US012555660B2

(12) United States Patent
Hayter et al.

(10) Patent No.: US 12,555,660 B2
(45) Date of Patent: Feb. 17, 2026

(54) SYSTEMS, DEVICES, AND METHODS RELATING TO MEDICATION DOSE GUIDANCE

(71) Applicant: ABBOTT DIABETES CARE INC., Alameda, CA (US)

(72) Inventors: Gary A. Hayter, Oakland, CA (US); Aparajita Bhattacharya, Dublin, CA (US); Erwin S. Budiman, Fremont, CA (US); Matthew T. Novak, Oakland, CA (US); Taihao Jin, Richmond, CA (US); Marc B. Taub, Mountain View, CA (US); Jonathan M. Fern, Alameda, CA (US); Yongjin Xu, San Ramon, CA (US); Kaiyuan Zhu, San Leandro, CA (US); Kendall Covington, Oakland, CA (US)

(73) Assignee: Abbott Diabetes Care Inc., Alameda, CA (US)

( * ) Notice: Subject to any disclaimer, the term of this patent is extended or adjusted under 35 U.S.C. 154(b) by 0 days.

(21) Appl. No.: 16/944,736

(22) Filed: Jul. 31, 2020

(65) Prior Publication Data

US 2021/0050085 A1 Feb. 18, 2021

Related U.S. Application Data

(60) Provisional application No. 63/058,799, filed on Jul. 30, 2020, provisional application No. 62/979,578, (Continued)

(51) Int. Cl.
*G16H 20/17* (2018.01)
*A61B 5/00* (2006.01)
(Continued)

(52) U.S. Cl.
CPC ......... *G16H 20/17* (2018.01); *A61B 5/14532* (2013.01); *A61B 5/4833* (2013.01); (Continued)

(58) Field of Classification Search
CPC ........ G16H 20/17; G16H 10/60; G16H 20/60; G16H 40/40; G16H 40/67; G16H 50/20; (Continued)

(56) References Cited

U.S. PATENT DOCUMENTS 5,860,917 A * 1/1999 Comanor ............... G16H 50/50
128/923
6,589,169 B1 7/2003 Surwit et al.
(Continued)

FOREIGN PATENT DOCUMENTS

CN 102016855 A 4/2011
CN 104620244 A 5/2015
(Continued)

OTHER PUBLICATIONS

Weimer, Physiology-Invariant Meal Detection for Type 1 Diabetes, 2016, Diabetes Technol Ther, Oct. 18(10):616-624 (Year: 2016).*
(Continued)

*Primary Examiner* — Kambiz Abdi
*Assistant Examiner* — Tran N Nguyen
(74) *Attorney, Agent, or Firm* — Sterne, Kessler, Goldstein & Fox P.L.L.C.

(57) ABSTRACT

Systems, devices and methods are provided for determining a medication dose for a patient or user. The dose determination can account for recent and/or historical analyte levels of the patient or user. The dose determination can also take into account other information about the patient or user, such as physiological information, dietary information, activity, and/or behavior. Many different dose determination embodiments are set forth, pertaining to a wide array of different
(Continued)

aspects of the system or environment in which the embodiments can be implemented.

22 Claims, 45 Drawing Sheets

Related U.S. Application Data filed on Feb. 21, 2020, provisional application No. 62/979,594, filed on Feb. 21, 2020, provisional application No. 62/979,618, filed on Feb. 21, 2020, provisional application No. 62/882,249, filed on Aug. 2, 2019.

(51) Int. Cl.

| | | |
|---|---|---|
| *A61B 5/145* | (2006.01) | |
| *G16H 10/60* | (2018.01) | |
| *G16H 20/60* | (2018.01) | |
| *G16H 40/40* | (2018.01) | |
| *G16H 40/67* | (2018.01) | |
| *G16H 50/20* | (2018.01) | |
| *G16H 50/30* | (2018.01) | |
| *G16H 50/70* | (2018.01) | |
| *G16H 15/00* | (2018.01) | |
| *G16H 70/40* | (2018.01) | |

(52) U.S. Cl.
CPC .......... *A61B 5/4848* (2013.01); *A61B 5/7246* (2013.01); *A61B 5/725* (2013.01); *A61B 5/7264* (2013.01); *A61B 5/7267* (2013.01); *G16H 10/60* (2018.01); *G16H 20/60* (2018.01); *G16H 40/40* (2018.01); *G16H 40/67* (2018.01); *G16H 50/20* (2018.01); *G16H 50/30* (2018.01); *G16H 50/70* (2018.01); *G16H 15/00* (2018.01); *G16H 70/40* (2018.01)

(58) Field of Classification Search
CPC ........ G16H 50/30; G16H 50/70; G16H 15/00; G16H 70/40; G16H 20/10; G16H 40/63; A61B 5/14532; A61B 5/4833; A61B 5/4848; A61B 5/7246; A61B 5/725; A61B 5/7264; A61B 5/7267
USPC ....................................................... 705/2–3
See application file for complete search history.

(56) References Cited

U.S. PATENT DOCUMENTS

| | | | | |
|---|---|---|---|---|
| 6,650,951 | B1* | 11/2003 | Jones | A61M 5/142 |
| | | | | 604/65 |
| 6,923,763 | B1 | 8/2005 | Kovatchev et al. | |
| 8,600,682 | B2 | 12/2013 | Bashan et al. | |
| 10,133,848 | B1* | 11/2018 | Benzel | G16H 20/13 |
| 10,252,002 | B2 | 4/2019 | Haider et al. | |
| 2003/0028089 | A1 | 2/2003 | Galley et al. | |
| 2005/0272640 | A1* | 12/2005 | Doyle, III | A61K 38/28 |
| | | | | 436/86 |
| 2007/0259377 | A1* | 11/2007 | Urdea | G01N 33/48714 |
| | | | | 435/7.1 |
| 2008/0009692 | A1 | 1/2008 | Stafford | |
| 2008/0201325 | A1* | 8/2008 | Doniger | G06N 20/00 |
| | | | | 707/999.005 |
| 2008/0300572 | A1 | 12/2008 | Rankers et al. | |
| 2009/0149815 | A1 | 6/2009 | Kiel et al. | |
| 2010/0198142 | A1 | 8/2010 | Sloan et al. | |
| 2010/0204557 | A1* | 8/2010 | Kiaie | A61B 5/411 |
| | | | | 707/E17.014 |
| 2011/0098548 | A1* | 4/2011 | Budiman | G16H 50/50 |
| | | | | 600/365 |
| 2011/0193704 | A1 | 8/2011 | Harper et al. | |
| 2011/0208156 | A1* | 8/2011 | Doyle, III | A61B 5/4839 |
| | | | | 604/504 |
| 2011/0213225 | A1 | 9/2011 | Bernstein et al. | |
| 2011/0319729 | A1 | 12/2011 | Donnay et al. | |
| 2013/0245547 | A1* | 9/2013 | El-Khatib | A61M 5/1723 |
| | | | | 604/66 |
| 2014/0128834 | A1 | 5/2014 | Thomson | |
| 2014/0188400 | A1 | 7/2014 | Dunn et al. | |
| 2014/0243612 | A1 | 8/2014 | Li et al. | |
| 2014/0258190 | A1 | 9/2014 | Doniger et al. | |
| 2014/0350369 | A1 | 11/2014 | Budiman et al. | |
| 2015/0018639 | A1 | 1/2015 | Stafford | |
| 2015/0025345 | A1 | 1/2015 | Funderburk et al. | |
| 2015/0173661 | A1 | 6/2015 | Myles | |
| 2015/0347698 | A1* | 12/2015 | Soni | G16Z 99/00 |
| | | | | 706/11 |
| 2016/0001002 | A1* | 1/2016 | Yodfat | A61M 5/1408 |
| | | | | 604/152 |
| 2016/0256114 | A1* | 9/2016 | Chen | A61B 5/7267 |
| 2017/0185730 | A1* | 6/2017 | McIntyre | G06N 5/01 |
| 2017/0185748 | A1 | 6/2017 | Budiman et al. | |
| 2017/0372034 | A1* | 12/2017 | Tribble | G06Q 10/08 |
| 2018/0121628 | A1* | 5/2018 | Foubet | G07F 17/0092 |
| 2018/0188400 | A1 | 7/2018 | Kim et al. | |
| 2018/0197628 | A1* | 7/2018 | Wei | G16H 20/60 |
| 2018/0235520 | A1 | 8/2018 | Rao et al. | |
| 2018/0248768 | A1* | 8/2018 | Ibrahim Rana | H04L 41/12 |
| 2018/0272065 | A1* | 9/2018 | Talbot | A61B 5/7405 |
| 2019/0150808 | A1* | 5/2019 | Sloan | G16H 20/10 |
| 2019/0151196 | A1* | 5/2019 | Trower | B65D 77/04 |
| 2019/0180857 | A1 | 6/2019 | Van Orden et al. | |
| 2019/0192768 | A1* | 6/2019 | Gupta | G16H 50/50 |
| 2019/0290172 | A1* | 9/2019 | Hadad | A61B 5/14532 |
| 2019/0333634 | A1* | 10/2019 | Vleugels | A61B 5/16 |
| 2019/0343385 | A1 | 11/2019 | Cole et al. | |
| 2019/0378619 | A1* | 12/2019 | Meyer | G16H 50/70 |

FOREIGN PATENT DOCUMENTS

| | | | |
|---|---|---|---|
| CN | 107073207 A | | 8/2017 |
| JP | 4231253 B2 | | 2/2009 |
| JP | 2013526887 A | | 6/2013 |
| JP | 2018502341 A | | 1/2018 |
| WO | WO 2005/119524 A2 | | 12/2005 |
| WO | WO 2008/151452 A1 | | 12/2008 |
| WO | WO 2009/049252 A1 | | 4/2009 |
| WO | WO 2011/119896 A1 | | 9/2011 |
| WO | WO 2011/119898 A1 | | 9/2011 |
| WO | WO 2011/162843 A1 | | 12/2011 |
| WO | WO 2014/145049 A2 | | 9/2014 |
| WO | WO 2014/145335 A1 | | 9/2014 |
| WO | WO 2015/153482 A1 | | 10/2015 |
| WO | 2016092707 A1 | | 6/2016 |
| WO | 2018001855 A1 | | 1/2018 |
| WO | WO 2018/132315 A1 | | 7/2018 |
| WO | WO 2018/152241 A1 | | 8/2018 |
| WO | WO 2018/229209 A1 | | 12/2018 |
| WO | WO 2020/142655 A1 | | 7/2020 |

OTHER PUBLICATIONS

Yang, H., et al., "Micro-optics for microfluidic analytical applications", Chem. Soc. Rev., 2018, vol. 47, pp. 1391-1458.
WO, PCT/US20/44528 ISR and Written Opinion, Dec. 8, 2020.
3.2.4.3.1. sklearn.ensemble.RandomForestClassifier retrieved at https://scikit-learn.org/stable/modules/generated/sklearn.ensemble.RandomForestClassifier.html on Jul. 31, 2020, pp. 1-7.
Kudva, Y. C., et al., "Approach to Using Trend Arrows in the FreeStyle Libre Flash Glucose Monitoring Systems in Adults", Journal of the Endocrine Society, 2018, vol. 2, No. 12, pp. 1320-1337.
EP, 20851137.8 Extended Search Report, Aug. 29, 2023.
U.S. Pat. No. 8,282,549 B2, Brauker et al., published Oct. 9, 2012;

(56) References Cited

OTHER PUBLICATIONS 73 pages; Anlage TW 2, Taylor Wesling, Statement of Defence in *Abbott* v. *Dexcom*, Opposition to EP 3782539.
Campbell et al., "Outcomes of Using Flash Glucose Monitory Technology by Children and Young People with Type 1 Diabetes in a Single Arm Study," Pediatric Diabetes, 2018:19:1294-1301; Anlage TW 7, Taylor Wessing, Statement of Defence in *Abbott* v. *Dexcom*, Opposition to EP 3782539.
Haak, Thomas et al., "Use of Flash Glucose-Sensing Technology for 12 monts as a Replacement for Blood Glucose Monitoring in Insulin-treated Type 2 Diabetes," Diabetes Ther., Apr. 11, 2017; 14 pages; Anlage TW 8, Taylor Wessing, Statement of Defence in *Abbott* v. *Dexcom*, Opposition to EP 3782539.
US Patent Application No. 2006/0276771 A1, Galley et al., published Dec. 7, 2006 (earliest priority Jun. 6, 2005) 17 pages, Anlage TW 11 D2, Taylor Wessing, Statement of Defence in *Abbott* v. *Dexcom*, Opposition to EP 3782539.
US Patent Application No. 2008/0119710 A1, Reggiardo et al., published May 22, 2008 (earliest priority Oct. 31, 2006) 12 pages, Anlage TW 11 D4, Taylor Wessing, Statement of Defence in *Abbott* v. *Dexcom*, Opposition to EP 3782539.
STS-7 Continuous Glucose Monitoring System User's Guide, 74 pages; 2007; Anlage TW 11 D5a, Taylor Wessing, Statement of Defence in *Abbott* v. *Dexcom*, Opposition to EP 3782539.
Summary of Safety and Effectiveness Data for STS-7 Continuous Glucose Monitoring System, Notice of Approval dated May 31, 2007; 14 pages; Anlage TW 11 D5b, Taylor Wessing, Statement of Defence in *Abbott* v. *Dexcom*, Opposition to EP 3782539.
U.S. Pat. No. 6,175,752 B1, Say et al., published Jan. 16, 2001 (earliest priority Apr. 30, 1998); 64 pages; Anlage TW 11 D7, Taylor Wessing, Statement of Defence in *Abbott* v. *Dexcom*, Opposition to EP 3782539.
Letter from Department of Health and Human Services to DexCom Inc. regarding STS-7 Continuous Glucose Monitoring System, dated May 31, 2007; 95 pages; Anlage TW 25, Taylor Wessing, Statement of Defence in *Abbott* v. *Dexcom*, Opposition to EP 3782539.
Webpage showing FDA Premarket Approval Order for the STS-7 Continuous Glucose Monitoring System, decision date May 31, 2007; 3 pages.
Wayback Machine Internet Archive of US FDA CDRH Premarket Approval Final Decisions Rendered for May 2007; 21 pages.
Wayback Machine Internet Archive of US FDA CDRH Premarket Approval for STS-7 Continuous Glucose Monitoring System, Approved May 31, 2007; 1 page.
Urging FDA to Act Promptly to Approve Artificial Pancreas Technologies, Dan Burton, House of Representatives, Congressional Record, vol. 157, Pt. 13, Nov. 30, 2011; 3 pages.
Choudhary, Pratik, MD, et al., Insulin Pump Therapy with Automated Insulin Suspension in Response to Hypoglycemia, Diabetes Care, vol. 34, Sep. 2011, pp. 2023-2025.
Draft Guidance for Industry and FDA Staff, The Content of Investigational Device Exemption and Premarket Approval Applications for Low Glucose Suspend Device Systems; Availability, Federal Register, vol. 76, No. 120, Jun. 22, 2011; 2 pages.
Kowalski, Erin J., Can We Really Close the Loop and How Soon? Accelerating the Availability of an Artificial Pancreas: A Roadmap to Better Diabetes Management, Diabetes Technology & Therapeutics, vol. 11, Supplement 1, 2009; 8 pages.
Pickup, John C. et al., Semi-Closed-Loop Insulin Delivery Systems: Early Experience with Low-Glucose Insulin Suspend Pumps, Diabetes Technology & Therapeutics, vol. 13, No. 7, 2011, pp. 695-698.
Office Action for Chinese Application No. 202080055853.9, mailed Jun. 26, 2025, 19 pages.

\* cited by examiner

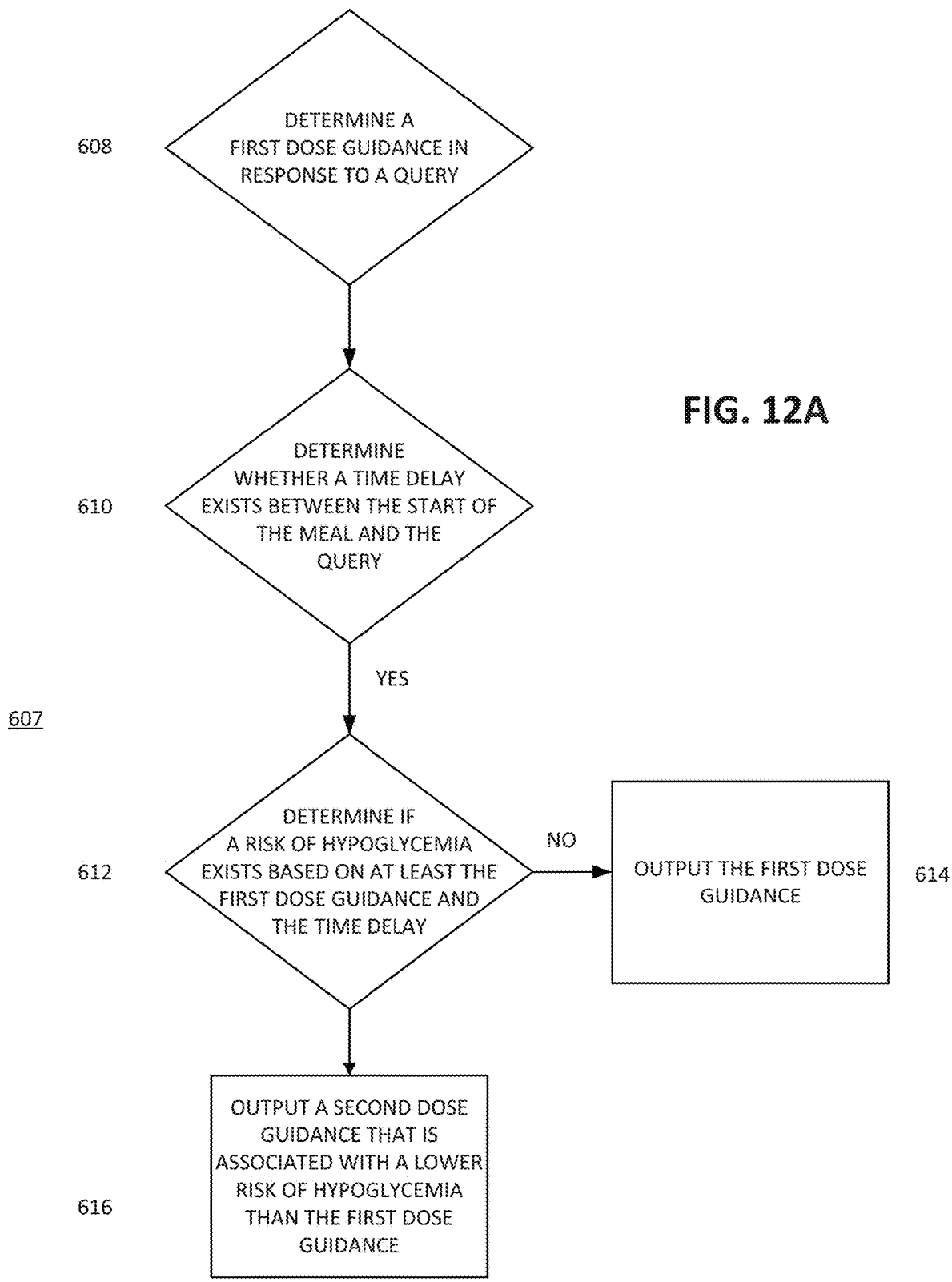

SYSTEMS, DEVICES, AND METHODS RELATING TO MEDICATION DOSE GUIDANCE

CROSS-REFERENCE TO RELATED APPLICATIONS

This application claims priority to, and the benefit of, U.S. Provisional Application No. 62/882,249, filed Aug. 2, 2019, U.S. Provisional Application No. 62/979,578, filed Feb. 21, 2020, U.S. Provisional Application No. 62/979,594, filed Feb. 21, 2020, U.S. Provisional Application No. 62/979,618, filed Feb. 21, 2020, and U.S. Provisional Application Ser. No. 63/058,799, filed Jul. 30, 2020, all of which are herein expressly incorporated by reference in their entirety for all purposes.

FIELD

The subject matter described herein relates generally to systems, devices, and methods relating to medication dose guidance such as, for example, the determination of an insulin dose for the treatment of elevated glucose levels resulting from diabetes.

BACKGROUND

The detection and/or monitoring of analyte levels, such as glucose, ketones, lactate, oxygen, hemoglobin A1C, or the like, can be vitally important to the health of an individual having diabetes. Patients suffering from diabetes mellitus can experience complications including loss of consciousness, cardiovascular disease, retinopathy, neuropathy, and nephropathy. Diabetics are generally required to monitor their glucose levels to ensure that they are being maintained within a clinically safe range, and may also use this information to determine if and/or when insulin is needed to reduce glucose levels in their bodies or when additional glucose is needed to raise the level of glucose in their bodies.

Growing clinical data demonstrates a strong correlation between the frequency of glucose monitoring and glycemic control. Despite such correlation, many individuals diagnosed with a diabetic condition do not monitor their glucose levels as frequently as they should due to a combination of factors including inconvenience, testing discretion, pain associated with glucose testing, and cost.

For patients that rely on the administration of medications (e.g., insulin) to treat or manage diabetes, it is desirable to have systems, devices, or methods that can automatically utilize glucose information collected by an analyte monitoring system to provide medication dose guidance in a readily accessible manner on an as-needed basis. It is further desirable for such systems, devices, or methods to take into account the physiology, diet, activity, and/or behavior of a user or patient to be treated in providing such medication dose guidance, as such may improve accuracy and reliability. Further, in some circumstances, it is also desirable for such systems, devices, or methods to be capable of automatically delivering a selected medication dose.

For these and other reasons, needs exist for improved systems, methods, and devices relating to medication dose guidance.

SUMMARY

Provided herein are example embodiments of systems, devices and methods relating to the provision of medication dose guidance and, in some embodiments, medication delivery. According to one aspect, many of the embodiments described herein comprise a dose guidance system that includes a display device, a sensor control device, and a medication delivery device. The dose guidance system can include a dose guidance application (e.g., software) that can determine and output dose guidance (e.g., recommendations regarding dose amounts, corrections, and titrations) to a patient. Furthermore, according to some embodiments, the dose guidance system can learn a patient's dosing strategy during a learning period in which the dose guidance system can estimate key dosing parameters. According to some embodiments, the dose guidance system can also provide guidance for titrations and corrections once the system is configured with a patient's current dosing strategies. The dose guidance system can also provide guidance for different meal dosing scenarios. For example, in some embodiments, the dose guidance system can provide dose guidance at or before a start of a meal or after a meal has started. The dose guidance system can also provide dose guidance for compounded meals (e.g., dessert) or for "touch up" doses to address high post-prandial glucose levels. Exemplary system and safety features of the dose guidance system are also described.

Many of the embodiments provided herein comprise improved software features or graphical user interfaces for use with analyte monitoring systems that are highly intuitive, user-friendly, and provide for rapid access to physiological information of a user. More specifically, these embodiments allow a user (or an HCP) to rapidly determine an appropriate medication therapy based on information relating to the user's physiological conditions, historic dosing patterns, and other factors, without requiring the user (or an HCP) to go through the arduous task of examining large volumes of analyte data. Furthermore, some of the GUIs and GUI features, allow for users (and their caregivers) to better understand and improve a user's dosing patterns and subsequent hypo and hyperglycemic episodes. Likewise, many other embodiments provided herein comprise improved software features for dose guidance systems that improve upon: dose guidances provided to users by allowing for safe titration strategies that minimize hypoglycemic episodes, methods for altering dose guidances depending on when the dose is to be administered relative to a meal start time (e.g., before, at the start, or after the start of a meal), consideration of real-world occurrences that effect dosing strategies, post-prandial alarms based on a predicted occurrence probability rather than a threshold, to name only a few. Other improvements and advantages are provided as well. The various configurations of these devices are described in detail by way of the embodiments which are only examples.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 12A is a flow diagram depicting an example embodiment of a method for determining a dose guidance for administration after a start of a meal.

DETAILED DESCRIPTION

Figure 1A:
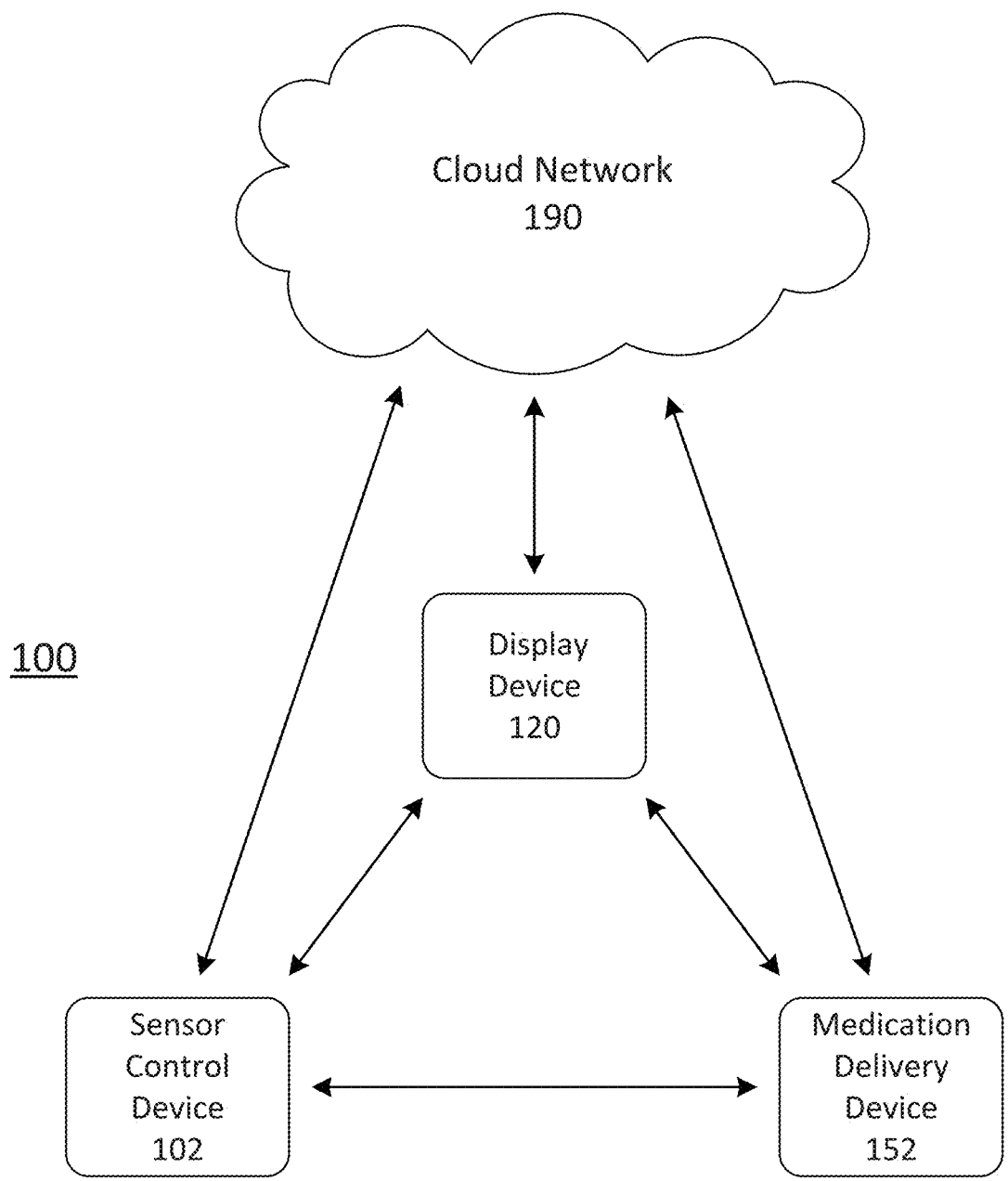
FIGS. 1A and 1B are block diagrams of example embodiments of a dose guidance system.

Before the present subject matter is described in detail, it is to be understood that this disclosure is not limited to the particular embodiments described herein, as such may, of course, vary. It is also to be understood that the terminology used herein is for the purpose of describing particular embodiments only, and is not intended to be limiting, since the scope of the present disclosure will be limited only by the appended claims.

Generally, embodiments of the present disclosure include systems, devices, and methods related to medication dose guidance. The dose guidance can be based on a broad array of information and categories of information specific to a user, such as the user's current and prior analyte levels, the user's current and prior diet, the user's current and prior physical activities, the user's current and prior medication history, and other physiological information about the user. According to one aspect of the embodiments, the dose guidance provided by the systems, devices, and methods of the present disclosure can be based—not only on individual categories of information—but also on the predicted impact of such categories of information on the user's future analyte levels.

The dose guidance functionality can be implemented as a dose guidance application (DGA) that includes software and/or firmware instructions stored in a memory of a computing device for execution by at least one processor or processing circuitry thereof. The computing device can be in the possession of a user or healthcare professional (HCP), and the user or HCP can interface with the computing device through a user interface. According to some embodiments, the computing device can be a server or trusted computer system that is accessible through a network, and the dose guidance software can be presented to the user in the form of an interactive web page by way of a browser executed on a local display device (having the user interface) in communication with the server or trusted computer system through the network. In this and other embodiments, the dose guidance software can be executed across multiple devices, or executed, in part, on processing circuitry of a local display device and, in part, on processing circuitry of a server or trusted computer system. It will be understood by those of skill in the art that when the DGA is described as performing an action, such action is performed according to instructions stored in a computer memory (including instructions hardcoded in read only memory) that, when executed by at least one processor of at least one computing device, causes the DGA to perform the described action. In all cases the action can alternatively be performed by hardware that is hardwired to implement the action (e.g., dedicated circuitry) as opposed to performance by way of instructions stored in memory.

Furthermore, as used herein, a system on which the DGA is implemented can be referred to as a dose guidance system. The dose guidance system can be configured for the sole purpose of providing dose guidance or can be a multifunctional system of which dose guidance is only one aspect. For example, in some embodiments the dose guidance system can also be capable of monitoring analyte levels of a user. In some embodiments the dose guidance system can also be capable of delivering medication to the user, such as with an injection or infusion device. In some embodiments, the dose guidance system is capable of both monitoring analytes and delivering medication.

These embodiments and others described herein represent improvements in the field of computer-based dose determination, analyte monitoring, and medication delivery systems. The specific features and potential advantages of the disclosed embodiments are further discussed below.

Before describing the dose guidance embodiments in detail, it is first desirable to describe examples of dose guidance systems on or through which the dose guidance application can be implemented.

Example Embodiments of Dose Guidance Systems

FIG. 1A is a block diagram depicting an example embodiment of dose guidance system 100. In this embodiment, dose guidance system 100 is capable of providing dose guidance, monitoring one or more analytes, and delivering one or more medications. This multifunctional example is used to illustrate the high degree of interconnectivity and performance obtainable by system 100. However, in the embodiments described herein, the analyte monitoring components, the medication delivery components, or both can be omitted if desired.

Here, system 100 includes a sensor control device (SCD) 102 configured to collect analyte level information from a user, a medication delivery device (MDD) 152 configured to deliver medication to the user, and a display device 120 configured to present information to the user and receive input or information from the user. The structure and function of each device will be described in detail herein.

System 100 is configured for highly interconnected and highly flexible communication between devices. Each of the three devices 102, 120, and 152, can communicate directly with each other (without passing through an intermediate electronic device) or indirectly with each other (such as through cloud network 190, or through another device and then through network 190). Bidirectional communication capability between devices, as well as between devices and network 190, is shown in FIG. 1A with a double-sided arrow. However, those of skill in the art will appreciate that any of the one or more devices (e.g., SCD) can be capable of unidirectional communication such as, for example, broadcasting, multicasting, or advertising communications. In each instance, whether bidirectional or unidirectional, the communication can be wired or wireless. The protocols that govern communication over each path can be the same or different, and can be either proprietary or standardized. For example, wireless communication between devices 102, 120, and 152 can be performed according to a Bluetooth (including Bluetooth Low Energy) standard, a Near Field Communication (NFC) standard, a Wi-Fi (802.11x) standard, a mobile telephony standard, or others. All communications over the various paths can be encrypted, and each device of FIG. 1A can be configured to encrypt and decrypt those communications sent and received. In each instance the communication pathways of FIG. 1A can be direct (e.g., Bluetooth or NFC) or indirect (e.g., Wi-Fi, mobile telephony, or other internet protocol). Embodiments of system 100 do not need to have the capability to communicate across all of the pathways indicated in FIG. 1A.

In addition, although FIG. 1A depicts a single display device 120, a single SCD 102, and a single MDD 152, those of skill in the art will appreciate that system 100 can comprise a plurality of any of the aforementioned devices. By way of example only, system 100 can comprise a single SCD 102 in communication with multiple (e.g., two, three, four, etc.) display devices 120 and/or multiple MDDs 152. Alternatively, system 100 can comprise a plurality of SCDs 102 in communication with a single display device 120 and/or a single MDD 152. Furthermore, each of the plurality of devices can be of the same or different device types. For example, system 100 can comprise multiple display devices 120, including a smart phone, a handheld receiver, and/or a smart watch, each of which can be in communication with SCD 102 and/or MDD 152, as well in communication with each other.

Analyte data can be transferred between each device within system 100 in an autonomous fashion (e.g., transmitting automatically according to a schedule), or in response to a request for analyte data (e.g., sending a request from a first device to a second device for analyte data, followed by transmission of the analyte data from the second device to the first device). Other techniques for communicating data can also be employed to accommodate more complex systems like cloud network 190.

Figure 1B:
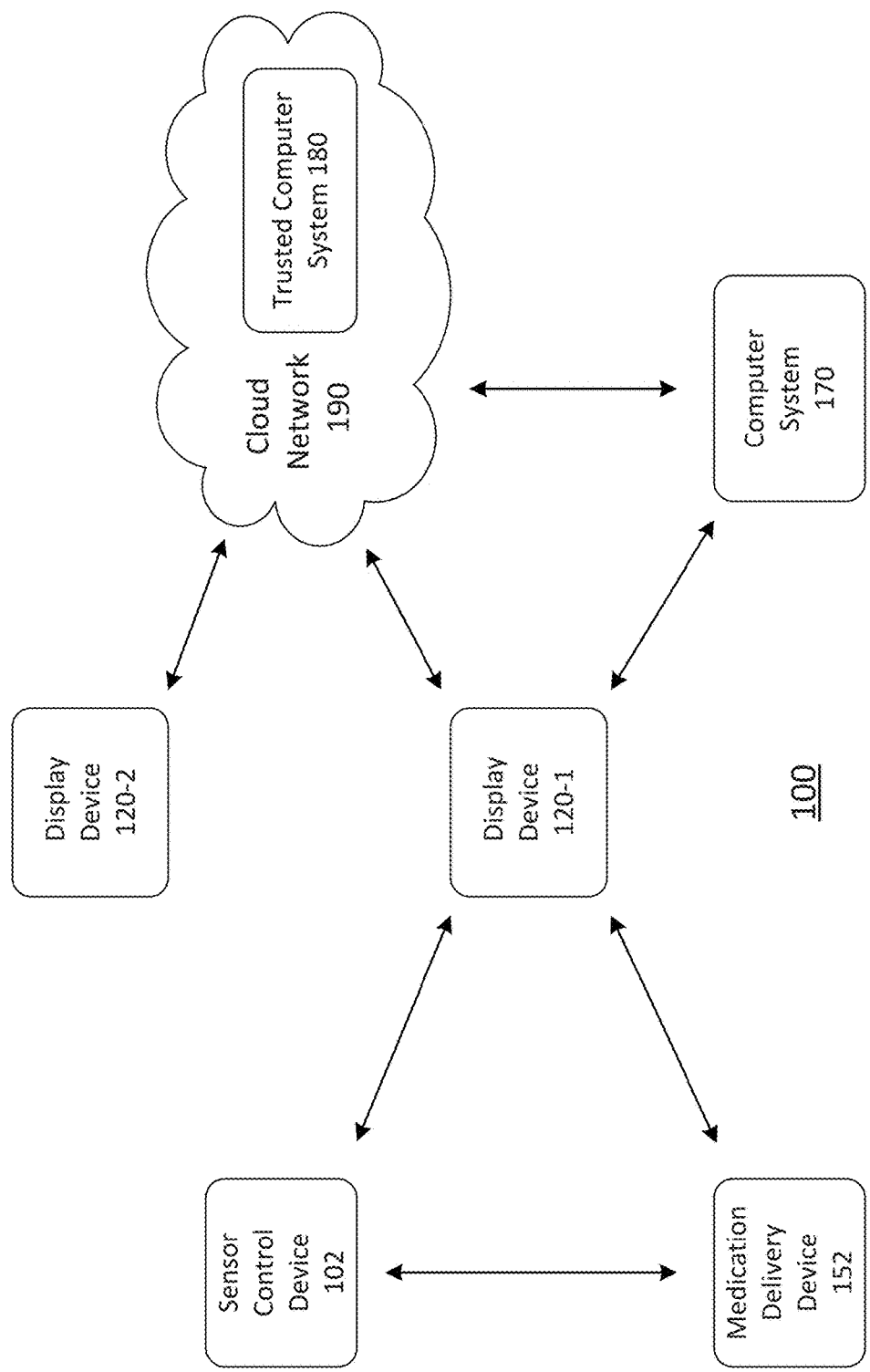

FIG. 1B is a block diagram depicting another example embodiment of dose guidance system 100. Here, system 100 includes SCD 102, MDD 152, a first display device 120-1, a second display device 120-2, local computer system 170, and trusted computer system 180 that is accessible by cloud network 190. SCD 102 and MDD 152 are capable of communication with each other and with display device 120-1, which can act as a communication hub for aggregating information from SCD 102 and MDD 152, processing and displaying that information where desired, and transferring some or all of the information to cloud network 190 and/or computer system 170. Conversely, display device 120-1 can receive information from cloud network 190 and/or computer system 170 and communicate some or all of the received information to SCD 102, MDD 152, or both. Computer system 170 may be a personal computer, a server terminal, a laptop computer, a tablet, or other suitable data processing device. Computer system 170 can include or present software for data management and analysis and communication with the components in system 100. Computer system 170 can be used by the user or a medical professional to display and/or analyze analyte data measured by SCD 102. Furthermore, although FIG. 1B depicts a single SCD 102, a single MDD 152, and two display devices 120-1 and 120-2, those of skill in the art will appreciate that system 100 can include a plurality of any of the aforementioned devices, wherein each plurality of devices can comprise the same or different types of devices.

Referring still to FIG. 1B, according to some embodiments, trusted computer system 180 can be within the possession of a manufacturer or distributor of a component of system 100, either physically or virtually through a secured connection, and can be used to perform authentication of the devices of system 100 (e.g., devices 102, 120-n, 152), for secure storage of the user's data, and/or as a server that serves a data analytics program (e.g., accessible via a web browser) for performing analysis on the user's measured analyte data and medication history. Trusted computer system 180 can also act as a data hub for routing and exchanging data between all devices in communication with system 180 through cloud network 190. In other words, all devices of system 100 that are capable of communicating with cloud network 190 (e.g., either directly with an internet connection or indirectly via another device), are also capable of communicating with all of the other devices of system 100 that are capable of communicating with cloud network 190, either directly or indirectly.

Display device 120-2 is depicted in communication with cloud network 190. In this example, device 120-2 can be in the possession of another user that is granted access to the analyte and medication data of the person wearing SCD 102. For example, the person in possession of display device 120-2 can be a parent of a child wearing SCD 102, as one example, or a caregiver of an elderly patient wearing SCD 102, as another example. System 100 can be configured to communicate analyte and medication data about the wearer through cloud network 190 (e.g., via trusted computer system 180) to another user with granted access to the data.

Example Embodiments of Analyte Monitoring Devices

The analyte monitoring functionality of dose guidance system 100 can be realized through inclusion of one or more devices capable of collecting, processing, and displaying analyte data of the user. Example embodiments of such devices and their methods of use are described in Int'l Publ. No. WO 2018/152241 and U.S. Patent Publ. No. 2011/0213225, both of which are incorporated by reference herein in their entireties for all purposes.

Analyte monitoring can be performed in numerous different ways. "Continuous Analyte Monitoring" devices (e.g., "Continuous Glucose Monitoring" devices), for example, can transmit data from a sensor control device to a display device continuously or repeatedly with or without prompting, e.g., automatically according to a schedule. "Flash Analyte Monitoring" devices (e.g., "Flash Glucose Monitoring" devices or simply "Flash" devices), as another example, can transfer data from a sensor control device in response to a user-initiated request for data by a display device (e.g., a scan), such as with a Near Field Communication (NFC) or Radio Frequency Identification (RFID) protocol.

Analyte monitoring devices that utilize a sensor configured to be placed partially or wholly within a user's body can be referred to as in vivo analyte monitoring devices. For example, an in vivo sensor can be placed in the user's body such that at least a portion of the sensor is in contact with a bodily fluid (e.g., interstitial (ISF) fluid such as dermal fluid in the dermal layer or subcutaneous fluid beneath the dermal layer, blood, or others) and can measure an analyte concentration in that bodily fluid. In vivo sensors can use various types of sensing techniques (e.g., chemical, electrochemical, or optical). Some systems utilizing in vivo analyte sensors can also operate without the need for finger stick calibration.

"In vitro" devices are those where a sensor is brought into contact with a biological sample outside of the body (or rather "ex vivo"). These devices typically include a port for receiving an analyte test strip carrying bodily fluid of the user, which can be analyzed to determine the user's blood glucose level. Other ex vivo devices have been proposed that attempt to measure the user's internal analyte level non-invasively, such as by using an optical technique that can measure an internal body analyte level without mechanically penetrating the user's body or skin. In vivo and ex vivo devices often include in vitro capability (e.g., an in vivo display device that also includes a test strip port).

The present subject matter will be described with respect to sensors capable of measuring a glucose concentration, although detection and measurement of concentrations of other analytes are within the scope of the present disclosure. These other analytes can include, for example, ketones, lactate, oxygen, hemoglobin A1C, acetyl choline, amylase, bilirubin, cholesterol, chorionic gonadotropin, creatine kinase (e.g., CK-MB), creatine, DNA, fructosamine, glutamine, growth hormones, hormones, peroxide, prostate-specific antigen, prothrombin, RNA, thyroid stimulating hormone, troponin and others. The concentration of drugs, such as, for example, antibiotics (e.g., gentamicin, vancomycin, and the like), digitoxin, digoxin, drugs of abuse, theophylline, and warfarin, may also be monitored. The sensor can be configured to measure two or more different analytes at the same or different times. In some embodiments, the sensor control device can be coupled with two or more sensors, where one sensor is configured to measure a first analyte (e.g., glucose) and the other one or more sensors are configured to measure one or more different analytes (e.g., any of those described herein). In other embodiments, a user can wear two or more sensor control devices, each of which is capable of measuring a different analyte.

The embodiments described herein can be used with all types of in vivo, in vitro, and ex vivo devices capable of monitoring the aforementioned analytes and others.

In many embodiments, the sensor operation can be controlled by SCD 102. The sensor can be mechanically and communicatively coupled with SCD 102, or can be just communicatively coupled with SCD 102 using a wireless communication technique. SCD 102 can include the electronics and power supply that enable and control analyte sensing performed by the sensor. In some embodiments the sensor or SCD 102 can be self-powered such that a battery is not required. SCD 102 can also include communication circuitry for communicating with another device that may or may not be local to the user's body (e.g., a display device). SCD 102 can reside on the body of the user (e.g., attached to or otherwise placed on the user's skin, or carried in the user's clothes, etc.). SCD 102 can also be implanted within the body of the user along with the sensor. Functionality of SCD 102 can be divided between a first component implanted within the body (e.g., a component that controls the sensor) and a second component that resides on or otherwise outside the body (e.g., a relay component that communicates with the first component and also with an external device like a computer or smartphone). In other embodiments, SCD 102 can be external to the body and configured to non-invasively measure the user's analyte levels. The sensor control device, depending on the actual implementation or embodiment, can also be referred to as a "sensor control unit," an "on-body electronics" device or unit, an "on-body" device or unit, an "in body electronics" device or unit, an "in-body" device or unit, or a "sensor data communication" device or unit, to name a few.

In some embodiments, SCD 102 may include a user interface (e.g., a touchscreen) and be capable of processing the analyte data and displaying the resultant calculated analyte levels to the user. In such cases, the dose guidance embodiments described herein can be implemented directly by SCD 102, in whole or in part. In many embodiments, the physical form factor of SCD 102 is minimized (e.g., to minimize the appearance on the user's body) or the sensor control device may be inaccessible to the user (e.g., if wholly implanted), or other factors may make it desirable to have a display device usable by the user to read analyte levels and interface with the sensor control device.

Figure 2A:
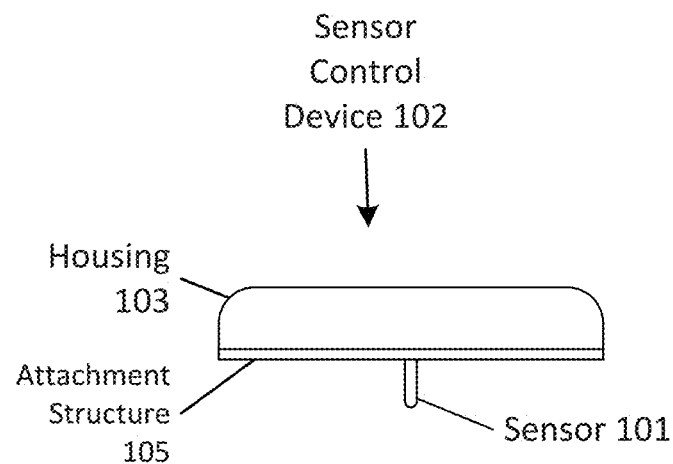
FIG. 2A is a schematic diagram depicting an example embodiment of a sensor control device.

FIG. 2A is a side view of an example embodiment of SCD 102. SCD 102 can include a housing or mount 103 for sensor electronics (FIG. 2B), which can be electrically coupled with an analyte sensor 101, which is configured here as an electrochemical sensor. According to some embodiments, sensor 101 can be configured to reside partially within a user's body (e.g., through an exterior-most surface of the skin) where it can make fluid contact with a user's bodily fluid and be used, along with the sensor electronics, to measure analyte-related data of the user. A structure for attachment 105, such as an adhesive patch, can be used to secure housing 103 to a user's skin. Sensor 101 can extend through attachment structure 105 and project away from housing 103. Those of skill in the art will appreciate that other forms of attachment to the body and/or housing 103 may be used, in addition to or instead of adhesive, and are fully within the scope of the present disclosure.

SCD 102 can be applied to the body in any desired manner. For example, an insertion device (not shown), sometimes referred to as an applicator, can be used to position all or a portion of analyte sensor 101 through an external surface of the user's skin and into contact with the user's bodily fluid. In doing so, the insertion device can also position SCD 102 onto the skin. In other embodiments, the insertion device can position sensor 101 first, and then accompanying electronics (e.g., wireless transmission circuitry and/or data processing circuitry, and the like) can be coupled with sensor 101 afterwards (e.g., inserted into a mount), either manually or with the aid of a mechanical device. Examples of insertion devices are described in U.S. Patent Publication Nos. 2008/0009692, 2011/0319729, 2015/0018639, 2015/0025345, and 2015/0173661, 2018/0235520, all which are incorporated by reference herein in their entireties for all purposes.

Figure 2B:
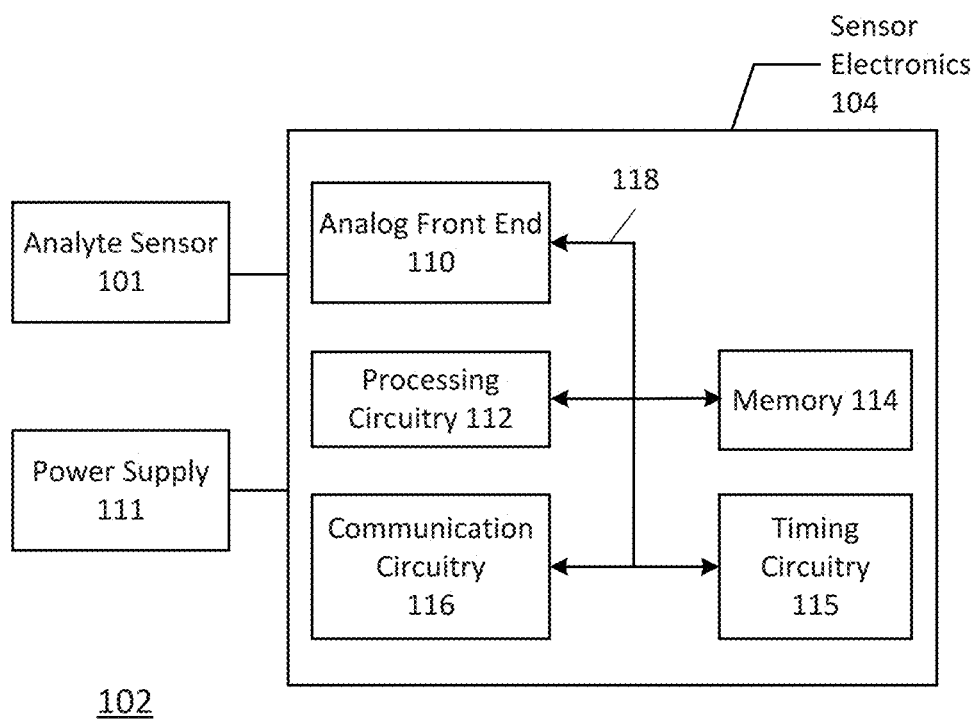
FIG. 2B is a block diagram depicting an example embodiment of a sensor control device.

FIG. 2B is a block diagram depicting an example embodiment of SCD 102 having analyte sensor 101 and sensor electronics 104. Sensor electronics 104 can be implemented in one or more semiconductor chips (e.g., an application specific integrated circuit (ASIC), processor or controller, memory, programmable gate array, and others). In the embodiment of FIG. 1B, sensor electronics 104 includes high-level functional units, including an analog front end (AFE) 110 configured to interface in an analog manner with sensor 101 and convert analog signals to and/or from digital form (e.g., with an A/D converter), a power supply 111 configured to supply power to the components of SCD 102, processing circuitry 112, memory 114, timing circuitry 115 (e.g., such as an oscillator and phase locked loop for providing a clock or other timing to components of SCD 102), and communication circuitry 116 configured to communicate in wired and/or wireless fashion with one or more devices external to SCD 102, such as display device 120 and/or MDD 152.

SCD 102 can be implemented in a highly interconnected fashion, where power supply 111 is coupled with each component shown in FIG. 2B and where those components that communicate or receive data, information, or commands (e.g., AFE 110, processing circuitry 112, memory 114, timing circuitry 115, and communication circuitry 116), can be communicatively coupled with every other such component over, for example, one or more communication connections or buses 118.

Processing circuitry 112 can include one or more processors, microprocessors, controllers, and/or microcontrollers, each of which can be a discrete chip or distributed amongst (and a portion of) a number of different chips. Processing circuitry 112 can include on-board memory. Processing circuitry 112 can interface with communication circuitry 116 and perform analog-to-digital conversions, encoding and decoding, digital signal processing and other functions that facilitate the conversion of data signals into a format (e.g., in-phase and quadrature) suitable for wireless or wired transmission. Processing circuitry 112 can also interface with communication circuitry 116 to perform the reverse functions necessary to receive a wireless transmission and convert it into digital data or information.

Processing circuitry 112 can execute instructions stored in memory 114. These instructions can cause processing circuitry 112 to process raw analyte data (or pre-processed analyte data) and arrive at a final calculated analyte level. In some embodiments, instructions stored in memory 114, when executed, can cause processing circuitry 112 to process raw analyte data to determine one or more of: a calculated analyte level, an average calculated analyte level within a predetermined time window, a calculated rate-of-change of an analyte level within a predetermined time window, and/or whether a calculated analyte metric exceeds a predetermined threshold condition. These instructions can also cause processing circuitry 112 to read and act on received transmissions, to adjust the timing of timing circuitry 115, to process data or information received from other devices (e.g., calibration information, encryption or authentication information received from display device 120, and others), to perform tasks to establish and maintain communication with display device 120, to interpret voice commands from a user, to cause communication circuitry 116 to transmit, and others. In embodiments where SCD 102 includes a user interface, then the instructions can cause processing circuitry 112 to control the user interface, read user input from the user interface, cause the display of information on the user interface, format data for display, and others. The functions described here that are coded in the instructions can instead be implemented by SCD 102 with the use of a hardware or firmware design that does not rely on the execution of stored software instructions to accomplish the functions.

Memory 114 can be shared by one or more of the various functional units present within SCD 102, or can be distributed amongst two or more of them (e.g., as separate memories present within different chips). Memory 114 can also be a separate chip of its own. Memory 114 is non-transitory, and can be volatile (e.g., RAM, etc.) and/or non-volatile memory (e.g., ROM, flash memory, F-RAM, etc.).

Communication circuitry 116 can be implemented as one or more components (e.g., transmitter, receiver, transceiver, passive circuit, encoder, decoder, and/or other communication circuitry) that perform the functions for communications over the respective communications paths or links. Communication circuitry 116 can include or be coupled to one or more antenna for wireless communication.

Power supply 111 can include one or more batteries, which can be rechargeable or single-use disposable batteries. Power management circuitry can also be included to regulate battery charging and monitor usage of power supply 111, boost power, perform DC conversions, and the like.

Additionally, an on-skin or sensor temperature reading or measurement can be collected by an optional temperature sensor (not shown). Those readings or measurements can be communicated (either individually or as an aggregated measurement over time) from SCD 102 to another device (e.g., display device 120). The temperature reading or measurement, however, can be used in conjunction with a software routine executed by SCD 102 or display device 120 to correct or compensate the analyte measurement output to the user, instead of or in addition to, actually outputting the temperature measurement to the user.

Example Embodiments of Medication Delivery Devices

The medication delivery functionality of dose guidance system 100 can be realized through inclusion of one or more medication delivery devices (MDDs) 152. MDD 152 can be any device configured to deliver a specific dose of medication. The MDD 152 can also include devices that transmit data regarding doses to the DGA, e.g., pen caps, even though the device itself may not deliver the medication. The MDD 152 can be configured as a portable injection device (PID) that can deliver a single dose per one injection, such as a bolus. The PID can be a basic manually-operated syringe, where the medication is either preloaded in the syringe or must be drawn into the syringe from a container prior to injection. In most embodiments, however, the PID includes electronics for interfacing with the user and performing the delivery of the medication. PIDs are often referred to as medication pens, although a pen-like appearance is not required. PIDs having user interface electronics are often referred to as smart pens. PIDs can be used to deliver one dose and then disposed of, or can be durable and used repeatedly to deliver many doses over the course of a day, week, or month. PIDs are often relied upon by users that practice a multiple daily injection (MDI) therapy regimen.

The MDD can also comprise a pump and infusion set. The infusion set includes a tubular cannula that resides at least partially within the recipient's body. The tubular cannula is in fluid communication with a pump, which can deliver medication through the cannula and into the recipient's body in small increments repeatedly over time. The infusion set can be applied to the recipient's body using an infusion set applicator, and the infusion set often stays implanted for 2 to 3 days or longer. A pump device includes electronics for interfacing with the user and for controlling the slow infusion of the medication. Both a PID and a pump can store the medication in a medication reservoir.

MDD 152 can function as part of a closed-loop system (e.g., an artificial pancreas system requiring no user intervention to operate), semi-closed loop system (e.g., an insulin loop system requiring seldom user intervention to operate, such as to confirm changes in dose), or an open loop system. For example, the diabetic's analyte level can be monitored in a repeated automatic fashion by SCD 102, and that information can be used by the dose guidance embodiments described herein to automatically calculate or otherwise determine the appropriate drug dosage to control the diabetic's analyte level and subsequently deliver that dose to the diabetic's body. This calculation can occur within MDD 152 or any other device of system 100 and the resulting determined dosage can then be communicated to MCD 152.

In many embodiments, the dose guidance provided by the embodiments described herein will be for a type of insulin (e.g., rapid-acting (RA), short-acting insulin, intermediate-acting insulin (e.g., NPH insulin), long-acting (LA), ultra long-acting insulin, and mixed insulin), and will be the same medication delivered by MDD 152. The type of insulin includes human insulin and synthetic insulin analogs. The insulin can also include premixed formulations. However, the dose guidance embodiments set forth herein and the medication delivery capabilities of MDD 152 can be applied to other non-insulin medications. Such medications can include, but are not limited to exenatide, exenatide extended release, liraglutide, lixisenatide, semaglutide, pramlintide, metformin, SLGT1-i inhibitors, SLGT2-i inhibitors, and DPP4 inhibitors. The dose guidance embodiments can also include combination therapies. Combination therapies can include, but are not limited to, insulin and glucagon-like peptide-1 receptor agonists (GLP-1 RA), insulin and pramlintide.

For ease of description of the dose guidance embodiments herein, MDD 152 will often be described in the form of a PID, specifically a smart pen. However, those of skill in the art will readily understand that MDD 152 can alternatively be configured as a pen cap, a pump, or any other type of medication delivery device.

Figure 3A:
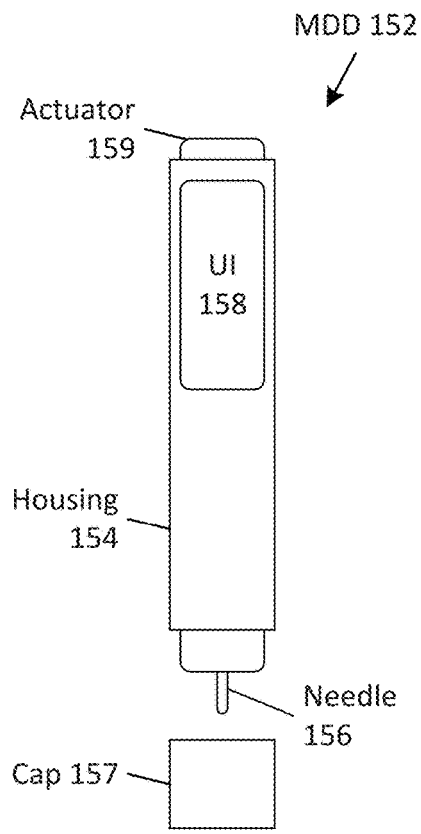
FIG. 3A is a schematic diagram depicting an example embodiment of a medication delivery device.

FIG. 3A is schematic diagram depicting an example embodiment of an MDD 152 configured as a PID, specifically a smart pen. MDD 152 can include a housing 154 for electronics, an injection motor, and a medication reservoir (see FIG. 3B), from which medication can be delivered through needle 156. Housing 154 can include a removable or detachable cap or cover 157 that, when attached, can shield needle 156 when not in use, and then be detached for injection. MDD 152 can also include a user interface 158 which can be implemented as a single component (e.g., a touchscreen for outputting information to the user and receiving input from the user) or as multiple components (e.g., a touchscreen or display in combination with one or more buttons, switches, or the like). MDD 152 can also include an actuator 159 that can be moved, depressed, touched or otherwise activated to initiate delivery of the medication from an internal reservoir through needle 156 and into the recipient's body. According to some embodiments, cap 157 and actuator 159 can also include one or more safety mechanisms to prevent removal and/or actuation to mitigate risk of a harmful medication injection. Details of these safety mechanisms and others are described in U.S. Patent Publ. No. 2019/0343385 (the '385 publication), which is hereby incorporated in its entirety for all purposes.

Figure 3B:
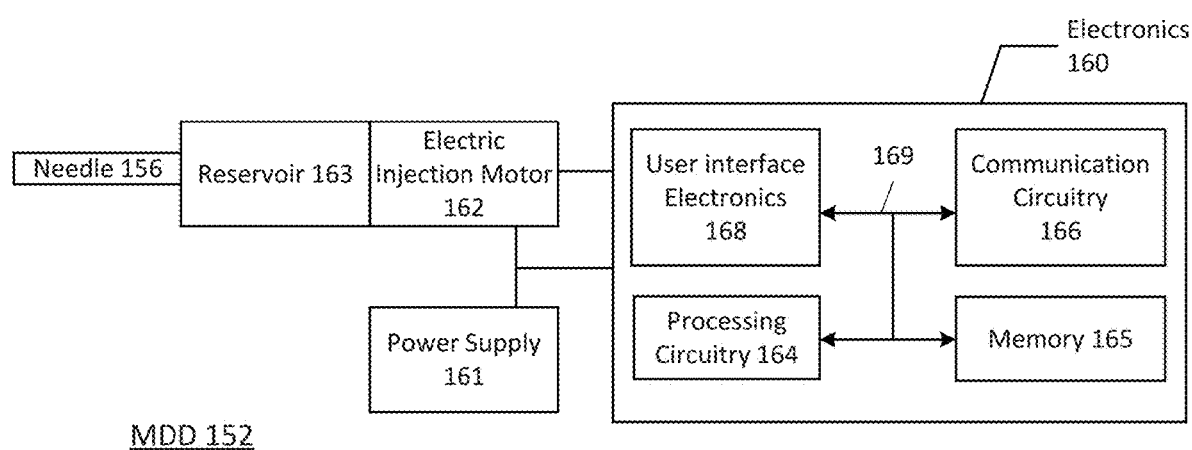
FIG. 3B is a block diagram depicting an example embodiment of a medication delivery device.

FIG. 3B is a block diagram depicting an example embodiment of MDD 152 having electronics 160, coupled with a power supply 161 and an electric injection motor 162, which in turn is coupled with power supply 161 and a medication reservoir 163. Needle 156 is shown in fluid communication with reservoir 163, and a valve (not shown) may be present between reservoir 163 and needle 156. Reservoir 163 can be permanent or can be removable and replaced with another reservoir containing the same or different medication. Electronics 160 can be implemented in one or more semiconductor chips (e.g., an application specific integrated circuit (ASIC), processor or controller, memory, programmable gate array, and others). In the embodiment of FIG. 3B, electronics 160 can include high-level functional units, including processing circuitry 164, memory 165, communication circuitry 166 configured to communicate in wired and/or wireless fashion with one or more devices external to MDD 152 (such as display device 120), and user interface electronics 168.

MDD 152 can be implemented in a highly interconnected fashion, where power supply 161 is coupled with each component shown in FIG. 3B and where those components that communicate or receive data, information, or commands (e.g., processing circuitry 164, memory 165, and communication circuitry 166), can be communicatively coupled with every other such component over, for example, one or more communication connections or buses 169.

Processing circuitry 164 can include one or more processors, microprocessors, controllers, and/or microcontrollers, each of which can be a discrete chip or distributed amongst (and a portion of) a number of different chips. Processing circuitry 164 can include on-board memory. Processing circuitry 164 can interface with communication circuitry 166 and perform analog-to-digital conversions, encoding and decoding, digital signal processing and other functions that facilitate the conversion of data signals into a format (e.g., in-phase and quadrature) suitable for wireless or wired transmission. Processing circuitry 164 can also interface with communication circuitry 166 to perform the reverse functions necessary to receive a wireless transmission and convert it into digital data or information.

Processing circuitry 164 can execute software instructions stored in memory 165. These instructions can cause processing circuitry 164 to receive a selection or provision of a specified dose from a user (e.g., entered via user interface 158 or received from another device), process a command to deliver a specified dose (such as a signal from actuator 159), and control motor 162 to cause delivery of the specified dose. These instructions can also cause processing circuitry 164 to read and act on received transmissions, to process data or information received from other devices (e.g., calibration information, encryption or authentication information received from display device 120, and others), to perform tasks to establish and maintain communication with display device 120, to interpret voice commands from a user, to cause communication circuitry 166 to transmit, and others. In embodiments where MDD 152 includes user interface 158, then the instructions can cause processing circuitry 164 to control the user interface, read user input from the user interface (e.g., entry of a medication dose for administration or entry of confirmation of a recommended medication dose), cause the display of information on the user interface, format data for display, and others. The functions described here that are coded in the instructions can instead be implemented by MDD 152 with the use of a hardware or firmware design that does not rely on the execution of stored software instructions to accomplish the functions.

Memory 165 can be shared by one or more of the various functional units present within MDD 152, or can be distributed amongst two or more of them (e.g., as separate memories present within different chips). Memory 165 can also be a separate chip of its own. Memory 165 is non-transitory, and can be volatile (e.g., RAM, etc.) and/or non-volatile memory (e.g., ROM, flash memory, F-RAM, etc.).

Communication circuitry 166 can be implemented as one or more components (e.g., transmitter, receiver, transceiver, passive circuit, encoder, decoder, and/or other communication circuitry) that perform the functions for communications over the respective communications paths or links. Communication circuitry 166 can include or be coupled to one or more antenna for wireless communication. Details of exemplary antenna can be found in the '385 publication, which is hereby incorporated in its entirety for all purposes.

Power supply 161 can include one or more batteries, which can be rechargeable or single-use disposable batteries. Power management circuitry can also be included to regulate battery charging and monitor usage of power supply 161, boost power, perform DC conversions, and the like.

MDD 152 may also include an integrated or attachable in vitro glucose meter, including an in vitro test strip port (not shown) to receive an in vitro glucose test strip for performing in vitro blood glucose measurements.

Example Embodiments of Display Devices

Display device 120 can be configured to display information pertaining to system 100 to the user and accept or receive input from the user also pertaining to system 100. Display device 120 can display recent measured analyte levels, in any number of forms, to the user. The display device can display historical analyte levels of the user as well as other metrics that describe the user's analyte information (e.g., time in range, ambulatory glucose profile (AGP), hypoglycemia risk levels, etc.). Display device 120 can display medication delivery information, such as historical dose information and the times and dates of administration. Display device 120 can display alarms, alerts, or other notifications pertaining to analyte levels and/or medication delivery.

Display device 120 can be dedicated for use with system 100 (e.g., an electronic device designed and manufactured for the primary purpose of interfacing with an analyte sensor and/or a medication delivery device), as well as devices that are multifunctional, general purpose computing devices such as a handheld or portable mobile communication device (e.g., a smartphone or tablet), or a laptop, personal computer, or other computing device. Display device 120 can be configured as a mobile smart wearable electronics assembly, such as a smart glass or smart glasses, or a smart watch or wristband. Display devices, and variations thereof, can be referred to as "reader devices," "readers," "handheld electronics" (or handhelds), "portable data processing" devices or units, "information receivers," "receiver" devices or units (or simply receivers), "relay" devices or units, or "remote" devices or units, to name a few.

Figure 4A:
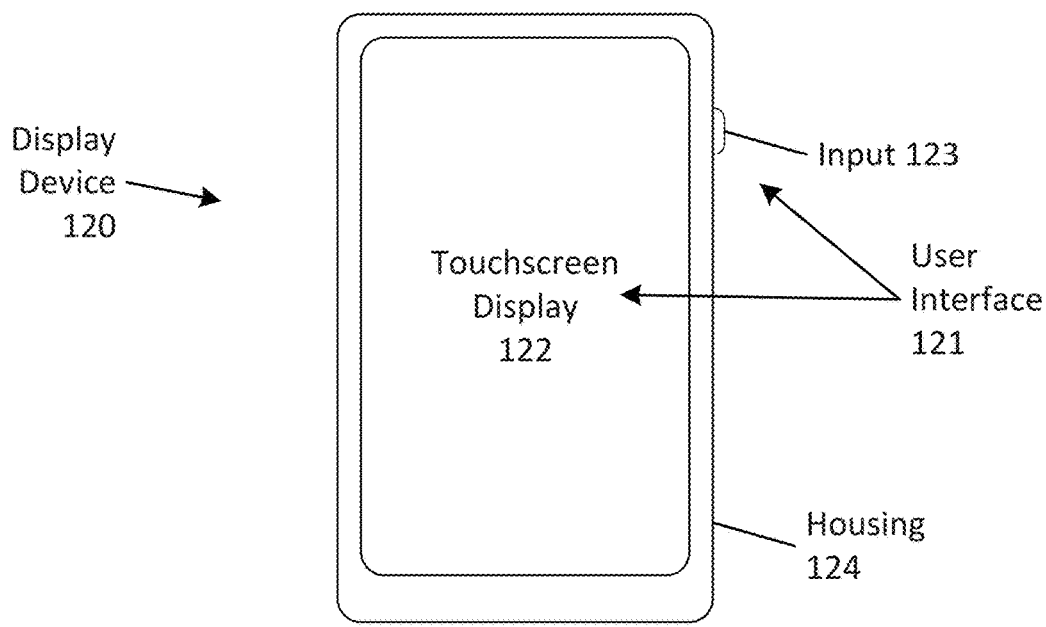
FIG. 4A is a schematic diagram depicting an example embodiment of a display device.

FIG. 4A is a schematic view depicting an example embodiment of display device 120. Here, display device 120 includes a user interface 121 and a housing 124 in which display device electronics 130 (FIG. 4B) are held. User interface 121 can be implemented as a single component (e.g., a touchscreen capable of input and output) or multiple components (e.g., a display and one or more devices configured to receive user input). In this embodiment, user interface 121 includes a touchscreen display 122 (configured to display information and graphics and accept user input by touch) and an input button 123, both of which are coupled with housing 124.

Display device 120 can have software stored thereon (e.g., by the manufacturer or downloaded by the user in the form of one or more "apps" or other software packages) that interface with SCD 102, MDD 152, and/or the user. In addition, or alternatively, the user interface can be affected by a web page displayed on a browser or other internet interfacing software executable on display device 120.

Figure 4B:
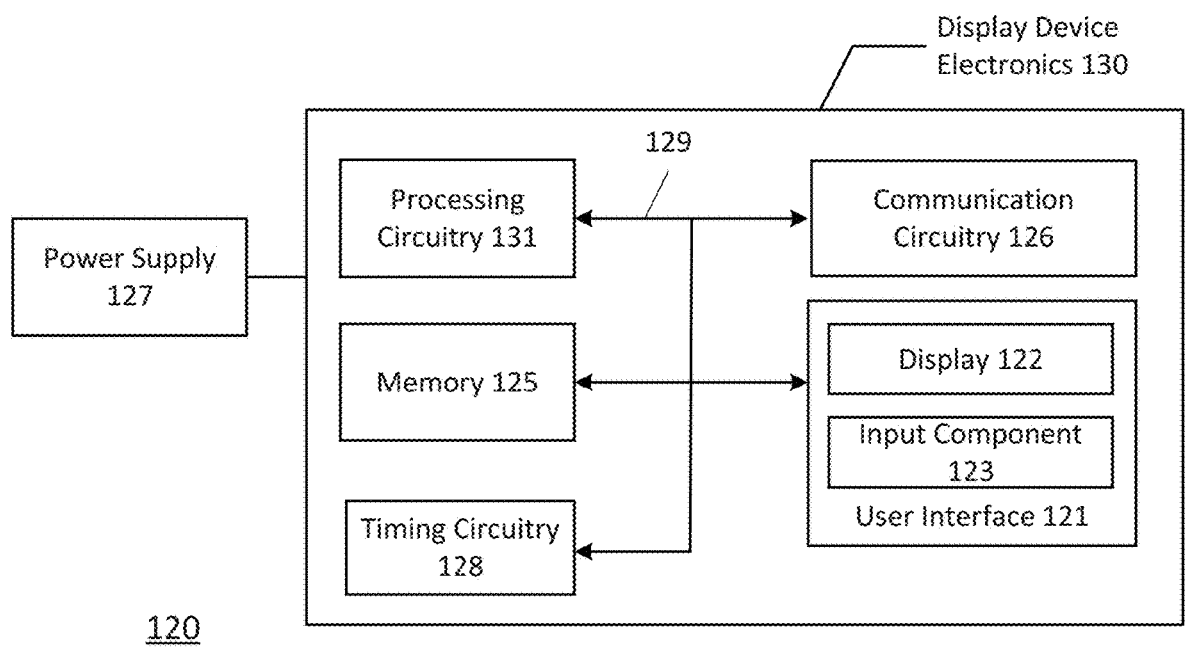
FIG. 4B is a block diagram depicting an example embodiment of a display device.

FIG. 4B is a block diagram of an example embodiment of a display device 120 with display device electronics 130. Here, display device 120 includes user interface 121 including display 122 and an input component 123 (e.g., a button, actuator, touch sensitive switch, capacitive switch, pressure sensitive switch, jog wheel, microphone, speaker, or the like), processing circuitry 131, memory 125, communication circuitry 126 configured to communicate to and/or from one or more other devices external to display device 120), a power supply 127, and timing circuitry 128 (e.g., such as an oscillator and phase locked loop for providing a clock or other timing to components of SCD 102). Each of the aforementioned components can be implemented as one or more different devices or can be combined into a multifunctional device (e.g., integration of processing circuitry 131, memory 125, and communication circuitry 126 on a single semiconductor chip). Display device 120 can be implemented in a highly interconnected fashion, where power supply 127 is coupled with each component shown in FIG. 4B and where those components that communicate or receive data, information, or commands (e.g., user interface 121, processing circuitry 131, memory 125, communication circuitry 126, and timing circuitry 128), can be communicatively coupled with every other such component over, for example, one or more communication connections or buses 129. FIG. 4B is an abbreviated representation of the typical hardware and functionality that resides within a display device and those of ordinary skill in the art will readily recognize that other hardware and functionality (e.g., codecs, drivers, glue logic) can also be included.

Processing circuitry 131 can include one or more processors, microprocessors, controllers, and/or microcontrollers, each of which can be a discrete chip or distributed amongst (and a portion of) a number of different chips. Processing circuitry 131 can include on-board memory. Processing circuitry 131 can interface with communication circuitry 126 and perform analog-to-digital conversions, encoding and decoding, digital signal processing and other functions that facilitate the conversion of data signals into a format (e.g., in-phase and quadrature) suitable for wireless or wired transmission. Processing circuitry 131 can also interface with communication circuitry 126 to perform the reverse functions necessary to receive a wireless transmission and convert it into digital data or information.

Processing circuitry 131 can execute software instructions stored in memory 125. These instructions can cause processing circuitry 131 to process raw analyte data (or pre-processed analyte data) and arrive at a corresponding analyte level suitable for display to the user. These instructions can cause processing circuitry 131 to read, process, and/or store a dose instruction from the user, and because the dose instruction to be communicated to MDD 152. These instructions can cause processing circuitry 131 to execute user interface software adapted to present an interactive group of graphical user interface screens to the user for the purposes of configuring system parameters (e.g., alarm thresholds, notification settings, display preferences, and the like), presenting current and historical analyte level information to the user, presenting current and historical medication delivery information to the user, collecting other non-analyte information from the user (e.g., information about meals consumed, activities performed, medication administered, and the like), and presenting notifications and alarms to the user. These instructions can also cause processing circuitry 131 to cause communication circuitry 126 to transmit, can cause processing circuitry 131 to read and act on received transmissions, to read input from user interface 121 (e.g., entry of a medication dose to be administered or confirmation of a recommended medication dose), to display data or information on user interface 121, to adjust the timing of timing circuitry 128, to process data or information received from other devices (e.g., analyte data, calibration information, encryption or authentication information received from SCD 102, and others), to perform tasks to establish and maintain communication with SCD 102, to interpret voice commands from a user, and others. The functions described here that are coded in the instructions can instead be implemented by display device 120 with the use of a hardware or firmware design that does not rely on the execution of stored software instructions to accomplish the functions.

Memory 125 can be shared by one or more of the various functional units present within display device 120, or can be distributed amongst two or more of them (e.g., as separate memories present within different chips). Memory 125 can also be a separate chip of its own. Memory 125 is non-transitory, and can be volatile (e.g., RAM, etc.) and/or non-volatile memory (e.g., ROM, flash memory, F-RAM, etc.).

Communication circuitry 126 can be implemented as one or more components (e.g., transmitter, receiver, transceiver, passive circuit, encoder, decoder, and/or other communication circuitry) that perform the functions for communications over the respective communications paths or links. Communication circuitry 126 can include or be coupled to one or more antenna for wireless communication.

Power supply 127 can include one or more batteries, which can be rechargeable or single-use disposable batteries. Power management circuitry can also be included to regulate battery charging and monitor usage of power supply 127, boost power, perform DC conversions, and the like.

Display device 120 can also include one or more data communication ports (not shown) for wired data communication with external devices such as computer system 170, SCD 102, or MDD 152. Display device 120 may also include an integrated or attachable in vitro glucose meter, including an in vitro test strip port (not shown) to receive an in vitro glucose test strip for performing in vitro blood glucose measurements.

Display device 120 can display the measured analyte data received from SCD 102 and can also be configured to output alarms, alert notifications, glucose values, etc., which may be visual, audible, tactile, or any combination thereof. In some embodiments, SCD 102 and/or MDD 152 can also be configured to output alarms, or alert notifications in visible, audible, tactile forms or combination thereof. Further details and other display embodiments can be found in, e.g., U.S.

Patent Publ. No. 2011/0193704, which is incorporated herein by reference in its entirety for all purposes.

Example Embodiments Related to Dose Guidance

The following example embodiments relate to dose guidance functionality provided by dose guidance system 100. The dose guidance functionality will, in many embodiments, be implemented as a set of software instructions stored and/or executed on one or more electronic devices. This dose guidance functionality will be referred to herein as a dose guidance application (DGA). In some embodiments, the DGA is stored, executed, and presented to the user on the same single electronic device. In other embodiments, the DGA can be stored and executed on one device, and presented to the user on a different electronic device. For example, the DGA can be stored and executed on trusted computer system 180 and presented to the user by way of a webpage displayed through an internet browser executed on display device 120.

Figure 5:
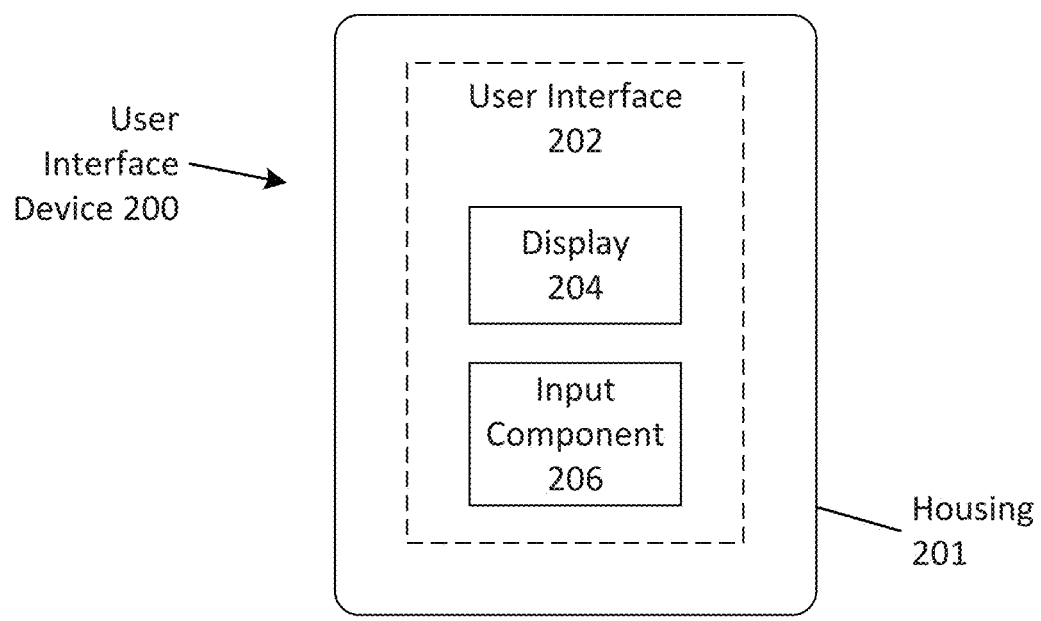
FIG. 5 is a block diagram depicting an example embodiment of a user interface device.

Thus, there are many different embodiments pertaining to the number and type of electronic devices that are used in storing, executing, and presenting the DGA to a user. With respect to presentation to the user, the device that is configured to implement this capability will be referred to herein as a user interface device (UID) 200. FIG. 5 is a block diagram depicting an example embodiment of UID 200. In this embodiment, UID 200 includes a housing 201 that is coupled with a user interface 202. The user interface 202 is capable of outputting information to the user and receiving input or information from the user. In some embodiments, the user interface 202 is a touchscreen. As shown here, the user interface 202 includes a display 204, that may be a touchscreen, and an input component 206 (e.g., a button, actuator, touch sensitive switch, capacitive switch, pressure sensitive switch, jog wheel, microphone, touch pad, soft keys, keyboard, or the like).

Many of the devices described herein can be implemented as UID 200. For example, display device 120 will, in many embodiments, be used as UID 200. In some embodiments, MDD 152 can be implemented as UID 200. In embodiments where SCD 102 includes a user interface, then SCD 102 can be implemented as UID 200. Computer system 170 can also be implemented as UID 200.

Detecting MDI Dose Strategy

Turning now to the aspects of the DGA and more particularly, the DGA can use knowledge of the patient's dosing strategy and analyte levels in order to provide accurate dose guidance. Example embodiments for automatic detection of the patient dosing strategy that can ease and speed the setup of the DGA is described herein. The detection of the dosing strategy can be based on the numerous characteristics of monitored drug (e.g., insulin) doses. For example, the embodiments can identify a dose as basal or bolus based on the MDD 152 used to administer the dose. Some patients may have more than one MDD 152. For example, a patient may have one MDD to administer long-acting insulin (e.g., basal doses) and another MDD to administer rapid-acting insulin (e.g., meal doses). The count (e.g., number of doses) and timing of basal doses per administration can also be used to categorize the basal strategy as a 'single' or 'split' basal dosing strategy. For example, in a 'split' basal dosing strategy, a daily basal dose of 20 U can be split into two 10 U doses, where one dose can be administered before bed and another dose can be administered upon awakening.

When successive bolus doses are administered in close succession, the system can attempt to distinguish between the original meal dose, an augmentation to the original meal dose, or a correction dose for high glucose between meals. When the DGA detects a small dose quickly followed by a larger dose, both occurring close to the start of a meal, the DGA can group the doses together as a single meal dose, even if the first dose may have been a priming dose that was not injected into the patient. Afterwards, if a dose occurs far after a known meal and/or a dose (group) tagged as a meal dose, the DGA can tag the later dose as a correction dose for high post-meal glucose following the meal, or an augmentation to the previous meal dose to account for extra food consumed. When a meal event is recognized, either based upon a meal detector algorithm or a user-entered meal event, the DGA can use the amount of the previous dose event and timing relative to the current detected meal to help to delineate if the previous dose was the first of multiple meal doses versus a correction for high glucose between meals. It is assumed that correction doses are smaller in size to mealtime doses. Moreover, if the time elapsed between the previous dose and the current meal event is sufficiently long, it would be reasonable to assume that those two events would not be related as treating the same glucose excursion event, removing the possibility that the previous dose was the first of multiple doses for a given meal. Therefore, if the earlier dose is sufficiently smaller than logged meal doses within this window on previous days, and is sufficiently far away from the current meal, the previous dose could be classified as a correction dose event.

The DGA can be configured to use a real time meal-detection algorithm and the time of the dose to identify the doses additional to basal as breakfast, lunch, and/or dinner bolus doses, and/or correction doses. The DGA can also be configured to use the number of bolus doses each day to identify the dosing strategy as basal only, basal plus one, basal plus two, etc.

These different scenarios and aspects of the DGA are discussed elsewhere in the specification in more detail.

On-Boarding

To increase the safety profile of the DGA, HCPs can approve learned insulin dosing parameters and subsequent titrations calculated by the DGA. The DGA embodiments include numerous methods of interaction between the HCP and the DGA, so that the HCP is provided with relevant evidence to approve suggested dose learning and titration in a concise informative way that improves workflow.

For patients with diabetes that are already on an insulin dosing regimen, HCPs can leverage existing reports that give insights into patients' glucose patterns to identify users who may benefit from dose guidance. Embodiments of the DGA provide for a learning period that can classify a patient's dosing strategies and tendencies (e.g., while using DGS 100). If the combined insulin and glucose data further confirm that the user is a good candidate for the DGA, e.g., a candidate for whom the DGA can learn their particular dosing strategy, insulin dose parameters learned during the learning period can serve as initial conditions for dose guidance that can be titrated as needed by the DGA. An HCP notification method for dose parameter initialization and titration for the DGA can also be presented. This process can aid both HCPs and users by streamlining the DGA onboarding and titration, while also helping to ensure that the DGA is used only by those for whom it is indicated. When the DGA is not able to learn a patient's dosing parameters, the DGA could indicate patient dosing inconsistencies, which could be used by the HCP to address the dosing inconsistencies with the patient.

A first step of identifying potential DGA users can involve an introductory analysis of a patient's glycemic control via their glucose concentration profile. To promote access of the DGA to as many users as possible, the process can be agnostic to a user's current methods for glucose monitoring.

Figure 6:
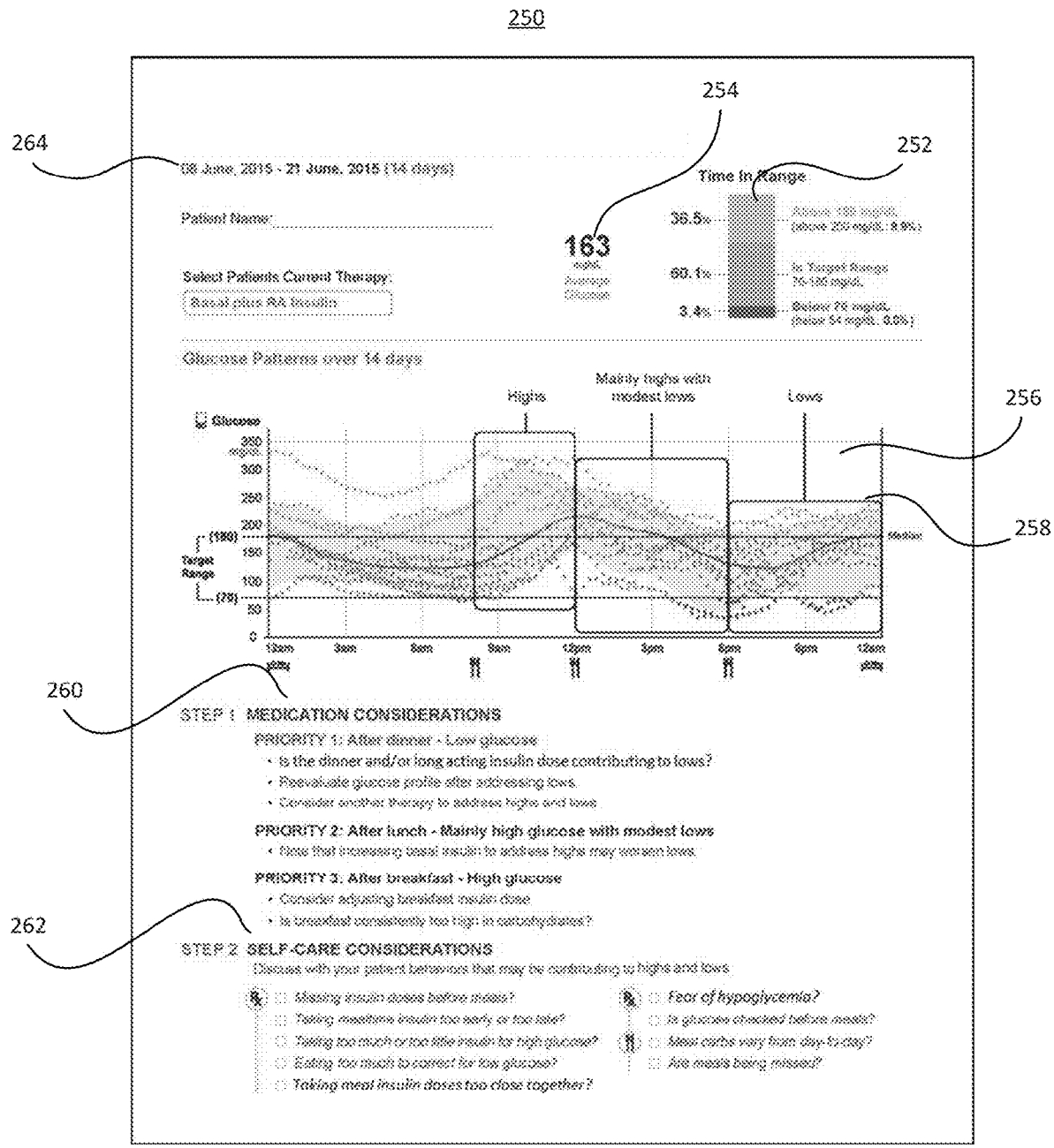
FIG. 6 is an exemplary glucose patterns report.

For a person with diabetes currently using an SCD 102, a glucose patterns report may be available that includes key metrics, a glucose concentration profile (e.g., an ambulatory glucose profile (AGP)), patterns identified for different times of the day, and titration and lifestyle suggestions to ameliorate instances where glucose is consistently outside of target range. The patterns can be identified using a GPA algorithm, as described in more detail elsewhere. As seen in FIG. 6, an exemplary glucose patterns report 250. Those of skill in the art will understand that the glucose patterns report 250 can be a graphical user interface outputted to a display of a computing device. Glucose patterns report 250 can include a time-in-range (TIR) display 252 that shows the percentages of time that the patient's glucose levels were below a target range (e.g., below 70 mg/dL), in a target range (e.g., 70-180 mg/dL), and above a target range (e.g., above 180 mg/dL). The TIR display 252 can also report the amount of time the patient's glucose levels were below a low threshold (e.g., below 54 mg/DL), which is lower than a low boundary of the target range or above a high threshold (e.g., above 250 mg/dL), which is higher than a high boundary of the target range. The TIR display 252 can include a histogram, where the different ranges are displayed in different colors. For instance, the time below the target range can be displayed in red, the time in target range can be displayed in green, and the time above the target range can be displayed in yellow or orange. The glucose patterns report 250 can also display an average glucose level 254 for the time period 264 of the report, e.g., about 14 days. The glucose patterns report 250 can also display a glucose concentration profile 256, such as an ambulatory glucose profile (AGP). The glucose concentration profile 256 is a graph of the glucose data for the time period of the report, where the various data points of the graph can be color-coded to correspond to whether that glucose analyte level is below the target range, within the target range, or above the target range. The color-coding can correspond to the color-coding, the of TIR display 252. Boxes 258 surrounding different portions of the glucose concentration profile 256 highlight patterns (e.g., highs, lows, moderate or modest highs, moderate or modest lows, and combinations thereof) that were detected according to the GPA algorithm, discussed elsewhere in the specification.

Medication considerations 260 can also be provided in the glucose patterns report 250 if the patient's current therapy (e.g., basal plus RA insulin, basal only, basal plus SU, etc.) is known. Medication guidance can be provided in the form of text recommendations. General advice regarding titrating an insulin dose can be provided based on the identified high and low glucose patterns, which are highlighted with boxes 258 in the glucose concentration profile 256. This general advice, however, could have been determined without access to data as to the actual insulin doses administered. The recommendations can generally follow the rule of mitigating any low patterns first before mitigating high patterns. If the glucose patterns report contains suggestions for insulin dose titration(s), the glucose patterns report 250 could also include a suggestion that the patient is a good candidate for the DGS 100, facilitating a conversation between the HCP and patient before transitioning to the learning period.

Self-care considerations 262 can be displayed in the glucose patterns report 250 when the GPA algorithm has identified patterns with high variability. Alternatively, the glucose concentration profile 256 might have such high variability that the logic behind the report cannot make specific suggestions, instead defaulting that the user consult with their HCP on lifestyle or therapy changes.

For a person not currently using a device or system (e.g., SCD 102) that is associated with an application that can generate a glucose patterns report 250, as described above, the HCP can suggest that the patient be monitored by a different device or system, such that a report 250, or similar, can be generated. For example, a patient could wear an SCD 102 to collect glucose data over a multi-day or multi-week period, wherein SCD 102 is configured in a masked or blinded mode where the user does not have access to the measured glucose levels, and thus cannot modify his or her behavior during this time. From these data, a glucose patterns report could be generated. If suggested insulin titration is included in the glucose patterns report, then the glucose patterns report 250 can also include a suggestion that the patient is a good candidate for the DGS 100 and a learning period for the drug dosing strategy could be suggested.

During the learning period, an MDD 152 can be incorporated with the glucose sensing system used for the initial screening to provide a more complete portrait of insulin intensive diabetes management. The learning period can utilize algorithms, such as those described elsewhere herein, to detect a user's insulin dosing strategy. During the learning period, the DGA can be configured to determine the manner in which the user determines a meal time dose. For example, the DGA can determine if the user is determining a meal time dose based on a carbohydrate counting technique, an experiential technique such as one where the user learns proper dosing based on past experience with the meal or a meal similar thereto, if the user doses a fixed insulin amount for meals, if the user modifies insulin meal dose amounts (determined from fixed dosing, carbohydrate counting, or experiential dosing) based upon premeal glucose values, if the user accounts for residual insulin from prior injections GOB) when determining a dose amount (determined from fixed dosing, carbohydrate counting, or experiential dosing), or another technique. The DGA can also determine if the user's mealtime doses are fixed according to meal type (e.g., breakfast, lunch, and dinner) or if the mealtime doses vary. A determination that mealtime doses are varying could be an indication that the user is basing the mealtime doses on a carbohydrate counting technique. The DGA can also determine if the user is adjusting a mealtime dose to account for high pre-prandial glucose. In some embodiments, the DGA may also determine a target glucose level, where the user is adjusting or correcting the mealtime dose when their level is above or predicted to be above the target glucose level. The DGA can also determine which meals are associated with insulin doses. The DGA can also determine a pattern of missed meal doses. For example, the DGA may detect if a user did not administer an insulin dose associated with a meal or time period at least two times, alternatively at least three times, in a period of time (e.g., one week or two weeks).

The learning period can last any time period sufficient to achieve the requisite information. In many embodiments, this period is at least two days, more preferable a week or longer (e.g., 14 days), and can vary depending on how well the DGA can learn the trends. Results can be compiled into a summary report for both the user and physician.

Learning Method

Manual configuration of the DGS 100 can require time by an HCP, who may not have sufficient time available. In addition, even if HCP time is available, configuration may be complex and is potentially error prone. To mitigate these issues, a patient parameter initialization (PI) module where setup is not required, or only minimal setup is required, can be included in the DGA. The PI module learns a patient's dosing strategy, which can comprise, for example, basal only, basal plus one, basal plus two, etc., and parameterizes the patient's medication dosing practice for configuring dose guidance settings by the DGA.

According to an aspect of the embodiments, the PI module's learning process can include automatically configuring patient dose guidance settings from observed data. Once the settings are successfully learned, the DGS 100 can enter a guidance mode, wherein the patient can ask for dose guidance and receive notifications about dosing. During the learning process that precedes the guidance mode, the DGA can process glucose and insulin data collected by the patient's SCD 102, UID 202, and/or other devices, and determine dosing information based on the processed data.

Dosing information can include, for example, dose regimen, meal-dose type, dose parameters, and dose range. Dose regimens may include, for example, basal dose plus BF, basal plus LU, basal plus DI, basal plus BF/LU, basal plus BF/DI, basal plus LU/DI, and basal plus 3, wherein BF indicates "breakfast," LU indicates "lunch," and DI indicates "dinner." Additional regimens can also be included, e.g., afternoon snack doses. Meal-dose type can include, for example, fixed meal dose or variable meal dose. Dose parameters can include, for example, a nominal fixed dose or carbohydrate ratio for each meal, a premeal correction factor (CF) and a post-meal CF. Dose range may include an estimate of the lowest meal dose.

For each of the above dosing information types, the DGA can determine whether the cumulative data are sufficient or insufficient for determining the dosing information. In some embodiments, the patient's SCD 102 can be configured to operate for a predefined time period, for example, 14 days. In these embodiments, the DGA can determine after the predetermined time period (or earlier if the sensor stops working prior to end of the period), whether the available analyte and dosing data are sufficient to determine each of the above dosing information. If so, the DGA can perform the parameterization method 300 and allow the start of the dose guidance mode. In alternative embodiments, periodically during the learning period (such as once per day), the DGA can determine if data are sufficient to determine each of the above dosing information. In either case, when the collected data are sufficient, the DGA can end the learning period, perform the parametrization, and begin the guidance period. If not, then the DGA may continue with the learning process.

Figure 7:
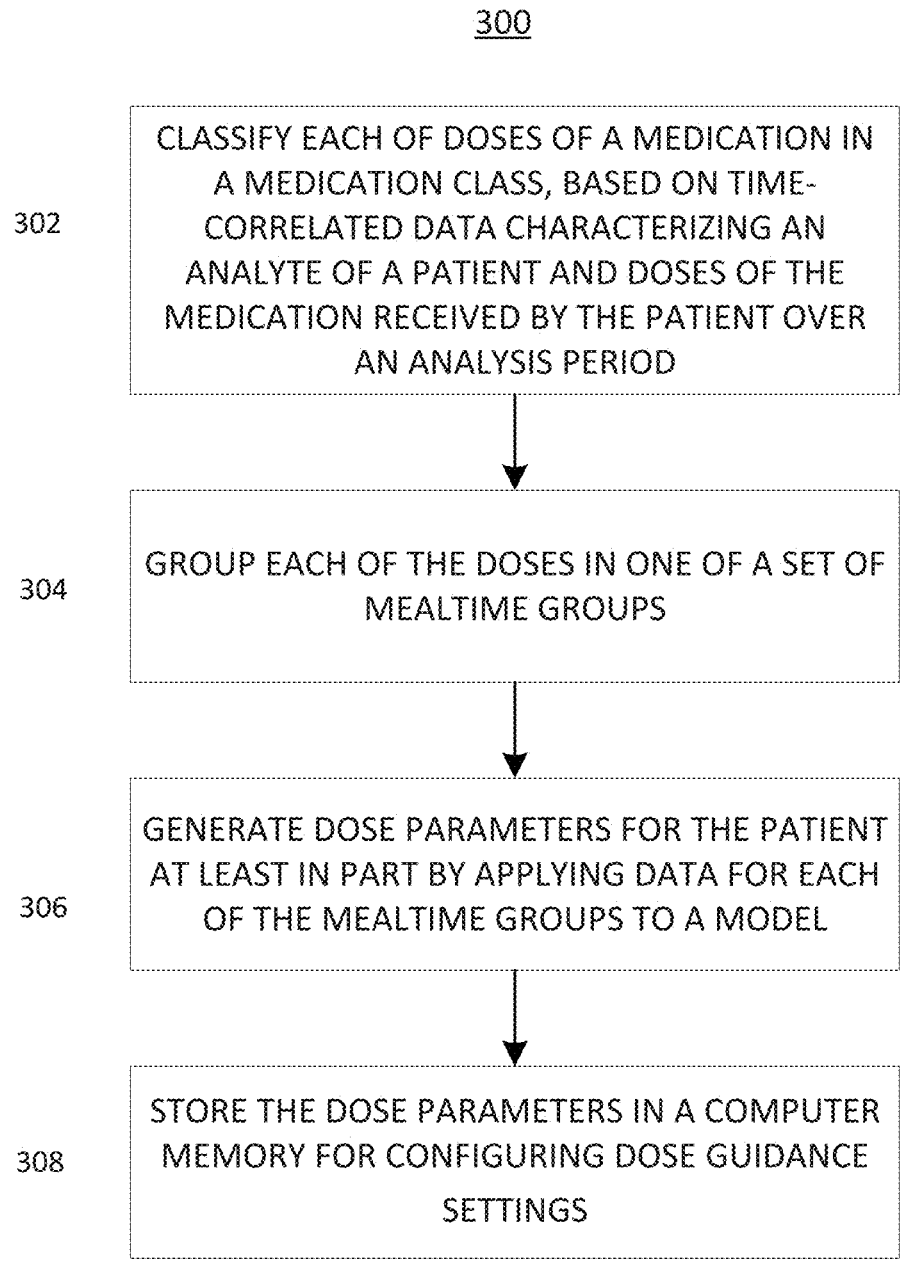
FIG. 7 is a flow diagram depicting an example embodiment of a process flow for a portion of a dose guidance application directed to a learning method for estimating an insulin dosing practice by a patient.

Referring to FIG. 7, a DGA can be configured to perform the method 300 on a suitable computing device, for example the UID 200, SCD 102, MDD 152, either alone or in any combination. Program instructions for performing the method 300 can be grouped in a PI module or any other suitable code configuration. In overview, the method 300 can include, by the DGA at step 302, classifying each of doses of medication received by a patient over an analysis period, based on data characterizing an analyte of the patient and the doses of a medication received by the patient over the analysis period. The method 300 can further include, at step 304, grouping each of the doses in one of a set of mealtime groups. The method can further include, at step 306, generating dose parameters for the patient at least in part by applying data for each of the mealtime groups to a model. The method can include, at step 308, storing the dose parameters in a computer memory for configuring dose guidance settings. In embodiments described herein, the analyte can be glucose, or can include an indicator of the patient's glucose level, and the medication can be, or can include, insulin. The dose guidance setting can be used by the DGA for developing dose guidance, or provided to an interface device, for example the UID 200 or health care practitioner's terminal, for output. More detailed aspects of each of the operations in the method 300 are described below. As used herein, "PI module" refers to a portion or portions of the DGA that perform the operations of the method 300 and any ancillary operations. A PI module is not limited to a particular configuration, and can encompass various arrangements of computer code.

In an aspect, the classifying operation 302 can include classifying each dose of medication (e.g., insulin) as one of a meal dose, a correction dose, and/or an ambiguous dose. If the DGA cannot classify a medication dose as a meal dose or correction dose to a defined degree of confidence, the DGA can classify the dose as ambiguous, and can omit said dose from use in generating dose parameters for dose guidance.

The DGA can perform medication dose classification by a sequence of two operations, referred to herein as feature extraction and classification. Relating this to FIG. 7, the classifying operation 302 can include generating a feature matrix correlating a set of classification features to each of the doses. In some embodiments, the DGA can configure a vector of insulin injection timestamps, a data file that includes analyte measurements from the patient's SCD 102, and the results from a meal detection algorithm module discussed elsewhere herein, as input to a function that outputs a feature matrix for insulin dose classification. The number of rows of the feature matrix can indicate a quantity of injections, or equivalent medication dosing events, during the relevant analysis period. Each row in the feature matrix can be, or can include, a feature vector for a single dosing event. In embodiments for classifying insulin injections, each vector can include elements as described below, referred to herein as classification features. The DGA can determine each of the elements of the feature vector based on a corresponding segment of glucose monitoring data in a time range, for example, between −2.5 and 1.5 hours, relative to the insulin injection time.

In embodiments, the classification features can include a medication time for each dose, e.g., a time of day that an insulin injection is recorded by the MDD 152 or recorded by the patient using the UID 200.

The classification features can further include a time-filtered analyte value, for example, a glucose value filtered using a Savitsky-Golay filter, a low-pass filter, a band-pass filter, a nonparametric smoothing filter such as locally estimated scatterplot smoothing, or other filters. In an aspect, the Savitsky-Golay filter can be of order 2, frame length 7 on a 15 minute sampling interval.

The classification features can further include a rate of change of the analyte value closest to the time of medication, for example, a rate of change of the analyte (e.g., glucose) value computed by linear regression of five analyte data points (e.g., using a 15 minute sampling interval) centered at the data point closest to the medication (e.g., injection) time.

The classification features can further include a left Area-Under-Curve (AUC) metric indicating an integrated difference between analyte values and the analyte value closest to the time of medication over an interval prior to the medication time. For example, to obtain the left AUC metric, the DGA can compute the left AUC metric by collecting all data points from the filtered analyte data within a time window (e.g., 2.5 hours), counting back from the injection time, then computing a difference between the mean analyte value of the collected data points and the data point closest to the injection time (i.e., the reference data point), and computing the incremental AUC on the left by multiplying the difference by the duration of the time window.

The classification features can further include a right AUC metric, indicating an integrated difference between analyte values the analyte value closest to the time of medication over an interval after the medication time. For example, the DGA can compute the right AUC metric by collecting all data points from the filtered analyte data within a time window (e.g., 1.5 hours), counting back from the injection time, then computing a difference between the mean analyte value of the collected data points and the data point closest to the injection time (the reference data point), and computing the incremental AUC on the right by multiplying the difference by the duration of the time window.

The classification features can further include time elapsed between medication times. For example, the DGA can, for each injection time, compute an elapsed time between the previous and the current injection time by subtracting the previous injection time from the current injection time. For the first injection time in the insulin log, the DGA can compute the elapsed time from the first SCG time data point to the current injection time because there is no previous injection time available. In addition, and for further example, the DGA can compute the elapsed time between the current and the next injection time by subtracting the current injection time from the next injection time. For the last injection time in the insulin log, the DGA can compute the elapsed time from the current injection time to the last SCG time data point because there is no next injection time available. In both the backward and forward computations, if the elapsed time is larger than a predetermined maximum value, e.g., 12 hours, the DGA can set the elapsed time value equal to the maximum time.

The classification features can further include probability of a meal starting within a defined interval prior to the medication time, for example, the maximum of the probability of meal start within a time window (e.g., 1.5 hours) prior to the injection. This probability can be computed by a meal detection module, described elsewhere herein.

The classification features can further include a most probable interval of time elapsed since the most recent meal, for example, an elapsed time from the maximum meal start probability point (e.g., determined by a meal detection module) relative to the injection time.

The classification features can further include probability of a meal starting within a defined interval after the medication time, for example, a maximum of the probability of meal start (determined by a meal detection module) within 2 hours after the injection.

The classification features can further include a most probable interval of time until the next meal, for example, a predicted elapsed time from the injection time to the maximum meal start probability point (e.g., determined by a meal detection module) after the meal injection.

As noted, computing some of the classification features includes estimating a time for each meal eaten by the patient during the analysis period, and methods for estimating mealtimes are described in more detail below. In brief, estimating the time for each meal can further include, by the DGA, generating a feature matrix based on the time-correlated analyte data, wherein the feature matrix correlates a set of analyte (e.g., glucose) data features to each of distinct regions classed as rising, fall-preceding, and falling. The set of analyte data features can be, or can include a maximal analyte rate of change, a maximal analyte acceleration, an analyte value at the maximal analyte acceleration point, a duration of the region, a height of the region, a maximal deceleration, an average rate of the change in the region, and a time of the maximal analyte acceleration. The estimating can further include generating estimated mealtimes based on the feature matrix, using an algorithm as described below.

More detailed aspects of a retrospective mealtime detection algorithm for use in the method 300, or for other uses, are described in the following paragraphs. Afterwards, description of other aspects of the method 300 is continued. A DGA can perform retrospective mealtime detection based on time-correlated analyte data by executing one or more code modules, for example, a feature extraction module and a meal detection module. A feature extraction module, when executed by the DGA, can cause the DGA to receive a glucose time series as input and output a feature matrix to be passed to the retrospective meal detection module to detect glucose excursions in response to meal events.

A DGA can perform feature extraction using the following operations as described below, which may be divided into a sequence of three sub-operations: smoothing, segmenting, and extracting.

In a smoothing sub-operation, the DGA can smooth an analyte (e.g., glucose) time series using a Savitzky-Golay filter (order 2) and compute a rate of change and acceleration at each analyte data point. The frame length parameter for the filter may be the number of the data points collected in a first time interval, e.g., 60 minutes; therefore, the sampling is interval dependent. The DGA can compute the rate of change by taking the average of the backward and forward difference in the smoothed analyte values between the point of interest and the points that are a second interval (e.g., 15 minutes) before and after the point of interest, wherein the second interval is less than the first interval, for example, equal to one-fourth of the first interval. Similarly, the DGA can compute the acceleration by taking an average of the backward and forward difference in the analyte rate of change between the point of interest and the points that are the second interval (e.g., 15 minutes) before and after it.

In a segmenting sub-operation, the DGA can segment the smoothed analyte trace into monotonically increasing (i.e., rising) and decreasing (i.e., falling) regions. Each rising region is considered as a candidate of a glucose excursion in response to a meal event.

In an extracting sub-operation, the DGA can extract the features from the data, for example, sixteen (16) features that may be or may include features from each rising region (e.g., eight (8) features), the preceding falling region (e.g., four (4) features), and the following falling region (e.g., four (4) features). Features that the DGA can extract from the rising features can include, for example: 1) the maximal analyte rate of change, 2) the maximal analyte acceleration, 3) the analyte value at the maximal analyte acceleration point (the reference point), 4) the duration of the rising region (the elapsed time from the reference point the to the last point of the region, 5) the height of the region (the difference in the smoothed analyte value between the last point and the reference point), 6) the maximal deceleration (the negative acceleration with maximal absolute value), 7) the average rate of the change in the region (height/duration), and 8) the time of the data of the reference point. For further example, four (4) features extracted from the preceding and the following falling regions may include: 1) the height of the falling region, 2) the duration of the falling region, 3) the average rate of the region (height/duration), and 4) the maximal absolute value of the glucose rate of change. The number of rows in the feature matrix output by the feature extraction module may be the same as the number of rising regions in smoothed glucose time series.

According to another aspect of the embodiments, the retrospective meal detection module can take the feature matrix, as input, and output binary detection results for each rising region. Such output can include: a binary classification result, and a probability value of each rising region being an analyte (e.g., glucose) excursion in response to a meal event. The DGA can assign a probability value for each rising region to its reference point. In some embodiments, for example, a pre-trained machine learning model for meal detection can be implemented using RandomForestClassifier by scikit learn (https://scikit-learn.org/stable/modules/generated/sklearn.ensemble.RandomForestClassifier.html). The meal detection module may detect meal-induced postprandial glucose excursions based on a multitude of decision trees constructed and optimized during the training process. In alternative embodiments, the DGA can build a pre-trained model based on an alternative classification algorithm, for example, gradient boosting, ada boost, artificial neural network, linear discriminant analysis, and extra tree.

Referring again to the method 300 of FIG. 7, the classification operation 302 can take the feature matrix of a patient as input and output a binary classification result for each relevant medication event (e.g., for each insulin injection). For example, the DGA can output binary data '1' signifying a meal dose and '0' signifying non-meal dose. According to some embodiments, the classification operation 302 can use meal detection results, in which case a meal detection can be performed prior to an insulin dose classification. As noted for retrospective mealtime detection, the classification operation 302 can include a pre-trained machine learning model, for example a model implemented using RandomForestClassifier by scikit learn (referenced above). The machine learning model implemented by the DGA can perform classification based on tree building rules and thresholds for various features in each decision tree which were optimized during the training process. Alternatively, the model can also be trained by other machine learning algorithms including gradient boosting, ada boost, artificial neural network, linear discriminant analysis, and extra tree. After the DGA successfully classifies each dose, it can proceed to determining the dose regimen and dose parameters.

At step 304, the method 300 can include the DGA grouping each of the doses in one of a set of mealtime groups or clusters. For example, the DGA can determine a dosing strategy by clustering analysis of the medication (e.g., injection) times of meal doses. The DGA can execute a clustering module, implemented using a K-mean algorithm together with the elbow method, that takes the injection times, as input, and outputs the optimal number of clusters K (maximum 3) and the cluster index for each injection time. The optimal number of clusters K can be the number of meal doses taken by the patient per day. Using the cluster index of each injection, the DGA can group the meal dose into K groups according to the cluster indexes.

The DGA can identify these groups as breakfast, lunch or dinner (B, L, D) as follows: for each group, the DGA can determine a typical time-of-day (TOD) by calculating the median TOD for the group. Alternatively, the DGA can use some other centroid metric. If K=3, then the DGA can associate breakfast with the group after the longest period between typical group TODs. Then, the next group is lunch and the last group is dinner. If K=2, the DGA can estimate which group is associated with breakfast, lunch or dinner using assumed rules about the time between each meal. For instance, if the two groups are more than six (6) hours apart from each other, then the DGA can identify the groups as breakfast and dinner. Otherwise, if a first group occurs before 10 am, then the DGA can identify the groups as breakfast and lunch; otherwise, as lunch and dinner. In an alternative embodiment, the DGA can prompt the user to identify the meal associated with each typical time, after the DGA identifies the typical times for meal events. For further example, in alternative embodiments, the DGA can combine the two methods described here by estimating the meal associations and then prompting the user to confirm. Further alternative methods can include analyses of glucose data to identify meals and cluster mealtimes to detect typical mealtimes. This can be useful for distinguishing meals in the case of K=2; that is, identifying the meal where a dose is not taken.

Once the doses are grouped in mealtime clusters, at step 306, the DGA can perform generating dose parameters for the patient at least in part by applying data for each of the mealtime groups to a model. For example, for each meal group (B, L, D), the DGA can pair each corresponding set of pre-meal glucose levels with the corresponding meal dose amount. The DGA can fit each group with a suitable model, for example, a linear function with zero slope, a linear function with non-zero slope, a piece-wise linear function joined at a single point, or a nonlinear function that approximates a joined piecewise model but with smooth curvature around the joint point. Other models are also suitable.

The DGA can perform model fitting and parameter estimation by minimizing the sum of square residual (SSR) in terms of model parameters. Then, the DGA can use a search algorithm to find the optimal parameters that results in the smallest value of the SSR. For linear models, the DGA can use a Nelder-Mead simplex method for fitting. For a nonlinear model, the DGA can use a Levenberg-Marquardt algorithm. That is, the DGA can use the Nelder-Mead simplex numerical optimization method for linear models and the Levenberg-Marquardt optimization method for nonlinear models. Alternative methods of fitting the data to these models are also possible.

When the number of iterations during optimization exceeds the convergence criteria, the model fails to fit, and the DGA can exclude the model that failed to fit as a candidate model. Additionally, the DGA can apply certain rules to minimize uncertainty in parameter estimation, for example, by validating an estimated correction factor by requiring at least three pre-meal glucose datapoints greater than the estimated threshold glucose; validating an estimated fixed dose by requiring at least three pre-meal glucose datapoints less than the estimated threshold glucose; requiring a 95% confidence interval of the parameter intercept to exclude zero; or requiring a 95% confidence interval of the model slope to exclude zero.

Insufficient data can lead to a failure of fitting a model and, consequently, the exclusion of a particular model as a candidate model. The DGA can evaluate each model with Akaike Information Criterion (AIC), and choose the model with the lowest AIC value as the preferred model for each meal group.

Once it has selected the models for each mealtime cluster, the DGA can then determine dose parameters including, for example, fixed dose insulin amount, target glucose level, and a correction factor based on a selected model for each mealtime cluster. The DGA can determine the target glucose level and the correction factor as a single value each for all groups, as described in more detail in the following paragraph. In alternative embodiments, the DGA can determine the target glucose level and the correction factor separately for each group and use the separately determined parameters for downstream dose guidance operations.

According to another aspect of the embodiments, the DGA can form a combined data group for obtaining a more accurate correction factor for the patient. For example, after fitting the dose data to various models for each meal group to select the best model and estimate a fixed inulin dose amount, the DGA can deduct the fixed dose insulin amount from an associated meal dose of each meal group. Remaining non-zero values correspond to doses that have correction amounts. Those non-zero values can then be combined from all three meal groups (B, L, D) to form a combined group. If the fixed dose insulin amount cannot be determined for a group, the DGA can exclude data of the group from the combined group. The system can then repeat the operations for finding a best-fitting model for the combined group, or can use the same model identified when the groups were analyzed separately. The use of this combined group approach assumes the patient has the same (or constant) correction factor and target glucose across all meals, and the combined group provides a larger sample size for potentially more accurate fitting. The DGA has completed the estimation of dose parameters after it determines the target glucose level and correction factor based on the best-fitting model. Then, at step 308, the DGA can store the dose parameters in a computer memory for configuring dose guidance settings.

In an additional aspect, the DGA can determine whether the patient is potentially carbohydrate-counting (e.g., varying their meal dose to account for carbohydrate consumption) by comparing the AIC value of the preferred model to a threshold, such as 50, or 75, or 100. If the AIC value is larger than the threshold, the DGA can determine that the patient is carbohydrate counting and ask the patient to confirm via the UID 200.

In alternative embodiments, one or more of the operations described above may be omitted and replaced by requesting that the patient or HCP provide information manually, or by extracting information from another source such as an EMR or another software program. Nonetheless, the method 300 should be useful for various applications without information beyond what an SCD and MDD can provide.

User Feedback During Learning Period

Example embodiments of methods for acquiring user feedback during or after a learning period of the DGA will now be described. The user can be prompted for feedback during the initial learning phase with the DGA. User feedback can provide an indication to the user that the system is making progress. The DGA can prompt the user for feedback (e.g., input or confirmation) as to any aspect of dose guidance, including a lack of information about an aspect of administered doses, analyte history, patient behavior or activities, dosing strategy generally, the type of a particular dose, confirmation that a DGA determined (e.g., learned by the system) dose type or strategy is correct, and others.

During (or after) the learning period, the DGA can output a prompt or other indication on UID 200 that requests user feedback. This feedback can concern dosing strategies, for example, strategies pertaining to insulin action type (e.g., long-acting and/or short or rapid-acting). If the feedback (or other determination) indicates a long-acting strategy is being used, then, for a first time period, e.g., the first three (3) days, the DGA can monitor the basal dosing pattern of the patient to categorize each dose or dosing pattern as a single or split dose type, and/or to characterize it the dose by time period (e.g., morning single dose, evening single dose, or split dose (e.g., both morning and evening). The DGA can also determine a tendency about the dose amount (e.g., median, mean) and the associated dose variability. From this information, the DGA can develop an expected basal dose. After the first time period, the user can be prompted for feedback if the actual dose administered (e.g., automatically registered by MDD 152 or input by the user) is different than expected.

According to one aspect of the embodiments, the user can be prompted in many different circumstances. For example, the DGA can be configured to detect missed doses, such as where a user did not administer a basal or bolus dose during a time period in which a prior basal or bolus dose was administered. If a missed dose is detected, the DGA can be configured to request input from the user regarding whether a basal dose was administered in the time period. According to some embodiments, the DGA can also be configured to detect differences in dose timing. For example, the DGA can be configured to detect when the user administers a basal dose in a different time of day period than the time of day period that a prior basal dose was administered (e.g., a basal dose that is usually administered in the morning was administered in the evening). When such a difference in timing of administration is detected, the DGA can be configured to request input from the user regarding whether a basal dose was administered in a different time period. In another aspect of the embodiments, the DGA can also be configured to detect when extra doses have been administered. For example, the DGA can be configured to detect a change in the number of basal doses administered in a day. In yet another aspect of the embodiments, the DGA can be configured to detect if a dosing strategy on a first day (e.g., one basal dose was administered) is different from a dosing strategy on a second day (e.g., two basal doses were administered). When a different dosing strategy is detected, the DGA can be configured to request input from the user regarding whether the user has adopted the dosing strategy used on the second day as a new dosing strategy. In yet another aspect of the embodiments, the DGA can also be configured to detect if a different dose amount was administered. For example, the DGA can be configured to detect whether a first amount of a dose administered in a time of day period is different (smaller or larger) than a prior dose administered in the time of day period on a previous day. When a different dosage amount is detected, the DGA can be configured to request input from the user regarding whether the user has changed the dosage amount.

The user response to these prompts can allow the DGA to either confirm that it has identified a correct pattern (e.g., the user confirms that they missed taking their morning basal dose, but they normally would take it) or offers the opportunity for the user to correct the pattern (e.g., the user informs the DGA that they adjust the basal dose based on their glucose before taking).

For rapid acting insulin dosing strategies, in addition to the above prompts, the DGA can also include a prompt regarding dose classification. The dose classifications can include, but are not limited to, bolus, correction, split-dose, bolus+correction, and bolus+carbohydrate counting+correction classifications.

The user can be prompted in many different circumstances concerning the dosing of rapid-acting insulin. The DGA can be configured to detect if a dose was administered that is not associated with a meal. For example, the DGA can be configured to determine if a dose was taken in a time period in which a meal was not identified or detected. If the DGA detects a dose was taken and a meal was not detected within a time period of the administration (e.g., within about 1 hour of administration), the DGA can request input from the user regarding a reason why the dose was administered (e.g., because they ate a meal, because they were lowering their glucose, or because they were finishing up an earlier meal dose). The DGA can also be configured to detect if a meal dose does not match a prior meal dose associated with the same meal type. For example, the DGA can be configured to determine if a bolus dose associated with a first meal type and administered in a time of day period is not the same as a prior bolus dose associated with the first meal type and administered in the time of day period on a previous day. Where such a difference in bolus doses is detected, the DGA can be configured to determine a reason for the different dose. For example, the DGA can be configured to determine a difference in a pre-meal glucose values associated with the bolus dose and the prior bolus dose to determine whether the difference detected is a correction. The DGA can also request input from the user regarding the reason for the difference in bolus doses (e.g., because they ate less/more food and/or they were correcting for hyperglycemia, and/or they were correcting for other factors).

In addition to enabling the DGA to determine what type of rapid-acting doses are being taken throughout the day, this enables the DGA to facilitate when to expect a dose. After a period of learning where no prompts are provided, the DGA can provide these prompts to the user in the case where the dose differs from the expected dose, in order to refine the DGA's model of the user's dosing strategy.

For both long-acting and rapid-acting doses, the DGA can aim to minimize the number of prompts as time goes on, and as the user responds. Emphasis can be placed on prompting frequently in the beginning stages, and tapering off as repeat patterns are observed.

Glucose Pattern Analysis and Meal Bolus Titration for MDI Insulin Dosing Therapies Example embodiments of methods for determining meal bolus titrations will now be described. The system can provide titration guidance for multiple daily injection (MDI) dosing therapies once it learns (or is configured with) the patient's current dosing strategies. For patients using fixed meal dosing, the fixed dose amounts (e.g., for breakfast, lunch, dinner, snack, etc.) can be titrated. For patients who are carbohydrate counting, the carbohydrate ratio can be titrated, for these same meals or for different times of the day. Patients who use experiential dosing can titrate their doses on a per meal basis. Titration guidance by the DGA can provide a recommendation to change the dose or carbohydrate ratio in a particular direction. The amount of the change can be a suitable percentage change, for example, 5%, 10%, 15%, etc. Dose guidance can also include starting a meal dose. For example, if a patient is on a basal plus one (e.g., lunch dose) regimen), and breakfast shows a high pattern, the DGA can provide a recommendation to administer a RA insulin for breakfast.

The DGA can require that a dosing category be defined such as Time-of-Day (TOD) period, meal type (e.g., breakfast), and composition of the meal (e.g., cereal with milk). For example, the dosing category can be time-of-day, defined by time-periods associated with meal insulin doses for time-of-day periods. For further example, a post-breakfast time period can be defined as starting when a meal insulin dose is taken in a defined period of day, for example, between 5 am and 10 am, and ending either after a defined post-meal period (e.g., six (6) hours later), or when the next meal insulin dose is taken, whichever is earlier. One or more metrics can be required to define whether a post-meal glycemic response is nominal or requires correction, or to rank a post-meal glycemic pattern as more or less favorable than another. Likelihood of low glucose (LLG) metric and the median glucose can be used to quantify the degree of hypoglycemia risk and hyperglycemia risk, respectively.

U.S. Patent Publ. No. 2018/0188400 (the '400 publication), which is incorporated by reference herein for all purposes, describes examples of an implementation for deriving and determining risk metrics that can be utilized in glucose pattern analysis (GPA) for the DGA embodiments. This implementation, among other things, utilizes central tendency (e.g., mean, median, etc.) and variability data from the multi-day period to determine a risk metric corresponding to a degree of hypoglycemia risk ("hypo risk"). This implementation is summarized herein, and a more exhaustive description of the implementation and variations therefrom can be obtained by reference to the '400 publication.

Alternatives to the implementation described in the '400 publication are set forth in U.S. Patent Publ. No 2014/0350369, which is also incorporated by reference herein for all purposes. For example, instead of using median and variability, the method could employ any two statistical measures that define a distribution of data. As described in the '369 publication, the statistical measures could be based on a glucose target range (e.g., $G_{LOW}$=70 mg/dL and $G_{HIGH}$=140 mg/dL). Common measures related to the target range are time in the target range (TIR), time above target ($t_{AT}$), and time below target ($t_{BT}$). If the glucose data is modeled as a distribution (e.g., a gamma distribution), for predefined thresholds $G_{LOW}$ and $G_{LOW}$, then $t_{AT}$ and $t_{BT}$ can be calculated. For the thresholds, an algorithm can also define $t_{BT\_HYPO}$ in which if exceeded by $t_{BT}$, then the patient may be determined to be a high hypoglycemia risk. For example, high hypoglycemia risk can be defined as whenever $t_{BT}$ is greater than 5% for $G_{LOW}$=70 mg/dL. Similarly, a metric $t_{AT\_HYPER}$ can be defined in which if exceed by $t_{AT}$, then the patient can be determined to be at high hyperglycemia risk. The degree of hypoglycemia and hyperglycemia risk can be adjusted by adjusting either $G_{LOW}$ or $t_{BT\_HYPO}$, or $G_{HIGH}$ or $t_{AT\_HYPER}$, respectively. Any two of the three measures, TIR, $t_{BT}$, and $t_{AT}$ can be used to define a control grid. These alternatives (and others) can be used to determine risk metrics for the DGA embodiments described herein.

The DGA embodiments described herein can operate based on a quantitative assessment of the user's analyte data during a TOD period. This quantitative assessment can be performed in various ways. For example, the embodiments described herein can assess the analyte data over a multi-day period to determine one or more metrics that are descriptive of relevant risks exhibited by that analyte data for a corresponding TOD. These metrics can then be used to classify the analyte data from the TOD period as one of multiple patterns. For example, these patterns can be indicative of a common or prevalent glucose behavior or trend for that TOD. Any number of two or more patterns can be utilized by the DGA embodiments. For ease of reference herein, these patterns are referred to as glucose pattern types and the embodiments described herein will make reference to an implementation utilizing three glucose pattern types (e.g., a low pattern, a high/low pattern, and a high pattern), although other implementations may utilize only two types or more than three types, and those types may differ from those described herein.

Figure 8A:
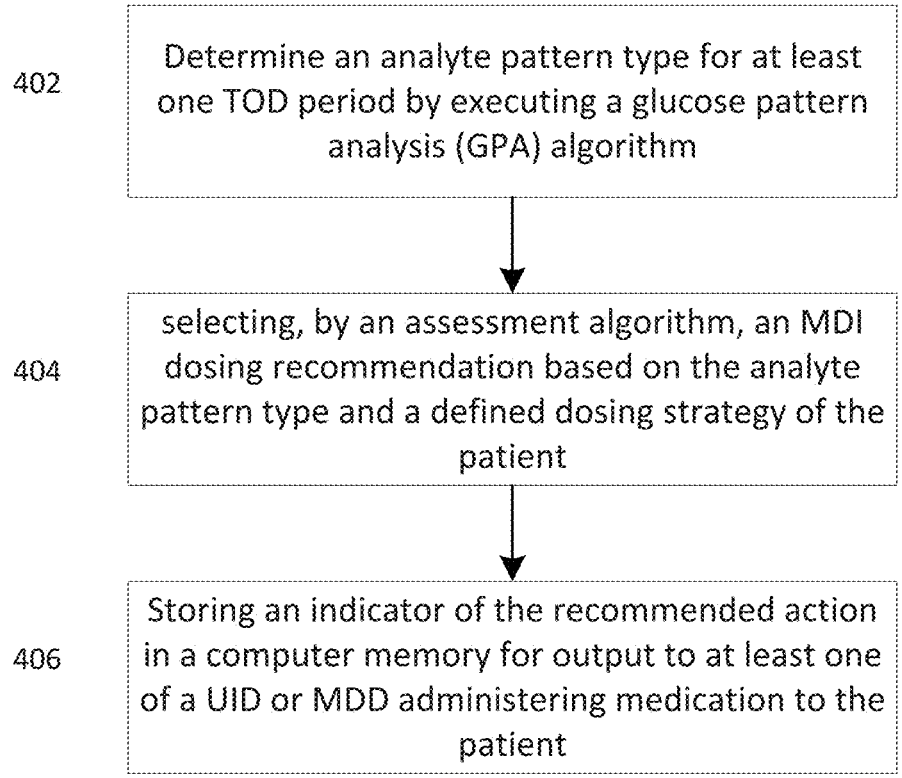
FIG. 8A is a flow diagram depicting an example embodiment of a process flow for operations by a dose guidance application for assessing a meal bolus titration for a multiple daily injection (MDI) dosing therapy.

Using fixed meal doses for example, once the DGA has learned the dosing strategy and the dose or carbohydrate ratio amounts, then titration assessment can begin, which can be categorized into four titration categories: overnight, post-breakfast, post-lunch and post-dinner. For each of these categories, the DGA can map the two metrics described above (LLG and median glucose) to the four logic "pattern" variables per the GPA method described below. FIG. 8A shows operations of an example method 400 by a DGA for assessing a meal bolus titration for multiple daily injection (MDI) dosing therapy. The method 400 can include, at 402, determining, by a DGA, an analyte pattern type for the at least one TOD by executing a glucose pattern analysis (GPA) algorithm that receives, as input, time-correlated analyte data originating from a sensor control device worn by a patient over an analysis period. The method 400 can further include, at 404, selecting by the DGA executing a recommendation algorithm, an MDI dosing recommendation based on the analyte pattern type and a defined dosing strategy of the patient for the analysis period. The method 400 can further include, at 406, storing, by the DGA an indicator of the recommended action in a computer memory for output to at least one of a UID 200 or an MDD 152 administering medication to the patient. A UID 200 can use the indicator of the recommended action to control a user interface, for example, by causing a human-readable expression of the indicator to appear on a display, or by generating an audio output expressing the indicator in a human language. An MDD 152 can use the indicator to adjust or maintain a next relevant dose administration. Further details of the method 400 are described below.

Figure 8B:
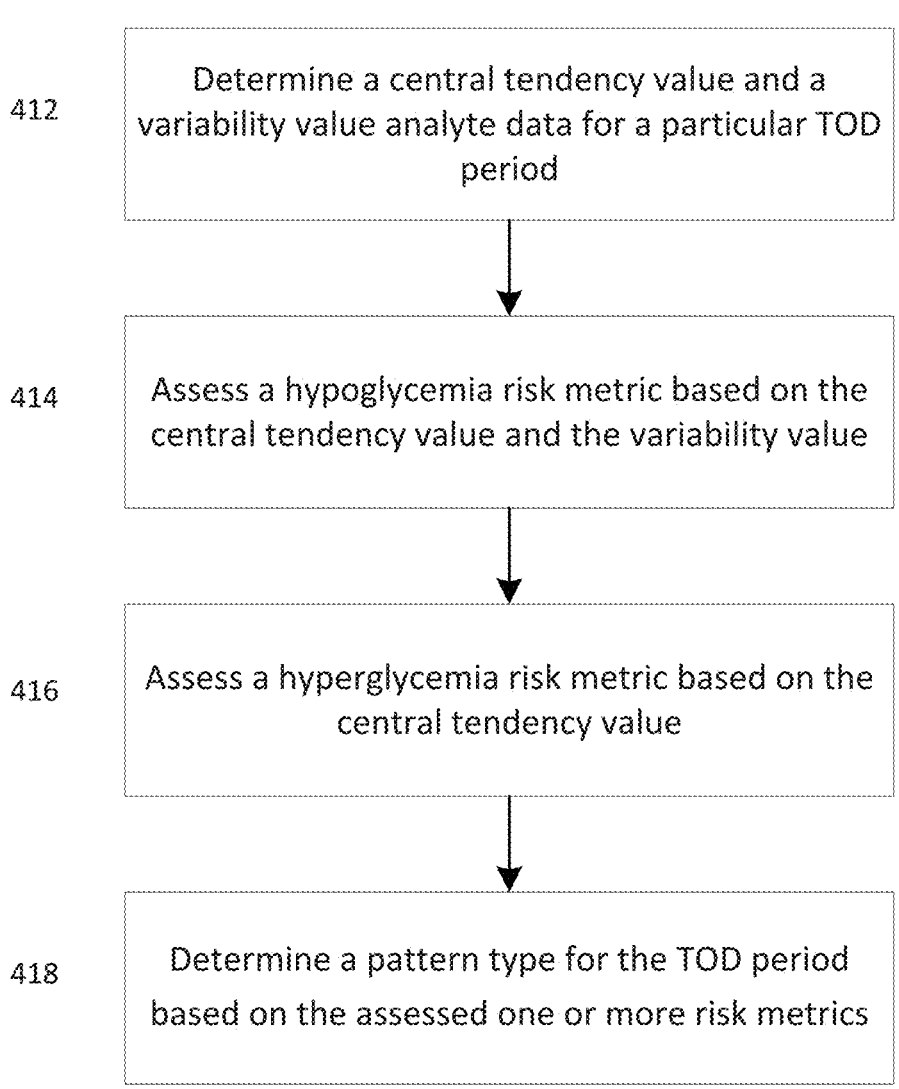
FIG. 8B is a flow diagram depicting an example embodiment of a process flow for operations by a dose guidance application for a glucose pattern analysis (GPA).

FIG. 8B is a flowchart depicting an example embodiment of a GPA method 410 that can be implemented as the GPA algorithm referenced in 402. Method 410 can be performed for a particular TOD period that can be an entire day (e.g., a 24 hour period), or a portion of a day that is delineated by time blocks (e.g., three 8 hour periods) or the user's activities (e.g., meals, exercise, sleep, etc.). In many embodiments, multiple TOD periods can correspond to meals (e.g., post-breakfast, post-lunch, post-dinner) and sleep (e.g., overnight). These TOD periods can correspond to fixed times of the day where the activity would normally occur (e.g., post-breakfast from 5 am to 10 am), where such time blocks can be set by the user, or can be contingent on the meal or activity actually having been performed as determined by the automated detection of the meal or activity, or by a user indication of such (e.g., with UID 200).

A DGA can perform the method 410 independently for each TOD period to arrive at a separate pattern assessment for that period. At 412, the DGA can determine a central tendency value and a variability value from the user's analyte data for the particular TOD period. The user's analyte data may be available from the user's own records or those of the user's healthcare professional, or the user's analyte data may have been collected by DGS 100, for example. The analyte data preferably spans a multi-day period (e.g., two days, two weeks, one month, etc.) such that sufficient data exists within the TOD period to make a reliable determination. In other embodiments, the method can be performed in real-time on limited data. The DGA can use any type of central tendency metric that correlates to a central tendency of the data including, but not limited to, a median or mean value. Any desired variability metric can also be used including, but not limited to, variability ranges that span the entire data set (e.g., from the minimal value to the maximum value), variability ranges that span a majority of the data but less than the entire data set so as to lessen the significance of outliers (e.g., from the $90^{th}$ percentile to the $10^{th}$ percentile, from the $75^{th}$ percentile to the $25^{th}$ percentile), or variability ranges that target a specific asymmetrical range (e.g., low range variability, which can span a range, e.g., from or in proximity with the central tendency value to a lower value of data, e.g., the $25^{th}$ percentile, the $10^{th}$ percentile, or the minimal value). The selection of the metrics to represent the central tendency and variability can vary based on the implementation.

Figure 8C:
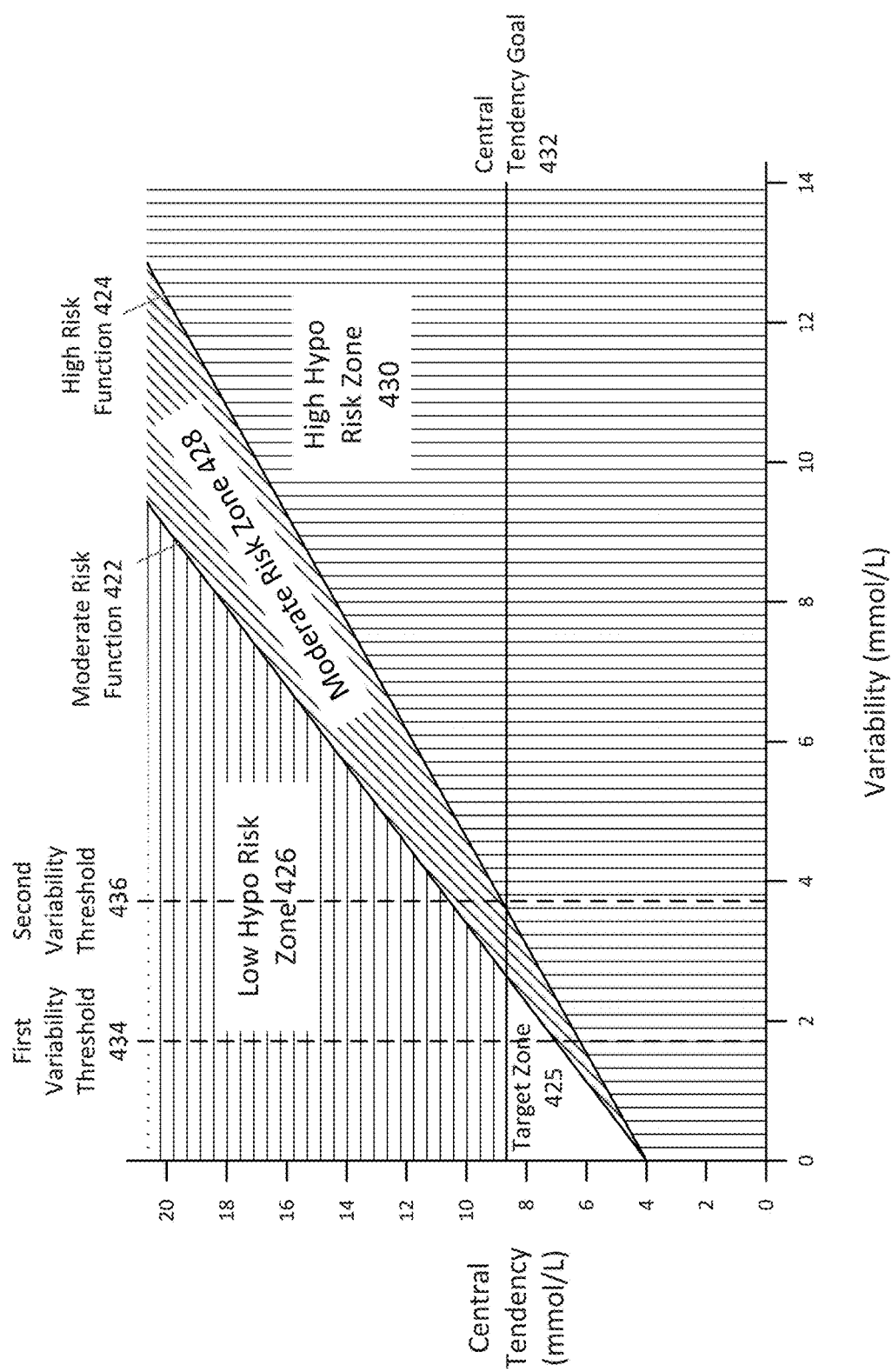
FIG. 8C is an example embodiment of a graph depicting information for determining a hypoglycemia risk and other metrics for a GPA.

At 414, the DGA can assess a risk of hypoglycemia ("hypo risk") metric based on the central tendency value and the variability value. One such methodology for determining hypo risk is described with respect to FIG. 8C, showing an example embodiment of a framework for determining hypo risk and other metrics. While FIG. 8C is intended to convey the framework to the reader, however, this framework can be implemented electronically in numerous different ways, such as with a software algorithm (e.g., a mathematical formula, a set of if-else statements, etc.), a lookup table, firmware, a combination thereof, or otherwise.

FIG. 8C is a graph of central tendency versus variability (e.g., low range variability) that can be used to evaluate or identify a region or zone that holds or corresponds to a determined central tendency and variability data pair for a particular TOD. Any number of two or more zones can be used. In this embodiment the data pair can correspond to a target zone 425 or one of three hypo risk zones: a low zone 426, a moderate zone 428, or a high zone 430. A first hypo risk function (e.g., a curved or linear boundary), referred to as moderate risk function 422, differentiates between low zone 426 and moderate zone 428. A second hypo risk function, referred to as high risk function 424, differentiates between moderate zone 428 and high zone 430. The central tendency and variability data pair can be evaluated against or compared to the zones to determine a hypo risk metric for the corresponding TOD period.

The hypo risk functions 422 and 424 can be implemented in the DGA explicitly as a mathematical function (e.g., a polynomial) or can be implemented implicitly, such as by defining each zone by the pairs it contains, use of a lookup table, set of if-else statements, threshold comparisons, or otherwise. The hypo risk functions 422 and 424 can be preloaded into the DGA, or can be downloaded from trusted computer system 480, or can be set by another party such as the HCP. Once implemented in the DGA, the hypo risk functions 422 and 424 can be treated as fixed or can be adjusted by the user or HCP. Example methodologies for determining the hypo risk function are described in the '400 publication.

At 416, the DGA can assess a hyperglycemia risk metric ("hyper risk") based on the central tendency value. In this embodiment, the hyper risk can be evaluated by comparison of the central tendency value for the particular TOD period to a central tendency goal or threshold 432. The magnitude and/or sign of the difference of the central tendency value from the goal 432 can identify the amount of hyper risk. For example, a low hyper risk can be present if the central tendency value is less than the goal 432 (e.g., a negative value). A moderate hyper risk can be present if the central tendency value exceeds the goal 432 (e.g., a positive value) by less than a threshold amount (e.g., 5 percent, 10 percent, etc.). A high hyper risk can be present if the central tendency value exceeds the goal 432 by a value greater than the threshold amount. The use of three discrete groupings for hyper risk (e.g., low, moderate, high) is an example and any number of two or more groupings can be used.

In other embodiments, the DGA can assess a hyperglycemia risk metric, at 416, before assessing a hypoglycemia risk, at 414. Alternatively, in another embodiment, the assessments of hypoglycemia risk, at 414, and hyperglycemia risk, at 416, can be done in parallel at the same time.

Other metrics such as variability risk can also be assessed. For example, a variability value less than a first variability threshold 434 can be indicative of a low variability risk, a variability value greater than the first variability threshold 434 and less than a second variability threshold 436 can be indicative of a moderate variability risk, and a variability value greater than the second variability threshold 436 can be indicative of a high variability risk. Again, the use of three discrete groupings for variability risk is an example. The DGA can use any number of two or more groupings.

At step 418, the DGA can determine a pattern type for the TOD period based on the assessed one or more risk metrics. In one example embodiment, pattern determination can be assessed with the hypo risk metrics and the hyper risk metric. If the hypo risk metric is high, then the pattern can be set as a low pattern. Otherwise, if the hypo risk is moderate and the hyper risk is either high or moderate then the pattern can be set as a high/low (or moderate) pattern. Otherwise, if the hyper risk is high or moderate and the hypo-risk is low, then the pattern can be set as a high pattern. If both the hyper risk and hypo risk are low, then the pattern identified can be No Problem (e.g., an "OK" message is displayed our outputted).

Thus, method 410 is one example of how the DGA can output one of multiple pattern types for each TOD period. The number of pattern types in the pattern types themselves can vary from those described in this embodiment (e.g., low, high/low, high). Once pattern type for the TOD period has been determined, the DGA can store an indicator of the pattern type in a memory location for use in determining a titration recommendation. Referring again to FIG. 8A, the DGA can proceed, at 404, to determine a titration recommendation once completing the GPA for each relevant TOD period.

The recommendation method can branch depending on the pattern type (e.g., low, high/low, high) and other factors including the TOD period, dosing strategy, compliance with the strategy (e.g., whether a dose is missing), and whether sufficient data is available for making an assessment. The DGA does not make titration recommendations until enough data are available for the corresponding TOD period, for example, the DGA can omit assessment and generate an error message if less than a threshold amount of data is available, e.g., less than a threshold number (e.g., five) of separate days with more than a minimum portion (e.g., 90%) of the data available.

Figure 8D:
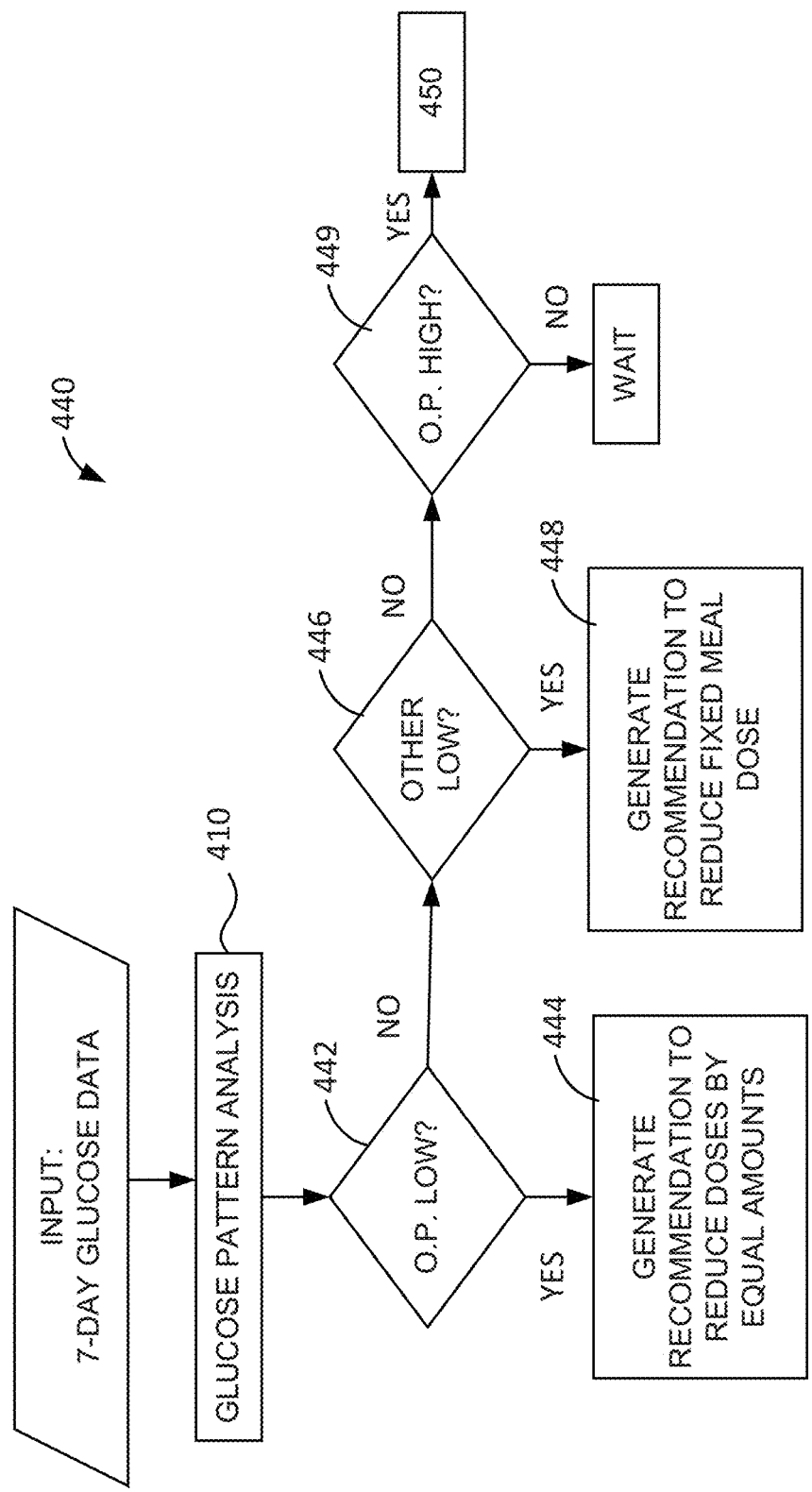
FIGS. 8D-8H are flow diagrams showing aspects of various example embodiments of algorithms for assessing meal bolus titrations for MDI insulin dosing therapies.

FIGS. 8D-8H show example branches of a recommendation algorithm or method for determining a dose titration recommendation based on the input information described above. Other branches can also be useful. FIG. 8D shows a recommendation method branch 440 for a TOD with sufficient data available and possible causes for a low pattern type including one or more of a higher than optimal basal dose, meal dose, premeal correction dose, or post-prandial dose. At 442, the DGA evaluates whether the pattern type for an overnight TOD period is low. If the pattern is low, at 444, the DGA generates a recommendation to reduce all relevant doses, including at least a basal dose and optionally, one or more of a meal dose, premeal correction dose, or post-prandial dose, by an equal amount, for example, 10%. Titration recommendation rules for the low patterns can include, for overnight TOD periods, generating a recommendation to reduce the long acting insulin dose(s) or basal rate at 444. At 446, if any other TOD period has a low pattern, the DGA can generate a recommendation, at 448, to reduce the fixed meal dose for the relevant TOD period only.

In this embodiment 440, if there is at least one low pattern, then no titration guidance for any high pattern TOD period is provided. The idea here is to emphasize prevention of hypoglycemia and to only increase doses when the risk of hypoglycemia is low in all TOD periods. Also, it is possible that in some situations, when a TOD period has a high pattern, this could be caused by a prior TOD period having a low pattern, and the patient is overeating to compensate—so addressing the low pattern can in itself help address a subsequent high pattern. At 449, if the pattern is not high, the process 440 waits or terminates without generating a recommendation or passes to a high pattern evaluation 450.

Accordingly, for high/low patterns, the DGA generates no titration guidance. If there are no TOD periods where titration guidance can be given and data is sufficient for all time periods, then the DGA can provide a message to the patient indicating that they need to address glucose variability before further titration guidance can be given. Also, the DGA can provide a report to the patient's HCP to consider alternative medications or therapies that can address glucose variability.

Figure 8E:
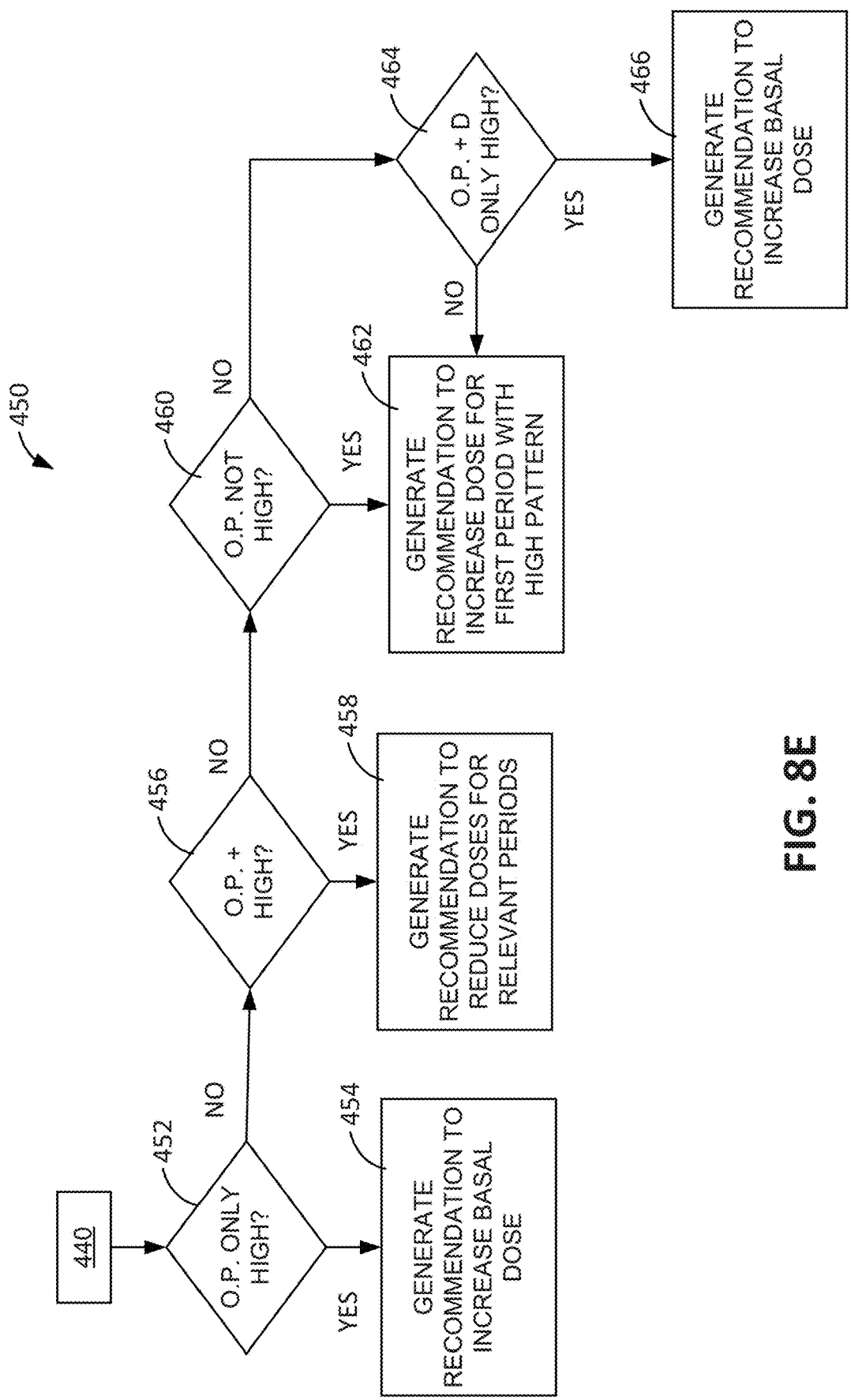

FIG. 8E shows operations by a DGA for generating titration recommendations for high patterns when there are no low pattern TOD periods. At 452, if the overnight period has a high pattern and there is no other period with moderate risk of hypoglycemia, the DGA can increase the long acting insulin dose(s) or basal rate recommendation at 454. At 456, if the overnight period has a high pattern, and there is at least one other non-dinner period with moderate risk of hypoglycemia, then at 458, the DGA can decrease the meal insulin dose associated with any period with moderate risk of hypoglycemia. At 460, if the overnight TOD period has no moderate risk of hypoglycemia and no high pattern, then at 462, the DGA can generate a recommendation to increase the meal insulin dose associated with the first TOD period with a high pattern. At 464, if the overnight period has a moderate risk of hypoglycemia, and the only post-meal period with a high pattern is dinner, at 466 the DGA can generate a recommendation to increase the long acting insulin dose(s) or basal rate. If the overnight period has a moderate risk of hypoglycemia, but not the post-dinner period, at 462 the DGA can generate a recommendation to increase the meal insulin dose associated with the first TOD period with a high pattern.

In alternative embodiments, the pre-meal glucose can be higher or lower than a target glucose (for example, 120 mg/dL). The glucose data for each meal that contributes to the calculation of the hypo and hyper risk metrics can be modified to compensate for the effects from a prior meal or condition that affects glucose that is not due to the current meal. The DGA can modify these data by subtracting the offset so the resulting starting glucose is the target level. Alternatively, the DGA can modify these data by a "triangle" function where, for the meal start time, the difference between the meal start glucose and the target glucose is subtracted, but this modification is reduced over time; either linearly for a defined period (e.g., three (3) hours), or another decay function.

Alternatively, this function can itself be a function of meal start glucose level or glucose trend, and/or when the previous meal dose was taken.

According to another aspect of the embodiments, algorithms for generating meal bolus titration recommendations can become more complex when additional aspects are factored in, such as, for example, missed meal doses, missed basal doses, post-prandial corrections, and pre-meal corrections. Algorithms for providing appropriate recommendations if these factors are present can require excluding some data, while still meeting data sufficiency thresholds after excluding data to provide guidance.

Figure 8F:
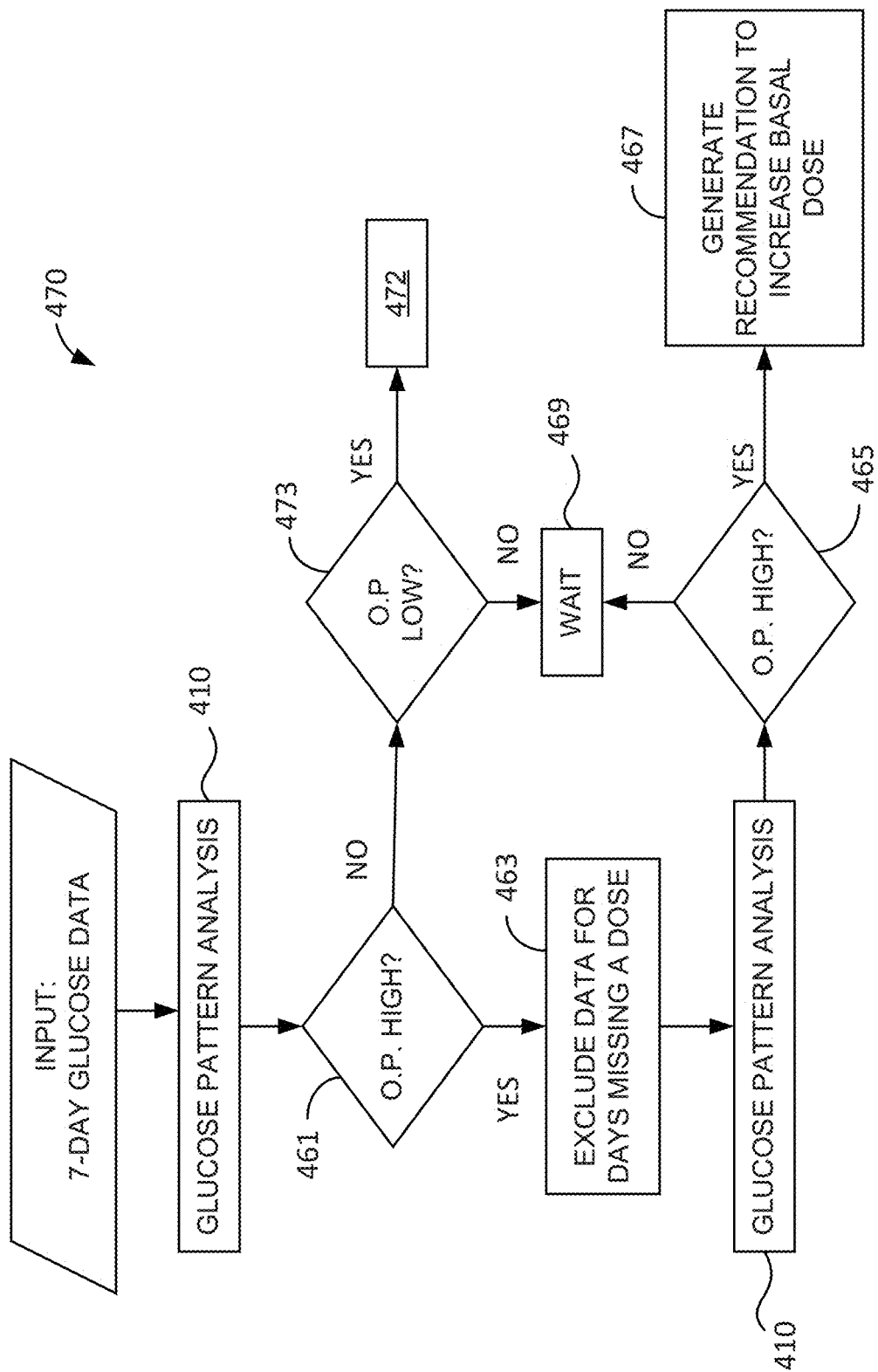

For example, referring to FIG. 8F, if a high pattern is detected at 461 with some days missing the meal dose, then the days with the missing meal dose are excluded 463 and the GPA analysis 410 is repeated. If a high pattern is subsequently detected 465, then the dose can be increased 467, based on the patterns identified in the other TODs, or wait for further input or return at 469. Alternatively, the system could only evaluate for high patterns using data where days with the missing meal dose are excluded. An algorithm 470 with this branching pattern is diagrammed in FIG. 8F. If the system detects a low pattern at 473, it may perform a low pattern algorithm 472 described in the following paragraph. If the system does not detect a high pattern or a low pattern, it may revert to block 469 for further input or return.

At 472, for missed meal doses, if the DGA detects a low pattern in a TOD period, and if the meal dose was missed for some of the days during this TOD, then the DGA can generate a recommendation to reduce the dose. The recommendation can include, for example, reducing the fixed portion or the correction-dose portion.

Regarding missed basal doses, if the DGA detects a low pattern 473 in the overnight TOD, missing basal doses should not impact the dose titration logic. Likewise, if a low pattern is detected in a TOD other than the overnight period, the missing basal doses should not impact the dose titration logic.

If the DGA detects a high pattern 461 in a TOD using data that includes at least one day (or TOD) with a missed basal dose, then data for any day or days (or TOD(s)) with the missing basal dose can be excluded 463 and the pattern analysis 410 is repeated. Subsequent actions can depend on the particular TOD in which the high pattern was detected. For example, if the DGA detects a high pattern in the overnight TOD in data including at least one day with a missed basal dose, then data for any day or days with the missing basal dose can be excluded and the pattern analysis is repeated. If a high pattern in the overnight TOD is detected when the day(s) with the missed basal dose(s) are excluded, then the basal dose can be increased, as the overnight TOD results can be used as a guide for adjusting basal dose. If a high pattern is detected in a TOD other than the overnight period, then the days with the missing basal dose can be excluded and the pattern analysis repeated. If a high pattern is detected when the day(s) with the missed dose(s) are excluded, then the meal dose associated with the TOD with the high pattern can be analyzed for titration as described herein. In either case, the logic flow 470 is as diagrammed in FIG. 8F.

Figure 8G:
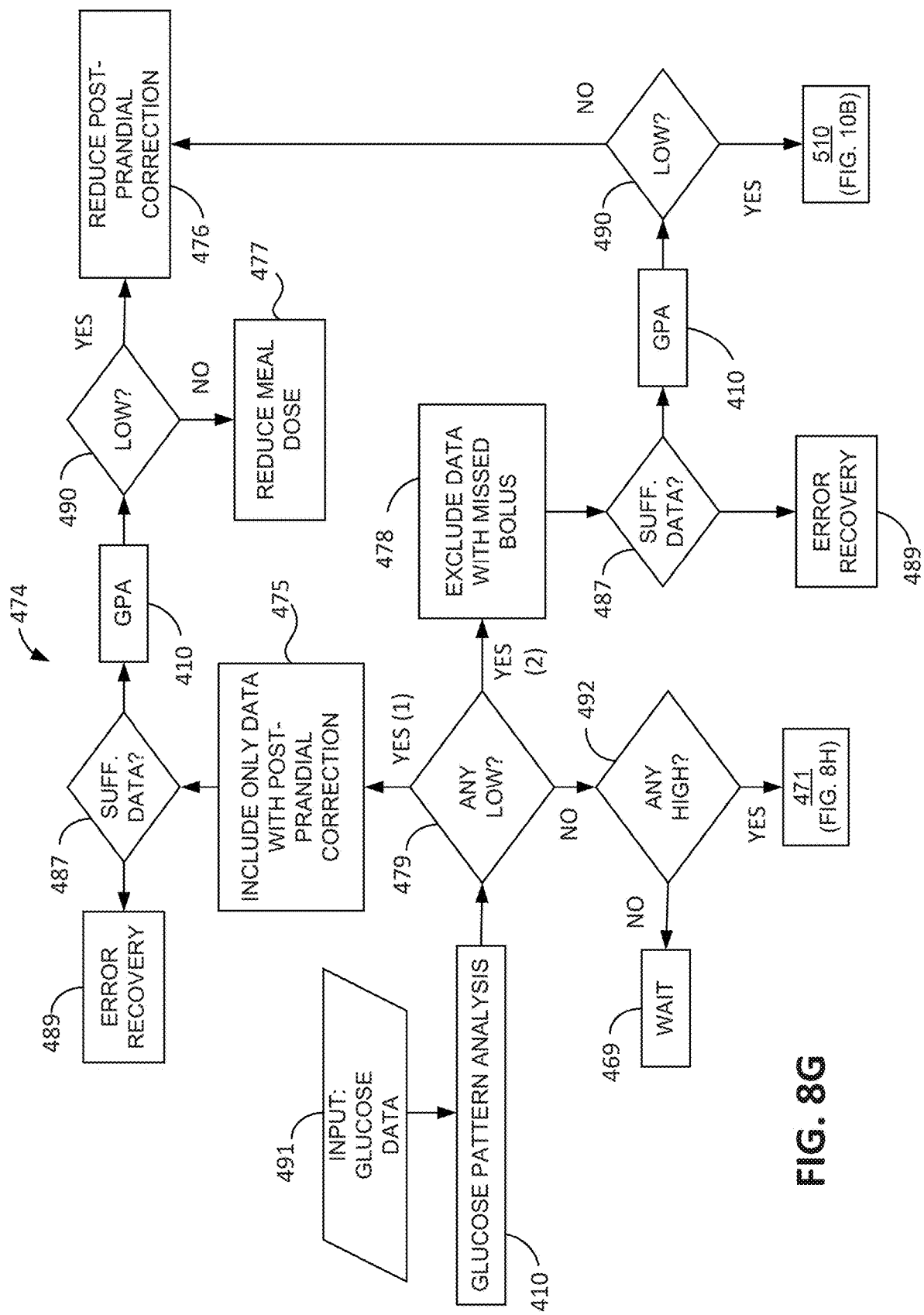

FIG. 8G shows an example for a logic flow 474 for developing recommendations with post-prandial corrections. If after GPA 410 the DGA detects a low pattern 479 for a TOD with some days including a post-meal correction, then the following analyses can be used to titrate the correction or meal dose. At 475, if the DGA first detects a low pattern 479 it can exclude data for the days without a post-meal correction, first testing that sufficient data is available at 487. If sufficient data is not available, the DGA may perform an error recovery routine 489, for example, displaying an error message. If sufficient data is available, the DGA may repeat the pattern analysis 410. If, subsequently, the DGA detects a low pattern, it can reduce the post-prandial correction dose (that is, increase the correction factor) at 476, subject to pattern analysis findings in the other TODs. If, subsequently, the DGA does not detect a low pattern, it can reduce the meal dose at 477.

For all embodiments described herein, modification (e.g., titration) of a correction dose in one direction can be achieved by modification of the correction factor in the opposite direction. The two parameters are inversely related, such that an increase in correction dose can be achieved by a decrease in correction factor, and a decrease in correction dose can be achieved by an increase in correction factor. Thus, in all of the embodiments described herein, the DGA can recommend or implement a correction either by modification of the correction factor or by modification of the correction dose. Thus, to the extent modification or titration of a correction factor is described herein, the embodiments can be configured to achieve the same effect by an inverse modification of the correction dose and, conversely, to the extent modification or titration of a correction dose is described herein, the embodiments can be configured to achieve the same effect by an inverse modification of the correction factor. Given this interchangeability, both options are available for every embodiment described herein although both options will not be described for every embodiment solely for ease of description.

In addition, or in an alternative, starting with an original data set 491, at 478 the DGA can exclude days with missed meal doses. After finding sufficient data at 487, if the pattern analysis 410 of these data with days with post-meal corrections excluded does not indicate a low pattern at 490, then the DGA can recommend reducing the post-prandial correction dose 476. Otherwise, the DGA can implement the logic 510 of FIG. 10B, which can result in a recommendation to reduce either the meal time insulin or pre-meal correction portions of the dose guidance. If the DGA does not detect lows at 479 and does not detect any high glucose pattern at 492, it may wait for further input or return at 469. If the DGA does detect a high pattern at 492, then it may implement the process 480 at block 471 (FIG. 8H).

Figure 8H:
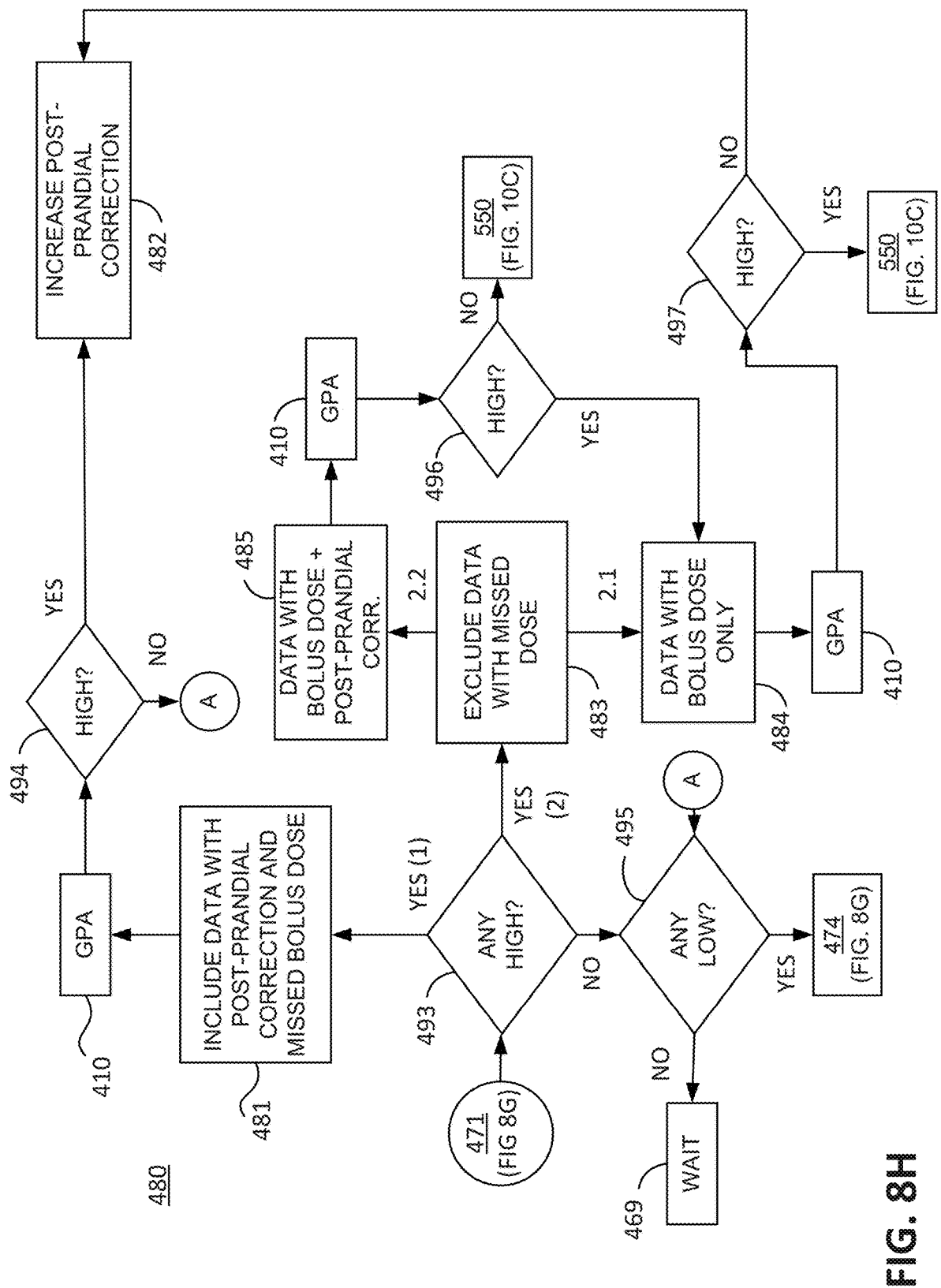

Referring to FIG. 8H, if the DGA detects a high pattern 493 for a TOD with some days including a post-meal correction, then it can implement the following procedure 480 to develop a recommendation for titrating the correction and meal doses. At 481, the DGA can include data for days with a missed dose and with a post-meal correction, and repeat the pattern analysis 410. If subsequently the DGA detects a high pattern at 494, it can increase the post-prandial correction dose (that is, decrease the correction factor) at 482, subject to pattern analysis findings in the other TODs. If it does not detect a high pattern at 494, it may check for a low pattern at 495 and revert to 474 of FIG. 8G if detecting a low pattern, or else wait for further input or return at 469. Although not shown in FIG. 8H, after excluding any data for GPA 410 and before performing the GPA, the DGA may test for sufficiency of data and perform an error recovery routine if available data is insufficient.

In an alternative, or in addition, starting with the original data set at 493, if the pattern analysis of the data excluding days with missed meal doses at 483 indicates a high pattern along either one of branches 2.1 or 2.2, the DGA can continue the procedure 480 as follows. On branch 2.1, if pattern analysis 410 of data for days excluding post-meal corrections at 484 (i.e., data with bolus dose only) does not indicate a high pattern at 497, then the DGA can generate a recommendation to increase the post-prandial correction dose at 482, subject to pattern analysis of the other TODs. Otherwise the DGA can generate a recommendation to increase either the meal time insulin or pre-meal correction portions, following the procedure 550 of FIG. 10C.

Figure 10A:
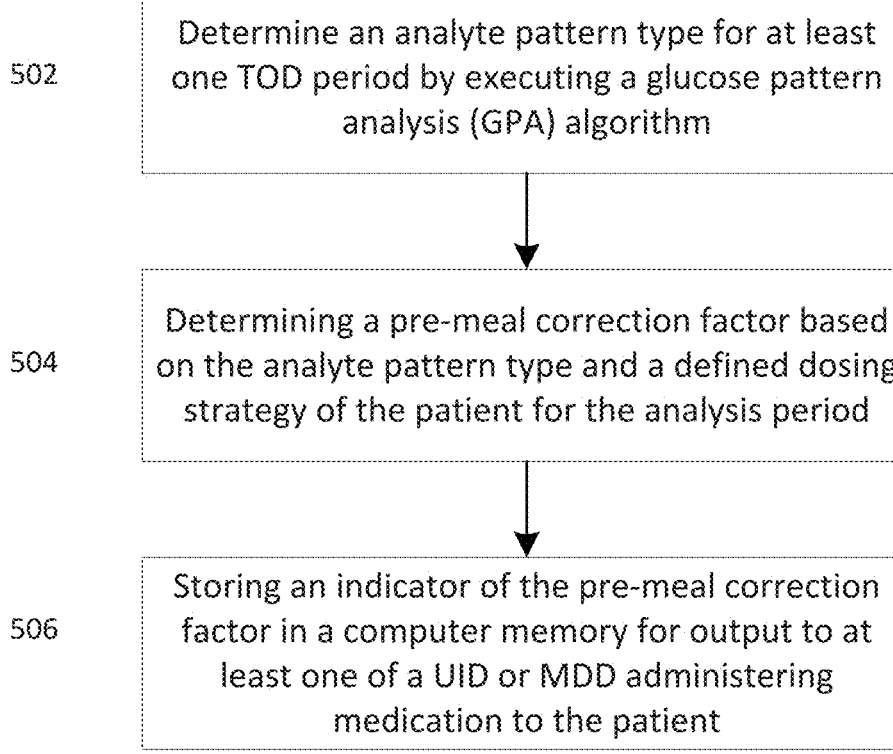
FIG. 10A is a flow diagram depicting an example embodiment of process flow for operations by a dose guidance application for correction factor titration.
Figure 10B:
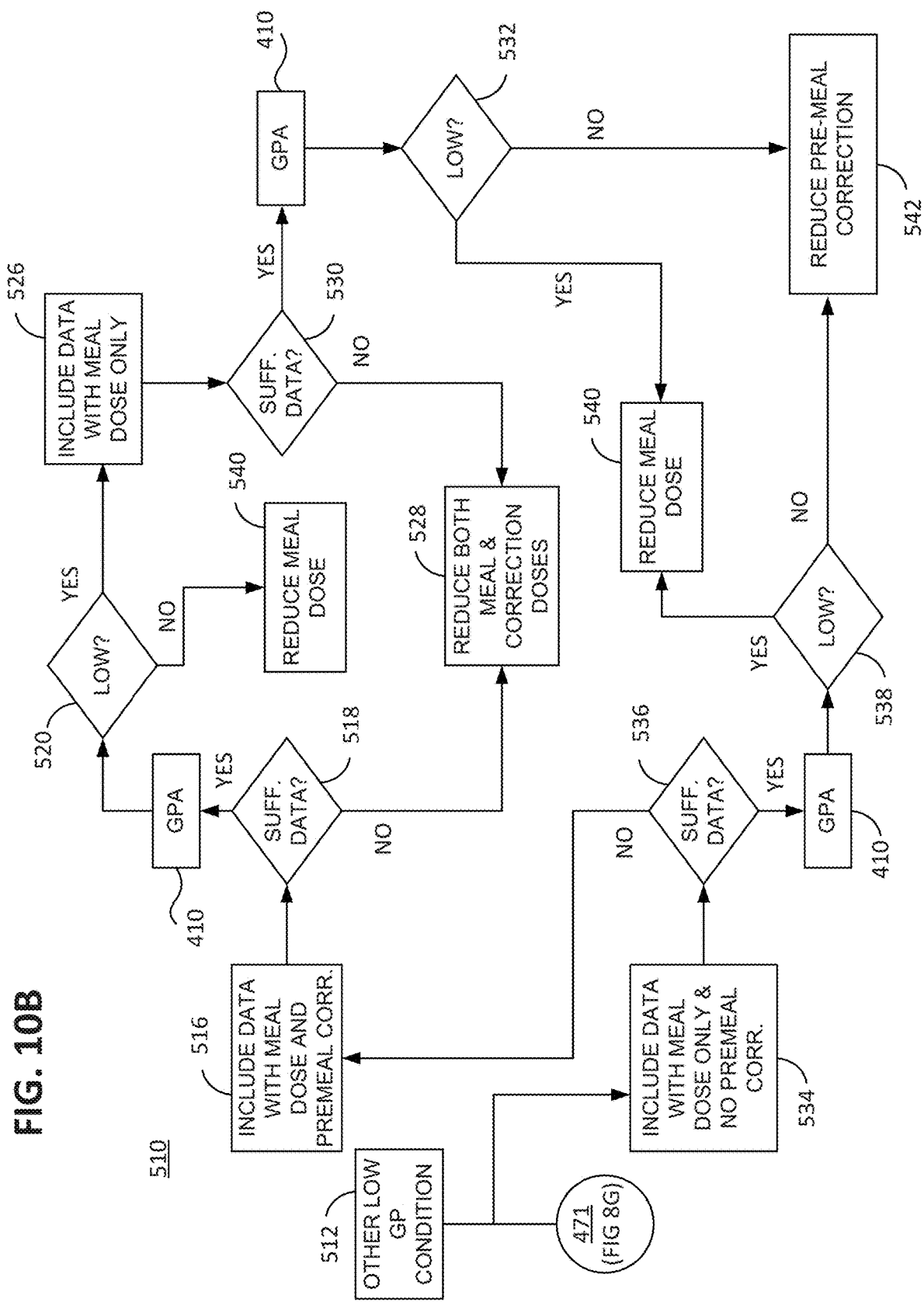
FIGS. 10B-10C are flow diagrams showing aspects of controlling a user interface device to output data for adjusting a correction factor in response to analyte data.
Figure 10C:
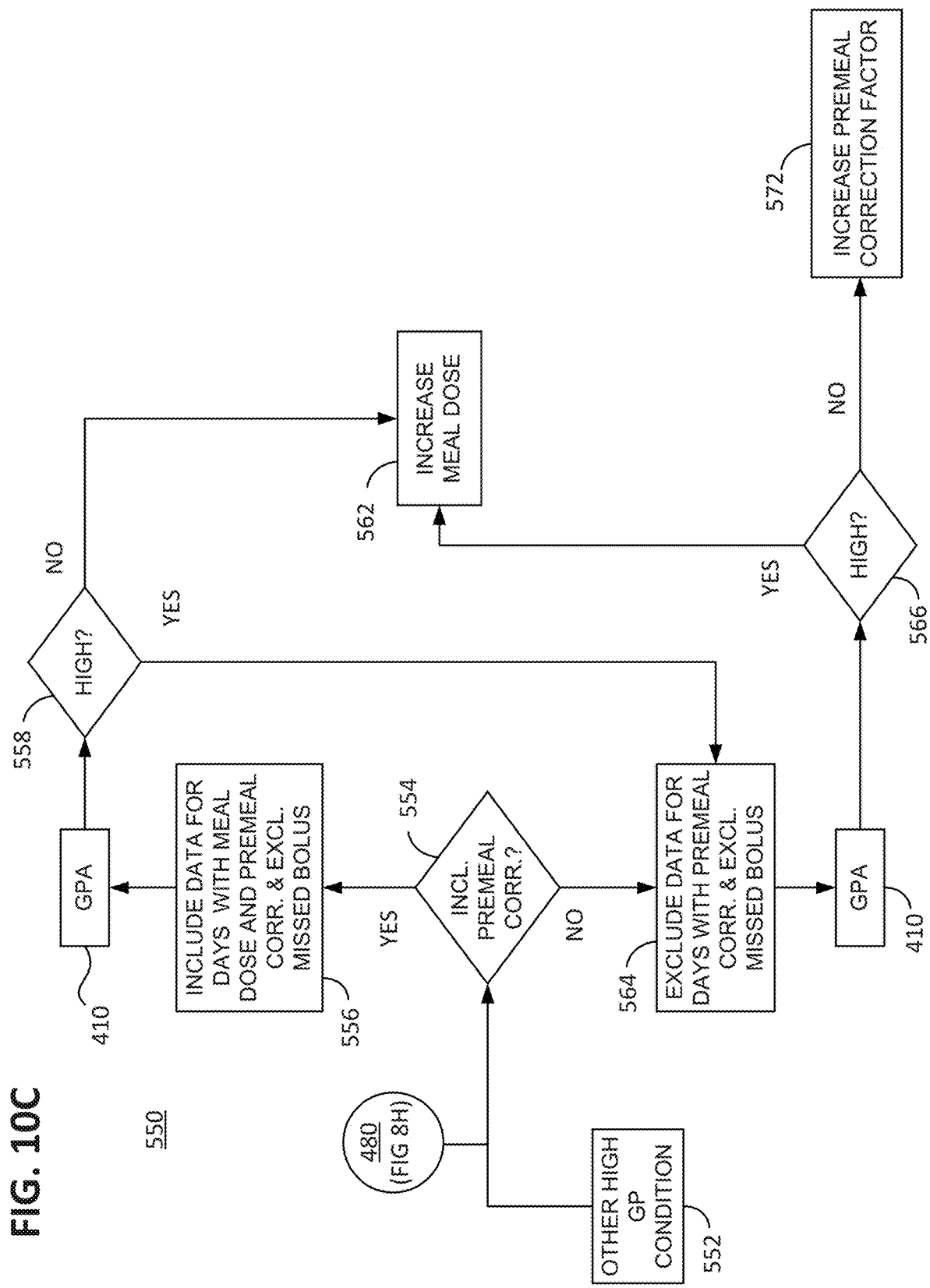

On branch 2.2, if the pattern analysis on the data with only days with post-meal corrections included at 485 does not indicate a high pattern at 496, then the DGA can increase either the meal time insulin or pre-meal correction portions, following the procedure 550 of FIG. 10C. If a high pattern is not detected at 496, the DGA may revert to block 484.

If correction factor titration recommendations from the different TODs are conflicting, and if the patient is currently using the same correction factor for all TODs, then the DGA can increase the correction factor. The procedure 480 can increase the meal dose first, if all three components, meal dose, pre-meal correction, and post-prandial correction are less than optimal. Pre-meal correction can be up-titrated after the meal dose has been titrated. Post-prandial correction can be up-titrated after meal dose and premeal correction have been corrected.

If during subsequent analysis, the TODs for which the DGA generated an 'increase correction factor' recommendation by the foregoing method, now will result in a recommendation of 'no change in correction factor.' Conversely, if TODs with a 'decrease correction factor' recommendation by the foregoing method still receive a recommendation to 'decrease correction factor', then the different TODs will likely be optimized by use of different correction factors.

While FIGS. 8D-8H show aspects of various recommendation algorithms 404 for use in the method 400, it should be appreciated that these are examples. Various other algorithms may also be suitable.

Meal Bolus Titration Hysteresis

Example embodiments of methods for mitigating oscillations around optimal meal bolus doses will now be described. When the DGA has reached or is close to reaching optimal titration, a situation can occur where titrations continue to be requested but are not really needed. That is, metrics used to determine if titration is needed can have a level of error or variability, and this variability can cause the titration algorithm to oscillate around the optimal dose. A patient parameter convergence tracking (PPC) module can be included in the DGA to mitigate this oscillation issue.

In one embodiment, a PPC module can collect past information from the user, where the past information includes data sufficient to determine the effect of various events to the patient's glucose levels at different times. The PPC module can be configured to calculate and track how a plurality of outcome metrics change over time. The outcome metrics can include, but are not limited to, hypo risk, hyper risk, and time in range. The PPC module can also be configured to calculate and track changes in dose guidance parameter estimates and/or dose guidance suggestions. Dose guidance parameter estimates can include, but are not limited to, estimated insulin sensitivity factor/insulin correction factor, estimated insulin-to-carbohydrate ratio, and estimated average carbohydrates for each meal time. Dose guidance suggestions include, but are not limited to, recommended basal insulin dose, recommended meal doses, recommended touch-up doses, and recommended correction doses.

In one embodiment, the PPC module of the DGA can be configured to create a correlation for each outcome metric. The correlation can be a multi-dimensional correlation. The PPC module can be configured to map changes in each dose guidance parameter over time and/or guidance suggestion over time to a change in an outcome metric over time. The PPC module can also be configured to track a gradient for a particular metric. For example, if a plurality of dose guidance parameter changes and/or guidance suggestion changes result in a small, predicted change in an outcome metric, the PPC module can be configured to determine that adjustment recommendations be delayed for a time period to prevent unnecessary adjustment requests to the user.

In another embodiment, the PPC module can be configured to use multiple gradients to compare each gradient of the multiple gradients with a set of predetermined gradient thresholds. The PPC module can be configured to determine that an adjustment recommendation be delayed when a number of the gradients exceeding their thresholds is not greater than a predetermined value. The predetermined value can be a universal or user specific value.

Physiological Dose Guidance Algorithm

Example embodiments of methods for determining doses guidance based on physiologically relevant processes will now be described. Many model-based control systems, specifically those utilizing model predictive control (MPC) algorithms, are based upon black box diagrams and have no strict physiological basis. As a result, these models may not be able to account for certain pharmacokinetic and pharmacodynamic differences in different insulin analogs used for intensive MDI therapy. Moreover, for MDI therapy, a given insulin dose must manage a user's glycemia for a period of hours, whereas many of the dose guidance algorithms utilized today are meant to be used in conjunction with an insulin pump, which supplies only one insulin analog (generally, fast acting) in a continuous stream to the user. When in communication with a CGM, MPC algorithms receive glucose feedback on the current insulin delivery rate frequently (e.g., every five minutes) and can subsequently alter pump flow rates in real-time to maintain normoglycemia. As a result, current MPC algorithms that can drive frequent changes in pump-driven insulin delivery based upon glucose feedback will not work for MDI therapy, wherein insulin delivery is less frequent, so longer time horizons must be projected. As those horizons become longer (e.g., on the order of hours), drug pharmacokinetics and pharmacodynamics can have a larger role in creating accurate predictions. This requirement necessitates the design of a more physiologically-based method for insulin dose guidance and glucose control.

An insulin dose guidance algorithm is described herein that considers physiologically relevant processes, such as insulin diffusion, subcutaneous pharmacokinetics (PK), and glucose-insulin dynamics. The parameters can be determined by numerically solving a modified minimal model of insulin absorption and glucose control (see Bergman, et al. 1978 and Dalla Man, et al., 2007, which is expressly incorporated by reference in its entirety) during a "learning phase" to develop user-specific model parameters. Once those parameters have been determined, the user-specific minimal model can be solved for both mealtime and correction doses to determine an optimal insulin dose at that moment.

As similarly described in other embodiments, the DGA can receive or otherwise access glucose values and trends from a glucose monitoring system. The DGA can be configured to query the user if they will be dosing soon and can also or alternatively be configured to query the user for which meal they will need dose guidance. The DGA can be configured to output a dose recommendation based on an algorithm, e.g., the physiological dose guidance algorithm or another algorithm described herein. The DGA can then be configured to observe if the user adheres to the dose guidance, and can also track resulting glucose traces for consideration in future dose guidance.

The DGA can be configured to include a physiological dose guidance algorithm that determines an optimal dose to be output in a dose guidance. In one embodiment, the dose guidance can be provided for a user with a multiple daily insulin injection (MDI) regimen of once daily long acting analog with 3× daily rapid acting meal analog with corrections. This methodology can be applied to other MDI strategies such as basal only or basal with single rapid acting injection.

Figure 9A:
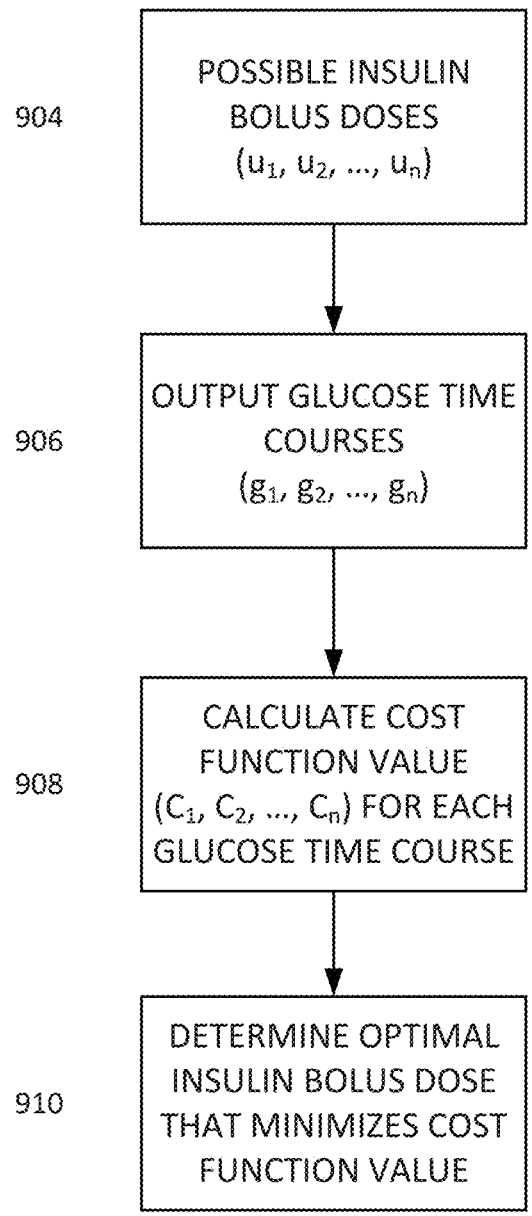
FIGS. 9A-9C are flow diagrams depicting example embodiments of methods for determining a dose guidance using physiological dose algorithms.

In example embodiments, as described in the flow diagram of FIG. 9A, beginning with step 904, in exemplary method 900, the DGA can automatically generate possible bolus insulin doses ($u_1, u_2, \ldots, u_n$) based on past dosing history. In step 906, the physiological dose guidance algorithm can process the possible insulin doses and generate and output a glucose time course ($g_1, g_2, \ldots, g_n$) (e.g., data array) for each bolus insulin dose input. In step 908, the DGA can then calculate a cost function value ($C_1, C_2, \ldots, C_n$) for each glucose time course. The cost function can be defined to minimize a time out of range (e.g., outside the range of about 70 mg/dL to about 180 mg/dL) over time for each glucose time course. In step 910, the DGA can determine an optimal insulin bolus dose that minimizes the cost function value.

An optimal insulin bolus dose (u) delivered at time t can be determined from projected glucose traces following simulated insulin dosing and carbohydrate meal input (if needed). This dose can be broken down into component parts, such as for a glucose correction portion, a meal coverage portion, and an insulin on board portion, using a simple bolus calculator equation (below).

$$u = \left(\frac{BG(t) - BG_{target}}{CF}\right) + (CHO * IC) - IOB \quad (1)$$

The physiological dose guidance algorithm, however, may not use equation (1) to determine the optimal dose. The physiological dose guidance algorithm can instead use the separate components of the equation to assist the user and HCP to understand how much of the dose is intended for current glucose levels relative to meal coverage. In the equation, u is the optimal insulin bolus dose. The first term of the equation in parentheses $$\left(\frac{BG(t) - BG_{target}}{CF}\right)$$

is the glucose correction portion and is meant to correct for any offset between the user's current glucose at time t (BG(t)) and a target value ($BG_{target}$). The correction factor (CF) represents the user's specific sensitivity to insulin, i.e., how effective a single insulin unit is in lowering the user's blood glucose. The second term (CHO*IC) represents the portion of the insulin dose necessary to cover a meal, if one is taken. The CHO value denotes the amount of carbohydrates in the upcoming meal and the IC value denotes the subject-specific insulin:carbohydrate ratio, i.e., how many grams of carbohydrates can be covered by a given insulin dose. Lastly, the IOB value is meant to account for active "insulin on board" that can still elicit a therapeutic benefit to avoid any instances of insulin stacking. This value can be based upon insulin pharmacokinetic models as well as endogenous insulin production. The values for $BG_{target}$, IC, and insulin total daily dose (TDD) can be defined by the user's HCP. In one embodiment, the initial condition for CF can be defined according to the "1800 rule", which is defined as 1800/TDD. Moreover, in one embodiment, during the learning phase, CF can be refined based upon data from correction doses.

The physiological dose guidance algorithm can use different methods to determine dose guidance for correction doses, meal doses and basal doses. For all three types of dose guidance, however, the DGA can assume that rapid acting insulin analogs (e.g., insulins lispro, aspart, or glulisine) will be used, and that all three have similar subcutaneous PK profiles such that their respective durations of action can be considered equivalent.

Correction Doses

When dose guidance is requested from the DGA for a correction dose, because a correction dose is not associated with a meal, CHO=0 because there are no new carbohydrates to consider. Thus, the second term of equation (1) is equal to zero. Therefore, the component parts of the correction dose are the glucose correction portion and IOB.

$$u = \left(\frac{BG(t) - BG_{target}}{CF}\right) - IOB \quad (2)$$

Figure 9B:
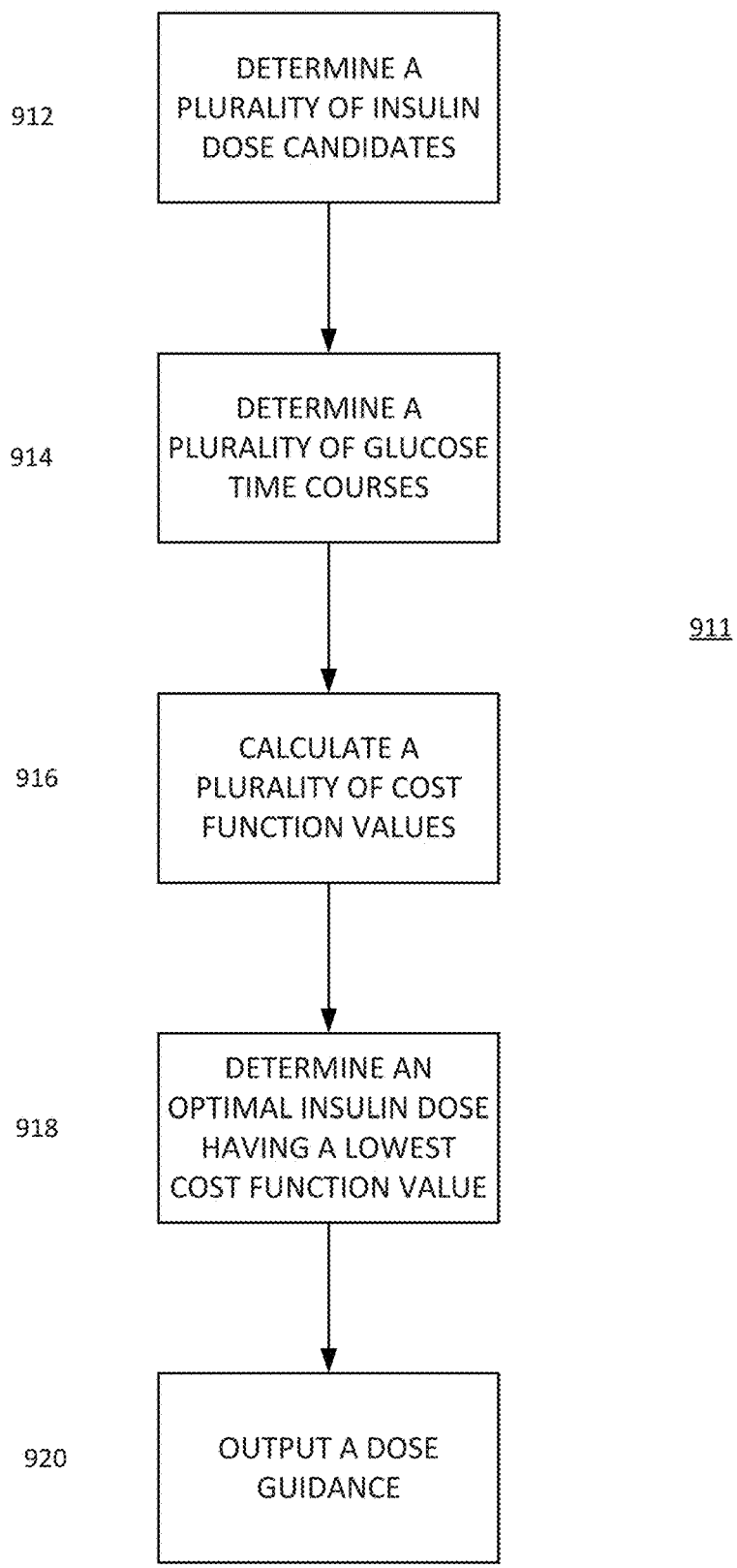

In one example embodiment, as described in the flow diagram of FIG. 9B, in exemplary method 911, beginning with step 912, once a correction dose is prompted, the DGA can generate a plurality of insulin dose candidates. In one embodiment, the plurality of insulin dose candidates can be generated based on a past history of the subject's insulin doses.

In step 914, the DGA can determine a plurality of glucose time courses corresponding to the plurality of insulin dose candidates. In one embodiment, the DGA can calculate subject-specific glucose time courses using a modification of the minimal model for a range of possible dose amounts using the physiological dose guidance algorithm. Each dose candidate can be considered to be a sum of the injected insulin dose and the amount of long acting insulin that is currently onboard. The amount of IOB can be calculated from pharmacokinetics specific to the subject's long-acting analog and can be the same across all candidate input doses. The numerical difference amongst all the candidate insulin doses can be due to the difference in rapid acting component of the overall dose.

In step 916, the DGA can calculate a plurality of cost function values corresponding to the plurality of glucose time courses. In one embodiment, for each glucose time course, different time-in-range metrics can be calculated and used to determine a cost function value that describes risk of time outside target range (e.g., about 70 mg/dL-about 180 mg/dL).

An exemplary cost function is shown below in Equation 5, although many other forms can be used. Area under the curve (AUC) is used for these calculations to incorporate both the magnitude and duration of hyper/hypo-glycemic events.

$$AUC_{hyper,calc} = \int_{t_i}^{t_f} (BG(t) > 180) dt \quad (3)$$

-continued $$AUC_{hypo,calc} = \int_{t_i}^{t_f} (BG(t) < 70) dt \quad (4)$$

$$C = w_{hypo}(AUC_{hypo,calc} - AUC_{hypo,threshold})^2 + \quad (5)$$
$$w_{hyper}(AUC_{hyper,calc} - AUC_{hyper,threshold})^2$$

The threshold values of $AUC_{hypo}$ and $AUC_{hyper}$ can be defined to be the minimal accepted time and duration spent in either regime. Each term in C can have an associated weighting factor, w, the total set of which $\{w_1, w_2, \ldots, w_n\}$ must sum to one. This weighting can allow for preference to be placed on protection from hypoglycemic events. The insulin dose that is associated with the minimal cost function value can be the suggested dose for the dose guidance that is outputted by the DGA.

In step 918, the DGA can determine an optimal insulin dose, where the optimal insulin dose has a lowest cost function value of the plurality of cost function values. In one embodiment, the DGA can be configured to determine the dose candidate that minimizes a time out of range-associated cost function, C, as the optimal insulin dose.

In step 920, the DGA can output a dose guidance that includes the determined optimal insulin dose.

In another embodiment, instead of simulating resultant glucose traces from an a priori set of possible insulin doses and choosing the best option, in an alternative embodiment, the DGA can provide an initial dose guess, from which a glucose horizon and cost function value can follow. A constrained minimization can then be performed on the cost function using either gradient or non-gradient based (e.g., genetic algorithm) approaches. Thus, each insulin dose guess could be chosen following the first dose to minimize the cost function.

Once an optimal insulin dose is determined, the optimal insulin dose can be further subdivided for the user to understand what aspects are to cover correction and how much insulin is currently onboard.

Meal Doses

When dose guidance is requested from the DGA for a meal dose, similar to the calculation for the correction dose described above, the DGA can calculate user-specific glucose time courses using a modification of the minimal model for a range of possible dose amounts. Because the dose guidance is associated with a meal, unlike the process for determining a correction dose, the DGA can also consider additional meal carbohydrate information in determining the dose guidance. Because the dose guidance is associated with a meal, CHO is greater than zero, and the components of the meal dose can include the additional meal carbohydrate information (CHO*IC). Thus, the components of the meal dose include the glucose correction portion, the meal coverage portion, and the IOB, per equation (1).

Figure 9C:
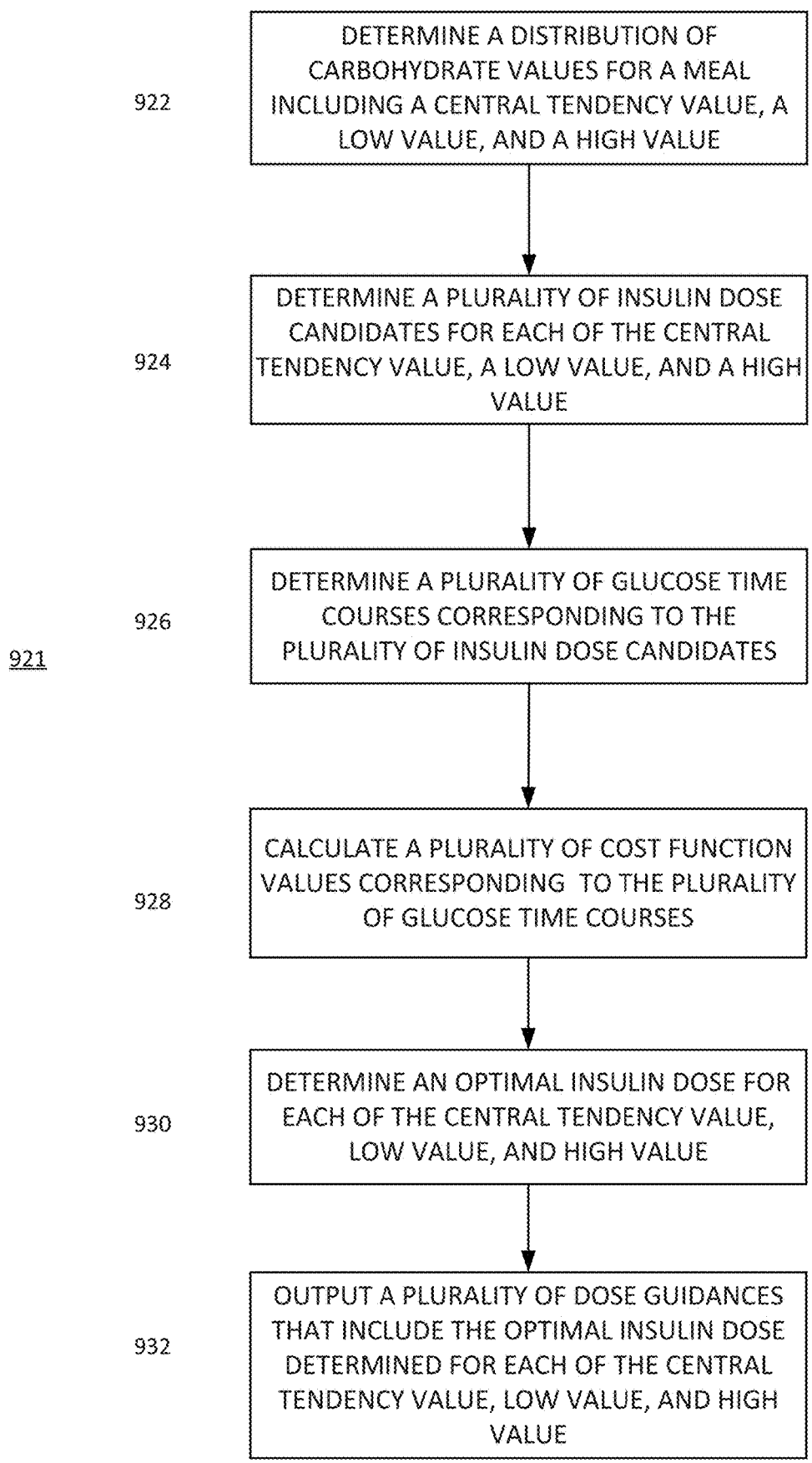

In one example embodiment, as described in the flow diagram of FIG. 9C, in exemplary method 921, beginning with step 922, in response to a user inquiry for dose guidance for a meal, the DGA can determine a distribution of carbohydrate values for the meal. The distribution of carbohydrate values can include a central tendency carbohydrate value, a low carbohydrate value that is smaller than the central tendency carbohydrate value, and a high carbohydrate value that is larger than the central tendency carbohydrate value. In one embodiment, the meal can be represented as a meal-specific distribution of carbohydrate values with known descriptive statistics to describe the central tendencies (e.g., mean or median) as well as variation (e.g., standard deviation, coefficient of variation, 25/75 quartiles). These data can undergo a transformation to provide these summary statistics. As a result, each meal can have its own carbohydrate distribution.

In one embodiment, the central tendency carbohydrate value can be a mean or a median. In one embodiment, the low carbohydrate value can be, e.g., the $25^{th}$ percentile, alternatively the $30^{th}$ percentile, alternatively the $35^{th}$ percentile, alternatively a value between the $20^{th}$ and $40^{th}$ percentile of the glucose data, or alternatively $\mu-\sigma$ if the data are normally distributed. In one embodiment, the high carbohydrate value can be, e.g., the $75^{th}$ percentile, alternatively the $80^{th}$ percentile, alternatively the $65^{th}$ percentile, alternatively the $60^{th}$ percentile, alternatively a value between the $60^{th}$ to the $80^{th}$ percentile of the glucose data, or alternatively $\mu+\sigma$ if the data are normally distributed.

In step 924, the DGA can determine a plurality of insulin dose candidates for each of the central tendency carbohydrate value, low carbohydrate value, and high carbohydrate value. In one embodiment, the plurality of insulin dose candidates can be generated based on a past history of the subject's insulin doses.

In step 926, the DGA can determine a plurality of glucose time courses corresponding to the plurality of insulin dose candidates for each of the central tendency carbohydrate value, low carbohydrate value, and high carbohydrate value. In one embodiment, the DGA can calculate subject-specific glucose time courses using a modification of the minimal model for a range of possible dose amounts using the physiological dose guidance algorithm, as described above with respect to correction doses. In one embodiment, each dose candidate can be considered to be a sum of the injected insulin dose and the amount of long acting insulin that is currently onboard. The amount of IOB can be calculated from pharmacokinetics specific to the subject's long-acting analog and can be the same across all candidate input doses. The numerical difference amongst all the candidate insulin doses can be due to the difference in rapid acting component of the overall dose.

In step 928, the DGA can calculate a plurality of cost function values corresponding to the plurality of glucose time courses for each of the central tendency carbohydrate value, low carbohydrate value, and high carbohydrate value. In one embodiment, for each glucose time course, different time-in-range metrics can be calculated and used to determine a cost function value that describes risk of time outside target range (e.g., about 70 mg/dL-about 180 mg/dL). Although many other forms can be used, in one embodiment, the DGA can be configured to calculate a plurality of cost function values using the exemplary AUC analysis described with respect to correction dose calculations. In other embodiments, for each glucose time course, different glucose values at a pre-determined percentile of glucose values within a pre-determined (rolling) time window can be determined. For example, as an alternative to percent time in hypoglycemia or an alternative to AUC below low glucose threshold, a $5^{th}$ percentile value (or other percentile less than 30%) can be calculated within a window of time and compared against a low glucose threshold. The window of time can be a fixed function of time of day, e.g., 9 am-11 am, relative to the start and/or end of an event, e.g., about 30 minutes after a meal, alternatively up to about 300 minutes after a meal, or other definitions. A different low percentile with its corresponding low glucose threshold can also be used. As an alternative to percent time in hyperglycemia or an alternative to AUC above high glucose threshold, a $90^{th}$ percentile value (or other percentile greater than 70%) can be calculated within a window of time and compared against a high glucose threshold.

In step 930, the DGA can determine an optimal insulin dose for each of the central tendency carbohydrate value, low carbohydrate value, and high carbohydrate value. The optimal insulin doses can be the doses with a lowest cost function value of the plurality of cost function values for each of the central tendency carbohydrate value, low carbohydrate value, and high carbohydrate value.

In step 932, the DGA can output a plurality of dose guidances that include the optimal insulin dose determined for each of the central tendency carbohydrate value, low carbohydrate value, and high carbohydrate value. The dose guidance associated with the central tendency carbohydrate value can correspond to a median meal dose guidance. The dose guidance associated with the low carbohydrate value can correspond to a "smaller than normal" meal dose guidance. The dose guidance associated with the high carbohydrate value can correspond to a "larger than normal" meal dose guidance. In one embodiment, the DGA can output a range of meal dose guidances to account for the current glucose value as well as a distribution of meal carbohydrate values. Any extreme cases can be modified or skewed as necessary. For example, the optimal insulin dose associated with a larger than normal meal may need to be based upon the $60^{th}$ percentile instead of the $75^{th}$ to avoid post-prandial hypoglycemia as a result of overbolusing. Using equation (1), an optimal insulin doses can be further divided to show the user and HCP an amount that was devoted to the meal or to the pre-meal glucose level. In one embodiment, each of the components of the dose guidance (e.g., the glucose correction portion, the meal coverage portion, and the IOB) can be outputted and displayed for the user and/or HCP.

Basal Doses

Basal doses of long acting insulin analogs are given once to twice daily, depending on the drug of choice. For example, insulin glargine has a 24 hour duration of action and is administered one daily, while insulin detemir has a 12 hour duration of action and is administered twice daily. As these time scales are much longer than the 4-5 hour duration of action associated with rapid acting analogs, different subcutaneous insulin PK profiles can be included for long acting analogs. The time course of action is a difference between the basal dose case relative to the other two. Similar to correction doses, basal administration is not associated with a meal, but rather is present during all meals due to its extended pharmacokinetic profile.

In one example embodiment, with reference to the flow diagram of FIG. 9B, beginning with step 912, once the DGA is prompted for a basal dose guidance, the DGA can generate a plurality of basal insulin dose candidates. In one embodiment, the plurality of basal insulin dose candidates can be generated based on a past history of the subject's basal doses.

In step 914, the DGA can determine a plurality of glucose time courses corresponding to the plurality of basal insulin dose candidates. In one embodiment, the DGA can calculate subject-specific glucose time courses using a modification of the minimal model for a range of possible dose amounts using the physiological dose guidance algorithm. The amount of IOB can be calculated from pharmacokinetics specific to the subject's insulin analog doses and can be the same across all candidate input doses.

In one embodiment, the DGA can be configured to expand the plurality of glucose time courses with respect to time to reflect the prolonged duration of action associated with long-acting analogs (e.g., 12 or 24 hours). Because basal insulin is typically a once daily drug, long acting basal guidance can be developed to prompt the user at the same time every day. Similar to the correction dose and meal dose determinations, the DGA can be configured to generate glycemic profiles for basal dose candidates. Each of the plurality of glucose time courses can include three meal events, which can each include an associated rapid acting dosing input to mimic excursions during the 24-hour window of basal action. Each meal event can include a carbohydrate input, as well a rapid acting insulin input. In one embodiment, values for the insulin input can be based upon subject-specific median rapid acting analog requirements from MDD 152 data. In one embodiment, meal input can be represented by a central tendency carbohydrate amounts (e.g., median or mean carbohydrate amount) as described in the mealtime dose guidance determination. In one embodiment, the meal events can be the same for every basal simulation event within a single dose guidance. In one embodiment, the basal dose is the only input value that is varied.

In step 916, the DGA can calculate a plurality of cost function values corresponding to the plurality of glucose time courses. In one embodiment, for each glucose time course, different time-in-range metrics can be calculated and used to determine a cost function value that describes risk of time outside target range (e.g., about 70 mg/dL-about 180 mg/dL). In one embodiment, the cost function analysis for the plurality of glucose time courses generated for the plurality of basal dose candidates can be the same as described with respect to the correction dose analysis. In another embodiment, the cost function analysis for the plurality of glucose time courses generated for the plurality of basal dose candidates can be different than the cost function analysis used for the correction dose analysis.

In step 918, the DGA can determine an optimal basal insulin dose, where the optimal basal insulin dose has a lowest cost function value of the plurality of cost function values. In one embodiment, the DGA can be configured to determine the basal dose candidate that minimizes a time out of range-associated cost function, C, as the optimal insulin dose.

In step 920, the DGA can output a dose guidance that includes the determined optimal basal insulin dose.

Correction Factor Titration

Example embodiments of methods for determining correction factor titrations will now be described. While initiated by physicians, insulin dosing for those with diabetes has largely been the purview of the patient to manage throughout the course of the disease. Frequently, these management methods are experiential, relying on the patient to learn from trial and error scenarios to improve diabetes management. Even more quantitative determination methods for those on MDI have largely relied upon simple approaches such as insulin bolus calculators, which rely on both frequent blood glucose measurements as well as values like insulin:carbohydrate ratio or insulin correction factor that are difficult to both determine and understand from a patient perspective. The algorithm subroutine herein described aims to leverage dense glucose data from CGM devices and insulin dosing information from Bluetooth-enabled insulin pens to titrate previously learned patient-specific dosing parameters during a passive observational period to an optimal level, thereby providing personalized dose guidance with minimal input from the user that evolves with a user.

To provide initial dose guidance, as described elsewhere in the specification, the DGA can undergo a "learning phase" wherein it ascertains user-specific dosing parameters, such as fixed mealtime doses, target glucose and insulin correction factor. Methods for the learning phase are described herein in connection with FIG. 7 herein. These parameter values can serve as initial estimators and can be further titrated to more optimal, patient-specific values as the system is used. This approach of an initial learning followed by continual parameter titration allows the system to respond to both disease progression as well as external changes in both lifestyle and medication that a user may undergo. As increasingly popular classes of insulin-based diabetes therapies can both increase endogenous insulin production as well as insulin sensitivity, a user's correction factor cannot remain a static value for the life of the system. A method for titrating a user's insulin correction factor, also known as insulin sensitivity, is herein described.

As used in many embodiments of the DGA, a user's correction factor need not be a single value, but can be a set of distinct values that are unique for a given meal type (e.g., breakfast, lunch, dinner). The correction factor can have the units of mg/dL glucose per insulin unit. A high correction factor signals that the user is highly sensitive to insulin, as a small dose can lead to large drops in glucose. Conversely a small correction factor suggests that the user is less sensitive to insulin. An efficacious mealtime insulin dose should bring postprandial glycemia back to a safe range within its pharmacodynamic window. Assuming a bolus calculator convention for dosing, for example, as described in connection with FIGS. 8A-8H, an accurate correction factor should contribute to an insulin dose that can both account for meal carbohydrates as well as elevated preprandial (pre-meal) glucose, thereby returning glucose levels to a safe, steady target value. Therefore, if the GPA plots all insulin doses for a specific meal as the ordinate against a particular metric that quantifies glucose readings for a time period associated with the meal (e.g., a metric that quantifies the glucose data or excursion associated with the meal such as a set amount of time following the dose (e.g., 4 hours), or a percentile of glucose values during the meal time period (e.g., $5^{th}$ percentile, $10^{th}$ percentile), then in theory, the best fit of these data is a line with zero slope and a y-intercept equal to the user's target glucose. In effect, all mealtime insulin doses will return a user's glycemia to a target value or range.

An insulin vs. post-meal glucose relationship with zero slope represents the ideal scenario for dosing efficacy. It can be assumed that the DGA will have previously learned a user's fixed dose, for example by user input or by transmission from the MDD 152. At doses greater than the fixed dose, the system can then observe the relationship between insulin dose and post-meal glucose from the SCD 102 or other source. The DGA can use one or more of several methods to assess dose efficacy, including, but not limited to the following:

Determining the Centroid (Median/Mean) of Post-Meal Glucose Values.

This method uses the difference between the centroid of post-meal glucose values for insulin doses not including any corrections and the centroid of post-meal glucose values for insulin doses including corrections. An ideal scenario would have zero or no significant difference between the two centroids. A positive difference exceeding a predetermined threshold would be indicative of a correction factor that is less than optimal. Similarly, a negative difference less than a predetermined threshold would be indicative of a correction factor that is higher than optimal.

Applying a Linear Fit to the Data.

Provided that the fit meets some goodness of fit metrics, the DGA can run a statistical test to determine if a statistically significant difference exists between the slope of the best fit and the ideal case, where slope is zero. If the slope is less than zero, then too much insulin is being dosed. This corresponds to a correction factor that is too low and needs to be increased. If the slope is greater than zero, then post-meal glucose is elevated, indicating that the insulin dose could be increased. This corresponds to a correction factor that is too high and needs to be decreased. The amount by which these values should be titrated may depend on the fit slope. A steep slope may require more aggressive titration than one that is closer to zero. This method of titration is independent of fixed dose titration and could be performed in parallel to a fixed dose titration.

Determining the Area Under the Post-Meal Glucose/Insulin Curve.

An ideal dosing scenario would have constant area, representing a return to a constant glucose level after all doses. Thus, the DGA can evaluate any changes within the area as indicative of an incorrect correction factor. An integral method could also be used to determine if mealtime dose components corresponding to the fixed meal amount are effective or need further titration. Elevated integral levels relative to an ideal scenario would be indicative of a fixed dose that could be increased to bring post-meal values closer to the target level.

During the learning phase for a defined period, e.g., up to 14 days depending on characteristics of the SCD or other factors, the DGA can learn user dosing strategy and other user-specific parameters which include but are not limited to dose amounts, correction factor, and insulin-action-time (IAT)/insulin-on-board (JOB). It may be desirable to titrate the correction factor for any one or more one of the following reasons: (1) inadequate correction factor, (2) changes due to therapy interventions or environmental changes. For bolus doses including corrections only (no carbohydrate counting), the DGA can analyze post-meal glucose values to titrate the correction factor. For example, if the post-meal glucose peak is greater than 180 mg/dL or the difference between post-meal peak and pre-meal value is more than a threshold, and there is no post-prandial hypoglycemia risk, the correction factor can be titrated per measurement cycle. For example, the correction factor can be titrated in a preset value, e.g., 1 unit increments, alternatively 2 unit increments. For isolated correction doses (e.g., no meal), which are dosed to treat hyperglycemia when the glucose level is high, difference between the value at the time of dose and glucose value at a predetermined time (e.g., four (4) hours post-dose) can be used to titrate the correction factor.

A meal time insulin dose can consist of two different amounts: a) a portion that is intended to cover the meal that will be consumed, and b) a portion that is intended to address when the pre-meal glucose level is above the target range. The portion associated with the meal is typically fixed (for instance, such that the portion taken for breakfast is always a particular amount, which could be titrated over time) or variable to match the number of carbs the patient is expecting to eat. In the following examples, a fixed meal portion is assumed. The following description, however, can apply to a variable portion where the actual portion is determined by a fixed carb-to-insulin ratio, which can itself be titrated. As used herein, the portion to address pre-meal glucose refers to the correction-dose or correction portion, determined by a pre-meal correction factor.

The pre-meal correction factor can be used in control of the MDD 152. Decreasing or down-titrating a correction factor is comparable to increasing a correction dose as noted herein. For example, FIG. 10A shows a method 500 by a DGA for providing a pre-meal correction factor in response to analyte data, for use in the control of the MDD 152. At 502, the method 500 can include determining, by at least one processor, an analyte pattern type for at least one TOD period by executing a GPA algorithm that receives as input time-correlated analyte data originating from a sensor control device worn by a patient over an analysis period. At 504, the method 500 can include determining, by the at least one processor executing an algorithm, a pre-meal correction factor based on the analyte pattern type and a defined dosing strategy of the patient for the analysis period. At 506, the method 500 can include storing, by the at least one processor, an indicator of the pre-meal correction factor in a computer memory for output to at least one of a user or a medication dosing device. In contrast to the linear fit embodiments described above, the embodiments described here are a unified approach where the fixed dose and correction factor titration can be performed concurrently through one technique or software function (e.g., a single logic tree).

In a related aspect, FIG. 8B and associated description above disclose a method 410 for GPA that categorizes a patient's glucose patterns for various TOD periods as high, low, or high/low. FIG. 8A and associated description disclose how the DGA can use output from the GPA 410 to provide an MDI dose guidance recommendation. FIGS. 8D-8H and associated descriptions provide examples of algorithms for a DGA to provide specific MDI dose guidance recommendations based on a glucose pattern type output by the GPA 410 and a defined dosing strategy of the patient for an analysis period. The recommendations may be provided for automatic or semi-automatic control of an MDD 152, or for the operation of a user interface for guiding manual dose control.

FIG. 10B shows a method 510 for assessing a recommendation for titrating a meal dose and premeal correction to increase high analyte levels, e.g., if the GPA indicates a low pattern, with or without a pre-meal correction. In a related aspect, FIG. 8G shows an example of an algorithm 474 for developing recommendations for post-prandial corrections. When executed by the DGA, the algorithm 474 calls for consideration of whether to implement a pre-meal correction if the GPA indicates a low pattern when analyte data excluding data for TOD periods with a missed bolus dosage are considered. Other low glucose pattern conditions 512 for a TOD period can also be appropriate to trigger execution of the method 510. If the meal dose and pre-meal correction are both higher than optimal, the method 510 can output a pre-meal correction factor that can only decrease the meal dose. If there is a low pattern, it could be due to a high fixed dose, a high premeal correction, or both. In one embodiment, the fixed dose and premeal correction could be titrated sequentially, where the fixed dose is titrated first as that is the base of the dose amount. Once the fixed dose is well-titrated, if a low pattern is still observed, then the correction dose can be titrated. In another embodiment, the fixed dose and premeal correction could be titrated in parallel.

If a low pattern is detected in a TOD period, then the DGA may determine, at 514, whether meal doses of the defined dosing strategy include pre-meal corrections. If so, at 534, the DGA can exclude days with missed boluses from the original data set or pre-meal correction, for example by including a portion of the analyte data only for days with meal doses and no missing boluses. At 536, the DGA can test whether sufficient data remains after exclusion of data for days with missed boluses or pre-meal correction to achieve a minimum confidence level. If sufficient data exists, at 410, the DGA can repeat the GPA 410 over an input analyte data set that excludes the data for days with missed boluses or pre-meal corrections.

At 538, the DGA may determine whether the subsequent glucose pattern is still low, and if so, at 540 reduce the meal portion of the insulin dose only. Otherwise, at 542, if the pattern is not low, the DGA may reduce the pre-meal correction factor, which, when implemented by a user or the MDD, can result in reducing a corresponding pre-meal correction dose.

If, at 536, the DGA determines there are insufficient data to determine a pattern, then at 516, the DGA may include data for days with meal dose and pre-meal corrections. Then, the DGA can, at 518, re-test for sufficiency of the data set. If the data is sufficient, at 410, the DGA can repeat the GPA for the enlarged data set. At 540, if the resulting glucose pattern is not low, the DGA can reduce a recommendation for the meal portion of each dose for the relevant TOD period without reducing the pre-meal correction factor. If the DGA determines, at 520, that the glucose pattern is low, then at 526, the DGA can include data for meal doses only. Then, the DGA can, at 530, re-test for sufficiency of the data set. If the data set is not sufficient, at 528, the DGA can reduce both the meal and correction doses. If the data set is sufficient, the DGA can run the GPA at 410 and determine if the glucose pattern is low at 532. If the glucose pattern is low, then the DGA can reduce a recommendation for the meal portion of each dose for the relevant TOD period without reducing the pre-meal correction factor at 540. If the glucose pattern is not low, at 542, the GPA can reduce the pre-meal correction factor, which, when implemented by a user or the MDD, can result in reducing a corresponding pre-meal correction dose.

FIG. 10C shows a method 550 for assessing a recommendation for titrating a meal dose and premeal correction to reduce high analyte levels, e.g., if the GPA 410 indicates a high pattern, with or without a pre-meal correction. In a related aspect, FIG. 8H shows an example of an algorithm 480 for developing recommendations for post-prandial corrections. When executed by the DGA, the algorithm 480 calls for consideration of whether to implement a pre-meal correction if the GPA indicates a high pattern. Other high glucose pattern conditions 552 for a TOD period may also be appropriate to trigger execution of the method 550. If the meal dose and pre-meal correction are both less than optimal, then the method 550 can increase the meal dose first. A high glucose pattern can be addressed sequentially such that correction doses can be up-titrated after the meal-dose has been titrated (pattern not high with data without correction) to avoid hypoglycemia from both increasing the fixed dose and decreasing the correction factor, which is analogous to increasing the correction dose at a given blood glucose level. The high pattern can be first addressed by increasing the fixed dose. If a high pattern still persists, and only occurs when correction doses are included, then the correction factor can be titrated.

If a high pattern is detected in a particular TOD, at 554, the DGA can determine whether the analyte data includes meal doses with pre-meal corrections. If no pre-meal corrections are included, at 564, the DGA can then exclude data for days with pre-meal corrections and days with missed boluses from the original data set and repeat the glucose pattern analysis at 410. At 566, the DGA can determine whether the subsequent glucose pattern is still high. If not, then at 572, the DGA can increase the pre-meal correction factor, which by outputting to the UID or MDD, can cause reduction of the pre-meal correction dose. Otherwise, if the glucose pattern is high, then at 562, the DGA can increase a recommendation for the meal portion of each dose for the relevant TOD period. If, at 554, it was determined that pre-meal corrections were included, then at 556, the DGA can include data for days with meal dose and pre-meal corrections, and exclude data from days with missed bolus doses from the original data set and repeat the glucose pattern analysis at 410. At 558, the DGA can determine whether the subsequent glucose pattern is still high. If the pattern is not high, at 562, the DGA can increase a recommendation for the meal portion of each dose for the relevant TOD period. If the pattern is not high at 558, the DGA can, at 564, exclude data for days with pre-meal corrections and exclude data for days with missed boluses, and repeat the pattern analysis, at 410, and subsequent steps described above.

While FIGS. 10B-10C show aspects of various algorithms for determining a pre-meal correction factor, it should be appreciated that these are examples. Various other algorithms may also be suitable.

Dose Guidance Method for Insulin Doses Depending on Timing of Administration (at or Before Meal Start and after Meal Start)

Example embodiments of methods for determining dose guidance depending on timing of administration will now be described. To maximize glycemic control, insulin dosing should be temporally in phase with a meal such that the peak circulating insulin coincides with rises in post-meal glucose. Patients, however, sometimes forget to take their mealtime insulin before they eat. The subsequent mismatch between meal-related glucose rise and insulin action can result in uncertainty as to the appropriate dose. Taking a meal dose after a meal has started, instead of just before the start of the meal, can result in hypoglycemia because active insulin may still be circulating once the post-meal glucose rise has been depleted. Moreover, patients who correct for glucose trend may be inclined to increase their dose due to the upward glucose trend at the start of the meal. Such action could also cause hypoglycemia. To minimize timing-related hypoglycemic episodes, the DGA can be configured to determine both a dosing time delay and account for the dosing time delay when providing dose guidances. A positive time delay is indicative of the insulin dose being administered after the start of a meal. A zero time delay is indicative of the insulin dose being administered at approximately the same time as the start of the meal. A negative time delay is indicative of the insulin dose being administered prior to the start of the meal.

In many embodiments, the DGA can be configured to include a method for real-time detection of missed meal doses for the purpose of determining if the meal dose guidance calculation should be an "on-time" calculation (i.e., a zero or negative time delay) or a "late dose" calculation (i.e., a positive time delay). In some embodiments, the DGA can also be configured to determine and output an estimation of the meal start time that can be used in a late dose calculation. In some embodiments, if a mealtime insulin dose is not detected to have occurred with +X or –Y minutes from the estimated start of the meal, then DGA can be configured to issue a notification to the patient that they may have forgotten to take a dose.

Algorithm for Real-Time Detection of Missed Meal Doses

In many embodiments, the DGA can be configured to detect missed meal doses using a real-time meal detection algorithm. Systems and processes for real-time detection of missed meal doses and subsequent alerting of the patient are described herein. The process for detecting missed meal doses can be executed periodically (e.g., whenever new glucose data are available to the system). Alternatively, the process can be executed whenever it is appropriate to provide "missed dose" alerts to the patient, or whenever the alert has been enabled.

In one example embodiment, real-time meal detection can be performed by a feature extraction module and a meal detection module. The feature extraction module can receive CGM datapoints one at a time as the datapoints become available. When the feature extraction module detects that a glucose value is increasing, the feature extraction module can extract a plurality of features and can pass the plurality of features to the meal detection module for meal detection.

In one embodiment, the feature extraction module is configured to perform data smoothing each time a new glucose data point is received by fitting the data within a time window and counting backwards from the current data point using a quadratic function. The time window can be about 60 minutes. The feature extraction module can be configured to store a fitted value at a center of the time window as a current smoothed data. The feature extraction module can also be configured to store coefficients of the linear and quadratic terms of the fitted value at the center of the time window as the most recent glucose rate of change and acceleration values, respectively. In addition to being configured to store the fitted values at the center point, the feature extraction module can also be configured to store a fitted value at the most recent point for the feature extraction. The feature extraction module can be configured to compare the current smoothed glucose value with a previous smoothed glucose value (e.g., the smoothed glucose value immediately preceding the current smoothed glucose value) to determine whether the smoothed glucose data is rising or falling. The feature extraction module can be configured to extract a plurality of features and thereafter pass the plurality of features to the meal detection module after the feature extraction module determines a rise in a comparison of the current and previous smoothed glucose values.

The feature extraction module can be configured to extract a plurality of features from two segments in the smoothed data. The two segments can be a current rising segment and a previous falling segment. The plurality of features extracted from the current rising segment can include, but are not limited to, 1) the maximal acceleration, 2) the time of the maximal acceleration point, 3) the glucose value at the maximal acceleration point, 4) the height computed by the difference in the glucose values between current time point (the fitted value) and the maximal acceleration point (the reference point), 5) the duration of the current segment computed by the elapsed time from the reference point to the current point, 6) the average rising rate of the current segment computed by dividing the height by the duration, 7) the maximum increase of acceleration (the increase in the acceleration at a given time point is obtained by subtracting the acceleration of the point by that of the previous point), and 8) the incremental area under the curve (subtracting the glucose value of the reference point from the mean glucose value, and subsequently multiplying the difference by the duration of the segment). The plurality of features extracted from the previous falling segment can include, but are not limited to: 1) duration, 2) height, 3) the average falling rate (height/duration), 4) the maximum falling rate (the maximum of the absolute value of the rate of change), and 5) the maximum deceleration (the maximum of the absolute value of the acceleration). The feature extraction module can be configured to pass the plurality of extracted features to the meal dose module.

The meal detection module can be configured to receive a feature vector as input and can be configured to output a binary detection result indicating whether the current rising segment is a meal response glucose excursion or not. The meal detection module can also be configured to output a probability value with the binary detection result. In one embodiment, a pretrained machine learning model in the meal detection module can be implemented using RandomForestClassifier by scikit learn (https://scikit-learn.org/stable/modules/generated/sklearn.ensemble.RandomForestClassifier.html). The meal detection module can be configured to detect a meal start based on tree building rules and a feature threshold for each feature in each tree, which can be optimized during a training process. In one embodiment, pretrained models can also be built based on alternative classification algorithms including gradient boosting, ada boost, artificial neural network, linear discriminant analysis, and extra tree.

The meal detection model can also be configured to estimate a start time of a meal if a meal is detected. In one embodiment, the start time of the meal can be estimated as the time point at which there is a maximum increase of glucose value acceleration, tracing back from the detection point within a time window size of about 1.25 hours. For example, if a missed meal was detected by the algorithm at 1:15 pm, the model can track back to about 12:00 pm to determine a meal start. Glucose value acceleration at each point can be computed by fitting five data points centered at the data point of interest using a quadratic function, i.e. $y=ax^2+bx+c$. The fitted parameter "a" is the acceleration at the point of interest. An increase of glucose value acceleration at a time point k can be defined by $a(k+1)-a(k)$.

The meal detection model can also be configured to output a notification on UID 200 regarding a missed dose to a user if a mealtime insulin dose is not detected to have occurred within a period of time around the estimated start of the meal. In one embodiment, if the estimated meal start is less than two hours ago, the notification can also indicate that the patient can still get dose guidance for the meal and dose late.

Details of other types of meal detection methods and algorithms are described in U.S. Patent Publication No. 2017/0185748 and PCT Application Serial No. PCT/US2020/12134, which are hereby expressly incorporated by reference in their entirety.

Dose Guidance for Dose Administered at a Start of a Meal

Where the dosing time delay is negative or zero (i.e., dose guidance is for administration at or before the start of a meal), to account for the span of time where bolus insulin can take into effect prior to the presence of a meal, the DGA can be configured to consider other factors that can alter hypoglycemia and hyperglycemia risk. For example, the DGA can be configured to include a risk factor related to circadian rhythm.

Figure 11:
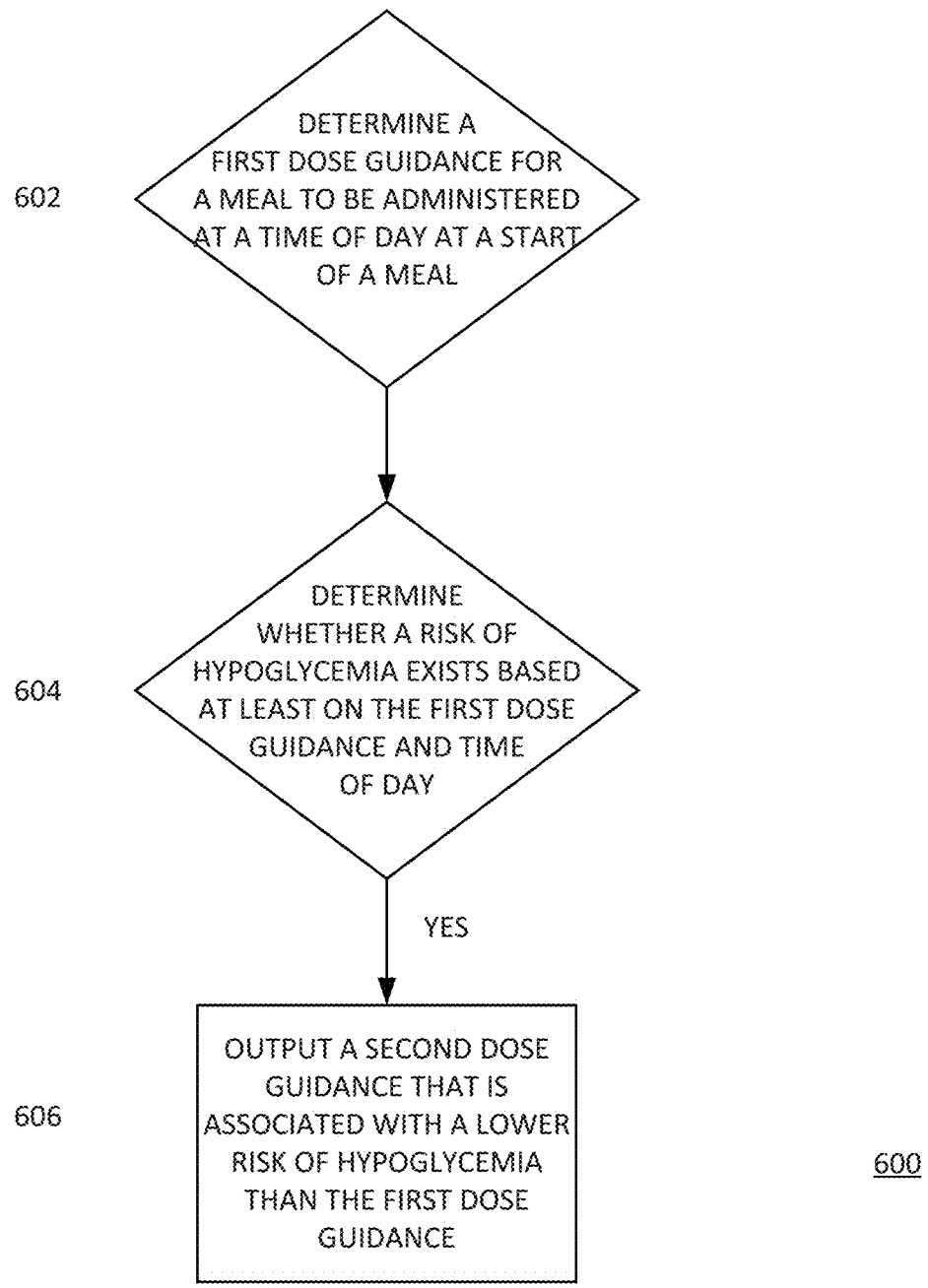
FIG. 11 is a flow diagram depicting an example embodiment of a method for determining a dose guidance for administration at or before a start of a meal.

In one example embodiment, as described in the flow diagram of FIG. 11, in exemplary method 600, the DGA can provide dose guidance for administration to a subject at a start of a meal, e.g., when the time delay is negative or zero. Beginning in step 602, the DGA can determine a first dose guidance for a meal to be administered at a time of day at a start of a meal. The first dose guidance can be a fixed meal dose (with or without a correction) or can be based on a carbohydrate content of the meal.

In step 604, the DGA can then determine whether a risk of hypoglycemia exists based at least on the first dose guidance and the time of day that the dose is to be administered. The DGA can be configured to determine the risk of hypoglycemia by referencing a risk map. In one embodiment, past user data (e.g., glucose levels and insulin dosing data), population data, or a combination of both past user data and population data, can be used to develop a risk map relative to time of day, day of the week, and/or other available patterns. In one embodiment, the DGA can be configured to use the risk map to identify the edges of the distribution closest to the highest risks, rather than to identify the typical behavior.

In step 606, the DGA can output a second dose guidance that is different than the first dose guidance. The second dose guidance can be outputted on UID 200 and include a lower drug amount than the first dose guidance. The second dose guidance can also be associated with a lower risk of hypoglycemia than the first dose guidance. For example, if a first time of day has a higher hypoglycemia risk in its near future than another (second) time of day, and a user requests dose guidance at the first time of day at or before the start of a planned meal, the DGA can be configured to output a lower dose guidance than a nominal suggested meal dose guidance (e.g., fixed meal dose (with or without a correction) or a meal dose based on carbohydrate content).

When the dose is to be administered after a start of the meal (i.e., the dosing time delay is positive), the DGA can be configured to determine the dosing time delay and output a dose guidance that accounts for the dosing time delay and any associated risks.

In one example embodiment, as described in the flow diagram of FIG. 12A, in exemplary method 607, beginning at step 608, the DGA can determine a first dose guidance for a meal in response to a query from a subject, wherein the first dose guidance is determined for administration to the subject at a start of the meal. In one embodiment, the DGA can be configured to assume that an initial optimal mealtime dose is taken at the same time as the meal start. Thus, in one embodiment, when a user opens the DGA and requests dose guidance, the algorithm can first calculate the optimal insulin dose if it was to be administered at the start of the meal. The optimal insulin dose for the meal can be determined in numerous ways, including but not limited to, a fixed meal dose (with or without a correction) or a meal dose based on carbohydrate content.

At step 610, the DGA can determine whether a time delay exists between the start of the meal and the query from the subject (i.e., the initiation of dose guidance). In one embodiment, the DGA can be configured to identify a dosing time delay through multiple methods. In one embodiment, the DGA can be configured to determine an estimated start of the meal. In one embodiment, the DGA can be configured to identify a dosing time delay using the meal detection algorithm described above that can detect an estimated start of a meal, and the DGA can be configured to record a time between the start and the user-prompted dose guidance. In another embodiment, the DGA can be configured to identify a dosing time delay between the start of the meal and the start of the bolus insulin dose, which can be recorded by the user. In this embodiment, the DGA can be configured to prompt the user for input regarding the dosing time delay. For example, the DGA can be configured to ask the user if the requested dose guidance is for a meal or if it is a correction dose to correct for high glucose. If the requested dose guidance is for a meal dose, the DGA can be configured to ask if eating has already begun and if so, for how long. This input could then be used as a meal versus dose time delay for dose guidance.

At step 612, the DGA can determine, in response to a determination of a time delay, whether a risk of hypoglycemia exists based at least on the first dose guidance and the time delay. In one embodiment, the DGA can determine whether the first dose guidance and the time delay put the patient in a high hypoglycemic risk zone or at a risk of hypoglycemia relative to the rest of the user population.

In one embodiment, the DGA can determine a risk of hypoglycemia with reference to a multi-dimensional surface map. In one embodiment, the map can be population-based. For example, the map can include observations across all DGA users until enough data can be gathered to personalize recommendations based on the particular user requesting dose guidance. In one embodiment, the DGA can be configured to receive and store a plurality of types of data related to mealtime doses for DGA users. The plurality of types of data related to mealtime doses can include, but are not limited to, dose time delay, suggested or recommended dose guidance, administered dose, and glucose time series for a predetermined time period following administration of the dose. The glucose time series can have a fixed time interval between glucose value samples (e.g., from a CGM), varying time intervals, or a combination thereof. The postprandial glucose data in the glucose time series can be used to calculate a hypoglycemic metric specific to a meal/dose episode. This hypoglycemic metric can be, but is not limited to, time below about 70 mg/dL, time below about 54 mg/dL, or a calculated risk factor like a low blood glucose index (LBGI). The hypoglycemic metric could also be normalized to the glucose concentration value at the start of the meal. The dose guidance and administered dose can be treated as variables in terms of the difference between the two, as well as individually. A multi-dimensional surface map can then be derived where the resulting hypoglycemic metric is a function of the various variables. To account for different meal sizes and circadian rhythm effects, the DGA can create a plurality of multi-dimensional surface maps, including a multi-dimensional surface map for each of breakfast, lunch, and dinner. Once a map has been created, the DGA can also determine a cutoff value for acceptable hypoglycemic risk. One of the important variables used by the system can be the meal versus dose time delay.

The DGA can be configured to output a dose guidance on UID 200 based on whether a risk of hypoglycemia is determined. In step 614, if the DGA determines that the first dose guidance and the time delay does not put the subject at risk for hypoglycemia, then the DGA can output the first dose guidance. In step 616, the DGA can output a second dose guidance in response to a determination that the risk of hypoglycemia exists, where the second dose guidance is associated with a lower risk of hypoglycemia than the first dose guidance. The second dose guidance can be outputted on UID 200. In one embodiment, if the DGA determines that there is a risk of hypoglycemia for the first dose guidance at the time delay, then the DGA can search for change in dose along a Δ dose/hypoglycemia risk isopotential of the multi-dimensional surface map that decreases the risk below the predetermined cutoff. This dose change can then be applied to the first dose guidance to give an updated dose guidance to minimize hypoglycemia. The system can continue to collect information to refine and/or update the multi-dimensional surface map as a function of the plurality of variables (e.g., dose time delay, suggested or recommended dose guidance, administered dose, and glucose time series for a predetermined time period following administration of the dose).

In another embodiment, the DGA can be configured to determine a late dose guidance that does not account for endogenous insulin production. A problem with using the traditional meal dose calculation when determining a dose guidance after a meal has started is that typically the user's glucose will increase even when the user has dosed insulin. If the user administers a meal dose after a start of a meal, and uses their current glucose value to determine the meal dose, the user may be injecting too much insulin and hypoglycemia may eventually occur. The DGA can be configured to determine dose guidance for administration after a meal has started that mitigates the problem of the user's rising glucose by considering a user's glucose value at an estimated start time of the meal to determine a correction portion of the dose guidance.

Figure 12B:
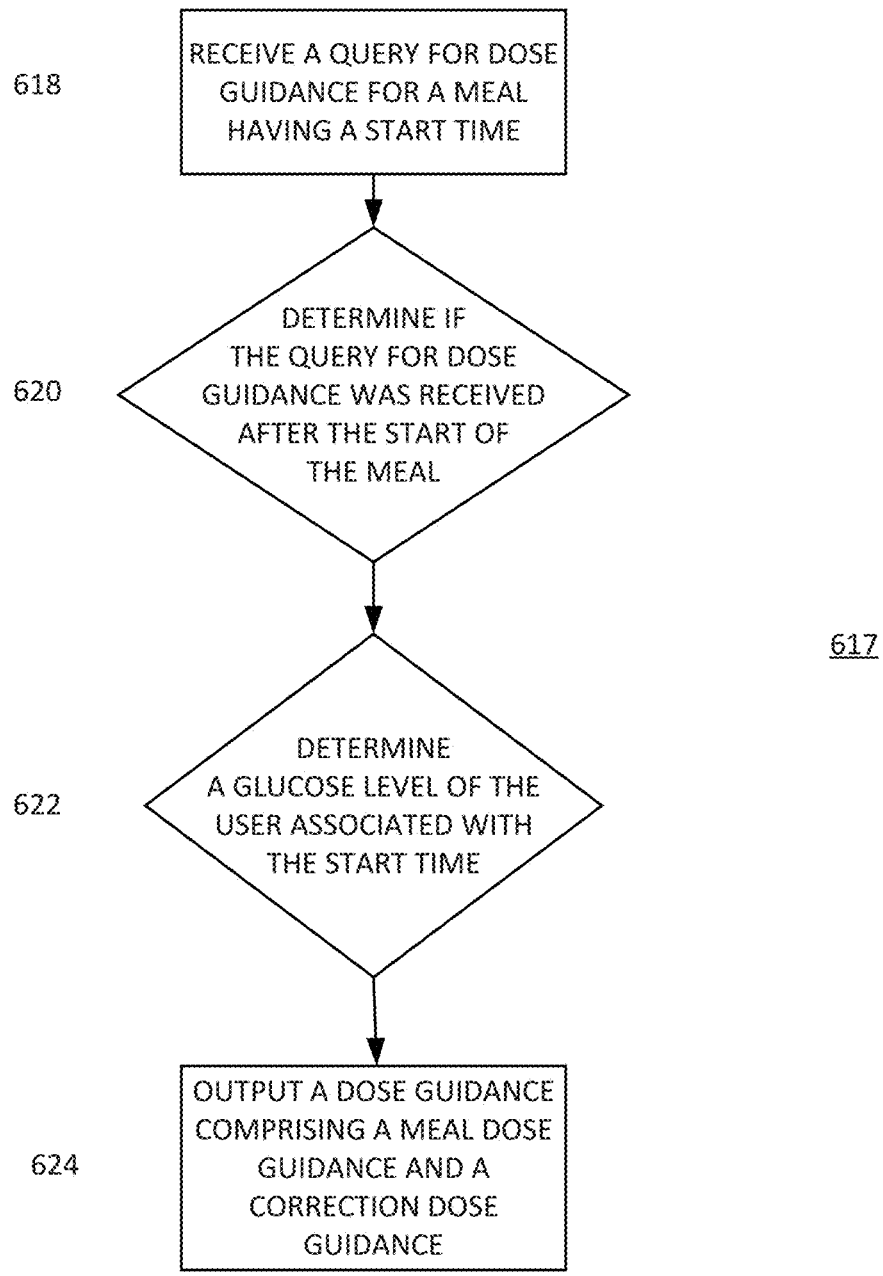
FIG. 12B is a flow diagram depicting an example embodiment of an alternative method for determining a dose guidance for administration after a start of a meal.

In one example embodiment, as depicted in the flow diagram of FIG. 12B, in exemplary method 617, beginning with step 618, the DGA can receive a query for dose guidance for a meal having a start time. In step 620, the DGA can determine if the query for dose guidance was received after the start of the meal. In one embodiment, in response to the query for dose guidance from a user, the DGA can determine whether the dose is late or not, using the late dose detection algorithm described above. In one embodiment, the late dose detection algorithm can determine and output an estimated start time of the meal, which the DGA can compare to a time when the query from the user was received.

In step 622, the DGA can determine a glucose level of the user associated with the start time of the meal. In one embodiment, the DGA can determine a glucose value associated with the meal start time (e.g., the nearest glucose value in time to the meal start time).

In step 624, the DGA can output a late dose guidance, where the late dose guidance comprises a meal dose guidance and a correction dose guidance. In one embodiment, the correction dose guidance can be based on the determined glucose level at the start time of the meal. The correction dose guidance can be determined using a bolus calculator for correcting high glucose and can include a glucose correction portion. As previously described with respect to equation (1), the glucose correction portion of the correction dose guidance can be determined based on the following formula, where (BG(t)) is the current glucose value and $BG_{target}$ is the target glucose.

$$\text{Glucose Correction Portion} = \frac{BG(t) - BG_{target}}{CF} \qquad (6)$$

In one embodiment, for the determination of a glucose correction portion for late dose guidance, the current glucose value is the glucose value associated with the estimated meal start time. In one embodiment, the correction factor may be the user's insulin sensitivity factor. In one embodiment, the late dose guidance is the meal dose guidance plus the correction dose guidance. The meal dose guidance can be determined in numerous ways. In one embodiment, the meal dose guidance can be determined based on an estimated carbohydrate content of the meal. In another embodiment, the meal dose guidance may be based on a "fixed" or "fixed+correction" dose strategy, where the user takes a pre-determined amount of insulin for the meal dose regardless of the carbohydrate content of the meal.

In another embodiment, the DGA can be configured to determine late dosing that accounts for endogenous insulin production. The problem with using traditional meal dose calculation when dosing after a meal has started is that Type 2 diabetics often still produce their own (endogenous) insulin. Thus, if the user doses late after a meal has started, then the user may have additional "insulin on board" that the user's own pancreas produced, and not accounting for this in the dose calculation may result in eventual hypoglycemia. The DGA can be configured to determine a dose guidance that accounts for production of additional endogenous insulin.

Figure 12C:
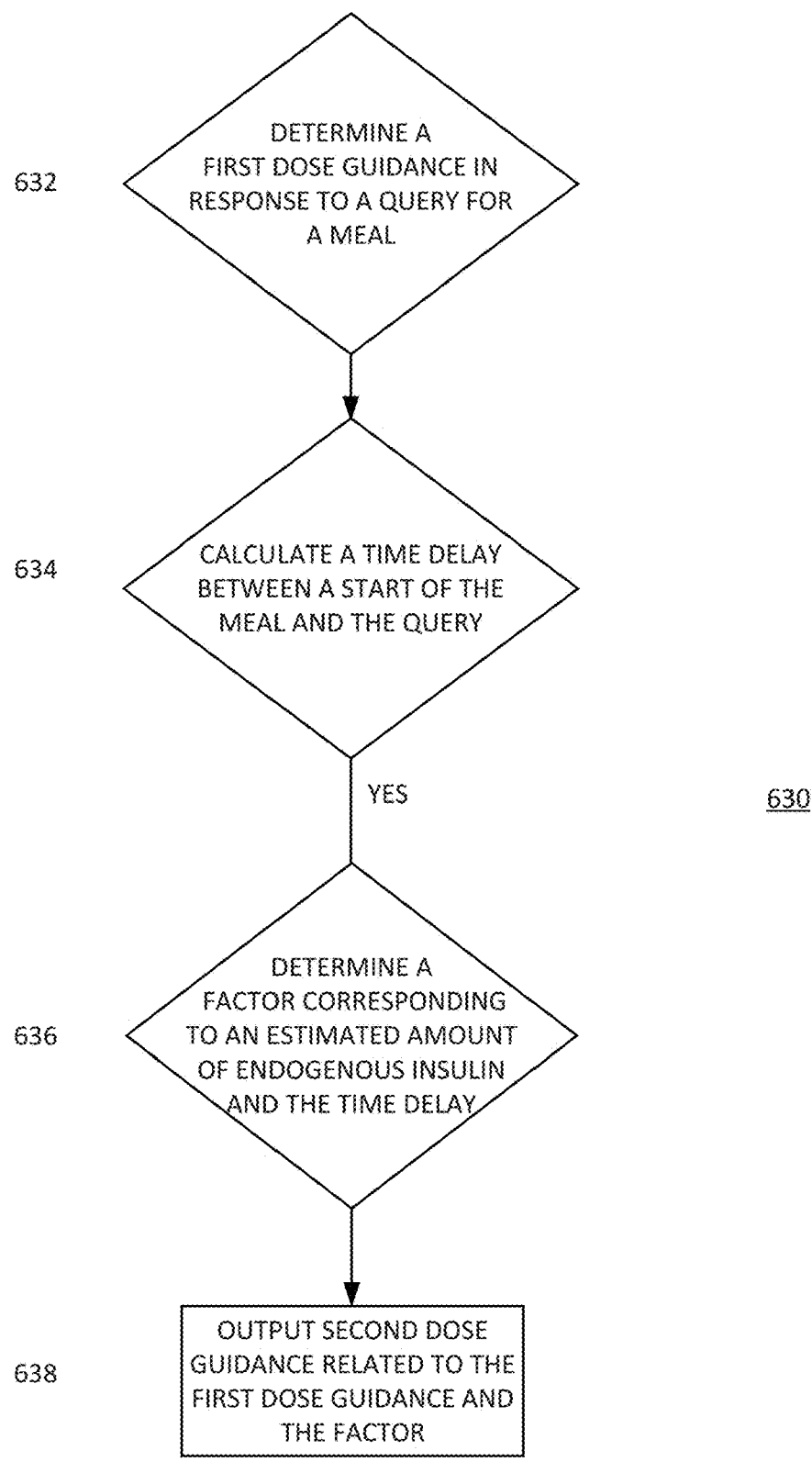
FIG. 12C is a flow diagram depicting an example embodiment of another alternative method for determining a dose guidance for administration after a start of a meal.

In one example embodiment, as described in the flow diagram of FIG. 12C, in exemplary method 630, beginning with step 632, the DGA can determine a first dose guidance for a meal in response to a query from a subject. In one embodiment, the first dose guidance is determined for administration to the subject at a start of the meal. In other embodiments, the first dose guidance can be a fixed meal dose (with or without correction) or a meal dose that was determined based at least on a carbohydrate content of the meal.

In step 634, the DGA can calculate a time delay between a start of the meal and the query from the subject. In one embodiment, the time delay can be calculated using the late dose detection algorithm described above. In one embodiment, the late dose detection algorithm can estimate a start time for a detected meal and can calculate a time delay by comparing the time that the query for dose guidance from the user was received by the DGA and the estimated start time. The estimated start time can be determined by the DGA as described with respect to other embodiments.

In step 636, the DGA can determine a factor corresponding to an estimated amount of endogenous insulin and an amount of the time delay in response to a determination that the time delay is greater than zero (>0). In one embodiment, the factor can be a fraction. In one embodiment, the factor can be determined by the amount of time between the query and the estimated meal start time, e.g., from a universal lookup table with a fractional value decreasing as the time delay from the start of the meal increases.

In step 638, the DGA can output a second dose guidance, where the second dose guidance is related to the first dose guidance and the factor. The second dose guidance can be outputted on the UID 200. The second dose guidance can be calculated by multiplying the first dose guidance with the factor determined at step 636, which can be a fraction. According to some embodiments, for example, the value of unity less the fraction can account for endogenous insulin production up to the time of injection. In one embodiment, the fraction can be based upon simulated Type 2 metabolic response to a meal. While it may not be known for each subject, this value summed with the fractional late dose amount could supply a dose that accounts for endogenous production to supply a modified dose that keeps a user's post-prandial glycemia within a safe range.

Dose Guidance for Compounded Meals (e.g., Dessert)

In some circumstances, patients will dose mealtime insulin in the amount to cover a planned meal, but later decide to eat additional food, often in the form of "seconds" or dessert. A common strategy is to dose again for the new amount, regardless of the glucose level and trend, which is often done in practice. There may be situations, however, where this is not the correct course of action. For example, the patient may not have eaten enough originally to cover the original dose, so the new dose may be too large, which could potentially lead to a hypoglycemic episode. Conversely, if the patient takes a conservative approach and does not dose any extra insulin to cover the extra food, a hyperglycemic episode could occur. In one embodiment, the DGA can provide dose guidance for compounded meals by (1) confirming that a user is continuing to extend the original meal with more food, (2) informing the user of any risk of hypoglycemia before an extra dose is administered, and (3) monitoring such risk post-prandially.

Figure 13:
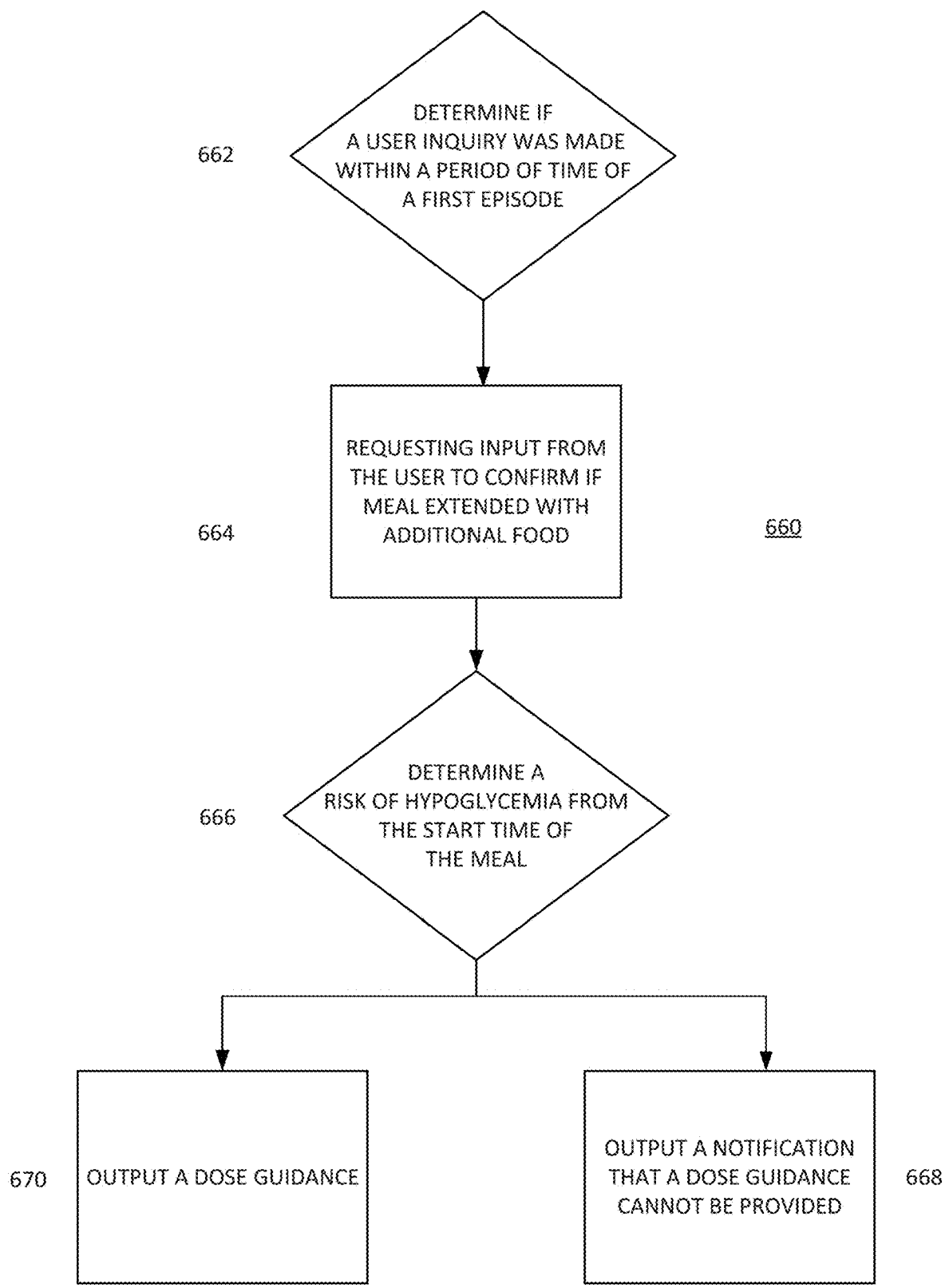
FIG. 13 is a flow diagram depicting an example embodiment of a method for determining a dose guidance for administration for a compound meal.

The DGA can be configured to output an initial query to the user on the UID 200 to confirm that a meal is being extended with extra food. It is assumed that if a user wishes to receive dose guidance that they will first open the dose guidance app. In one example embodiment, as described in the flow diagram described in FIG. 13, in exemplary method 660, beginning at step 662, the DGA can be configured to determine if a user inquiry for a dose guidance was made within a period of time of a first episode, where the first episode comprises a meal having a start time. The start of the period of time can be the determined start time of the meal from the real time meal detection algorithm and the length of the period of time can also be determined by the real time meal detection algorithm. The start time of the meal can be can be determined in several ways, including, but not limited to, the last time either a meal was detected (e.g., by the real time meal detection algorithm), or the last time dose guidance and/or an insulin dose was provided in conjunction with meal detection.

As seen in step 664, if a user queries the DGA for dose guidance within the period of time, then the DGA can request input from the user to confirm whether a meal has been extended with additional food. The DGA can output a prompt or other indication on UID 200 that requests the user feedback. In one embodiment, the DGA can also request input from the user to confirm if the purpose of the dose guidance was to correct for high glucose. In another embodiment, the DGA can prompt the user for an explanation as to the recent dose guidance request and can optionally provide selectable options as answers. The options can include, for example, an option that the additional request was made in response to an extended meal and an option that the additional request was made to correct for high glucose not associated with additional food intake.

As seen in step 666, the DGA can determine a risk of hypoglycemia from the start time of the meal. In one embodiment, to avoid hypoglycemic episodes due to insulin dose stacking, the DGA can be configured to determine the risk of hypoglycemia by determining a point where the user is at in a current glycemic excursion before the meal is extended with the additional food. The DGA can be further configured to create, from the determined point in the current excursion, a forward projection of glucose levels to determine if the user's glucose levels are still rising or on decline. As a safety measure to avoid insulin stacking, the DGA can be configured not to supply a dose guidance until glucose levels have reached a local post-prandial maximum. For example, if a dose guidance for a compound meal is requested while the user's glucose is still rising, then the DGA can output a notification that guidance cannot be made at this time for safety reasons. In one embodiment, if a risk of hypoglycemia is determined, at step 668, the DGA can be configured to notify the user to either not administer any doses or to take extreme caution in dosing. In another embodiment, if there is no hypoglycemia risk, at step 670, the DGA can be configured to notify the user to dose according to HCP recommendations for the extra food.

Furthermore, in one embodiment, if the DGA detects that an extra dose has been delivered, the DGA can be configured to advise the user to check their glucose levels at least about two hours afterward to ensure no hypoglycemia.

Dose Guidance Method for Correction Doses (Dose was Taken)

In certain circumstances, outside factors can affect insulin dose efficacy, causing a dose to have more of a glucose-lowering effect than anticipated. In these cases, users may conservatively estimate their insulin doses to avoid hypoglycemia. Individuals may also dose conservatively if they are unsure how much insulin is sufficient for a particular meal type or size. For example, a meal type may be higher in fat and/or protein, as compared to meals normally consumed by the user. To allow for conservative dosing, the DGA can be configured to provide the user with dose guidance after a meal and the concomitant initial meal insulin dose. In one embodiment, the DGA can be configured to perform at least four functions following the initial meal dose guidance and administration. The DGA can be configured to confirm that a user has administered less than the dose amount indicated in the initial meal dose guidance. The DGA can then be configured to determine a risk of hypoglycemia before an additional dose is suggested, and inform the user of the risk. The DGA can be further configured to provide an additional dose guidance, and monitor for subsequent hypoglycemia risk in a period of time after injection of the additional dose guidance.

Figure 14:
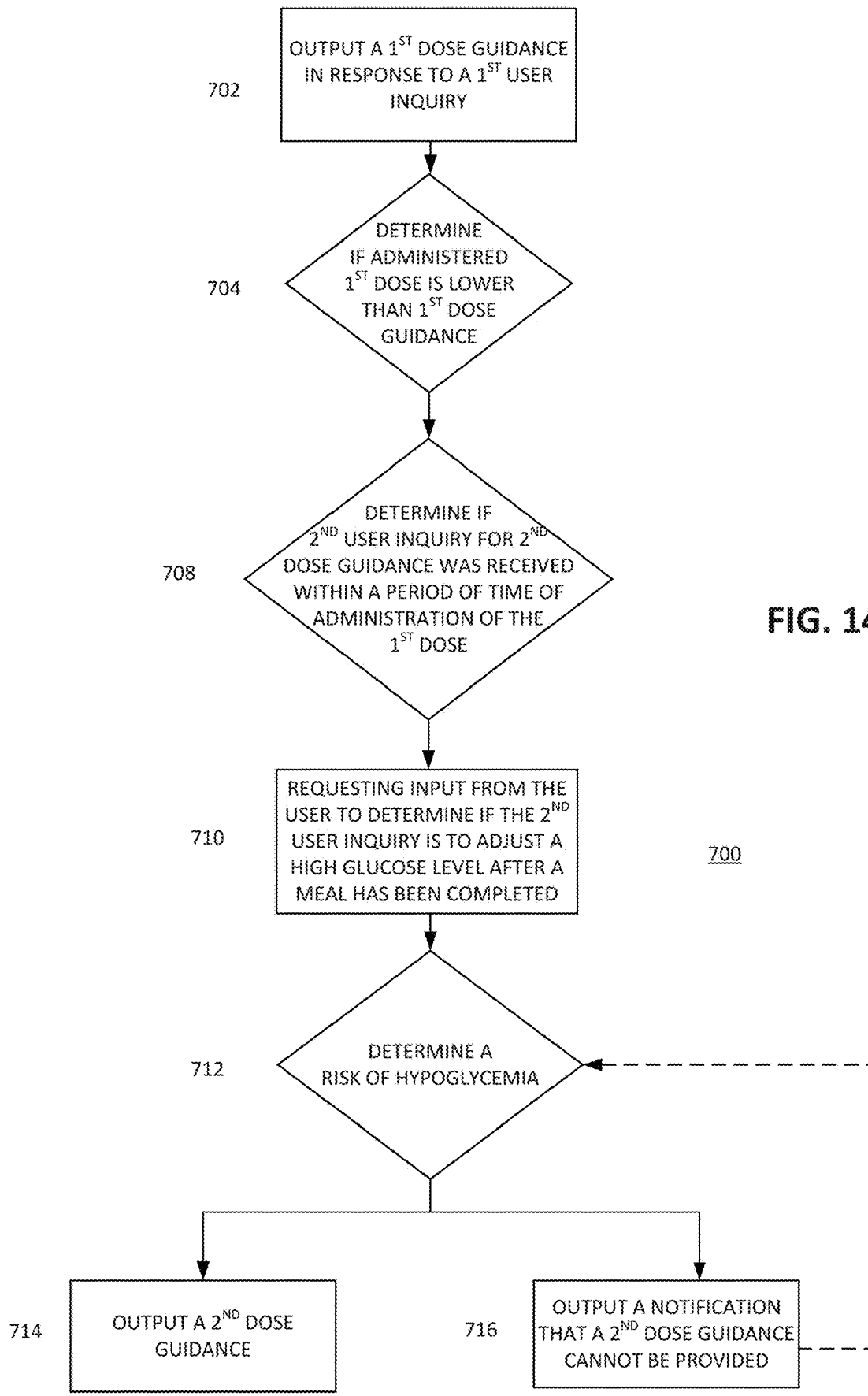
FIG. 14 is a flow diagram depicting an example embodiment of a method for determining a dose guidance for administration of a correction dose.

In one example embodiment, at or near a start of a meal, a user will query the DGA for a recommended dose amount. As described in FIG. 14, in exemplary method 700, beginning with step 702, the DGA can output a first dose guidance in response to a first user inquiry. The first dose guidance can be outputted on UID 200. In one embodiment, the first dose guidance can be calculated to be administered at a start of a meal. The first dose guidance can also be a fixed dose (with or without correction) meal guidance. The first dose guidance can also be determined based on a carbohydrate content of the meal.

The user, however, can choose whether to follow the recommended dose guidance or not when administering their insulin. If the administered dose is different from the recommended dose, then the system will record that difference. As step 704, the DGA can determine if the administered first dose is different than the first dose guidance. The administered first dose can be lower or higher than the first dose guidance. In one embodiment, the administered first dose is lower than the first dose guidance. The DGA can be configured to record when an administered dose is less than a recommended dose guidance.

At step 708, the DGA can determine if a second user inquiry for a second dose guidance was received within a period of time of administration of the first dose. The period of time can be determined by the real-time meal detection algorithm, or can be a predetermined time, from the administration of the first dose.

At step 710, the DGA can request input from the user to determine if the second user inquiry is to adjust a high glucose level after a meal has been completed if it is determined that the second user inquiry was received within the period of time. The DGA can output a prompt or other notification on UID 200 that requests the user feedback. For example, if the DGA is subsequently queried for a further dose recommendation following a conservative dose (e.g., less than the recommended dose was administered) within a certain amount of time since the first meal dose, the DGA can use both the query time as well as the record of the dosing mismatch to prompt the user as to the reason for the second dose guidance. In one embodiment, the DGA can be configured to request input to determine if the later requested dose is to cover additional mealtime food or to account for high post-meal glucose. If user has requested a second dose guidance to cover additional mealtime food, then the DGA can follow the flow described in the "Dose Guidance for Compounded Meals" section elsewhere in the specification.

If the user has requested a second dose guidance to correct a high post-meal glucose, as seen in step 712, the DGA can determine a risk of hypoglycemia by at least determining if glycemia in the user is increasing. In one embodiment, to avoid hypoglycemic episodes due to insulin dose stacking, the DGA can be configured to determine the risk of hypoglycemia by determining a point where the user is in a current glycemic excursion. The DGA can be further configured to create, from the determined point of the current excursion, a forward projection of glucose levels to determine if the user's glucose levels are still rising or on the decline. In one embodiment, as a safety measure to avoid insulin stacking, the DGA can be configured not to supply dose guidance until glucose levels have reached a local post-prandial maximum. If a corrective dose recommendation is requested while the user's glucose is still rising, the DGA can be configured to supply a notification that guidance cannot be made at this time for safety reasons. In one embodiment, the DGA can be configured to provide additional reasons for not providing a dose guidance. For example, the DGA can be configured to provide a latest estimate of insulin on board that can be determined from a combination of aggregate population-based parameters and user-specific parameters, if available.

In one embodiment, once a DGA determines that the user's glycemia is decreasing, the DGA can be configured to calculate a risk of future hypoglycemia in the absence of a correcting "touch up" dose. In one embodiment, the DGA can be configured to calculate a risk of hypoglycemia by calculating a forward projection of current glucose levels to examine for possible hypoglycemic episodes. In another embodiment, the DGA can be configured to analyze historical events to observe how often a given dose induced post-prandial hypoglycemia for a given pre-prandial glucose range. In one embodiment, at step 716, if the DGA determines that a current hypoglycemic risk is above a predefined threshold, the DGA can be configured to output a recommendation on the UID 200 that no further insulin be taken at this time.

At step 714, if the DGA determines that the user has no current hypoglycemia risk, the DGA can be configured to calculate and output dose guidance as though the later dose is a post-meal correction. Thus, in one embodiment, the later dose can be determined without accounting for new carbohydrate intake because the meal is already finished. As discussed with respect to equation (2), the DGA can be configured to calculate the second dose (correction dose guidance) as a function of a glucose correction portion less the residual insulin on board (IOB) from the initial mealtime dose.

$$\text{Correction Dose Guidance} = \left(\frac{BG(t) - BG_{target}}{CF}\right) - IOB \tag{7}$$

-continued wherein $\frac{BG(t) - BG_{target}}{CF}$ is the glucose correction portion.

In one embodiment, the DGA can be configured to calculate the glucose correction portion of the correction dose guidance as the difference between current glucose (BG(t)) and target glucose ($BG_{target}$) divided by a correction factor. The correction factor can be the user's insulin sensitivity factor (ISF), a metric that serves as a measure of how well a single unit of insulin lowers fasting blood glucose. The ISF can be personalized for each user during the algorithm learning period. In one embodiment, for an initial estimation, population-based statistics for insulin pharmacokinetics (PK) can be used to estimate JOB. Rapid acting insulin analogs generally achieve peak plasma concentration in approximately 45 minutes, with a profile that decays exponentially afterward, though this time may be shorter if a user is taking ultra-rapid insulin analogs. This time window can fall within the dormant period where the DGA cannot provide guidance due to rising glucose levels. IOB can be estimated from this profile by directly measuring the exponential decay or by estimating a linear decay from the peak insulin concentration to the pre-prandial value. The IOB value can account for the current decline in glucose levels from the initial insulin dose and can be subtracted from the glucose correction amount to minimize insulin stacking. When the extra dose is delivered, the application user interface will advise the user to scan their glucose two hours afterward to ensure no hypoglycemia.

Post-Prandial Hypo and Hyper Alarm Method for Prandial Insulin Therapy

The DGA can be configured to generate and/or output alarms, or otherwise notify the users of predicted or probable future hypo- and/or hyperglycemic episodes in advance. These alarms would allow the user take to action to keep their blood glucose value in euglycemic range, which is a main goal of diabetes management.

In contrast to threshold based alarming methods, the predictive alarm method of the DGA can be based on a predicted occurrence probability, a predicted timing, and a predicted severity of the hypo/hyper glycemic episodes. There are several advantages associated with the predictive alarm methodology. The predictive alarm methodology overcomes the problem of how to set an optimal threshold, which is one of the most common problems with threshold-based alarms. Setting the threshold too low can cause too many false alarms, while setting the threshold too high can result in failure to alarm a patient in time. Moreover, the predictive alarm methodology can provide the patient with more specific information about the upcoming glycemic episodes, including the occurrence probability, timing, and the severity. The additional specificity provided in the alarms can enable a patient to take more appropriate actions. Additionally, the predictive alarm methodology can provide the patient with personalized choices of appropriate actions.

Figure 15:
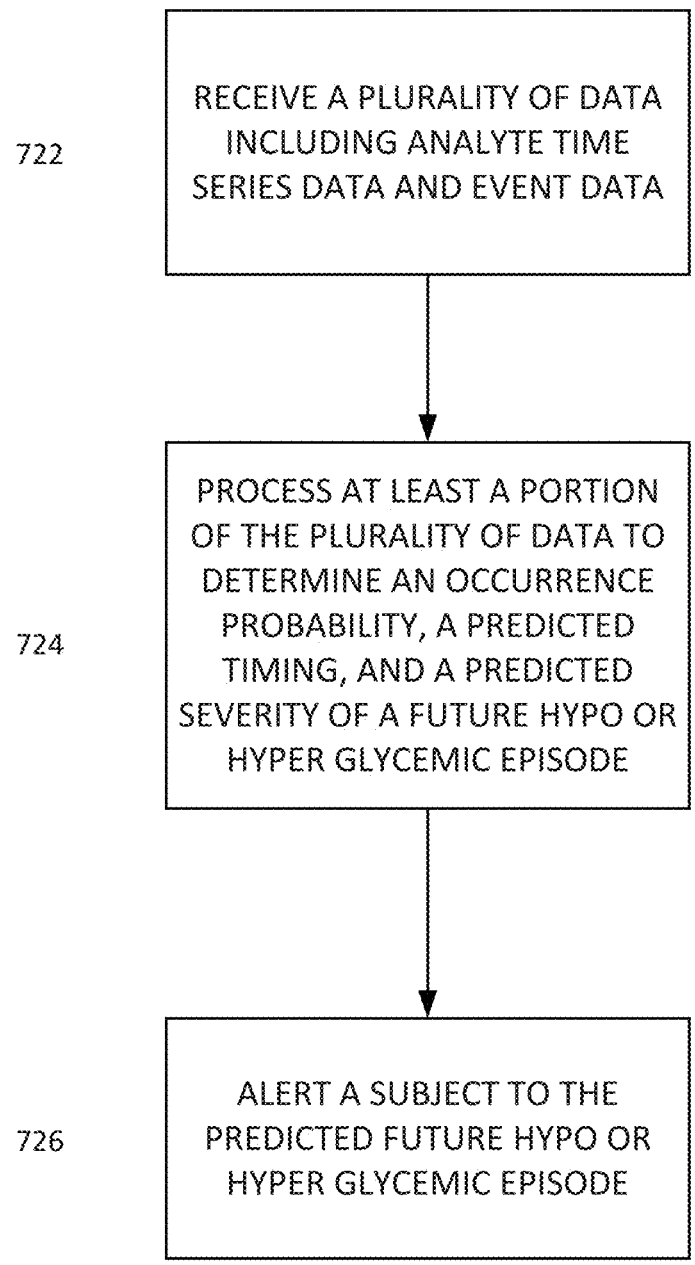
FIG. 15 is a flow diagram depicting an example embodiment of a method for alerting a subject.

In one example embodiment, as described in the flow diagram of FIG. 15, in exemplary method 720, beginning with step 722, the DGA can be configured to receive a plurality of data that includes analyte (e.g., glucose) time series data and event data. The DGA can be configured to learn specific patterns from each individual patient from their past data. The plurality of data received by the DGA can include glucose time series data and other event markers and associated time stamps. In one embodiment, higher order derivative and integration of the glucose time series data are also relevant inputs to the alarm system. Moreover, the plurality of data can also include, but is not limited to, patient location data, calendar day data, TOD data, and stress level data. Event data can include, but is not limited to, meal data, snack data, exercise data, and drug dosing data, along with the associated time stamps of each event. Drug dosing data can include bolus insulin doses and amounts, and/or basal insulin doses and amounts.

In step 724, the DGA can be configured to process at least a portion of the plurality of data to determine an occurrence probability, a predicted timing, and a predicted severity of a future hypo or hyper glycemic episode. In one embodiment, a past record of each event type can be profiled to generate a prediction of a most likely occurrence in the near future. The prediction of a future glycemic episode can be made with reference to a TOD, time of the week, or with reference to an association with other events. For example, the DGA can be configured to predict an association between an exercise event before or after a particular meal of the day in a particular day of the week.

The DGA can be configured to use a glucose value prediction algorithm to predict the future hypo or hyper glycemic episode. In one embodiment, this algorithm can be implemented using naïve Bayes classifiers. In another embodiment, this algorithm can use long short-term memory (LSTM) architecture of recurrent neural network (RNN), random forest, or a combination of various methods. In one embodiment, a machine learning model can initially be trained with the glucose time series data collected in clinical studies and real-world database to develop a population-based model. In one embodiment, the population-based model can be an initial model for each patient at the starting point, and the model can learn subject-specific patterns as the algorithm is continuously trained with the data from the patient. Thus, the performance of the DGA can improve for each subject as they use it.

In step 726, the DGA can be configured to alert a patient to the predicted future hypo- or hyperglycemic episode. In one embodiment, the DGA can be configured to output an alarm on UID 200 to notify the patient so they can act on the alert, e.g., by ingesting carbohydrates to treat a future hypo condition, or by taking insulin to treat a future hyperglycemia condition. In another embodiment, the DGA can be configured such that an alarm system is coupled with a dosing algorithm to suggest the proper amount of treatment. In one embodiment, where a future hyper episode is predicted, the DGA can be configured to output an alarm on the UID 200 that includes a recommended dose guidance. In another embodiment, the DGA can be configured to provide a display on the UID 200 that the user can access when they want to determine if a post-meal insulin dose would be recommended. For example, if a high probability of future hypoglycemia was calculated, then the DGA can be configured to output a dose guidance that indicates that no addition insulin is recommended. The DGA could also be configured to output a recommendation not related to dose guidance on the UID 200. For example, the DGA could be configured to output a recommendation to consume carbohydrates, recheck glucose levels after a short time had elapsed (e.g., 15 minutes), set a reminder to check glucose after a preset time or user configured time, and/or enable a hypoglycemia threshold alarm. In addition to outputting alarms, the DGA can also be configured to include a display detailing future hypo/hyper episode status.

In one embodiment, a particular episode prediction can be qualified by a probability of occurrence. Different levels of probability can drive different system outputs. For example, the alarm initiation may require a higher degree of probability than the post-prandial dose guidance display requested by the patient.

In another embodiment, the DGA can be configured to have an adjustable sensitivity or specificity of the prediction method. In one embodiment, different levels of sensitivity and/or specificity can allow the user or the DGA to select a level of sensitivity and/or specificity that is appropriate for the level of involvement of the user at the time. For example, when the user needs to focus on other aspects of life, a higher specificity can be chosen by the user such that the user may only be alerted to highly urgent situations. In another embodiment, a higher sensitivity can be chosen. For example, when the user decides to allocate more time to improve glucose management, a prediction system with higher sensitivity can be chosen proactively to prevent urgent situations. In one embodiment, as with the learning modules themselves, the sensitivity and specificity settings may be initially based on population data. As more user choices are recorded, a pattern recognition can attempt to associate days of the week (e.g., 7 discrete days, or weekdays vs. weekends), time of day, and potentially the density of logged activity in the user's calendar, in order to assess the most likely sensitivity and specificity settings preferences at any given time.

System Features

The DGS 100 may include system considerations that address common events that occur during the management of insulin-intensive diabetes. Current insulin bolus dose calculators do not consider these real-world events, leaving the user to modify the recommended dose according to their best judgement. While people with diabetes should be able to modify ideal dose recommendations to accommodate real world occurrences, such considerations can serve as a significant cognitive burden to people with diabetes. To reduce that burden and create an even more user-friendly dosing system, the DGS 100 leverages insulin and glucose data to adjust doses appropriately to accommodate real-world situations. These system features are further augmented by the ability for a physician to modify dosing parameters as well.

HCP Override of Dose Guidance Settings

The DGA can provide dose guidance based on individualized parameters, such as fixed dose amounts, target glucose, correction factor, and duration of insulin action. The user may be able to view these various parameters in different ways. For example, the user could view the parameters on the UID 200 through a settings tab within the DGA, or as a viewable breakdown of a dose recommendation. Although the user may view these parameters that are part of the recommended dose, these values can be strictly informational and may not be editable by the user.

In contrast, the DGA can be configured to allow the user's HCP to view these values as part of, e.g., a clinical-facing system web application and also can be configured to allow the HCP to edit one or more of these parameters. This web application can display patient performance metrics through a series of patient glucose values such as a glucose concentration profile as well as insulin dosing statistics. If the HCP wants to modify dose recommendations to accommodate changes in other treatment regimens, the clinician-facing web application can allow the HCP to edit user-specific dosing parameters, including, but not limited to those mentioned above.

Figure 16A:
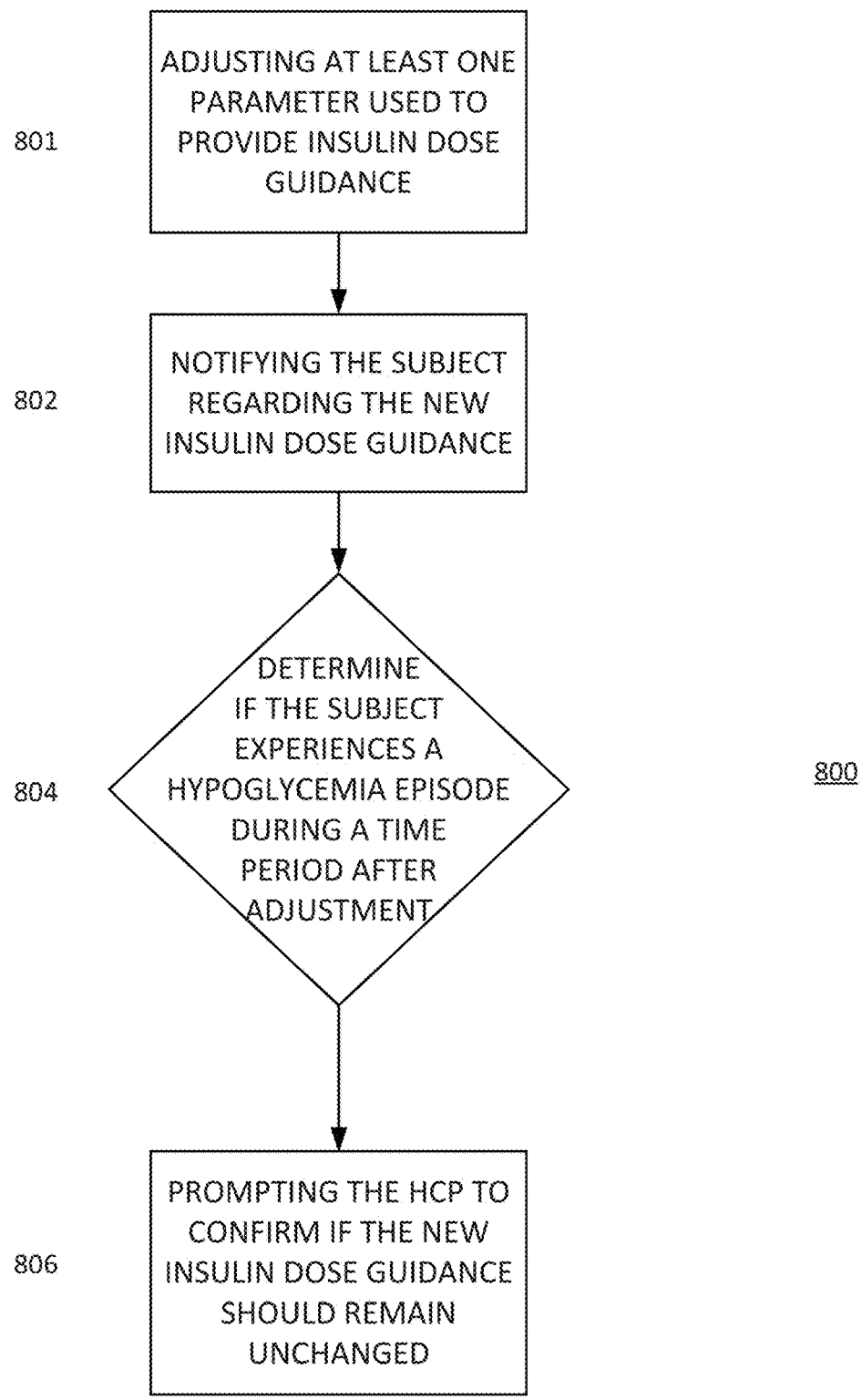
FIG. 16A is a flow diagram depicting an example embodiment of a method for overriding dose guidance settings.

In one example embodiment, as described in the flow diagram of FIG. 16A, in exemplary method 800, in step 801, an HCP can adjust at least one parameter used to provide insulin dose guidance for a subject in a dose guidance application to create a new insulin dose guidance. For example, the HCP can adjust at least one of a fixed dose amount, a target glucose, a correction factor, and a duration of insulin action. Before adjusting the at least one parameter to create a new insulin dose guidance, the HCP can view a glucose concentration profile and insulin statistics to determine if the subject is experiencing any low or high glucose patterns in any time periods of the day in order to inform them which, if any, insulin dose guidances need to be adjusted. The high or low glucose patterns can be determined by the GPA, as described elsewhere in the specification.

After an HCP alters at least one parameter, in step 802, the subject can be notified regarding the new insulin dose guidance. Moreover, an explanation for why the dose guidance was changed may also be provided to the subject. In one embodiment, one or both of the user and HCP can approve any changes in dose guidance before the changes go into effect. The parameters and dose guidance can remain fixed for a certain period of time (e.g., 14 days to coincide with the life of a sensor), though any unchanged parameters can still be allowed to vary as part of the algorithm's continual learning.

In step 804, the DGA can determine if the subject experiences any episodes of hypoglycemia for a time period, e.g., 14 days, after the at least one parameter has been adjusted. If any instances of hypoglycemia are observed during this time period, the HCP can be immediately notified to determine if the parameters should be reverted to their pre-override or pre-adjustment values. At the end of the time period, the HCP can be asked to review the subject's performance, e.g., the subject's glucose concentration profile and insulin statistics, during the time period and confirm whether the adjustments to the dosing parameters should be kept. If the HCP determines to keep the dosing parameter adjustments, those values can then serve as initial conditions from which future doses will be titrated. The history of all previous data associated with those values can be either negated or very lightly weighted in any future dose recommendation.

If an HCP only verbally notifies the user of dosing changes without updating the DGA via, e.g., the web application, there may be differences between the outputted dose guidances and administered doses. If such differences are consistently observed over an extended period of time, e.g., a three-day period, then the DGA can provide notifications to both the user and HCP to query if any change in dosing amounts occurred. If both the user and HCP confirm, then the algorithm can employ the strategies described above. Additionally, the system can prompt the user to input a reason for such persistent changes.

The DGA can also include a "10%" reduction button. If selected by the HCP in association with a specific dose recommendation, the dose recommendation will automatically be reduced by 10%, e.g., 1 U. For example, the HCP may want to decrease a patient's insulin doses as a result of a change in a dosage of a non-insulin medication. This dosage change could be known to make the patient more sensitive to insulin. Thus, the patient's current insulin regimen might be too effective in lowering glucose and cause hypoglycemia. As a precaution, the HCP could decrease insulin doses. In this example, the DGA can titrate based on the adjusted values going forward.

Onboard Glucose Sensor Fault Detection from Insulin and Glucose Data

While the glucose sensor 101 can have built-in fault detection to notify a user to remove and replace the current sensor, the DGS 100 can also be configured to provide a fault detection via insulin total daily dose.

Figure 16B:
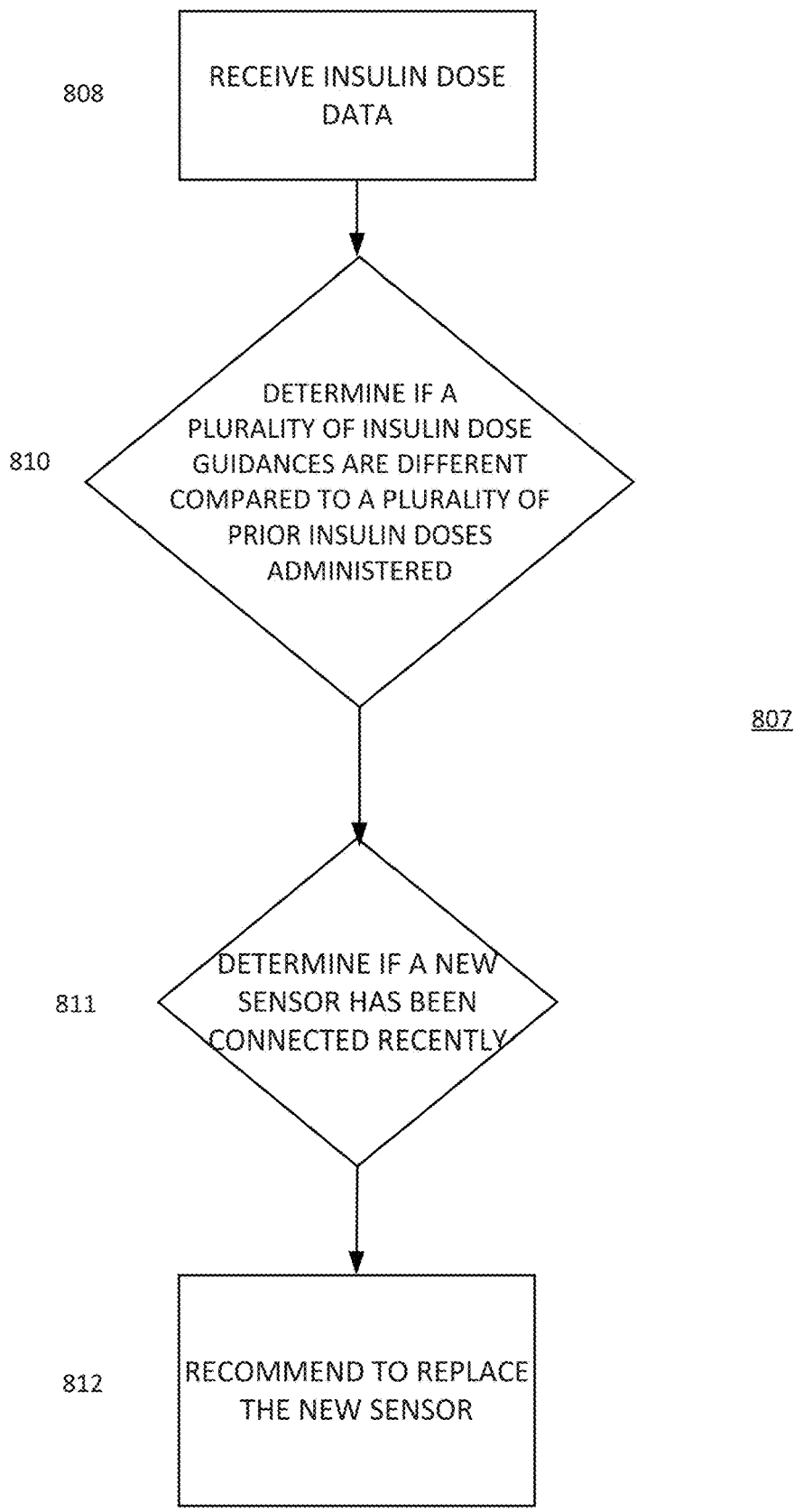
FIG. 16B is a flow diagram depicting an example embodiment of a method for sensor fault detection.

In one example embodiment, as described in the flow diagram of FIG. 16B, in exemplary method 807, beginning in step 808, insulin dose data of the subject can be received from an MDD 152.

In step 810, the DGA can determine if a plurality of recommended insulin dose amounts is different compared to a plurality of prior insulin doses administered over a period of time. Each of the plurality of insulin dose guidances and each of the plurality of prior insulin doses administered are associated with a TOD period, and each of the plurality of insulin dose guidances can be compared to one of the plurality of prior insulin doses administered that is associated with a same TOD period to determine a difference. A difference is detected if a dose guidance is different from a corresponding prior dose administered in the same time period. If a sensor 102 is reading higher glucose levels compared to past sensors, recommended doses may be similarly high due to an increased high glucose correction. Conversely, if a sensor 102 has far lower readings than past sensors, then recommended dose amounts can be suddenly lower to prevent against hypoglycemia.

In step 811, the DGA can determine if a new sensor has been connected to the SCD 102 in a time in close proximity to a beginning of the period of time in which the differences were detected. If it is determined that a new sensor was recently connected to the SCD, then in step 812, the DGA can recommend to replace the new sensor. While multiple reasons exist for high or low sensor glucose readings, if the onset of these aberrant glucose levels and dose guidances coincide with the placement of a new sensor, and persist for the time of sensor 102 wear, then a faulty sensor may be the root cause of such deviation. In this case, the DGA may notify the user to replace the glucose sensor 102.

Dosing Strategy Changes in Response to Adjunctive Therapy or New Insulin Type

Intensive therapeutic diabetes treatment for those with Type 2 diabetes is often very complicated. In addition to insulin, a diabetes patient often takes a variety of drugs that work either additively or synergistically to improve glucose homeostasis amidst progressive loss of insulin sensitivity. Changes in adjunctive therapies, such as secretagogues or incretin-based treatments, can affect both endogenous insulin production and tissue sensitivity to insulin. As a result, any alterations in adjunctive therapies can affect subsequent exogenous insulin efficacy and should be accounted for as part of any insulin dose guidance. A similar situation could occur if a user switches to different insulins (e.g., from rapid acting to ultra-rapid acting or from once daily basal to twice daily).

Changes in dosing strategies can occur when an HCP alters a patient's adjunctive therapy or insulin type. In such a case, as discussed above, the HCP can provide an adjustment in the insulin dosing parameters to minimize any hypoglycemic episodes, as described above. In some situations, however, the DGA may not be informed of any changes in adjunctive therapy or dosing recommendations. In this case, the system can monitor for trends of differences related to insulin doses over a time period.

Figure 16C:
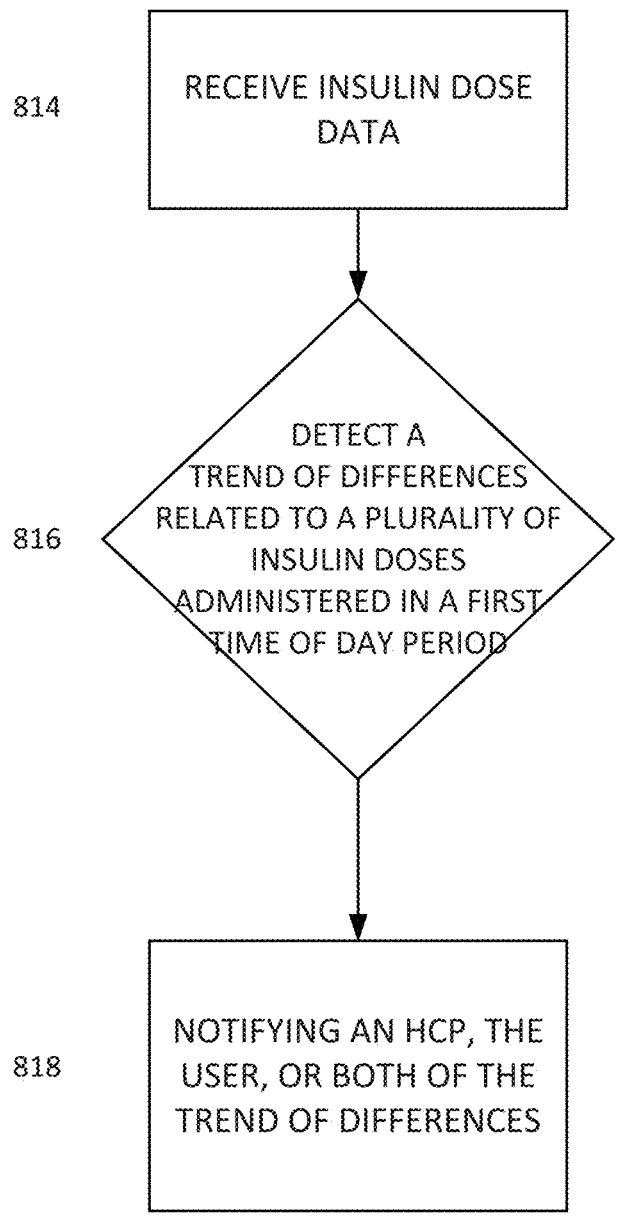
FIG. 16C is a flow diagram depicting an example embodiment of a method for detecting dosing strategy changes.

In one example embodiment, as described in the flow diagram of FIG. 16C, in exemplary method 813, beginning in step 814, insulin dose data of the subject can be received from an MDD 152.

In step 816, a trend of differences related to a plurality of insulin doses administered in a first time of day period over a time period can be detected by the DGA. The trend of differences can include, but are not limited to, differences between suggested and administered doses as well as differences in the efficacy of a given dose (in either magnitude or longevity of response) relative to previous administrations at that dose value. If any trend of differences is observed over a period of time, then in step 818, the DGA can provide a notification to the user, the HCP, or both regarding the trend of differences. The period of time can be about two days, alternatively about 3 days, alternatively about 4 days. In one embodiment, the DGA can also output a prompt on UID 200 to the HCP and/or user for confirmation of a therapeutic change to explain the trend of differences.

Where the trend of differences is that an administered dose is consistently different than the recommended dose from the DGA, the HCP may have overrode the user's dosing parameters, as discussed in the above section "HCP override of dose guidance settings." Where the trend of differences is that the recommended dose has a pronounced and consistent difference in post-prandial glucose control relative to past administrations, the insulin efficacy may have changed. This change in insulin efficacy can either be in magnitude (indicative of a change in adjunctive therapy) or in duration (indicative of a change in insulin analog).

In the case of an adjunctive drug change, once a change is confirmed by the user and HCP, the DGA can be configured to move into a conservative mode, where dose suggestions can be a fraction of previous dose guidances. The DGA can then titrate dosing parameters and amounts to optimize these new conditions. In the event of a change in insulin type (e.g., from rapid acting to ultra-rapid acting), the magnitude of response should not change as the marketed difference between the two is in the rapid onset/offset of the drug. Rather, the response duration could change. To counteract this, population-based values of the new insulin type can be used to estimate duration of insulin action until the system can determine a new individualized value for it.

User Takes a Different Dose than the Dose Guidance Recommended

While the DGA can recommend doses to users, the DGS 100 does not ensure that the user strictly follows the dose guidance. The DGA can record any differences between administered and suggested doses and detect trends in the differences. Persistent trends that are observed are discussed in the above sections "HCP override of dose guidance settings" and "Dosing strategy changes in response to adjunctive therapy or new insulin type."

Figure 16D:
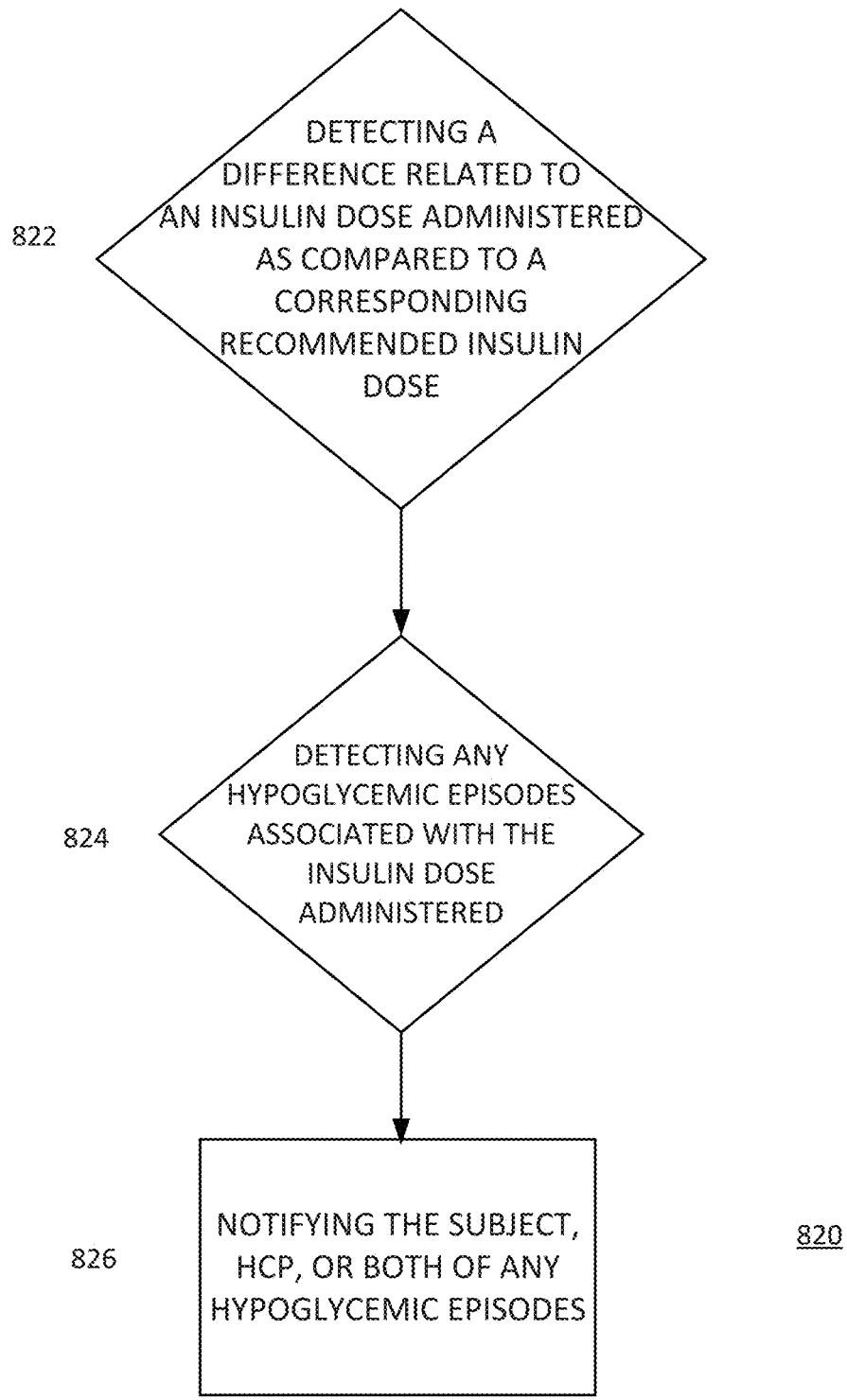
FIG. 16D is a flow diagram depicting an example embodiment of a method for detecting dosing strategy discrepancies.

In an example embodiment, as described in the flow diagram of FIG. 16D, in exemplary method 820, beginning with step 822, the DGA can detect a difference related to an insulin dose administered to a subject in a first time period as compared to a dose guidance provided for the first time period. The DGA can compare the dose guidance with the insulin dose data received from the MDD 152 to determine if a dose other than what was indicated in the dose guidance was administered to the user. The administered dose may have been a different amount of insulin taken or a different type of insulin taken, as compared to the dose guidance provided.

A special example of taking a different dose than the dose guidance is when a user takes the correct amount of the wrong insulin (e.g., injects long acting instead of rapid acting and vice versa). For any dosing scenario, the DGA can calculate an optimal dose for a given insulin analog type; that is, rapid acting for mealtime and correction doses, and long acting for basal doses. To avoid any mistakes, the DGA can output both the insulin type and amount during dose guidance on the UID 200. MDDs 152 can record and transmit both the amount and type of insulin administered. The DGA can gather information as to which insulin type is used for the injection and detect any difference. When a difference is detected, a notification can be made to the user on the UID 200. This notification can indicate that the DGA detected that a different insulin type was used and have the user confirm.

Where the user has administered an incorrect type of insulin, an insulin mismatch notification can be outputted to the UID 200 to alert the user to the possibility of a severe hypoglycemic episode even before a hypoglycemic alarm is triggered, to alert the user as soon as possible. For example, if a rapid-acting dose was taken in place of long acting dose, severe hypoglycemia may be imminent. The reasoning is three-fold: (1) as the name implies, rapid acting insulin has a more pronounced effect soon after administration than long acting, (2) once-daily long acting doses can be much larger than a single mealtime rapid acting doses, and (3) depending on the timing of the last mealtime dose, an accidental rapid acting bolus could cause insulin stacking. If a long-acting dose was taken in place of a rapid acting mealtime dose, results could be more unpredictable. Given a slower pharmacokinetic and pharmacodynamic profile relative to rapid-acting insulin, post-prandial glycemia following an accidental dosing of long acting insulin may cause the patient to be hyperglycemic soon after injection. Depending on the timing of the previous long-acting dose, a possibility of insulin stacking and subsequent hypoglycemia exists, especially as the current dose reaches its maximal blood plasma concentration approximately six (6) hours post-injection. The user can still be made aware of the possibility of severe hypoglycemia within the notification on the UID 200. In either situation, the DGA may not make any recommendations as to an insulin dose until the insulin on-board value for the injection is close to zero (e.g., approximately 5-6 hours for rapid acting and 12-24 hours for long acting). Glucose data during these periods can also be flagged by the system not to be used for further parameter refinement and dose titration.

In step 824, the DGA can detect any hypoglycemic episodes associated with the insulin dose administered in the first time period. The DGA can determine an episode of hypoglycemia when, e.g., the glucose levels drop below 70 mg/dL.

In step 826, the DGA can notify the subject and/or an HCP of the any hypoglycemic episodes associated with the insulin dose administered in the first time period that were detected. The notification can be outputted to the UID 200. When the DGA observes that the user experiences hypoglycemia from persistently taking more than the recommended insulin dose, the DGA can output a predictive hypoglycemia alert to the UID 200 to notify the user a period of time before the actual hypoglycemic event itself to mitigate associated side effects in the moment. However, if hypoglycemia occurs from persistent (e.g., defined as three separate episodes, alternatively as four separate episodes) dosing above the recommended value, a notification can be sent both to the user through the system phone application and the HCP through the clinical-facing web application alerting both of this trend.

Any difference that does not appear to be part of a broader trend can be noted by the DGA and the given dose can be incorporated into the system's continual learning of an individual's dosing patterns. As with any administered dose, post-prandial metrics can be noted. Anytime a differing dose is associated with post-prandial hypoglycemia (e.g., <70 mg/dL) or any other negative result, the dose can be flagged for both the user and HCP to help each with improved dosing approaches. This flag could take the form of a note in a glucose patterns report for the HCP or a note within a DGA insulin logbook for the user.

How System Accounts for Many Doses in Succession

In order to ensure accurate dose recording, the DGA should be able to interpret situations correctly where multiple insulin injections occur in short succession. Instances where this could occur include priming (potentially multiple times) before an actual dose, as well as multiple injections for a given dose recommendation.

Figure 16E:
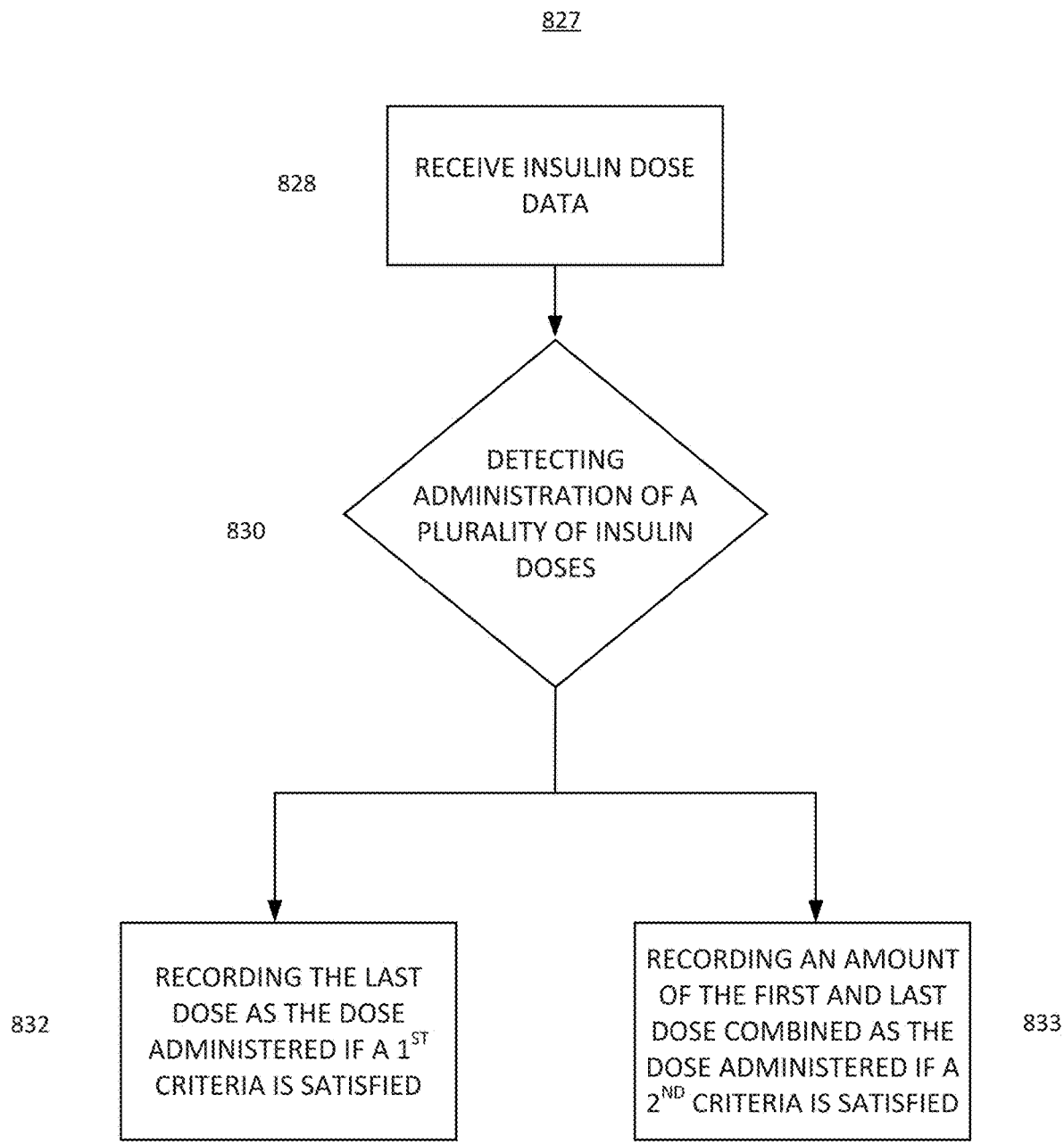
FIG. 16E is a flow diagram depicting an example embodiment of a method for managing multiple doses.

In one example embodiment, as described in the flow diagram of FIG. 16E, in exemplary method 827, beginning with step 828, insulin dose data of the subject can be received from an MDD 152.

In step 830, the DGA can detect administration of a plurality of insulin doses. The plurality of insulin doses include at least a first dose and a last dose, where the last dose is administered within a time period of the first dose. Where multiple doses are administered within a short time period, at least one of the doses administered could be a priming dose. A procedural best practice in insulin delivery is to use a new needle with every injection and to prime each new needle with insulin before dose administration. This is done by dispensing small insulin volumes, generally 2 U, into the air until insulin is visible at the needle tip, designating that the needle is full of injectate. To differentiate priming volumes, the DGA can assume that (1) priming doses are generally much smaller than actual doses, (2) priming doses are the same amount each time, and (3) little time passes between primes and doses. Alternatively, where multiple doses are administered within a short time period, the multiple doses could actually be part of a split dose due to the high volume that must be injected. For example, the user's MDD 152 could have less insulin remaining than the dose amount requested, thus requiring a cartridge change and subsequent extra injection.

In step 832, the DGA can record the last dose as a dose administered if a first criteria is satisfied. The first criteria may be satisfied if the last dose is administered within about 1 minute, alternatively within about 2 minutes, alternatively within about 3 minutes of the first dose. In such a situation, the DGA can consider that the first dose and any subsequent intermediate doses (other than the last dose) are priming doses and are therefore, not considered the actual dose administered. Thus, the DGA can be configured to record only the last dose as the dose administered. Because priming doses typically involve small volumes of insulin, in another embodiment, if the first dose is substantially smaller than the last dose, then the first condition may be satisfied. For example, if the first dose could be about a tenth, alternatively about a fifth, alternatively about a fourth, alternatively about a third of the last dose, then the first condition could be satisfied.

Alternatively, in step 833, the DGA can record an amount of the first and the last dose combined as the amount of the dose administered if a second criteria is satisfied. The second criteria may be satisfied when a single dose is delivered via multiple smaller injections made within a time period (e.g., about 4 to about 35 minutes, alternative about 5 to about 30 minutes) that is longer than the time period for priming (e.g., 1-3 minutes). For example, the user's MDD 152 may have less insulin remaining than the dose amount requested, thus requiring a cartridge change and subsequent extra injection. In this case, the DGA may not interpret these injections as distinct episodes, but rather as two actions within the same dosing episode. To do so, the DGA can employ latency in recording dosing, only finally recording an insulin dose value about 30 minutes after the first dose administration. If, for example, the DGA recommends a 10 U mealtime dose, but only 4 U remain in the insulin cartridge, there would be two separate injections: one for the initial 4 U and another for the remaining 6 U. An intermediate priming dose could occur as well if a new needle is used for the second injection. When the first 4 U dose is given, the DGS 100 can proceed to look for the remaining 6 U dose. If the 6 U dose arrives within 30 minutes of the first dose, then it can be seen by the DGA as one 10 U dose. In the instance where one or more prime doses are detected in between the actual doses, the DGA can consider all doses in between the first dose and the last dose to be primes, and therefore not included in the final dose amount. As the DGA is in communication with the MDD 152, the DGA can be configured to import the remaining insulin cartridge volume along with insulin dose information. By knowing the insulin amount remaining within a cartridge, the DGA could be configured to anticipate a split dose due to a cartridge switch and even notify the user about the insulin amount remaining.

In another embodiment, the DGA can be configured to consider a priming dose and a later dose as a split dose and add the two doses together to get a single mealtime value that includes the prime dose. If the prime dose is much less than the meal dose, the prime dose may have a negligible effect on algorithmic titration of dose guidance. In this way, it would be similar to the logic described below for split doses. While not precise, the assumption that the priming volume is much less than the injected volume may be reasonable for those with type 2 diabetes who suffer from increased insulin resistance.

Titrating with Glucose Data from Missed Doses

In order to provide optimal medication advice for a disease that is progressive in nature, the DGA can continually refine its estimates for a user's specific dosing parameters. As a result, it is necessary to identify appropriate data streams upon which to base this algorithmic learning. To avoid confounding results, the DGA can be configured to base its learning only upon insulin and glucose data that are aligned with the user's own clinically recommended dosing strategy. Such strategies include, but are not limited to, basal only, basal with one mealtime rapid-acting insulin dose, basal with two mealtime rapid-acting insulin doses, and full multiple daily injection strategy of basal with three mealtime rapid-acting doses.

Figure 16F:
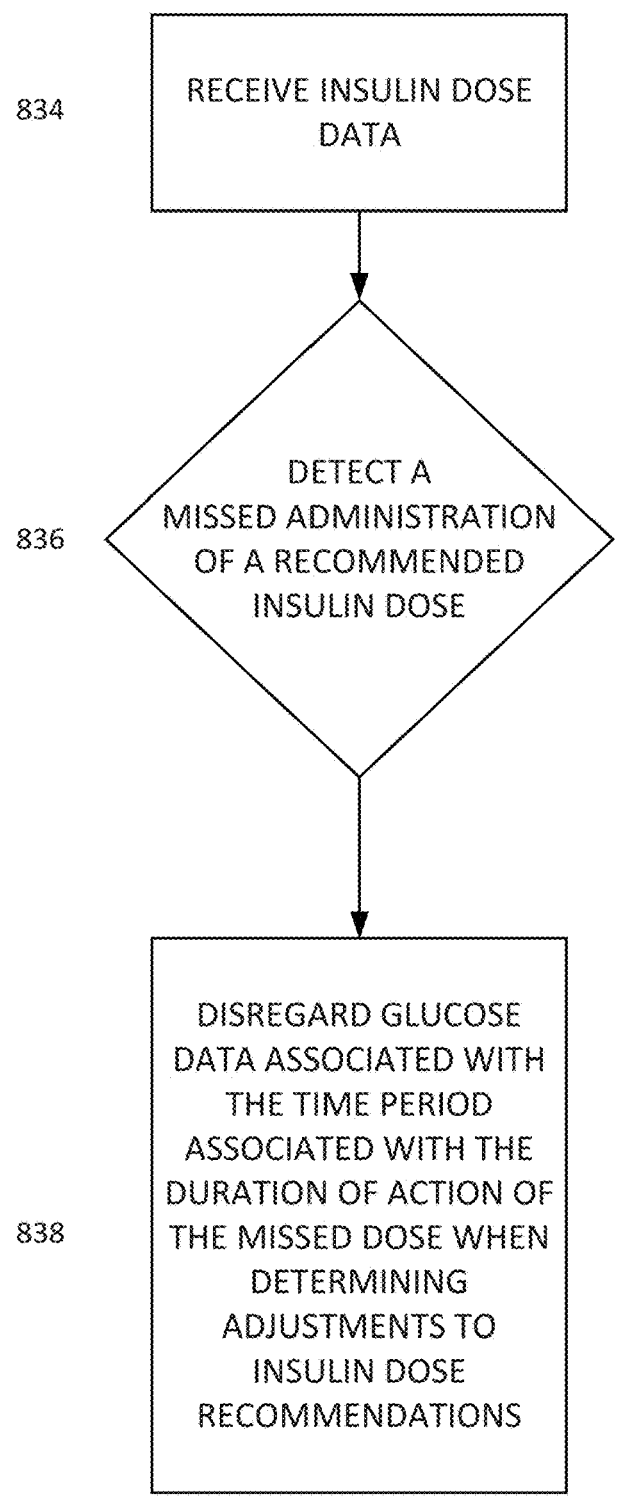
FIG. 16F is a flow diagram depicting an example embodiment of a method for adjusting insulin dose guidance.

In one example embodiment, as described in the flow diagram of FIG. 16F, in exemplary method 833, beginning with step 834, insulin dose data of the subject can be received from an MDD 152.

In step 836, the DGA can detect a missed administration of an insulin dose, wherein the insulin dose has a time period associated with a duration of action. For example, the DGA can first identify a user's dosing strategy during the initial learning period before dose guidance can be provided. Using automated meal detection methods and data from Bluetooth connected MDDs 152, the system can also identify meal events and their concomitant doses. The DGA can therefore determine if a dose was missed for a given meal. Missed basal doses can be detected when there is no reported data from the user's long acting MDD 152.

In step 838, the DGA can disregard glucose analyte data associated with the time period when determining adjustments to insulin dose guidance. One missed mealtime dose could cause elevated glycemia and insulin boluses relative to past occurrences. These altered mealtime doses, as well as the glucose levels following a missed meal, could skew current dose titrations that the DGA has determined for a given dosing strategy. Similarly, a missed basal dose could cause persistent elevated glucose for the duration of insulin action, which is generally assumed to be one day. As a result, the DGA algorithm may only include glucose and insulin data from meals with an accompanying insulin dose. For rapid-acting insulin, the duration of action may be about 4 hours, alternatively about 5 hours, alternatively about 6 hours, alternatively between about 4 and about 6 hours. For example, if a breakfast dose is missed, then the resulting four hours of glucose data following the start of breakfast may not be included in dose titration. For long-acting insulin, the duration of action may be about 18 hours, alternatively about 20 hours, alternatively about 24 hours, alternatively between about 20 and about 24 hours. Because long-acting insulin both helps maintain normoglycemia between meals and prevents instances of diabetic ketoacidosis, the system algorithm may not include any data within the duration of action for a missed basal dose. For example, insulin glargine has a reported 24-hour duration of insulin action. If a user on glargine misses a daily basal dose, all data from the subsequent 24 hours will not be used by the system for dose titration.

Encouraging User not to Miss Doses

Adherence to a well-titrated insulin dose regimen can improve diabetes management by reducing hyperglycemia associated with missed doses as well as hypoglycemia from overcompensating correction doses. The DGA can be configured to provide actionable, easily interpreted data to the user highlighting the positive impact of dose adherence. One such method is to provide periodic updates comparing glucose time-in-range or another relevant statistic for time periods with a missed dose versus no missed dose.

Figure 16G:
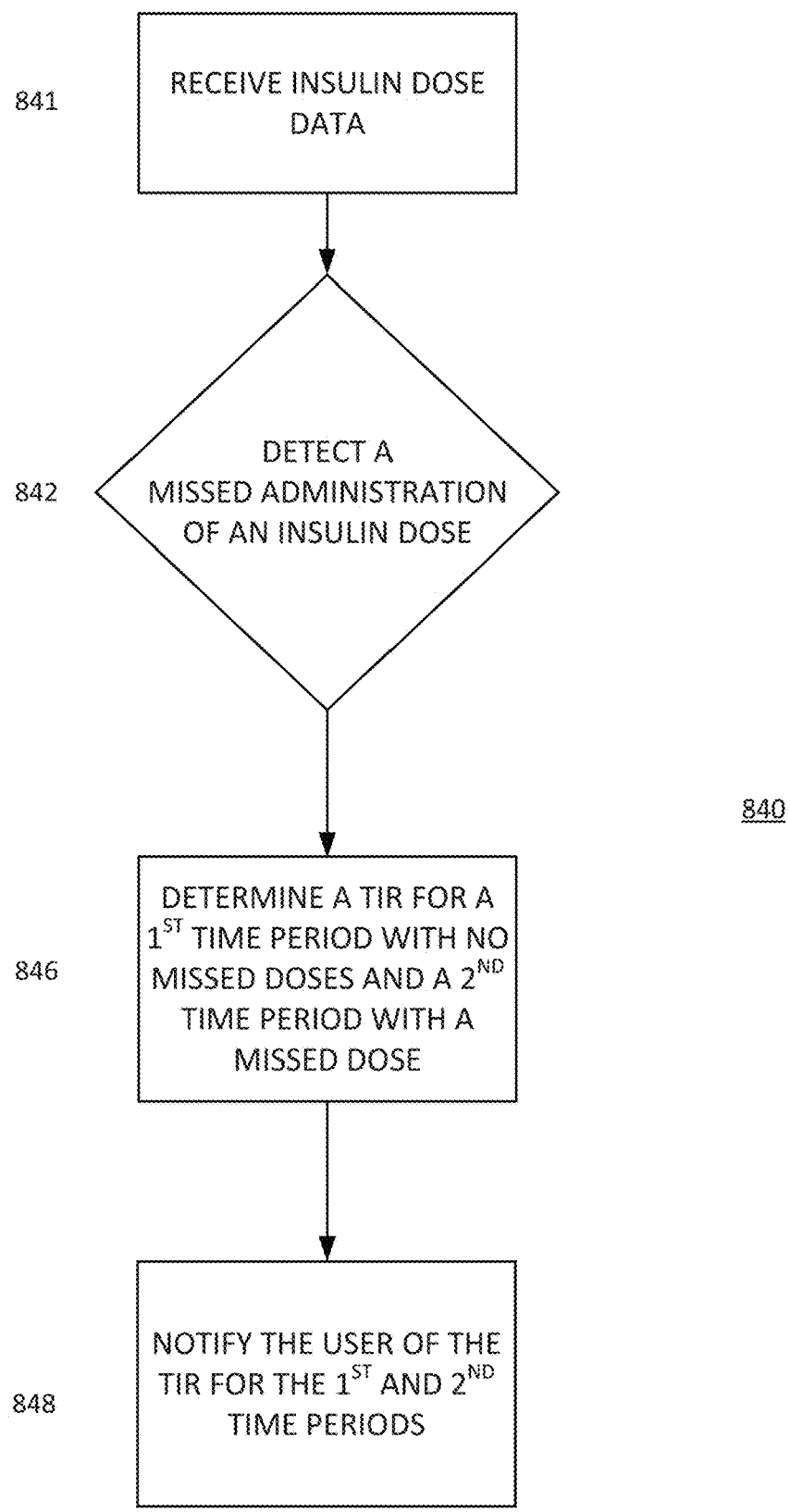
FIG. 16G is a flow diagram depicting an example embodiment of a method for managing a dosing strategy.

In one example embodiment, as described in the flow diagram of FIG. 16G, in exemplary method 840, beginning with step 841, insulin dose data of the subject can be received from an MDD 152.

In step 842, the DGA can detect a missed administration of an insulin dose. In step 846, the DGA can determine an amount of time that glucose levels of the subject have remained in a goal range (TIR) for first and second time periods. The goal range can be set by the DGA, the user, or the HCP. The goal range can be between about 70 mg/dL to about 180 mg/dL, alternatively between about 70 mg/dL to about 190 mg/dL, alternatively between about 70 mg/dL to about 200 mg/dL. The first and second time periods can be the same amount of time, wherein the first time period does not contain the missed administration of the insulin dose, and the second time period contains the missed administration of the insulin dose. Thus, a comparison of the TIR for time periods that include a missed dose and do not include a missed dose can be prepared.

In step 848, the DGA can notify the user of the determined TIR for the first and second time periods. If a difference between the two determined TIRs is greater than a threshold amount (i.e., the TIR for the first period less the TIR for the second period), then a positive message can be displayed to the user on the UID 200 both to encourage good dosing behavior and educate the user on the benefits of dose adherence. An example would be to notify a user that when compared to days when a meal dose is missed, days when all doses are taken result in a 10% increase in time-in-range.

Safety Features

The example embodiments of safety features of the DGS 100 described herein prioritize user safety during the guidance and titration process. Current insulin bolus dose calculators utilize static dosing parameters to calculate dose suggestions. Any update to those values by the user or HCP is a trial and error process that can in some cases induce hypoglycemia. As an automated process, the DGA can utilize user insulin and glucose data to titrate these parameters, provide dose guidance that is tailored to and can change with the user. Safety measures can be incorporated to ensure that no recommended titrations result in post-dosing hypoglycemia.

Safe Titration Method

The titration logic of the DGA can be configured such that no increase in dose titrations are made until hypoglycemic time-of-day periods are mitigated. When titration is done manually by HCPs, the HCP may want to increase some doses while decreasing others in order to fully titrate as soon as possible to reduce their time expenditure. Automated systems, however, can titrate less aggressively, that is take longer (and be more conservative and safer) because there is no HCP time involved. Thus, a patient with hypoglycemia may experience higher average glucose initially when titration starts, but once hypoglycemia is mitigated, insulin doses may be safely increased to achieve glycemic targets.

One issue with detecting a high glucose pattern after a meal is that the prior meal may have post-prandial glucose that results in the next meal starting with high glucose. If this occurs, a high pattern may wrongly be indicated for the next meal because of the high starting glucose. In order to address this issue, the titration strategy of the DGA can include titrating the overnight dose first, if necessary, before titrating the meal doses. Moreover, the meal doses can be titrated in the order of the earliest meal having a high glucose pattern first, before titrating meals later in the day having a high glucose pattern in sequential order. For example, recommendations for titrating an insulin dose associated with the overnight period may be done first. Next, for any high glucose patterns detected during any post-meal time periods, recommendations for titrating an insulin dose associated with breakfast may be provided before providing recommendations for doses associated with lunch, which are provided before providing recommendations for doses associated with dinner. Titrating the previous meal first ensures that premeal high glucose for the next meal is minimized, lessoning the chance that the recommended titration will impact or interfere with the titration of the next meal.

For the embodiments described herein, the DGA can detect high and low patterns as described with respect to the GPA described elsewhere in the specification.

For the embodiments described herein, when the DGA can be configured to recommend a change (e.g., an increase or reduction) in an insulin dose. The recommended change amount can be any desired amount of insulin, e.g., a fraction of a unit (0.1 unit, alternatively 0.5 units), alternatively a single unit (1.0 unit), alternatively two or more units of insulin (2.0 or more), or any combination thereof. For ease of description, embodiments described herein will make reference to adjustments at one unit intervals.

The DGA can perform the various steps described in the safe titration embodiments in a variety of different ways. For instance, the steps can be performed prior to each meal, alternatively at the beginning of a day, alternatively at the end of a day, alternatively every day, alternatively every other day, alternatively every third day, alternatively whenever a user queries the DGA for a dose recommendation, or combinations thereof.

In one example embodiment, the DGA can access measured glucose data (e.g., from an SCD 102). The DGA can determine if there is a high glucose pattern in an overnight period. If a high pattern is detected in an overnight period, the DGA can change a dose guidance. For instance, the DGA can increase an amount of drug in a dose guidance for a basal dose if it is safe to do so without causing any low glucose patterns in any periods of the day. The DGA can then determine if there is a high glucose pattern in at least one post-meal period of the day. If a high pattern is detected, the DGA can increase a drug amount in a dose guidance associated with the earliest of the at least one post-meal period of the day. The DGA can be configured such that, thereafter, the DGA can increase a drug amount in a dose guidance associated with the next earliest time period of the at least one post-meal period of the day determined to have a high glucose pattern.

Figure 17A:
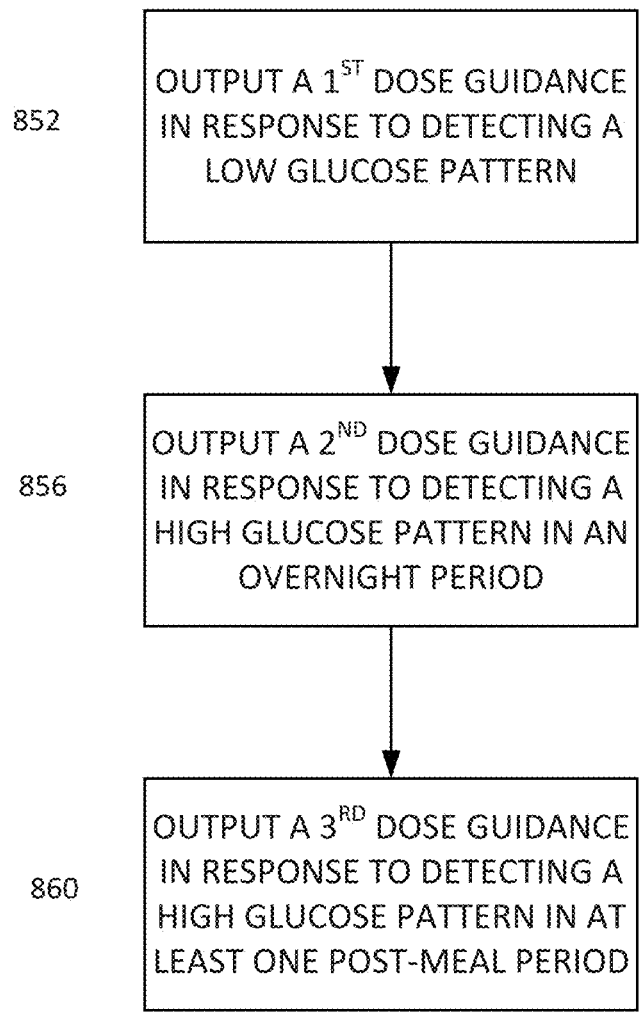
FIG. 17A is a flow diagram depicting an example embodiment of a method for recommending the titration of insulin doses.

In another example embodiment, as described in the flow diagram of FIG. 17A, in exemplary method 850, at step 852, the DGA can output a first dose guidance in response to detecting in analyte data of a subject a low glucose pattern in at least a first time of day period, where the first dose guidance is less than a prior dose for the at least the first time of day period. The first dose guidance can be outputted to the UID 200. If a low glucose pattern is detected, the DGA can output a dose guidance associated with the period(s) in which the low glucose patterns was detected. The DGA can be configured such that it does not recommend any reductions in insulin doses to address high glucose patterns until low glucose patterns are no longer detected.

At step 856, the DGA can output a second dose guidance in response to detecting in analyte data of the subject a high glucose pattern in an overnight period, where the second dose guidance is less than a prior dose for the overnight period. For instance, the DGA can recommend an increase in a basal dose if it is safe to do so, e.g., if such an increase would not cause a low glucose pattern in another time period of the day.

At step 860, the DGA can output a third dose guidance in response to detecting in analyte data of the subject a high glucose pattern in at least one post-meal period, wherein the third dose guidance is less than a prior dose for the at least one post-meal period. In one embodiment, the DGA can be configured to detect all of the high glucose patterns found during any time periods of the day. In another embodiment, the DGA can be configured to detect if a post-breakfast period has a high glucose pattern, then the DGA can be configured to detect if a post-lunch period has a high glucose pattern, then the DGA can be configured to detect if a post-dinner period has a high glucose pattern.

If it is determined that a high glucose pattern exists in more than one post-meal period, the third dose guidance that is outputted by the DGA can be associated with a post-meal period having a high glucose pattern that occurs earliest in the day. For instance, if high glucose patterns were detected in both the post-breakfast and post-lunch periods, the DGA can increase a recommended insulin dose associated with breakfast before recommending an increase in a recommended insulin dose associated with lunch. Moreover, the DGA can reassess whether the high glucose pattern in the post-breakfast period was mitigated before recommending the increase in the recommended insulin dose associated with lunch.

Figure 17B:
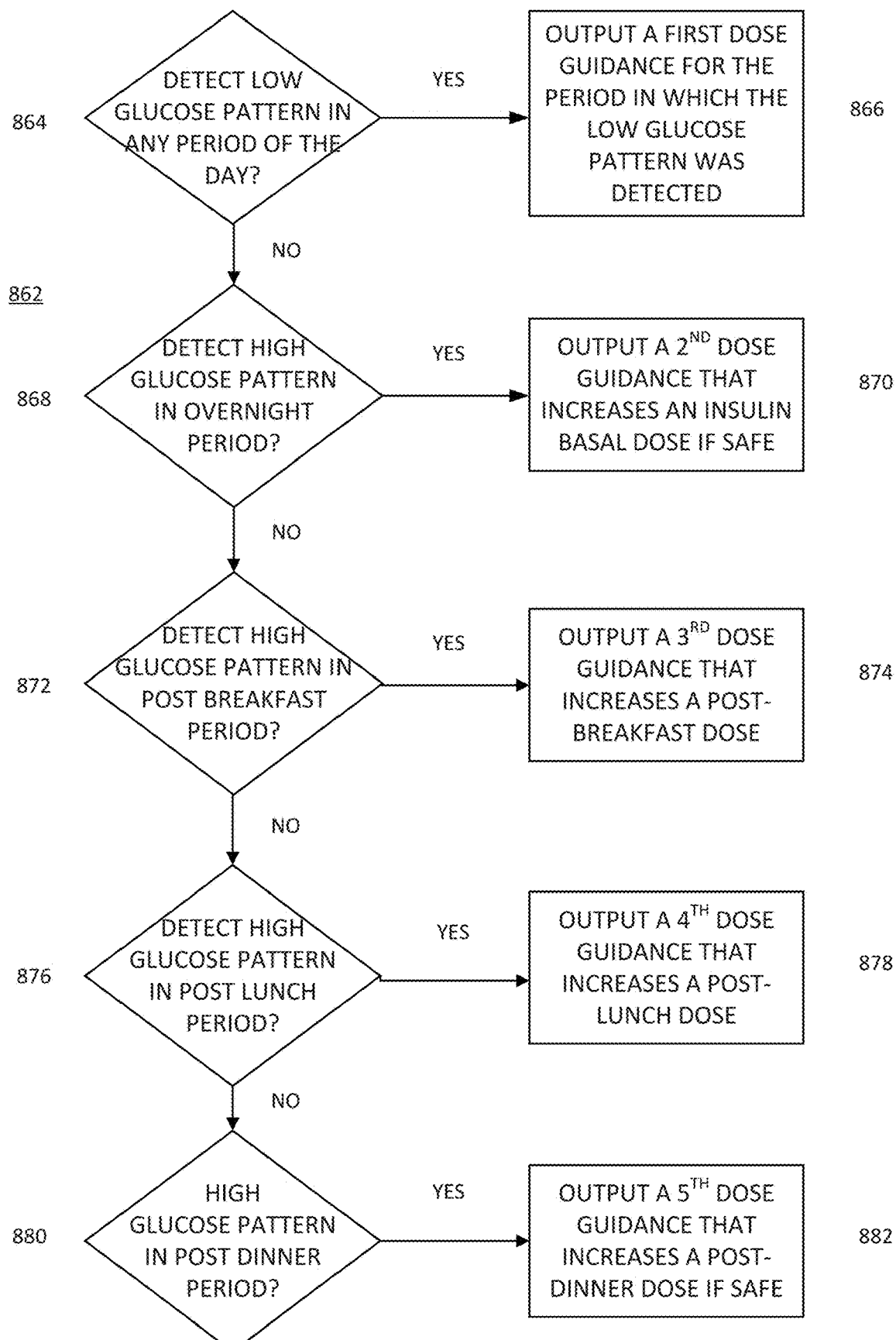
FIG. 17B is a flow diagram depicting another example embodiment of a method for recommending the titration of insulin doses.

In another example embodiment, as described in the flow diagram of FIG. 17B, in exemplary method 862, beginning with step 864, the DGA can detect low glucose patterns in any period of the day. The low patterns can be detected based on the GPA as described elsewhere. If a low glucose pattern is detected, then at step 866, the DGA can output a first dose guidance for the period of the day in which the low glucose pattern was detected. The first dose guidance can include a lower drug amount as compared to a prior dose administered in the period of the day in which the low glucose pattern was detected. The DGA can be configured not to recommend any increases in insulin doses to address high glucose patterns until low glucose patterns are no longer detected in any time periods.

At step 868, the DGA can detect if a high glucose pattern exists in an overnight period. If a high glucose pattern is detected, at step 870, the DGA can output a second dose guidance for the basal dose. For instance, the second dose guidance can include a higher drug amount than a prior basal dose if the DGA has determined that such a modification is safe, e.g., such an increase would not cause a low glucose pattern in another time period of the day. In one embodiment, the second dose guidance can include a higher drug amount than the basal dose that was administered on the previous day.

At step 872, the DGA can detect if a high glucose pattern exists in a post-breakfast period. If a high glucose pattern is detected, at step 874, the DGA can output a third dose guidance. The third dose guidance can increase a recommended insulin dose associated with breakfast, i.e., the third dose guidance can include a higher drug amount than a prior post-breakfast dose. In one embodiment, the third dose guidance can include a higher drug amount than the post-breakfast dose that was administered on the previous day.

At step 876, the DGA can detect if a high glucose pattern exists in a post-lunch period. If a high glucose pattern is detected, at step 878, the DGA can output a fourth dose guidance. The fourth dose guidance can increase a recommended insulin dose associated with lunch, i.e., the fourth dose guidance can increase a recommended insulin dose associated with lunch, i.e., the fourth dose guidance can include a higher drug amount than a prior post-lunch dose. In one embodiment, the fourth dose guidance can include a higher drug amount than the post-lunch dose that was administered on the previous day.

At step 880, the DGA can detect if a high glucose pattern exists in a post-dinner period. If a high glucose pattern is detected, at step 882, the DGA can output a fifth dose guidance, i.e., the fifth dose guidance can increase a recommended insulin dose associated with dinner, i.e., the fifth dose guidance can include a higher drug amount than a prior post-dinner dose. In one embodiment, the fifth dose guidance can include a higher drug amount than the post-dinner dose that was administered on the previous day. In one embodiment, the DGA can only increase a recommend insulin dose associated with dinner if it is safe to do so, e.g., if it can be increased without causing a low glucose pattern in the overnight period.

Figure 17C:
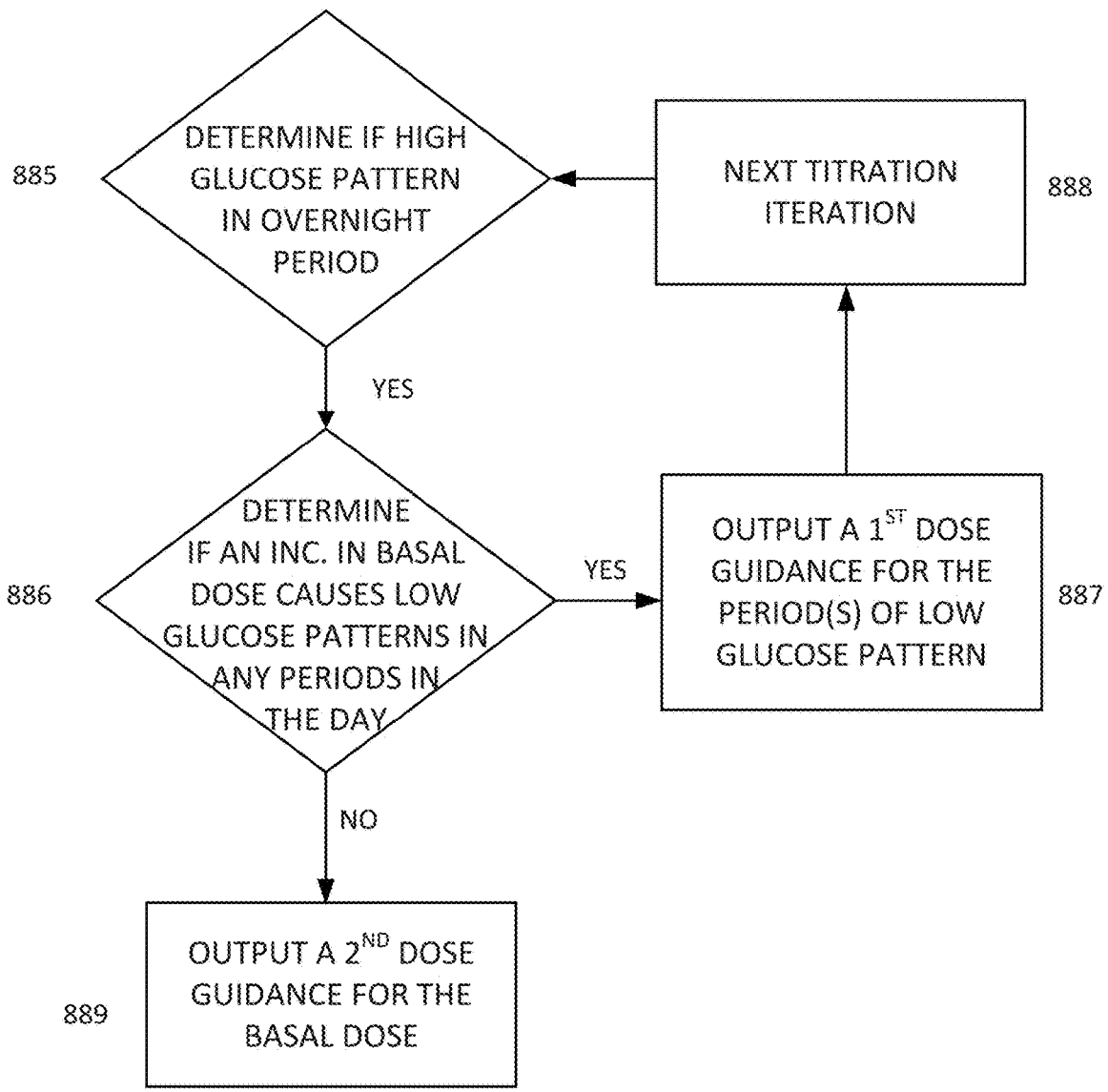
FIG. 17C is a flow diagram depicting an example embodiment of a method for recommending the titration of insulin doses associated with an overnight period.

In another example embodiment, as described in the flow diagram of FIG. 17C, in exemplary method 883, at step 885, the DGA can detect if a high glucose pattern exists in an overnight period, as explained with reference to the GPA.

If a high glucose pattern is detected in an overnight period, then at step 886, the DGA can determine if an increase in a basal dose can cause a low glucose pattern in any time periods of the day. If an increase in a basal dose can cause a low glucose pattern in any time periods of the day, at step 887, the DGA can output a first dose guidance for the period(s) of the day determined to have a low glucose pattern. The first dose guidance can reduce a recommended insulin dose associated with the periods determined to have a low glucose pattern, i.e., the first dose guidance can include a lower drug amount than a prior dose administered in the same period of the day. In one embodiment, the first dose guidance can include a lower drug amount than the dose that was administered on the previous day in the same period of the day.

If an increase in a basal dose is not determined to cause a low glucose pattern in any time periods, at step 888, the DGA can output a second dose guidance. The second dose guidance can increase a recommended basal dose to address the high glucose pattern in the overnight period, i.e., the second dose guidance can include a higher drug amount than a prior basal dose. In one embodiment, the second dose guidance can include a higher drug amount than the basal dose that was administered on the previous day. The DGA can be configured such that, thereafter, after the DGA outputs the first dose guidance, which reduces the recommended insulin dose associated with the period(s) of the day associated with the time periods determined to have a low glucose pattern in step 887, the DGA can then perform a next titration iteration in step 888, and then determine if a high glucose pattern exists in an overnight period in step 885.

Figure 17D:
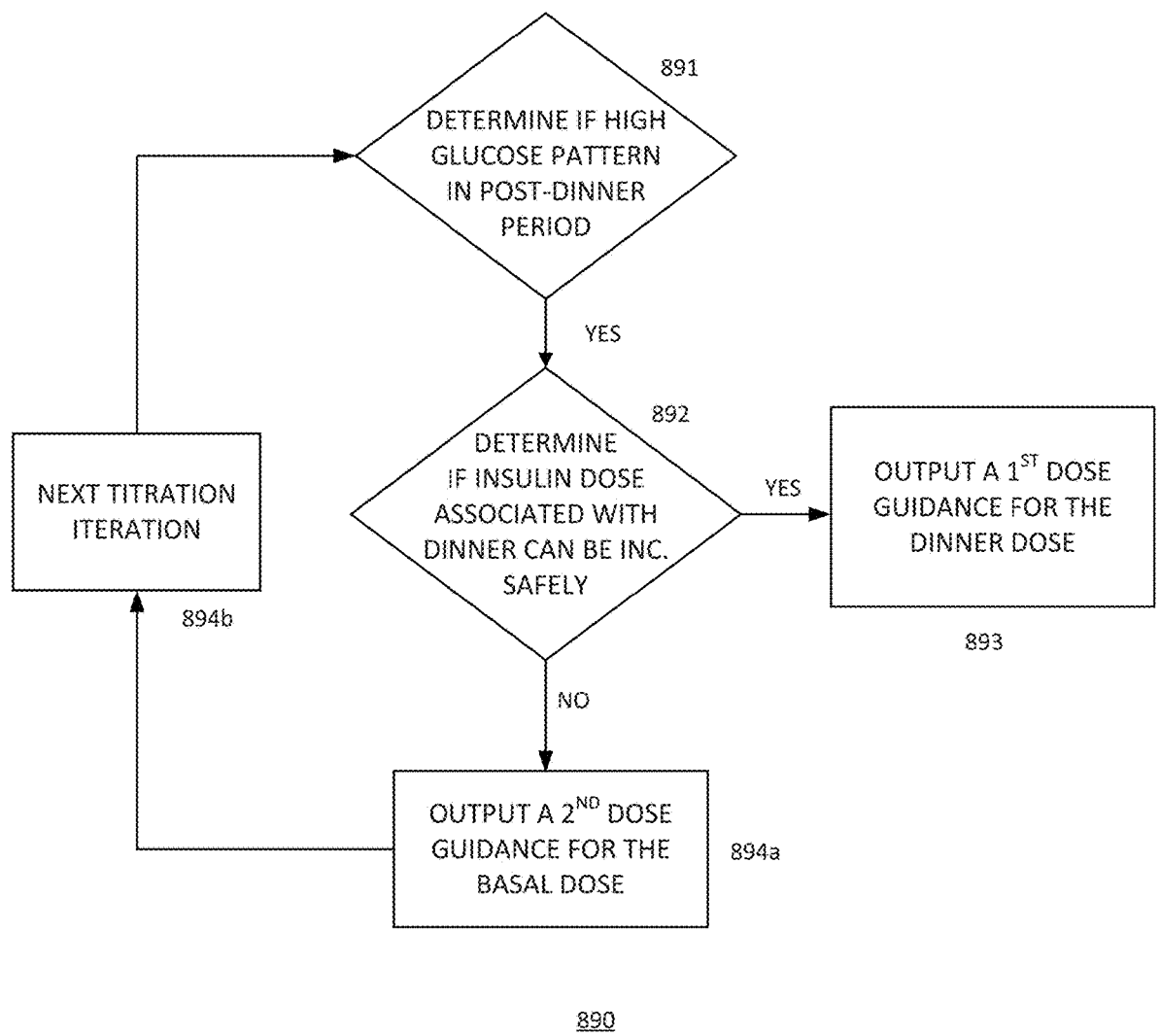
FIG. 17D is a flow diagram depicting an example embodiment of a method for recommending the titration of insulin doses associated with a dinner period.

In another example embodiment, as described in the flow diagram of FIG. 17D, in exemplary method 890, beginning with step 891, the DGA can detect if a high glucose pattern exists in a post-dinner period. If a high glucose pattern is detected in a post-dinner period, then at step 892, the DGA can determine if an insulin dose associated with dinner can be increased safely. For instance, if the insulin dose associated with dinner can cause a low glucose pattern in the overnight period, the dinner dose cannot be increased safely.

If an insulin dose associated with dinner can be increased safely, at step 893, the DGA can output a first dose guidance. The first dose guidance can increase a recommended insulin dose associated with dinner to address the high glucose pattern in the post-dinner period, i.e., the first dose guidance can include a higher drug amount than a prior post-dinner dose. In one embodiment, the first dose guidance can include a higher drug amount than the post-dinner dose that was administered on the previous day.

If the dinner dose cannot be increased safely, at step 894a, the DGA can output a second dose guidance. The second dose guidance can decrease or reduce a recommended basal insulin dose, i.e., the second dose guidance can include a lower drug amount than a prior basal dose. In one embodiment, the second dose guidance can include a lower drug amount than the basal dose that was administered on the previous day. The DGA can also be configured such that, thereafter, after the DGA decreases the recommended basal dose in step 894a, the DGA can then perform a next titration iteration in step 894b, and then determine if a high glucose pattern exists in a post-dinner period at step 891.

Issues with Connectivity of the MDD

Accurate dose guidance requires that the DGA has access to up-to-date glucose analyte data and insulin dose data. Gaps in either data can result in inaccurate recommendations that could lead to serious hypoglycemia episodes.

Figure 17E:
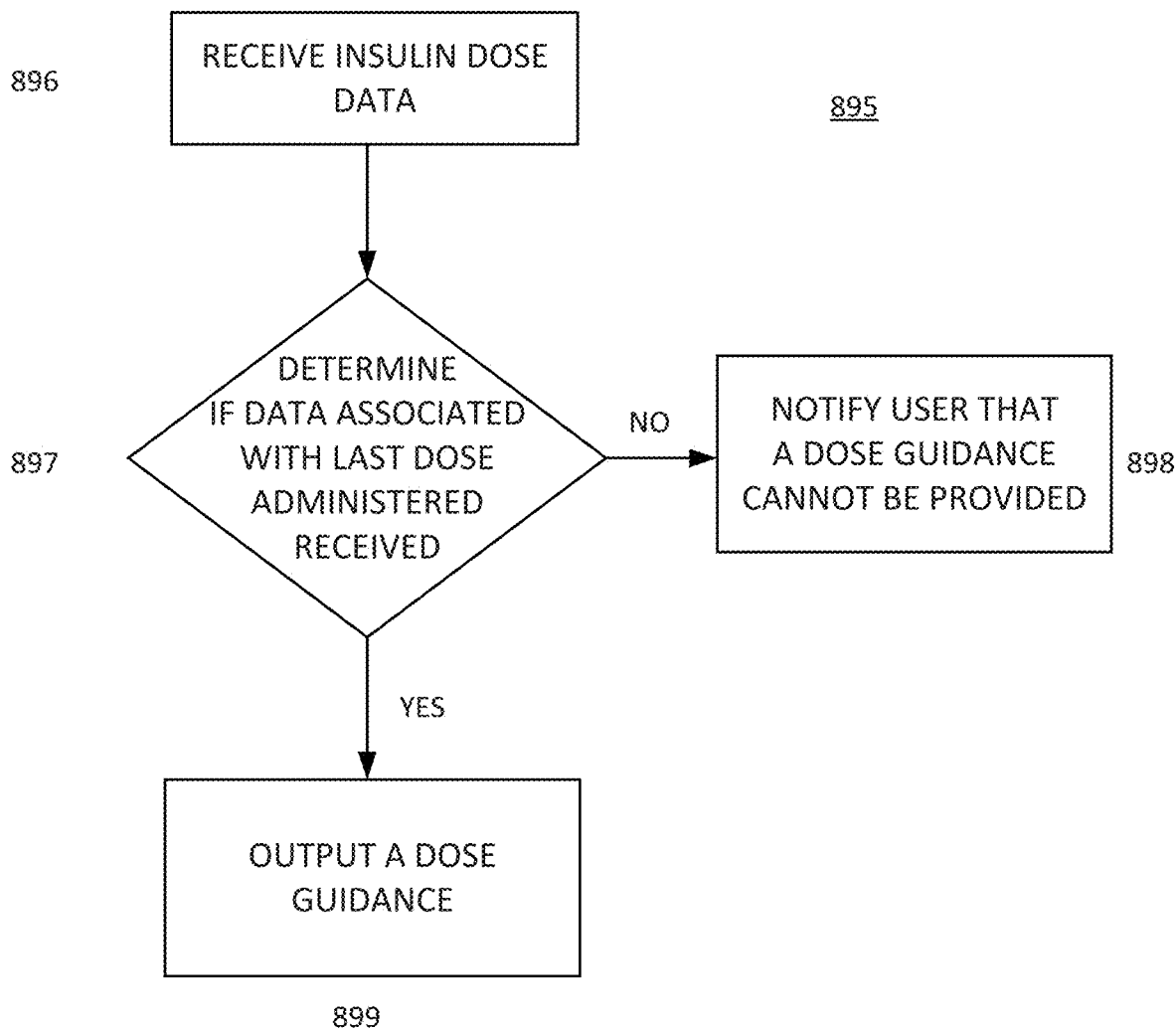
FIG. 17E is a flow diagram depicting an example embodiment of a method for recommending insulin doses.

In one example embodiment, as seen in FIG. 17E, in exemplary method 895, beginning with step 896, the DGA can receive or otherwise access insulin data of the subject (e.g., from MDD 152). For example, the DGA can check for the latest insulin delivery information by requesting delivery information from different sources, including, but not limited to, the MDD 152, the MDD-associated application, or the interface that stores the latest insulin delivery information (such as the MDD application web server), or by checking the memory of the various applications for the latest insulin delivery information.

At step 897, the DGA can determine if data associated with a last dose administered to the subject has been received. This step can be particularly applicable to embodiments where the device or software responsible for logging dose administration is different than the DGA or device executing the DGA. In embodiments where the DGA is automatically provided with dose administration data (e.g., the DGA is being executed by MDD 152), then this step may not be applicable.

The DGA can determine if it has the latest available data based on different factors. In one embodiment, the determination can be based on a time gap in insulin dose data received. For example, if a user is on full multiple daily injection therapy (basal+3 mealtime boluses), then the DGA can communicate with the MDD 152 or its associated application at least about every six hours. If there has been no communication in that time, the DGA can be configured to determine that the MDD 152 needs to be connected to the DGA before dose guidance can be given. In one embodiment, the DGA can assume that the data associated with the last dose administered was not received if the time gap since the last dose administration was received is longer than an assumed time between meals. For instance, an assumed time between meals may be about 5 hours, alternatively about 6 hours, alternatively about 6.5 hours, alternatively about 7 hours, alternatively about 7.5 hours, alternatively about 8 hours. In another embodiment, the DGA can detect whether Bluetooth communication is enabled between the user's display device 120, e.g., smartphone, and the MDD 152. For example, Bluetooth communication may not be enabled on either the device 120, or the MDD 152 or both. In another embodiment, the DGA can detect whether a power source associated with the medication delivery device needs to be replaced.

If it is determined that data associated with the last dose administered to the subject was not received, at step 898, the DGA can notify the user that a dose guidance cannot be provided. In one embodiment, the UID 200 can display a message to the user indicating that the DGA cannot output dose guidance until the DGA has received the latest insulin delivery information. In one embodiment, the UID 200 can display a message to the user indicating that the DGA cannot give dose guidance until the DGA has received the latest insulin delivery information. In another embodiment, the DGA can also generate and the UID 200 can display a prompt to notify the user to turn on Bluetooth for the display device 120, the MDD 152, or both. In another embodiment, the DGA can also indicate that the battery of the MDD 152 needs to be replaced. In addition, the DGA can determine the battery life remaining in the MDD 152 and output a warning to the patient that can be displayed on the UID 200 when the battery life is below a certain threshold, e.g., the battery life is less than 10%. In another embodiment, the DGA can also output a notification that is displayed on the UID 200 to inform the user of the last recorded insulin dose and timestamp, and can also inform the user as a warning that any dose guidance will not be based upon any doses that may have followed that last dose and timestamp.

If it is determined that data associated with the last dose administered to the subject was received, at step 899, the DGA can output a dose guidance to the UID 200 based on the received glucose analyte data and insulin dose data.

Recommendations for Additional Test if Insulin Delivery Abnormal

The DGA can be configured to run statistics corresponding to various measures of insulin administered and glucose levels measured. Correlations between various insulin and glucose metrics can be used to identify abnormalities in the DGA, which could include, but are not limited to the incorrect logging of insulin doses, glucose readings that may be biased low or high, and reduced or increased insulin resistance.

The insulin metric used can be a rolling insulin metric. In one embodiment, the rolling insulin metric can be a total dose of insulin within a time period. The time period may be about 24, about 48, or about 72 hours. Moreover, the total dose of insulin can be a total dose of long and rapid-acting insulin within the time period. In another embodiment, the rolling insulin metric can be an insulin-on-board at an elapsed time since a meal start. Such a metric can have different pre-determined insulin-related parameters, e.g., DIA or Duration of Insulin Action, for different mealtime insulin types.

The glucose metric used can be a rolling glucose metric. In one embodiment, the rolling glucose metric can be a rolling mean glucose, a rolling median glucose, or a rolling mode glucose. In another embodiment, the rolling glucose metric can be a meal-start normalized glucose AUC or a change in meal glucose (meal delta).

Figure 17F:
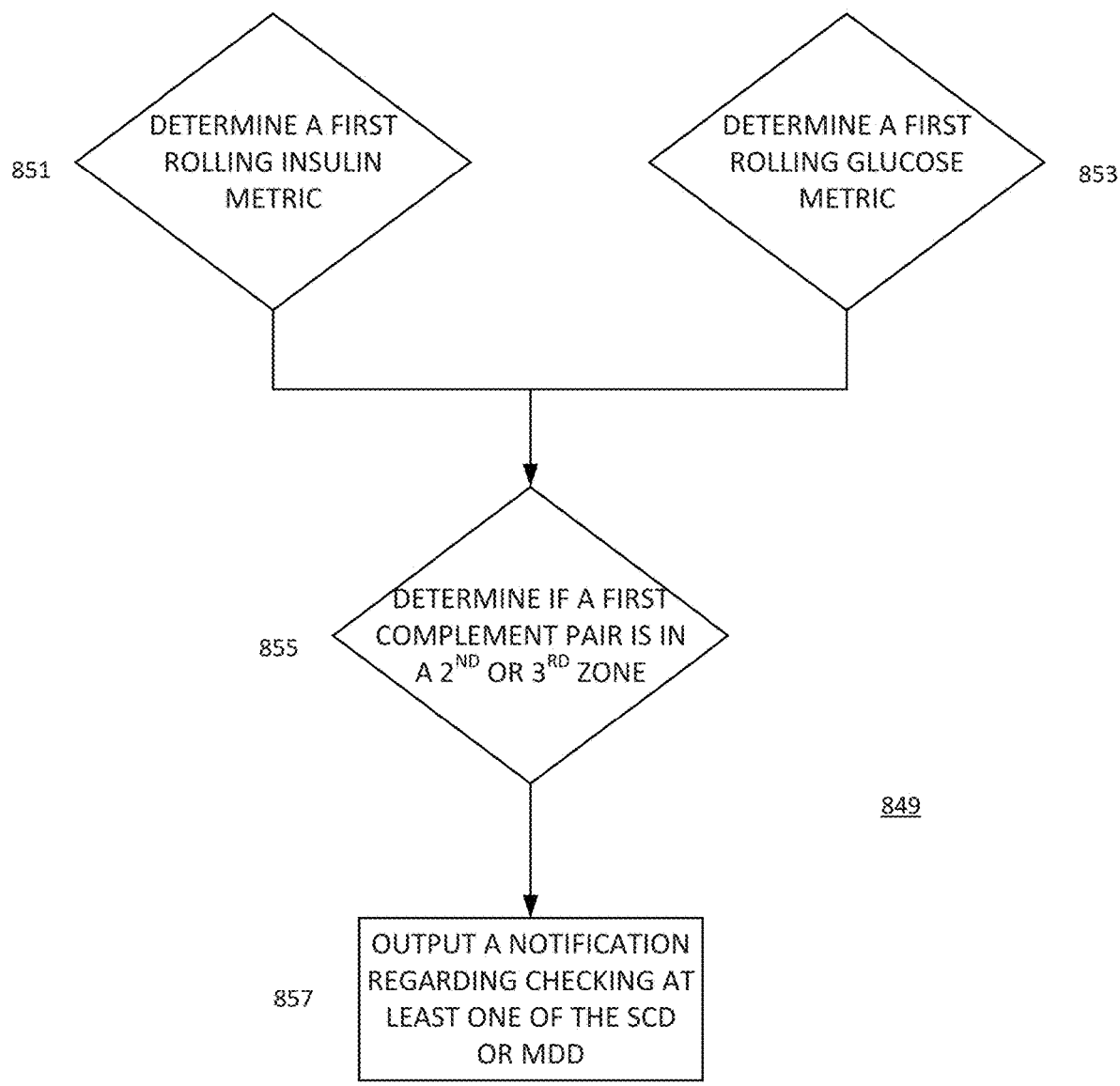
FIG. 17F is a flow diagram depicting an example embodiment of a method for determining if insulin delivery is abnormal.

In another example embodiment, as described in the flow diagram of FIG. 17F, in exemplary method 849, in step 851, the DGA can determine a first rolling insulin metric associated with a first time from insulin dose data. In step 853, the DGA can determine a first rolling glucose metric associated with a first time from glucose dose data. The first rolling insulin metric and the first rolling glucose metric may be associated together to form a first complement pair.

Many different complement pairs of rolling insulin metrics and rolling glucose metrics can be formed. For example, in one embodiment, a rolling insulin metric of total insulin dose within a rolling time period can be paired with one of a rolling mean glucose, a rolling median glucose, or a rolling mode glucose for the same or similar time window. In another embodiment, complement pairs, such as glucose mode for the rolling last 48 hours and total insulin dose delivered in the rolling last 48 hours, can also follow the same general procedure outlined above. In another embodiment, an IOB at a specific elapsed time since a meal start can be paired with one of a meal-start-normalized glucose AUC or a meal delta, e.g., a change in glucose resulting from a meal. The time horizons for IOB and AUC pairings can include, but are not limited to, about 60, alternatively about 120, alternatively about 150, or alternatively about 300 minutes post-meal.

In step 855, the DGA can determine, with reference to a data space comprising first, second, and third zones, which of the first, second, and third zones contains the first complement pair. The data space can be defined by a plurality of complement pairs, each complement pair comprising a rolling insulin metric and a rolling glucose metric associated with the same time. For the plurality of complement pairs, the paired values can be collected at a regular time interval, e.g., about every 2 hours, alternatively about every 6 hours, alternatively about every 12 hours, alternatively about every 24 hours, or other interval that balances between proper data density and minimum data storage requirements. The amount of complement pairs stored can, in some embodiments, be retained in a First-in-First-Out (FIFO) buffer implemented in software or hardware. Within the complement pairs in a FIFO buffer, a correlation can be made between the complement pairs, similar to fitting a curve of a scatter plot made of insulin and glucose metric pairs collected over time. The correlation can be a curve of pre-determined structure (e.g., 3rd order polynomial) with potentially one or more of the parameters determined based on the paired data in the FIFO buffer, and one or more of the parameters pre-determined from a-priori population data. The curve can describe the nominal expected relationship between the paired observations. In addition to the nominal expected relationship, two safety boundary curves with pre-determined structure can also be constructed above and below the curve of the nominal expected relationship. Some of the parameters can also be determined based on the paired data in the FIFO buffer, while others may be pre-determined from a-priori population data. To improve numerical stability, parameter fit of the nominal, upper, and lower curves for the different time horizons can be related by an a-priori rule. To enable coverage of this insulin-glucose balance check, any other instances can be interpolated from existing time horizons. The curve of the nominal expected relationship and the two safety boundary curves can form the three zones of the data space. The first zone is defined as the zone between the upper and lower safety boundary curves, and includes the curve of the nominal expected relationship. The second zone is defined as the zone above the upper safety boundary curve and the third zone is defined as the zone below the lower safety boundary curve.

In step 857, the DGA can output a notification regarding checking at least one of the SCD 102 or the MDD 152 in response to a determination that the complement pair comprising the first rolling insulin metric and the first rolling glucose metric is contained in the second or third zone.

Figure 17G:
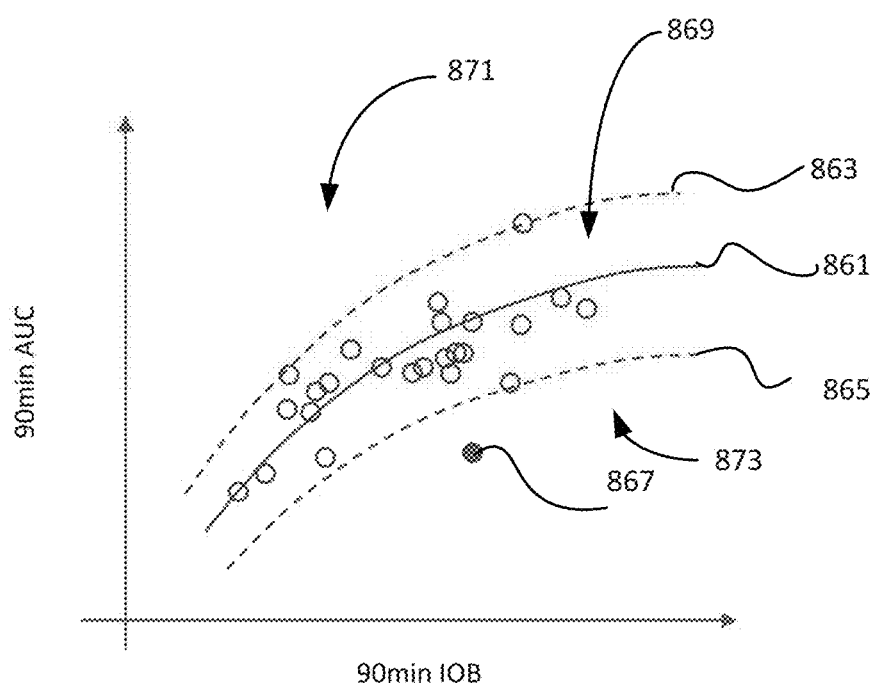
FIG. 17G is an example embodiment of a graph of exemplary tracking pairs.

FIG. 17G shows an example of the tracking of complement pairs where the rolling insulin metric is the estimated IOB 90 minutes after each meal and the rolling glucose metric is the meal-start-normalized glucose AUC 90 minutes after each meal. The complement pair 867 being analyzed (e.g., the latest pair denoted by the solid circle in FIG. 17G) is excluded from the fit to the curve of the nominal expected relationship 861, and represents the event of interest, such as the state of the user's glucose-insulin balance 90 minutes after a meal. The latest complement pair 867 is being analyzed to determine to which zone it corresponds. Its location relative to the two safety boundaries 863, 865 can be examined to determine which zone contains this complement pair 867. For example, the solid circle 867 shown in FIG. 17G appears "below" the lower safety boundary in the third zone 873. There are several possibilities for this occurrence: (1) the amount of insulin logged may be incorrectly higher than the actual amount of insulin delivered, (2) the glucose readings may be biased low, or (3) other confounding factors such as reduced insulin resistance as a result of exercise, or a vastly different meal composition consumed, may be occurring. Depending on the actual combination of events, there could be a risk of a false impending hypoglycemia notification or risk of undetected post-meal hyperglycemia if the latest pair is too far below the lower safety boundary.

In contrast, when the location of the complement pair of interest is above the upper safety boundary in the second zone 871, one or more of the opposite scenarios may be occurring: (1) the amount of insulin logged may be incorrectly lower than the actual amount of insulin delivered, including missed meal dose, (2) the glucose readings may be biased high, or (3) other confounding factors such as increased insulin resistance as a result of illness, or a vastly different meal composition may have been consumed. Depending on the actual combination of events, there could be a risk of a false impending hyperglycemia notification or risk of undetected post-meal hypoglycemia if the latest pair is too far above the upper safety boundary.

If the complement pair maps either above the upper safety boundary in the second zone or below the lower safety boundary in the third zone, a-priori determinations have been made with sufficient study data to conclude that a DGA 100 integrity check may be warranted. Thus, the DGA can notify the user to perform self-monitoring of blood glucose (SMBG). If the blood glucose measure (BGM) reading can link to the DGS 100 or be otherwise inputted into the DGA, then it may be used to determine whether the sensor 102 needs replacement or not, using one or more threshold comparison not covered in this discussion. Otherwise, the DGA can notify the user to check the MDD 152 or smart insulin pen cap for possible causes of error.

Incorporating Trend into Bolus Calculation

Traditional bolus calculators determine a dose based upon the difference between a user's current glucose and target glucose. In these traditional bolus calculators, the current glucose value is considered a discrete snapshot in time and the trend of glucose values at that point in time is not considered. Recommended doses can vary widely, however, during periods with a high rate of glucose change, as current glucose levels can increase or decrease drastically from one time point to the next.

The Endocrine Society published consensus guidelines in December 2018 for using glucose trend arrows for diabetes management (see Y. C. Kudva, et al., "Approach to Using Trend Arrows in the Freestyle Libre Flash Glucose Monitoring Systems in Adults," Journal of the Endocrine Society, vol. 2, pp. 1320-1337, 2018, which is hereby expressly incorporated by reference in its entirety). Glucose trend arrows can be binned into 5 categories based upon the glucose rate of change: (1) rising quickly (>2 mg/dL/min), (2) rising (between 1-2 mg/dL/min), (3) changing slowly (no change greater than 1 mg/dL/min in magnitude), (4) falling (decreasing between 1-2 mg/dL/min) or (5) falling quickly (decreasing >2 mg/dL/min).

To attempt to account for these rapid changes, heuristics can be developed for each trend arrow category that will incorporate glucose rate of change in addition to the current glucose value to calculate a recommended dose. Depending on the reported rate of change, a recommended dose utilizing an additional rate of change term may be increased or decreased to accommodate dynamic glucose responses. It is envisioned that these heuristics will be developed to minimize incidences of post-dose hypoglycemia, thereby improving glucose time-in-range.

Insulin Site Rotation

Methods described herein promote proper site rotation for insulin injection through the automated detection of injection sites of insulin pen needles and infusion sets.

The most common method of insulin delivery is administration into the subcutaneous tissue either via discrete injections or continuous infusion. Proper technique for both insulin injection and infusion set placement dictates the need to "rotate" injection sites, that is, cycling through different areas of the body to avoid any sort of local skin reaction due to repeated and persistent needle access. Two common results related to lack of rotating injection sites are scar tissue formation and lipohypertrophy. Scar tissue is the formation of fibrous tissue as a result of constant trauma or improper healing to an initial insult and is characterized by the presence of collagen-dense, avascular tissue. Lipohypertrophy is clinically defined as a local accumulation of fat deposits at insulin injection sites. While scar tissue is a ubiquitous issue across injection therapy, lipohypertrophy is a condition that is almost singularly associated with subcutaneous insulin administration. Both present themselves as hard nodules underneath the skin and are associated with local areas that are largely avascular, which will negatively impact systemic insulin uptake and action. As such, their effects on insulin absorption are often grouped together. These effects include reduced insulin absorption (by as high as 40%), higher insulin total daily doses (TDD), and reduced glycemic control. Prevalence is also high and been estimated to occur in ~50% of those on insulin therapy.

Currently, there is no technology-aided solution to the issue of poor injection site rotation. Site rotation is reliant upon education from physicians and diabetes educators to patients and subsequent adherence from patients.

As described herein, the DGS 100 can include a site rotation application that can be configured to detect a general injection region and to provide guidance to the user to rotate to a new injection site if the same location is detected repeatedly. By presenting the user with site rotation information as part of a dose guidance regimen, the DGS 100 could promote better injection practice, higher insulin efficacy, and a greater time-in-range.

Figure 18A:
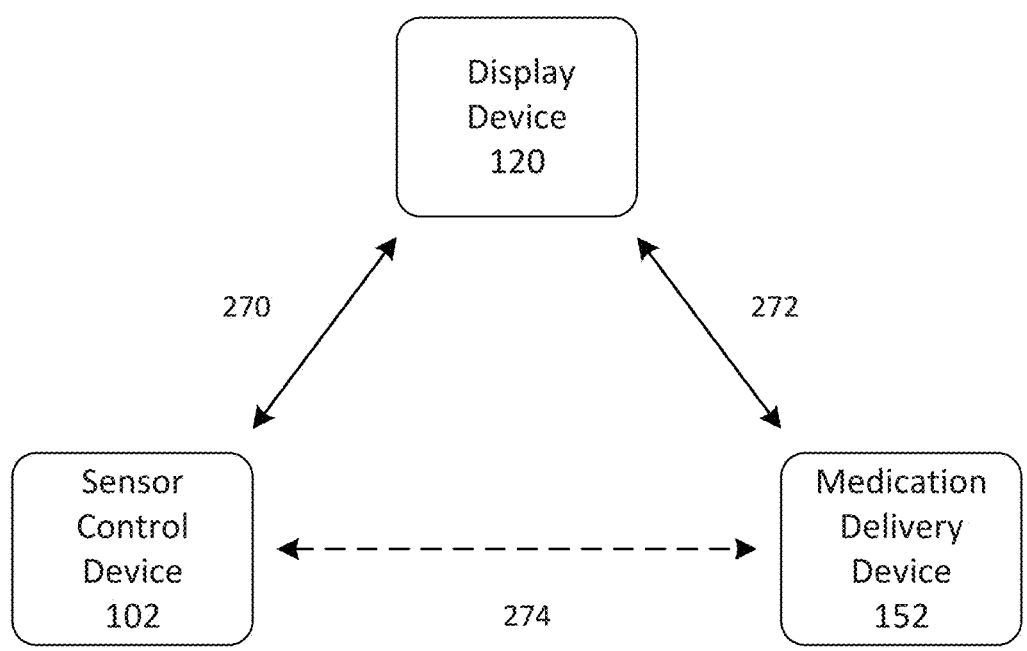
FIG. 18A is a block diagram depicting an example embodiment of a site rotation system.
Figure 18B:
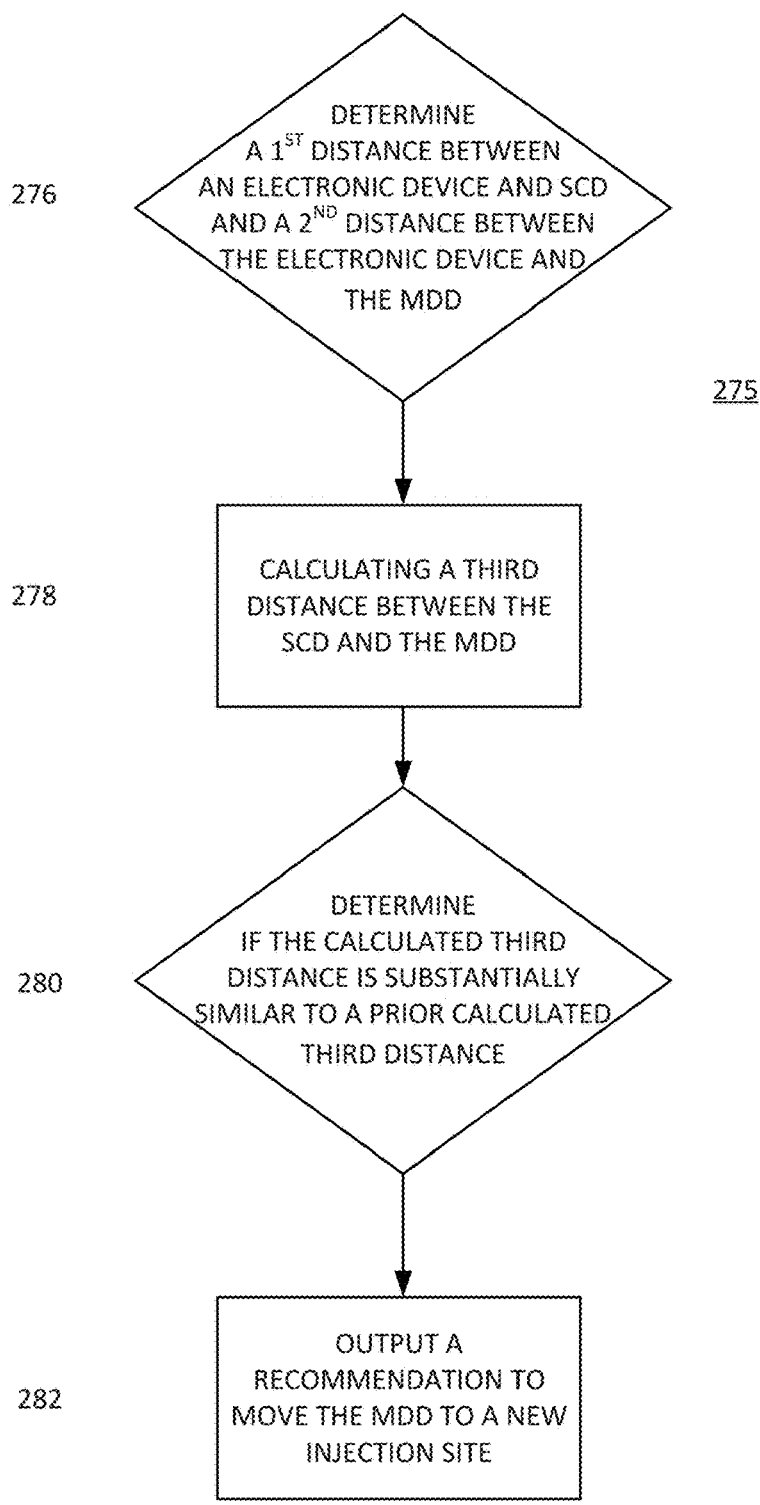
FIG. 18B is a flow diagram of an example embodiment of a method for monitoring a drug injection site.

In one embodiment, as seen in FIGS. 18A and 18B, in exemplary method 275, beginning with step 276, the site rotation application can be configured to determine a first distance 270 between an electronic device, such as a display device 120 (e.g., a smart phone) and an SCD 102 and a second distance 272 between the electronic device and an MDD 152. In one embodiment, the site rotation application can employ Bluetooth communication (BLE) amongst the three separate devices: (1) a display device 120, such as a smartphone, (2) an SCD 102, and (3) an MDD 152, such as a connected pen needle. As seen in FIG. 18A, the display device 120 can be configured to serve as a central point of connection for communication. When dose guidance is requested from the DGA, the display device 120 can determine a first distance 270 between the display device 120 and the SCD 102, and a second distance 272 the display device 120 and the MDD 152. In one embodiment, the first distance 270 can be determined by a strength of a first signal between the display device 120 and the SCD 102 and the second distance 272 can be determined by a strength of a second signal between the display device 120 and the MDD 152.

In step 278, the site rotation application can be configured to calculate a third distance 274 between the SCD 102 and the MDD 152, wherein the SCD 102 is at a fixed location on the subject. Because the display device 120 is not fixed in one location, the first and second signals can be triangulated to determine a third distance 274 between the SCD 102, which has a fixed location on the body of the subject, and the MDD 152. The calculated third distance 274 between the MDD 152 and the SCD 102 can then be recorded within the site rotation application in the display device 120.

In step 282, the site rotation application can be configured to output a recommendation to move the MDD to a new injection site on the subject in response to a determination that the calculated third distance is substantially similar to a prior calculated third distance. In one embodiment, if the calculated third distance 274 between the SCD 102 and the MDD 152 is consecutively repeated more than a given threshold amount, then the site rotation application can be configured to supply a guidance message suggesting that the user inject the insulin into a new site location. The threshold amount can be 1 time, alternatively 2 times, alternatively 3 times. In one embodiment, the site rotation application can be further configured to supply a list of acceptable location sites to the user to present ideas for new injection areas. These alternative areas can include the arms, thighs, abdomen, and buttocks.

Additional Example Embodiments

Additional example embodiments pertaining to medication delivery are also described herein. These embodiments will be described in the context of an insulin pen, although they are not limited to such. In many embodiments the MDD 152 (e.g., an insulin pen) can communicate directly with the SCD 102, and thus an additional reader device may not be necessary. In some embodiments a reader device can also be in communication with the sensor control device, which is in communication with the MDD 152. In those embodiments, the reader device can also be in communication with the MDD 152. In other embodiments, the reader device can communicate with the MDD 152, which is in turn in communication with the SCD 102, which is not in communication with the reader device. In other embodiments, the SCD 102 is in communication with the reader device, which is in turn in communication with the MDD 152, but the MDD 152 is not in communication with the SCD 102. These various communication schemes can allow any type of information (e.g., analyte measurements, alarms, user information or settings, dose guidance, etc.) to be communicated from one device in the system to another, via an intermediate device. Communication can occur via Bluetooth or Bluetooth Low Energy, or another wireless protocol (e.g., NFC, RFID, Wi-Fi, etc.). The communication can be maintained (e.g., an active Bluetooth pairing) or can be intermittent (e.g., an NFC proximity scan).

In some embodiments, an SCD 102 or a display device 120, such as a reader device (RD), can check if the MDD 152 is maintaining a wireless connection with the SCD 102 or reader device for safety purposes of notifying the user if the MDD 152 is potentially out of the immediate area. If the SCD 102 or RD detect loss of connection, then an alarm is generated at the SCD 102 (if configured to generate audible or visual alarms) or RD (or the SCD 102 can notify the RD to generate an alarm). Similar alarms can be generated upon detecting a priming issue or failure, or a depleted medication supply (e.g., low cartridge). If the SCD 102, RD, or the MDD 152 detects a high analyte condition (e.g., hyperglycemia), then the SCD 102 or RD (through communication with the MDD 152), or the MDD 152 itself can determine whether a dose was recently administered, and refrain from generation of the alarm (at the SCD 102, RD, or MDD 152).

Other notifications or alarms that can be generated for the user can relate to pen depletion, including estimating and/or reminding the user that an amount sufficient for administration in less than a certain time period (e.g., 1 day) of medication remains. If the next scheduled dose is determined to be greater than the amount of medication remaining, then a recommendation to use a new pen or load a new cartridge can be outputted. The MDD 152 can be configured to monitor medication quantity, and if the expected quantity does not match the actual (sensed) quantity then an alarm or notification can be generated. The MDD 152 can also be configured to monitor a duration of time that the delivery button is pressed to ensure complete delivery, and notify the user if incomplete delivery is suspected. If the MDD 152 or DGS 100 detects that the button is pressed for too short of a time period, then the MDD 152 or DGS 100 can assume the user took a lower dose than recommended. The DGA or the MDD 152 could output a query to the user to verify if the administered dose was an incomplete dose or an intended lower dose. If the MDD 152 or DGS 100 detects that the delivery button is pressed for too long (e.g., a longer amount of time needed to administer a recommended dose or the dose amount as indicated in the dose guidance), then the MDD 152 or other system device (e.g, the DGA installed on the display device 120) can notify or alarm the user that too large a dose may have been administered. In one embodiment, the MDD 152 can be configured to output an audible notification (e.g., a beep), tactile notification (e.g., vibrate or click), and/or a visual notification (e.g., LED, light) once the completion of the dose has been reached so that the user can stop pressing the actuator or button. After a dose is administered, the SCD 102 or RD can be configured to send a blackout time to the MDD 152 so that, if the MDD 152 is disconnected or otherwise unable to communicate with an SCD 102 or RD 120 configured to provide dose guidance, then the MDD 152 knows that further dose administration during at least the blackout period should prevented or limited. Suggested feed data can be sent to the integrated pen based on latest best estimate.

If connection is lost and then reestablished between the MDD 152 and the SCD 102 and/or the RD 120, the user can be queried to enter the amount of any dose that was administered during the lack of connection. For embodiments where the MDD 152 monitors a time period that the injection or delivery button is pressed, an accelerometer or other depression sensing mechanism can be included. Based on the time of depression measured by the depression sensing mechanism (or pattern of motion, and/or orientation of the pen when the button is depressed), the MDD 152 can determine if the button was pressed was for the purposes of priming or dose administration. The MDD 152 can be configured to distinguish between different types of presses. For example, the MDD 152 can assume a series of short presses are for the purpose of priming, and thus do not count as dose administration.

In one embodiment, the DGS 100 (e.g., SCD 102, display device 120, or MDD 152) can be configured to detect the occurrence of meal consumption and then prompt the user to dose if they haven't yet done so. The DGS 100 can update dose guidance as analyte data is collected during or immediately after the meal and prior to dose administration.

The MDD 152 can also include a temperature sensor and the DGS 100 can adjust insulin dose guidance based upon temperature fluctuations (in case of decreasing insulin efficacy or insulin on board (JOB level)). The system can also be configured to generate a notification if a temperature range is crossed.

The SCD 102 or RD 120 can identify the MDD 152 via communication and determine if the MDD 152 is of the correct type for administering the dose. For example, if the MDD 152 contains rapid acting insulin, where the dose guidance relates to long acting insulin, then the SCD 102 or RD 120 can generate an alarm or notification, or cause the same to be generated by the MDD 102 itself. The SCD 102 or RD 120 can support connections to multiple different MDDs 152 concurrently, including multiple pens of the same type and/or different type.

Any device in the DGS 100 (a "system device" such as e.g., the SCD 102, RD 120, or MDD 152) can estimate the amount of time before the next dose is needed and notify the user. The system device can track the location of the MDD 152 using, e.g., a GPS monitor in the MDD 152 (e.g., geotracking, geofencing), and can notify the user as to the MDD's 152 location.

The MDD 152 can detect the application of a new needle, and if no needle replacement is detected, then prompt the user to apply a new needle. The MDD 152 can be configured with a sensor to detect the presence of air or gas in the needle. The MDD 152 can be configured to detect if the needle has been tapped (e.g., with a sensor or accelerometer) and prompt or request the user to tap the needle to remove the air or gas. A durable pen can detect the presence of the reservoir or cartridge, and prompt the user to input the type of medication (e.g., rapid-acting insulin, long-acting insulin). The MDD 152 can be configured to detect whether the medication is properly mixed (e.g., with a sensor or accelerometer) and prompt the user to mix or shake the MDD 152 to properly mix the medication.

The MDD 152 can be configured to display the time remaining before the MDD 152 battery is depleted or gone, and/or before the medication in the MDD 152 is depleted or gone.

The MDD 152 can be configured to lockout a user in particular circumstances, such as if the user is not authorized (fails login/password entry at the device), if the user's analyte level is too low or rapidly decreasing, if a large dose has recently been administered, if the insulin in the MDD 152 is expired or too old, or has been exposed to excess temperature, if the system status time has been exceeded from previous dose (potentially combined with glucose level), any combination thereof or otherwise.

The system device, e.g., the DGA on the display device 120, can calculate a dose guidance and transmit it to the MDD 152 and/or the cloud 190 (e.g., a trusted server) in case connection is lost or communication fails. The MDD 152 can send a confirmation that the dose guidance has been received; if no confirmation is received, then the system device can generate an alarm or notification to the user.

Prior to administering a dose, such as when the user picks up or otherwise activates the MDD 152, the MDD 152 (or other system device in communication with the MDD 152) can prompt the user to verify that the last dose known by the system is correct (e.g., a query that asks the user to confirm that the last dose of, e.g., 5 ml @ 5 pm, is correct and that there have been no other doses). Such a situation may occur if a different MDD 152 (e.g., a different pen or pump) was used. If the user indicates that no other dose has been taken, then the DGS 100 can proceed. If the user indicates that another dose has been taken (e.g., one not known to the DGS 100), then the system device can prompt the user to enter the dose amount, time, and medication type, and the determine new dose guidance. A system device can also be configured to prompt the user periodically to determine if other pens or medication delivery devices are being used, and request that the user integrate those into the system, e.g., by establishing a Bluetooth pairing.

In many embodiments, a method for parameterizing a patient's medication dosing practice for configuring dose guidance settings is provided, the method including: classifying, by at least one processor based on time-correlated data characterizing an analyte of the patient and doses of a medication received by the patient over an analysis period, wherein each of the doses of the medication is classed in a medication class; grouping, by the at least one processor, each of the doses in one of a set of mealtime groups; generating, by the at least one processor, dose parameters for the patient at least in part by applying data for each of the mealtime groups to a model; and storing, by the at least one processor, the dose parameters in a computer memory for configuring dose guidance settings.

In some embodiments, the classifying step of the method further includes generating a feature matrix correlating a set of classification features to each of the doses. The method can further include classification features that are selected from the group comprising: a medication time for each dose, a time-filtered analyte value, a rate of change of the analyte value closest to the time of medication, a left Area-Under-Curve (AUC) indicating an integrated difference between analyte values and the analyte value closest to the time of medication over an interval prior to the medication time, a right AUC indicating an integrated difference between analyte values the analyte value closest to the time of medication over an interval after the medication time; time elapsed between medication times, probability of a meal starting within a defined interval prior to the medication time, a most probably interval of time elapsed since the most recent meal, probability of a meal starting within a defined interval after the medication time, and a most probably interval of time until the next meal. The method can further include estimating a time for each meal eaten by the patient during the analysis period. The method can further specify that estimating the time for each meal further comprises generating a feature matrix based on the time-correlated analyte data, where the feature matrix correlates a set of analyte data features to each of distinct regions classed as rising, fall-preceding, and falling. The method can further specify that estimating the time for each meal further comprises generating estimated mealtimes based on the feature matrix, using an algorithm. The method can further specify that the set of analyte data features are selected from the group comprising: a maximal analyte rate of change, a maximal analyte acceleration, an analyte value at the maximal analyte acceleration point, a duration of the region, a height of the region, a maximal deceleration, an average rate of the change in the region, and a time of the maximal analyte acceleration.

In some embodiments, the mealtime groups comprise breakfast, lunch, and dinner. In some embodiments, the method further includes grouping by a clustering analysis.

In some embodiments, the model for fitting the data pairs is selected from a linear model with zero slope, a linear model with non-zero slope, a piecewise model with joins at a single point, or a non-linear model that approximates the piecewise model.

In some embodiments, the fitting the data pairs further comprises minimizing a sum of squares residual.

In some embodiments, the fitting the data pairs further comprises evaluating each model with Akaike Information Criterion (AIC) and choosing a model having a minimum AIC value. In some embodiments, the dose parameters comprise a fixed dose medication amount, an analyte level and a correction factor from a chosen model for each group. In some embodiments, the method further includes combining data from multiple mealtime groups to form a combined group, and choosing a best-fitting one of the models and a correction factor for the combined group, by the at least one processor. In some embodiments, the method further includes comparing the AIC value of a chosen model to a threshold, and requesting user input if the AIC value exceeds a threshold, by the at least one processor.

In some embodiments, the analyte comprises an indicator of glucose level and the medication comprises insulin.

In some embodiments, the method further includes providing the dose guidance settings to a user interface device for output to a user.

In some embodiments, the method further includes receiving, by the at least one processor, the time-correlated data characterizing an analyte of the patient and doses of a medication received by the patient over an analysis period.

In some embodiments, the at least one processor selects the medication class for each of the doses of the medication from a meal dose, a non-meal dose, and an ambiguous dose, based on the time-correlated data.

In some embodiments, applying data for each of the mealtime groups to a model comprises fitting data pairs to the model.

In many embodiments, an apparatus for parameterizing a patient's medication dosing practice for configuring dose guidance settings is described, the apparatus includes: an input configured to receive measured analyte data, meal data, and drug dosing data; a display configured to visually present information; and one or more processors coupled with the input, the display, and a memory storing instructions and time-correlated data characterizing an analyte of the patient and doses of a medication received by the patient over an analysis period, where the instructions, when executed by the one or more processors, cause the apparatus to: classify each of the doses of the medication in a medication class, based on the time-correlated data; group each of the doses in one of a set of mealtime groups; generate dose parameters for the patient at least in part by applying data for each of the mealtime groups to a model; and store the dose parameters for configuring dose guidance settings.

In some embodiments, the memory holds further instructions to classify the medication doses at least in part by generating a feature matrix correlating a set of classification features to each of the doses. In some embodiments, the memory holds further instructions for correlating the classification features from the group including: a medication time for each dose, a time-filtered analyte value, a rate of change of the analyte value closest to the time of medication, a left Area-Under-Curve (AUC) indicating an integrated difference between analyte values and the analyte value closest to the time of medication over an interval prior to the medication time, a right AUC indicating an integrated difference between analyte values the analyte value closest to the time of medication over an interval after the medication time; time elapsed between medication times, probability of a meal starting within a defined interval prior to the medication time, a most probably interval of time elapsed since the most recent meal, probability of a meal starting within a defined interval after the medication time, and a most probably interval of time until the next meal. In some embodiments, the memory holds further instructions to classify the medication doses at least in part by estimating a time for each meal eaten by the patient during the analysis period. In some embodiments, the memory holds further instructions for estimating the time for each meal further at least in part by generating a feature matrix based on the time-correlated analyte data, where the feature matrix correlates a set of analyte data features to each of distinct regions classed as rising, fall-preceding, and falling. In some embodiments, the memory holds further instructions for estimating the time for each meal at least in part by generating estimated mealtimes based on the feature matrix, using an algorithm. In some embodiments, the memory holds further instructions for selecting the set of analyte data features from the group comprising: a maximal analyte rate of change, a maximal analyte acceleration, an analyte value at the maximal analyte acceleration point, a duration of the region, a height of the region, a maximal deceleration, an average rate of the change in the region, and a time of the maximal analyte acceleration.

In some embodiments, the memory holds further instructions to group into the mealtime groups including breakfast, lunch, and dinner. In some embodiments, the memory holds further instructions for the grouping at least in part by a clustering analysis.

In some embodiments, the memory holds further instructions for selecting the model for fitting the data pairs from a linear model with zero slope, a linear model with non-zero slope, a piecewise model with joins at a single point, or a non-linear model that approximates the piecewise model.

In some embodiments, the memory holds further instructions for fitting the data pairs at least in part by minimizing a sum of squares residual.

In some embodiments, the memory holds further instructions for fitting the data pairs at least in part by evaluating each model with Akaike Information Criterion (AIC) and choosing a model having a minimum AIC value. In some embodiments, the memory holds the dose parameters including a fixed dose medication amount, an analyte level and a correction factor from a chosen model for each group. In some embodiments, the memory holds further instructions for combining data from multiple mealtime groups to form a combined group, and choosing a best-fitting one of the models and a correction factor for the combined group. In some embodiments, the memory holds further instructions for comparing the AIC value of a chosen model to a threshold, and requesting user input if the AIC value exceeds a threshold. In some embodiments, the memory holds the time-correlated data characterizing an analyte of the patient including an indicator of glucose level and the medication including insulin.

In some embodiments, the memory holds further instructions for providing the dose guidance settings to a user interface device for output to a user.

In some embodiments, the memory holds further instructions for receiving the time-correlated data characterizing an analyte of the patient and doses of a medication received by the patient over an analysis period.

In some embodiments, the memory holds further instructions for selecting the medication class for each of the doses of the medication from a meal dose, a non-meal dose, and an ambiguous dose, based on the time-correlated data.

In some embodiments, the memory holds further instructions for applying data for each of the mealtime groups to a model at least in part by fitting data pairs to the model.

In many embodiments, a method for assessing a meal bolus titration for multiple daily injection (MDI) dosing therapy is provided, the method including: determining, by at least one processor, an analyte pattern type for the at least one time of day (TOD) period by executing a pattern analysis algorithm that receives as input time-correlated analyte data of a patient taken over an analysis period; selecting, by the at least one processor executing a recommendation algorithm, an MDI dosing recommendation based on the analyte pattern type and a defined dosing strategy of the patient for the analysis period; and storing, by the at least one processor, an indicator of the recommended action in a computer memory for output to at least one of a user or a medication dosing device.

In some embodiments, the pattern analysis algorithm is a glucose pattern analysis (GPA) algorithm. In some embodiments, the method can further include determining, by the at least one processor, a central tendency value and a variability value for the at least one TOD period. In some embodiments, the method can further include assessing, by the at least one processor, at least one of a hypoglycemia risk metric or a hyperglycemia risk based on at least one of the central tendency value and the variability value. In some embodiments, the method can further include providing, by the at least one processor, the analyte pattern type for use in the assessing meal bolus titration for an MDI dosing therapy. In some embodiments, the at least one processor assesses the hypoglycemia risk metric based on the central tendency value and the variability value. In some embodiments, the at least one processor assesses the hyperglycemia risk metric based on the central tendency value. In some embodiments, the at least one processor selects a recommendation for no change if the analyte pattern is high/low. In some embodiments, the method further includes generating, by the at least one processor if the analyte pattern for an overnight TOD period is low, a recommendation to reduce all relevant doses, including at least a basal dose and optionally, one or more of a meal dose, premeal correction dose, or post-prandial dose, by an equal amount. In some embodiments, the method further includes generating, by the at least one processor if the analyte pattern for a non-overnight TOD period is low, a recommendation to reduce a fixed meal dose for the non-overnight TOD period only. In some embodiments, if the at least one processor detects at least one low pattern, then the at least one processor provides no titration guidance for any high pattern TOD period. In some embodiments, the method further includes generating, by the at least one processor if the analyte pattern for an overnight TOD period is high and no other TOD periods have a low analyte pattern, a recommendation to increase a long acting insulin dose or basal rate. In some embodiments, the method further includes generating, by the at least one processor if the analyte pattern for an overnight TOD period is high and at least one other non-dinner TOD period has a low analyte pattern, a recommendation to decrease a meal insulin dose for the at least one other non-dinner TOD period. In some embodiments, the method further includes generating, by the at least one processor if the analyte pattern for an overnight TOD period is not high and not low and at least one other TOD period has a high analyte pattern, a recommendation to increase a meal insulin dose for an earliest TOD period having a high analyte pattern. In some embodiments, the method further includes generating, by the at least one processor if the analyte pattern for an overnight TOD period is low and a sole period with a high analyte pattern is a dinner TOD period, a recommendation to increase a long acting insulin dose or basal rate. In some embodiments, the method further includes, by the at least one processor if the analyte pattern for an overnight TOD period is high and at least one day has a missed meal dose, repeating the determining of the analyte pattern type while excluding data for the at least one day from the determining, and if the analyte pattern is high after the repeating the determining, generating a recommendation to increase a long acting insulin dose or basal rate. In some embodiments, the method further includes, by the at least one processor if the analyte pattern for a TOD period is low and at least one day includes a post-meal correction, repeating the determining of the analyte pattern type while excluding data for any day without a post-meal correction from the determining, and if the analyte pattern is low after the repeating the determining, generating a recommendation to reduce a post-meal correction dose. In some embodiments, the method further includes, by the at least one processor if the analyte pattern for a TOD period is low and at least one day includes a post-meal correction, repeating the determining of the analyte pattern type while excluding data for any day without a post-meal correction from the determining, and if the analyte pattern is not low after the repeating the determining, generating a recommendation to reduce a meal dose. In some embodiments, the method further includes, by the at least one processor if the analyte pattern for a TOD period is low and at least one day has a missed meal dose, repeating the determining of the analyte pattern type while excluding data for any day with a missed meal dose from the determining, and if the analyte pattern is not low after the repeating the determining, generating a recommendation to reduce a post-meal correction dose. In some embodiments, the method further includes, by the at least one processor if the analyte pattern for a TOD period is high and at least one day includes a post-meal correction, repeating the determining of the analyte pattern type while excluding data for any day without a post-meal correction or missed dose from the determining, and if the analyte pattern is high after the repeating the determining, generating a recommendation to increase a post-meal correction dose.

In some embodiments, wherein the pattern analysis is a TIR algorithm. In some embodiments, executing the TIR algorithm includes determining, by the at least one processor, a time below target ($t_{BT}$) and a time above target ($t_{AT}$) for the at least one TOD period. In some embodiments, executing the TIR algorithm further includes assessing, by the at least one processor, at least one of a hypoglycemia risk metric or a hyperglycemia risk based on at least the time below target ($t_{BT}$) and the time above target ($t_{AT}$).

In some embodiments, the selecting further includes determining whether the time-correlated analyte data is sufficiently complete to support a recommendation.

In some embodiments, the method further includes receiving, by the at least one processor, the time-correlated analyte data originating from a sensor control device worn by a patient over an analysis period.

In some embodiments, the method further includes receiving, by the at least one processor, information defining doses of a medication received by the patient from a medication delivery device over the analysis period.

In some embodiments, the analyte comprises an indicator of glucose level and the medication comprises insulin.

In many embodiments, an apparatus for providing dose guidance to a subject is described, the apparatus including: an input configured to receive measured analyte data, meal data, and drug dosing data; a display configured to visually present a dose guidance; and one or more processors coupled with the input, the display, and a memory storing instructions, wherein the instructions, when executed by the one or more processors, cause the apparatus to: determine an analyte pattern type for the at least one time of day (TOD) period by executing a pattern analysis algorithm that receives as input time-correlated analyte data of a patient taken over an analysis period; select, by executing a recommendation algorithm, an MDI dosing recommendation based on the analyte pattern type and a defined dosing strategy of the patient for the analysis period; and store an indicator of the recommended action in a computer memory for output to at least one of a user or a medication dosing device.

In some embodiments, the pattern analysis algorithm is a glucose pattern analysis (GPA) algorithm. In some embodiments, the memory holds further instructions for executing the GPA algorithm at least in part by determining a central tendency value and a variability value for the at least one TOD period. In some embodiments, the memory holds further instructions for executing the GPA algorithm at least in part by assessing at least one of a hypoglycemia risk metric or a hyperglycemia risk based on at least one of the central tendency value and the variability value. In some embodiments, the memory holds further instructions for providing the analyte pattern type for use in the assessing meal bolus titration for an MDI dosing therapy. In some embodiments, the memory holds further instructions for assessing the hypoglycemia risk metric based on the central tendency value and the variability value. In some embodiments, the memory holds further instructions for assessing the hyperglycemia risk metric based on the central tendency value. In some embodiments, the memory holds further instructions for selecting a recommendation for no change if the analyte pattern is high/low. In some embodiments, the memory holds further instructions for generating, if the analyte pattern for an overnight TOD period is low, a recommendation to reduce all relevant doses, including at least a basal dose and optionally, one or more of a meal dose, premeal correction dose, or post-prandial dose, by an equal amount. In some embodiments, the memory holds further instructions for generating, if the analyte pattern for a non-overnight TOD period is low, a recommendation to reduce a fixed meal dose for the non-overnight TOD period only. In some embodiments, the memory holds further instructions for, if detecting at least one low pattern, then providing no titration guidance for any high pattern TOD period. In some embodiments, the memory holds further instructions for generating, if the analyte pattern for an overnight TOD period is high and no other TOD periods have a low analyte pattern, a recommendation to increase a long acting insulin dose or basal rate. In some embodiments, the memory holds further instructions for generating, if the analyte pattern for an overnight TOD period is high and at least one other non-dinner TOD period has a low analyte pattern, a recommendation to decrease a meal insulin dose for the at least one other non-dinner TOD period. In some embodiments, the memory holds further instructions for generating, if the analyte pattern for an overnight TOD period is not high and not low and at least one other TOD period has a high analyte pattern, a recommendation to increase a meal insulin dose for an earliest TOD period having a high analyte pattern. In some embodiments, the memory holds further instructions for generating, if the analyte pattern for an overnight TOD period is low and a sole period with a high analyte pattern is a dinner TOD period, a recommendation to increase a long acting insulin dose or basal rate. In some embodiments, the memory holds further instructions for, if the analyte pattern for an overnight TOD period is high and at least one day has a missed meal dose, repeating the determining of the analyte pattern type while excluding data for the at least one day from the determining, and if the analyte pattern is high after the repeating the determining, generating a recommendation to increase a long acting insulin dose or basal rate. In some embodiments, the memory holds further instructions for, if the analyte pattern for a TOD period is low and at least one day includes a post-meal correction, repeating the determining of the analyte pattern type while excluding data for any day without a post-meal correction from the determining, and if the analyte pattern is low after the repeating the determining, generating a recommendation to reduce a post-meal correction dose. In some embodiments, the memory holds further instructions for, if the analyte pattern for a TOD period is low and at least one day includes a post-meal correction, repeating the determining of the analyte pattern type while excluding data for any day without a post-meal correction from the determining, and if the analyte pattern is not low after the repeating the determining, generating a recommendation to reduce a meal dose. In some embodiments, the memory holds further instructions for, if the analyte pattern for a TOD period is low and at least one day has a missed meal dose, repeating the determining of the analyte pattern type while excluding data for any day with a missed meal dose from the determining, and if the analyte pattern is not low after the repeating the determining, generating a recommendation to reduce a post-meal correction dose. In some embodiments, the memory holds further instructions for, if the analyte pattern for a TOD period is high and at least one day includes a post-meal correction, repeating the determining of the analyte pattern type while excluding data for any day without a post-meal correction or missed dose from the determining, and if the analyte pattern is high after the repeating the determining, generating a recommendation to increase a post-meal correction dose.

In some embodiments, the pattern analysis is a TIR algorithm. In some embodiments, the memory holds further instructions for executing the TIR algorithm at least in part by determining a time below target ($t_{BT}$) and a time above target ($t_{AT}$) for the at least one TOD period. In some embodiments, the memory holds further instructions for executing the TIR algorithm at least in part by assessing at least one of a hypoglycemia risk metric or a hyperglycemia risk based on at least the time below target ($t_{BT}$) and the time above target ($t_{AT}$).

In some embodiments, the memory holds further instructions for the selecting at least in part by determining whether the time-correlated analyte data is sufficiently complete to support a recommendation.

In some embodiments, the memory holds further instructions for receiving the time-correlated analyte data originating from a sensor control device worn by a patient over an analysis period.

In some embodiments, the memory holds further instructions for receiving information defining doses of a medication received by the patient from a medication delivery device over the analysis period.

In some embodiments, the analyte comprises an indicator of glucose level and the medication comprises insulin.

In many embodiments, a method for providing dose guidance is described, the method including the steps of: determining, by processing circuitry in response to a user inquiry for dose guidance, a plurality of insulin dose candidates; determining, by processing circuitry, a plurality of glucose time courses corresponding to the plurality of insulin dose candidates; calculating, by processing circuitry, a plurality of cost function values corresponding to the plurality of glucose time courses; determining an optimal insulin dose, wherein the optimal insulin dose has a lowest cost function value of the plurality of cost function values; and outputting a dose guidance that includes the determined optimal insulin dose.

In some embodiments, the determined optimal insulin dose comprises a glucose correction portion, a meal correction portion, and an insulin on board portion.

In some embodiments, the determined optimal insulin dose comprises a glucose correction portion and an insulin on board portion.

In some embodiments, the glucose correction portion, the meal correction portion, and the insulin on board portion are each outputted to the user.

In some embodiments, the plurality of cost function values are calculated to minimize a time out of a target range. In some embodiments, the target range is about 70 mg/dL to about 180 mg/dL.

In some embodiments, the plurality of cost function values are calculated based on an area under the curve determination.

In some embodiments, the dose guidance is for a correction dose.

In some embodiments, the dose guidance is for a meal dose.

In some embodiments, the dose guidance is for a basal dose. In some embodiments, each of the plurality of glucose time courses comprises three meal events. In some embodiments, each of the three meal events comprises a carbohydrate input and a rapid-acting insulin input.

In many embodiments, an apparatus for providing dose guidance to a subject is described, the apparatus including: an input configured to receive measured analyte data, meal data, and drug dosing data, and a user inquiry; a display configured to visually present a dose guidance; and one or more processors coupled with the input, the display, and a memory storing instructions, wherein the instructions, when executed by the one or more processors, cause the one or more processors to: determine in response to a user inquiry for dose guidance, a plurality of insulin dose candidates; determine a plurality of glucose time courses corresponding to the plurality of insulin dose candidates; calculate a plurality of cost function values corresponding to the plurality of glucose time courses; determine an optimal insulin dose, wherein the optimal insulin dose has a lowest cost function value of the plurality of cost function values; and output a dose guidance that includes the determined optimal insulin dose.

In some embodiments, the optimal insulin dose comprises a glucose correction portion, a meal correction portion, and an insulin on board portion.

In some embodiments, the optimal insulin dose comprises a glucose correction portion and an insulin on board portion.

In some embodiments, the glucose correction portion, the meal correction portion, and the insulin on board portion are each outputted to the user.

In some embodiments, the plurality of cost function values are calculated to minimize a time out of a target range. In some embodiments, the target range is about 70 mg/dL to about 180 mg/dL.

In some embodiments, the plurality of cost function values are calculated based on an area under the curve determination.

In some embodiments, the dose guidance is for a correction dose.

In some embodiments, the dose guidance is for a meal dose.

In some embodiments, the dose guidance is for a basal dose. In some embodiments, each of the plurality of glucose time courses comprises three meal events. In some embodiments, each of the three meal events comprises a carbohydrate input and a rapid-acting insulin input.

In many embodiments, a method for providing dose guidance is described, the method including the steps of: determining, by processing circuitry in response to a user inquiry for dose guidance for a meal, a distribution of carbohydrate values for the meal, wherein the distribution includes a central tendency carbohydrate value, a low carbohydrate value that is smaller than the central tendency carbohydrate value, and a high carbohydrate value that is larger than the central tendency carbohydrate value; determining a plurality of insulin dose candidates for each of the central tendency carbohydrate value, low carbohydrate value, and high carbohydrate value; determining, by processing circuitry, a plurality of glucose time courses corresponding to the plurality of insulin dose candidates for each of the central tendency carbohydrate value, low carbohydrate value, and high carbohydrate value; calculating, by processing circuitry, a plurality of cost function values corresponding to the plurality of glucose time courses for each of the central tendency carbohydrate value, low carbohydrate value, and high carbohydrate value; determining an optimal insulin dose for each of the central tendency carbohydrate value, low carbohydrate value, and high carbohydrate value, wherein the optimal insulin dose has a lowest cost function value of the plurality of cost function values for each of the central tendency carbohydrate value, low carbohydrate value, and high carbohydrate value; and outputting, by processing circuitry, a plurality of dose guidances that include the optimal insulin dose determined for each of the central tendency carbohydrate value, low carbohydrate value, and high carbohydrate value.

In some embodiments, the optimal insulin dose comprises a glucose correction portion, a meal correction portion, and an insulin on board portion.

In some embodiments, the glucose correction portion, the meal correction portion, and the insulin on board portion are each outputted to the user.

In some embodiments, the plurality of cost function values are calculated to minimize a time out of a target range. In some embodiments, the target range is about 70 mg/dL to about 180 mg/dL.

In some embodiments, the plurality of cost function values are calculated based on an area under the curve determination.

In many embodiments, an apparatus for providing dose guidance to a subject is described, the apparatus including: an input configured to receive measured analyte data, meal data, and drug dosing data, and a user inquiry; a display configured to visually present a dose guidance; and one or more processors coupled with the input, the display, and a memory storing instructions, wherein the instructions, when executed by the one or more processors, cause the one or more processors to: determine in response to a user inquiry for dose guidance for a meal, a distribution of carbohydrate values for the meal, wherein the distribution includes a central tendency carbohydrate value, a low carbohydrate value that is smaller than the central tendency carbohydrate value, and a high carbohydrate value that is larger than the central tendency carbohydrate value; determine a plurality of insulin dose candidates for each of the central tendency carbohydrate value, low carbohydrate value, and high carbohydrate value; determine a plurality of glucose time courses corresponding to the plurality of insulin dose candidates for each of the central tendency carbohydrate value, low carbohydrate value, and high carbohydrate value; calculate a plurality of cost function values corresponding to the plurality of glucose time courses for each of the central tendency carbohydrate value, low carbohydrate value, and high carbohydrate value; determine an optimal insulin dose for each of the central tendency carbohydrate value, low carbohydrate value, and high carbohydrate value, wherein the optimal insulin dose has a lowest cost function value of the plurality of cost function values for each of the central tendency carbohydrate value, low carbohydrate value, and high carbohydrate value; and output a plurality of dose guidances that include the optimal insulin dose determined for each of the central tendency carbohydrate value, low carbohydrate value, and high carbohydrate value.

In some embodiments, the optimal insulin dose comprises a glucose correction portion, a meal correction portion, and an insulin on board portion.

In some embodiments, the glucose correction portion, the meal correction portion, and the insulin on board portion are each outputted to the user.

In some embodiments, the plurality of cost function values is calculated to minimize a time out of a target range. In some embodiments, the target range is about 70 mg/dL to about 180 mg/dL.

In some embodiments, the plurality of cost function values is calculated based on an area under the curve determination.

In many embodiments, a method for providing a pre-meal correction factor in response to analyte data is described, the method including: determining, by at least one processor, an analyte pattern type for at least one time of day (TOD) period by executing a pattern analysis algorithm that receives as input time-correlated analyte data of a patient taken over an analysis period; determining, by the at least one processor executing an algorithm, a pre-meal correction factor based on the analyte pattern type and a defined dosing strategy of the patient for the analysis period; and storing, by the at least one processor, an indicator of the pre-meal correction in a computer memory for output to at least one of a user or a medication dosing device.

In some embodiments, the pattern analysis algorithm is a glucose pattern analysis (GPA) algorithm. In some embodiments, where the GPA outputs an indication of a low glucose pattern, and further including determining by the at least one processor whether meal doses of the defined dosing strategy include pre-meal corrections. In some embodiments, the method further includes the step of including a portion of the analyte data only for days with meal doses and no missing bolus dose or pre-meal correction, by the at least one processor. In some embodiments, the method further includes the step of testing whether sufficient data remains to achieve a minimum confidence level, by the at least one processor. In some embodiments, the method further includes, by the at least one processor if sufficient data remains, performing the GPA with the portion of the analyte data only for days with meal doses and no missing bolus dose or pre-meal corrections as input. In some embodiments, the method further includes, by the at least one processor, determining whether the glucose pattern from the GPA is low, and if so, reducing a recommendation for a meal portion of each dose for the relevant TOD period. In some embodiments, the method further includes, by the at least one processor if the glucose pattern is not low, reducing the pre-meal correction factor. In some embodiments, the method further includes, by the at least one processor if insufficient data remains, including data for days with pre-meal corrections. In some embodiments, the method further includes, by the at least one processor, testing whether sufficient data exists to achieve a minimum confidence level, with inclusion of data for days with pre-meal correction. In some embodiments, the method further includes, by the at least one processor, performing a second GPA with analyte data including data for days with one or more pre-meal corrections as input. In some embodiments, the method further includes, by the at least one processor, determining whether the glucose pattern from the second GPA is not low, and if so, reducing a recommendation for a meal portion of each dose for the relevant TOD period. In some embodiments, the method further includes, by the at least one processor if the glucose pattern from the second GPA is low, performing a third GPA with analyte data including data with meal doses only as input. In some embodiments, the method further includes, by the at least one processor, determining whether the glucose pattern from the third GPA is not low, and if so, reducing a recommendation for a pre-meal correction. In some embodiments, the method further includes, by the at least one processor if the glucose pattern from the third GPA is low, and if so, reducing a recommendation for a meal portion of each dose for the relevant TOD period. In some embodiments, the GPA outputs an indication of a high glucose pattern, and the method further includes the step of determining by the at least one processor whether the analyte data includes meal doses with pre-meal corrections and if not, exclude data for days with missed boluses and data for days with premeal corrections from the original data set and performing the GPA based thereon. In some embodiments, the method further includes, by the at least one processor, determining whether a glucose pattern determined by the GPA is high, and if not, increasing a pre-meal correction factor. In some embodiments, the method further includes, by the at least one processor, determining whether a glucose pattern determined by the GPA is high, and if so, increasing a recommendation for a meal portion of each dose for the relevant TOD period. In some embodiments, where the GPA outputs an indication of a high glucose pattern, the method further includes determining by the at least one processor whether the analyte data includes meal doses with pre-meal corrections and if so, include data for days with meal doses and premeal corrections and exclude data for days with missed boluses from the original data set and performing the GPA based thereon. In some embodiments, the method further includes, by the at least one processor, determining whether a glucose pattern determined by the GPA is high, and if so, exclude data for days with premeal correction doses and data for days with missed bolus doses from the original data set and performing the GPA based thereon. In some embodiments, the method further includes, by the at least one processor, determining whether a glucose pattern determined by the GPA is high, and if not, increasing a pre-meal correction factor. In some embodiments, the method further includes, by the at least one processor, determining whether a glucose pattern determined by the GPA is high, and if so, increasing a recommendation for a meal portion of each dose for the relevant TOD period. In some embodiments, where the GPA outputs an indication of a high glucose pattern, the method further includes the step of determining by the at least one processor whether the analyte data includes meal doses with pre-meal corrections and if not, exclude data for days with pre-meal corrections and days with missed boluses from the original data set and performing the GPA based thereon. In some embodiments, the method further includes, by the at least one processor, determining whether a glucose pattern determined by the GPA is high, and if so, increasing a recommendation for a meal portion of each dose for the relevant TOD period. In some embodiments, the method further includes, by the at least one processor, determining whether a glucose pattern determined by the GPA is high, and if not, increasing a pre-meal correction factor.

In some embodiments, the pattern analysis is a TIR algorithm. In some embodiments, executing the TIR algorithm includes determining, by the at least one processor, a time below target ($t_{BT}$) and a time above target ($t_{AT}$) for the at least one TOD period. In some embodiments, executing the TIR algorithm further includes assessing, by the at least one processor, at least one of a hypoglycemia risk metric or a hyperglycemia risk based on at least the time below target ($t_{BT}$) and the time above target ($t_{AT}$).

In some embodiments, the analyte comprises an indicator of glucose level and the medication comprises insulin.

In many embodiments, an apparatus for providing a pre-meal correction factor in response to analyte data is described, the apparatus including: an input configured to receive measured analyte data, meal data, and drug dosing data; a display configured to visually present information; and one or more processors coupled with the input, the display, and a memory storing instructions, wherein the instructions, when executed by the one or more processors, cause the apparatus to perform: determining an analyte pattern type for at least one time of day (TOD) period by executing a pattern analysis algorithm that receives as input time-correlated analyte data of a patient taken over an analysis period; determining, by executing an algorithm, a pre-meal correction factor based on the analyte pattern type and a defined dosing strategy of the patient for the analysis period; and storing an indicator of the pre-meal correction in a computer memory for output to at least one of a user or a medication dosing device.

In some embodiments, the memory holds the pattern analysis algorithm being a glucose pattern analysis (GPA) algorithm. In some embodiments, the GPA outputs an indication of a low glucose pattern, and further including determining by the at least one processor whether meal doses of the defined dosing strategy include pre-meal corrections. In some embodiments, the memory holds further instructions for including a portion of the analyte data only for days with meal doses and no missing bolus dose or pre-meal correction. In some embodiments, the memory holds further instructions for testing whether sufficient data remains to achieve a minimum confidence level. In some embodiments, the memory holds further instructions for performing the GPA with the portion of the analyte data only for days with meal doses and no missing bolus dose or pre-meal corrections as input, if sufficient data remains. In some embodiments, the memory holds further instructions for determining whether the glucose pattern from the GPA is low, and if so, reducing a recommendation for a meal portion of each dose for the relevant TOD period. In some embodiments, the memory holds further instructions for reducing the pre-meal correction factor if the glucose pattern is not low. In some embodiments, the memory holds further instructions for including data for days with pre-meal corrections, if insufficient data remains. In some embodiments, the memory holds further instructions for testing whether sufficient data exists to achieve a minimum confidence level, with inclusion of data for days with pre-meal correction. In some embodiments, the memory holds further instructions for performing a second GPA with analyte data including data for days with one or more pre-meal corrections as input. In some embodiments, the memory holds further instructions for determining whether the glucose pattern from the second GPA is not low, and if so, reducing a recommendation for a meal portion of each dose for the relevant TOD period. In some embodiments, the memory holds further instructions for performing a third GPA with analyte data including data with meal doses only as input, if the glucose pattern from the second GPA is low. In some embodiments, the memory holds further instructions for determining whether the glucose pattern from the third GPA is not low, and if so, reducing a recommendation for a pre-meal correction. In some embodiments, the memory holds further instructions for reducing a recommendation for a meal portion of each dose for the relevant TOD period, if the glucose pattern from the third GPA is low.

In some embodiments, the GPA outputs an indication of a high glucose pattern, and the memory holds further instructions for determining whether the analyte data includes meal doses with pre-meal corrections and if not, excluding data for days with missed boluses and data for days with premeal corrections from the original data set and performing the GPA based thereon. In some embodiments, the memory holds further instructions for determining whether a glucose pattern determined by the GPA is high, and if not, increasing a pre-meal correction factor. In some embodiments, the memory holds further instructions for determining whether a glucose pattern determined by the GPA is high, and if so, increasing a recommendation for a meal portion of each dose for the relevant TOD period.

In some embodiments, the GPA outputs an indication of a high glucose pattern, and the memory holds further instructions for determining by the at least one processor whether the analyte data includes meal doses with pre-meal corrections and if so, include data for days with meal doses and premeal corrections and exclude data for days with missed boluses from the original data set and performing the GPA based thereon. In some embodiments, the memory holds further instructions for determining whether a glucose pattern determined by the GPA is high, and if so, excluding data for days with premeal correction doses and data for days with missed bolus doses from the original data set and performing the GPA based thereon. In some embodiments, the memory holds further instructions for determining whether a glucose pattern determined by the GPA is high, and if not, increasing a pre-meal correction factor. In some embodiments, the memory holds further instructions for determining whether a glucose pattern determined by the GPA is high, and if so, increasing a recommendation for a meal portion of each dose for the relevant TOD period. In some embodiments, the GPA outputs an indication of a high glucose pattern, and the memory holds further instructions for determining by the at least one processor whether the analyte data includes meal doses with pre-meal corrections and if not, exclude data for days with pre-meal corrections and days with missed boluses from the original data set and performing the GPA based thereon. In some embodiments, the memory holds further instructions for determining whether a glucose pattern determined by the GPA is high, and if so, increasing a recommendation for a meal portion of each dose for the relevant TOD period. In some embodiments, the memory holds further instructions for determining whether a glucose pattern determined by the GPA is high, and if not, increasing a pre-meal correction factor.

In some embodiments, the analyte comprises an indicator of glucose level and the medication comprises insulin.

In some embodiments, pattern analysis is a TIR algorithm. In some embodiments, the memory holds further instructions for executing the TIR algorithm at least in part by determining, by the at least one processor, a time below target ($t_{BT}$) and a time above target ($t_{AT}$) for the at least one TOD period. In some embodiments, the memory holds further instructions for executing the TIR algorithm at least in part by assessing, by the at least one processor, at least one of a hypoglycemia risk metric or a hyperglycemia risk based on at least the time below target ($t_{BT}$) and the time above target ($t_{AT}$).

In many embodiments, a method of providing dose guidance for administration to a subject at a start of a meal is described, the method including the steps of: determining, by processing circuitry, a first dose guidance for a meal in response to a query from a subject, wherein the first dose guidance is determined for administration to the subject at a time of day at the start of the meal; determining, by processing circuitry with reference to a risk map, whether a risk of hypoglycemia exists based at least on the first dose guidance and the time of day; and outputting a second dose guidance in response to a determination that the risk of hypoglycemia exists, where the second dose guidance is different than the first dose guidance.

In some embodiments, the risk map is based on population data, the subject's data, or a combination thereof.

In some embodiments, the risk map includes a risk of hypoglycemia associated with a time of day or a day of a week.

In some embodiments, the second dose guidance includes a lower amount than the first dose guidance.

In some embodiments, the second dose guidance is associated with a lower risk of hypoglycemia than the first dose guidance.

In many embodiments, an apparatus for providing dose guidance to a subject at a start of a meal is described, the apparatus including: an input configured to receive measured analyte data, meal data, and drug dosing data; a display configured to visually present a dose guidance; and one or more processors coupled with the input, the display, and a memory storing instructions, wherein the instructions, when executed by the one or more processors, cause the one or more processors to: determine a first dose guidance for a meal in response to a query from a subject, wherein the first dose guidance is determined for administration to the subject at a time of day at the start of the meal; determine, with reference to a risk map, whether a risk of hypoglycemia exists based at least on the first dose guidance and the time of day; and output a second dose guidance in response to a determination that the risk of hypoglycemia exists, where the second dose guidance is different than the first dose guidance.

In some embodiments, the risk map is based on population data, the subject's data, or a combination thereof.

In some embodiments, the risk map includes a risk of hypoglycemia associated with a time of day or a day of a week.

In some embodiments, the second dose guidance includes a lower amount than the first dose guidance.

In some embodiments, the second dose guidance is associated with a lower risk of hypoglycemia than the first dose guidance.

In many embodiments, a method of providing dose guidance for administration after a start of a meal is described, the method includes the steps of: determining, by processing circuitry, a first dose guidance for a meal in response to a query from a subject, wherein the first dose guidance is determined for administration to the subject at a start of the meal; determining, by processing circuitry, whether a time delay exists between the start of the meal and the query from the subject; determining, by processing circuitry, in response to a determination of a time delay, whether a risk of hypoglycemia exists based at least on the first dose guidance and the time delay; and outputting a second dose guidance in response to a determination that the risk of hypoglycemia exists, where the second dose guidance is associated with a lower risk of hypoglycemia than the first dose guidance.

In some embodiments, the risk of hypoglycemia is determined by processing circuitry with reference to a data space including a risk map.

In some embodiments, the risk map is population based.

In some embodiments, the risk map is user based.

In some embodiments, the risk map comprises a multi-dimensional surface map derived from a hypoglycemic metric. In some embodiments, the hypoglycemic metric is a function of a plurality of variables selected from the group consisting of a dose time delay, a suggested dose guidance, a recommended dose guidance, an administered dose, and a glucose time series for a predetermined time period following administration of a dose. In some embodiments, the hypoglycemic metric is a time below 70 mg/dL, a time below 54 mg/dL, or a low blood glucose index. In some embodiments, the second dose guidance is determined from a Δ dose/hypoglycemia risk isopotential of the multidimensional surface map.

In many embodiments, an apparatus for providing dose guidance to a subject after a start of a meal is described, the apparatus including: an input configured to receive measured analyte data, meal data, and drug dosing data; a display configured to visually present a dose guidance; and one or more processors coupled with the input, the display, and a memory storing instructions, wherein the instructions, when executed by the one or more processors, cause the one or more processors to: determine a first dose guidance for a meal in response to a query from a subject, wherein the first dose guidance is determined for administration to the subject at a start of the meal; determine whether a time delay exists between the start of the meal and the query from the subject; determine, in response to a determination of a time delay, whether a risk of hypoglycemia exists based at least on the first dose guidance and the time delay; and output a second dose guidance in response to a determination that the risk of hypoglycemia exists, where the second dose guidance is associated with a lower risk of hypoglycemia than the first dose guidance.

In some embodiments, execution of the program causes the one or more processors to determine the risk of hypoglycemia by processing circuitry with reference to a data space including a risk map.

In some embodiments, the risk map is population based.

In some embodiments, the risk map is user based.

In some embodiments, the risk map comprises a multi-dimensional surface map derived from a hypoglycemic metric. In some embodiments, the hypoglycemic metric is a function of a plurality of variables selected from the group consisting of a dose time delay, a suggested dose guidance, a recommended dose guidance, an administered dose, and a glucose time series for a predetermined time period following administration of a dose. In some embodiments, the hypoglycemic metric is a time below 70 mg/dL, a time below 54 mg/dL, or a low blood glucose index. In some embodiments, execution of the program causes the one or more processors to determine the second dose guidance from a Δ dose/hypoglycemia risk isopotential of the multi-dimensional surface map.

In many embodiments, a method of providing late dose guidance for administration after a start of a meal is described, the method including the steps of: receiving a query from a user for dose guidance for a meal having a start time; determining, by processing circuitry, if the query for dose guidance was received after the start of the meal; determining, by processing circuitry, an analyte level of the user associated with the start time; determining a correction dose guidance based on the determined analyte level; and outputting a late dose guidance including a meal dose guidance and the correction dose guidance.

In some embodiments, the method further includes the step of notifying the user of a missed dose.

In some embodiments, the start time of the meal is an estimated start time.

In some embodiments, the late dose guidance is the sum of the meal dose guidance and the correction dose guidance.

In some embodiments, the correction dose guidance is the difference between the determined analyte level and a target analyte, divided by a correction factor.

In some embodiments, the meal dose guidance is a fixed meal dose.

In some embodiments, the meal dose guidance is determined based at least on a carbohydrate content of the meal.

In some embodiments, the drug is insulin and the analyte is glucose.

In many embodiments, an apparatus for providing dose guidance to a subject after a start of a meal is described, the apparatus including: an input configured to receive measured analyte data, meal data, and drug dosing data and a query from a user for dose guidance for a meal having a start time; a display configured to visually present a dose guidance; and one or more processors coupled with the input, the display, and a memory storing instructions, wherein the instructions, when executed by the one or more processors, cause the one or more processors to: determine if the query for dose guidance was received after the start of the meal; determine an analyte level of the user associated with the start time; determine a correction dose guidance based on the determined analyte level; and output a late dose guidance including a meal dose guidance and the correction dose guidance.

In some embodiments, execution of the program causes the one or more processors to notify the user of a missed dose.

In some embodiments, the start time of the meal is an estimated start time.

In some embodiments, the late dose guidance is the sum of the meal dose guidance and the correction dose guidance.

In some embodiments, the correction dose guidance is the difference between the determined analyte level and a target analyte, divided by a correction factor.

In some embodiments, the meal dose guidance is a fixed meal dose.

In some embodiments, the meal dose guidance is determined based at least on a carbohydrate content of the meal.

In some embodiments, the drug is insulin and the analyte is glucose.

In many embodiments, a method of providing dose guidance for administration after a start of a meal is described, the method including the steps of: determining, by processing circuitry, a first dose guidance for a meal in response to a query from a subject; calculating, by processing circuitry, a time delay between a start of the meal and the query from the subject; determining, by processing circuitry, a factor corresponding to an estimated amount of endogenous insulin and the time delay in response to a determination that the time delay is >0; outputting a second dose guidance, wherein the second dose guidance is related to the first dose guidance and the factor.

In some embodiments, the second dose guidance is a product of the first dose guidance and the factor.

In some embodiments, the factor is a fraction.

In some embodiments, the factor is determined from a universal lookup table.

In some embodiments, the first dose guidance is determined for administration to the subject at a start of the meal.

In some embodiments, the first dose guidance is a fixed meal dose.

In some embodiments, the first dose guidance is determined based at least on a carbohydrate content of the meal.

In many embodiments, an apparatus for providing dose guidance to a subject after a start of a meal is described, the apparatus including: an input configured to receive measured analyte data, meal data, and drug dosing data; a display configured to visually present a dose guidance; and one or more processors coupled with the input, the display, and a memory storing instructions, wherein the instructions, when executed by the one or more processors, cause the one or more processors to: determine a first dose guidance for a meal in response to a query from a subject; calculate a time delay between a start of the meal and the query from the subject; determine a factor corresponding to an estimated amount of endogenous insulin and the time delay in response to a determination that the time delay is >0; and output a second dose guidance, wherein the second dose guidance is related to the first dose guidance and the factor.

In some embodiments, the second dose guidance is a product of the first dose guidance and the factor.

In some embodiments, the factor is a fraction.

In some embodiments, execution of the program causes the processor to determine the factor from a universal lookup table.

In some embodiments, execution of the program causes the one or more processors to determine the first dose guidance for administration to the subject at a start of the meal.

In some embodiments, the first dose guidance is a fixed meal dose.

In some embodiments, the first dose guidance is determined based at least on a carbohydrate content of the meal.

In many embodiments, a method for providing dose guidance for a compounded meal is described, the method including the steps of: determining, by processing circuitry in response to a user inquiry for dose guidance, whether the user inquiry was made within a period of time of a first episode, the first episode including a meal having a start time; requesting, by processing circuitry, input from the user to confirm if the meal has been extended with additional food in response to a determination that the user inquiry was made within the period of time; determining, by processing circuitry, a risk of hypoglycemia from the start time of the meal; outputting, by processing circuitry, a notification that a dose guidance cannot be provided in response to a determination of a risk of hypoglycemia; and outputting, by processing circuitry, a dose guidance in response to a determination of no risk of hypoglycemia.

In some embodiments, the method further includes the step of determining a second risk of hypoglycemia after the user has eaten the additional food.

In some embodiments, the method further includes the step of outputting a notice to the user to check a glucose level at least about two hours after the time of the user query to check for hypoglycemia.

In some embodiments, a start of the period of time is the start time of the meal.

In some embodiments, a start of the period of time is a time that a last dose guidance was outputted to the user.

In some embodiments, a start of the period of time is a time that a last insulin dose was provided.

In some embodiments, the predetermined time is selected from the group consisting of about 30 minutes, about 60 minutes, about 90 minutes, and about 120 minutes.

In some embodiments, where determining the risk of hypoglycemia comprises the steps of: determining, by processing circuitry, a point at which the user is in a current glycemic excursion; and calculating, by processing circuitry, a projection of glucose levels to determine if a level of glucose is increasing or decreasing.

In some embodiments, where the dose guidance outputted in response to a determination of no risk of hypoglycemia is a dose guidance according to HCP recommendations for the additional food.

In many embodiments, an apparatus for providing dose guidance for a compounded meal is described, the apparatus including: an input configured to receive measured analyte data, meal data, and drug dosing data and a user inquiry for dose guidance; a display configured to visually present a dose guidance; and one or more processors coupled with the input, the display, and a memory storing instructions, wherein the instructions, when executed by the one or more processors, cause the one or more processors to: determine, in response to a user inquiry for dose guidance, whether the user inquiry was made within a period of time of a first episode, the first episode including a meal having a start time; request input from the user to confirm if the meal has been extended with additional food in response to a determination that the user inquiry was made within the period of time; determine a risk of hypoglycemia from the start time of the meal; output a notification that a dose guidance cannot be provided in response to a determination of a risk of hypoglycemia; and output a dose guidance in response to a determination of no risk of hypoglycemia.

In some embodiments, execution of the program further causes the one or more processors to determine a second risk of hypoglycemia after the user has eaten the additional food.

In some embodiments, execution of the program further causes the one or more processors to output a notice to the user to check a glucose level at least about two hours after the time of the user query to check for hypoglycemia.

In some embodiments, a start of the period of time is the start time of the meal.

In some embodiments, a start of the period of time is a time that a last dose guidance was outputted to the user.

In some embodiments, a start of the period of time is a time that a last insulin dose was provided.

In some embodiments, the predetermined time is selected from the group consisting of about 30 minutes, about 60 minutes, about 90 minutes, and about 120 minutes.

In some embodiments, wherein execution of the program causes the one or more processors to determine the risk of hypoglycemia by causing the processor to: determine a point at which the user is in a current glycemic excursion; and calculate a projection of glucose levels to determine if a level of glucose is increasing or decreasing.

In some embodiments, the dose guidance outputted in response to a determination of no risk of hypoglycemia is a dose guidance according to HCP recommendations for the additional food.

In many embodiments, a method for providing dose guidance is described, the method including the steps of: outputting a first dose guidance in response to a first user inquiry; determining, by processing circuitry, if an amount of drug in an administered first dose is lower than an amount of drug in the first dose guidance; determining, by processing circuitry, if a second user inquiry for a second dose guidance was received within a period of time of administration of the first dose; requesting input from the user to determine if the second user inquiry is to adjust a high glucose level after a meal has been completed; determining, by processing circuitry, a risk of hypoglycemia by at least determining if glycemia in the user is increasing; outputting, by processing circuitry, a notification that the second dose guidance cannot be provided in response to a determination of a risk of hypoglycemia; and outputting, by processing circuitry, the second dose guidance in response to a determination of no risk of hypoglycemia.

In some embodiments, the first dose guidance is a meal dose to be administered at a start of a meal.

In some embodiments, the method further includes the step of recording, by processing circuitry, a difference determined between the amount of drug in the administered first dose and the amount of drug in the first dose guidance.

In some embodiments, the period of time is about 120 minutes.

In some embodiments, determining the risk of hypoglycemia includes determining if a user's glucose levels are rising.

In some embodiments, determining the risk of hypoglycemia includes the steps of: calculating a forward projection of a current glucose level of a user; and determining possible hypoglycemic episodes in the forward projection.

In some embodiments, the second dose guidance comprises a correction dose guidance. In some embodiments, the correction dose guidance is a difference between a current glucose level and a target glucose divided by a correction factor, less a residual insulin on board. In some embodiments, the correction factor is an insulin sensitivity factor of the user.

In many embodiments, an apparatus for providing dose guidance is described, the apparatus including: an input configured to receive measured analyte data, meal data, and drug dosing data and a plurality of user inquiries for dose guidance; a display configured to visually present a dose guidance; and one or more processors coupled with the input, the display, and a memory storing instructions, wherein the instructions, when executed by the one or more processors, cause the one or more processors to: output a first dose guidance in response to a first user inquiry; determine if an amount of drug in an administered first dose is lower than an amount of drug in the first dose guidance; determine if a second user inquiry for a second dose guidance was received within a period of time of administration of the first dose; request input from the user to determine if the second user inquiry is to adjust a high glucose level after a meal has been completed; determine a risk of hypoglycemia by at least determining if glycemia in the user is increasing; output a notification that the second dose guidance cannot be provided in response to a determination of a risk of hypoglycemia; and output the second dose guidance in response to a determination of no risk of hypoglycemia.

In some embodiments, the first dose guidance is a meal dose to be administered at a start of a meal.

In some embodiments, execution of the program further causes the one or more processors to record a difference determined between the amount of drug in the administered first dose and the amount of drug in the first dose guidance.

In some embodiments, the period of time is about 120 minutes.

In some embodiments, determining the risk of hypoglycemia includes determining if a user's glucose levels are rising.

In some embodiments, execution of the program causes the one or more processors to determine the risk of hypoglycemia by causing the processor to: calculate a forward projection of a current glucose level of a user; and determine possible hypoglycemic episodes in the forward projection.

In some embodiments, the second dose guidance comprises a correction dose guidance. In some embodiments, the correction dose guidance is a difference between a current glucose level and a target glucose divided by a correction factor, less a residual insulin on board. In some embodiments, the correction factor is an insulin sensitivity factor of the user.

In many embodiments, a method for alerting a subject is described, the method including the steps of: receiving a plurality of data including analyte time series data and event data; processing at least a portion of the plurality of data to determine an occurrence probability, a predicted timing, and a predicted severity of a future hypo or hyper glycemic episode; and alerting a subject to the predicted future hypo or hyper glycemic episode.

In some embodiments, the event data comprises at least one of meals data, snacks data, exercise data, and drug dosing data. In some embodiments, the drug dosing data comprises bolus insulin dose times and amounts administered. In some embodiments, the drug dosing data comprises basal insulin dose times and amounts administered.

In some embodiments, the event data includes associated time stamps for each event.

In some embodiments, the plurality of data further comprises at least one of location data, calendar day data, time of day data, and stress level data.

In some embodiments, the analyte time series data comprises higher order derivative and integration of the analyte time series data.

In some embodiments, alerting the subject includes outputting a notification including a predicted type and a predicted time of the predicted future hypo or hyper glycemic episode.

In some embodiments, alerting the subject occurs when the occurrence probability, the predicted timing, and the predicted severity are each above a threshold value.

In some embodiments, alerting the subject includes outputting a notification including an association between an event and the predicted future hypo or hyper glycemic episode.

In some embodiments, the predicted future hypo or hyper glycemic episode is based on population-based data, subject-based data, or a combination thereof.

In some embodiments, alerting the subject includes displaying a list of a plurality of predicted future hypo or hyper glycemic episodes.

In many embodiments, an apparatus for alerting a subject is described, the apparatus includes: an input configured to receive a plurality of data including analyte time series data and event data; a display configured to visually present a dose guidance; and one or more processors coupled with the input, the display, and a memory storing instructions, wherein the instructions, when executed by the one or more processors, cause the one or more processors to: process at least a portion of the plurality of data to determine an occurrence probability, a predicted timing, and a predicted severity of a future hypo or hyper glycemic episode; and alert a subject to the predicted future hypo or hyper glycemic episode.

In some embodiments, the event data comprises at least one of meals data, snacks data, exercise data, and drug dosing data. In some embodiments, the drug dosing data comprises bolus insulin dose times and amounts administered. In some embodiments, the drug dosing data comprises basal insulin dose times and amounts administered.

In some embodiments, the event data includes associated time stamps for each event.

In some embodiments, the plurality of data further comprises at least one of location data, calendar day data, time of day data, and stress level data.

In some embodiments, the analyte time series data comprises higher order derivative and integration of the analyte time series data.

In some embodiments, execution of the program further causes the one or more processors to alert the subject by causing the processor to output a notification including a predicted type and a predicted time of the predicted future hypo or hyper glycemic episode.

In some embodiments, execution of the program further causes the one or more processors to alert the subject when the occurrence probability, the predicted timing, and the predicted severity are each above a threshold value.

In some embodiments, execution of the program further causes the one or more processors to alert the subject by causing the processor to output a notification including an association between an event and the predicted future hypo or hyper glycemic episode.

In some embodiments, the predicted future hypo or hyper glycemic episode is based on population-based data, subject-based data, or a combination thereof.

In some embodiments, execution of the program further causes the one or more processors to alert the subject by causing the processor to display a list of a plurality of predicted future hypo or hyper glycemic episodes.

In many embodiments, a method for adjusting medication dosage recommendations is described, the method including: adjusting, by a health care professional, at least one parameter used to provide a drug dose guidance for a subject in a dose guidance application to create a new drug dose guidance; notifying, by processing circuitry, the subject regarding the new drug dose guidance; determining, by processing circuitry, if the subject experiences a hypoglycemia episode during a time period after the at least one parameter has been adjusted; and prompting, by processing circuitry, the health care professional to confirm if the new drug dose guidance should remain unchanged after the end of the time period.

In some embodiments, wherein the time period is about 14 days.

In some embodiments, the at least one parameter is selected from the group consisting of at least one of a fixed dose amount, target glucose, a correction factor, and a duration of drug action.

In some embodiments, the method further includes the step of displaying a glucose concentration profile and drug dosing statistics to the health care professional before the adjusting step.

In some embodiments, the method further includes the step of prompting the subject, the health care professional, or both, by processing circuitry, to approve the new drug dose guidance.

In some embodiments, wherein the drug is insulin.

In many embodiments, an apparatus for adjusting medication dosage recommendations is described, the apparatus including: an input configured to receive analyte data, meal data, and drug dosing data; a display configured to visually present a dose guidance; and one or more processors coupled with the input, the display, and a memory storing instructions, wherein the instructions, when executed by the one or more processors, cause the one or more processors to: adjust at least one parameter used to provide a drug dose guidance for a subject in a dose guidance application to create a new drug dose guidance; notify the subject regarding the new drug dose guidance; determine if the subject experiences a hypoglycemia episode during a time period after the at least one parameter has been adjusted; and prompt the health care professional to confirm if the new drug dose guidance should remain unchanged after the end of the time period.

In some embodiments, the time period is about 14 days.

In some embodiments, the at least one parameter is selected from the group consisting of at least one of a fixed dose amount, target glucose, a correction factor, and a duration of drug action.

In some embodiments, execution of the program further causes the one or more processors to display a glucose concentration profile and drug dosing statistics to the health care professional before execution of the program causes the processor to adjust at least one parameter.

In some embodiments, the method further includes the step of prompting the subject, the health care professional, or both, by processing circuitry, to approve the new drug dose guidance.

In some embodiments, the drug is insulin.

In many embodiments, a method for detecting a defect in a sensor is described, the method including: receiving, by an electronic device, drug dose data of the subject from a medication delivery device; determining, by processing circuitry, if a plurality of drug dose guidances are different compared to a plurality of prior drug doses administered over a period of time, wherein each of the plurality of drug dose guidances and each of the plurality of prior drug doses administered are associated with a time of day period, and wherein each of the plurality of drug dose guidances are compared to one of the plurality of prior drug doses administered that is associated with a same time of day period to determine a difference; determining, by processing circuitry, if a new sensor has been connected to the sensor control device in a time in close proximity to a beginning of the period of time; and recommending, by processing circuitry, to replace the new sensor in response to a determination that the new sensor was connected in the time in close proximity to the beginning of the period of time.

In some embodiments, the plurality of drug dose guidances are higher compared to the plurality of prior drug doses administered within the at least one time of day period.

In some embodiments, the plurality of drug dose guidances are lower compared to the plurality of prior drug doses administered within the at least one time of day period.

In some embodiments, the period of time is about 2 days.

In some embodiments, the drug is insulin.

In many embodiments, an apparatus for detecting a defect in a sensor, the apparatus including: an input configured to receive drug dosing data; a display configured to visually present a dose guidance; and one or more processors coupled with the input, the display, and a memory storing instructions, wherein the instructions, when executed by the one or more processors, cause the one or more processors to: determine if a plurality of drug dose guidances are different compared to a plurality of prior drug doses administered over a period of time, wherein each of the plurality of drug dose guidances and each of the plurality of prior drug doses administered are associated with a time of day period, and wherein each of the plurality of drug dose guidances are compared to one of the plurality of prior drug doses administered that is associated with a same time of day period to determine a difference; determine if a new sensor has been connected to the sensor control device in a time in close proximity to a beginning of the period of time; and recommend to replace the new sensor in response to a determination that the new sensor was connected in the time in close proximity to the beginning of the period of time.

In some embodiments, the plurality of drug dose guidances are higher compared to the plurality of prior drug doses administered within the at least one time of day period.

In some embodiments, the plurality of drug dose guidances are lower compared to the plurality of prior drug doses administered within the at least one time of day period.

In some embodiments, the period of time is about 2 days.

In some embodiments, the drug is insulin.

In many embodiments, a method for detecting changes in a dosing strategy is described, the method including: receiving, by an electronic device, drug dose data of the subject from a medication delivery device; detecting, by processing circuitry, a trend of differences related to a plurality of drug doses administered in a first time of day period over a time period; and notifying, by processing circuitry, a health care provider, the user, or both of the trend of differences.

In some embodiments, the trend of differences includes a difference in an amount of drug administered in the plurality of drug doses in the first time of day period compared to a prior drug dose administered in the first time of day period.

In some embodiments, the trend of differences includes a difference in an efficacy of the plurality of drug doses administered in the first time of day period compared to prior drug doses administered in the first time of day period. In some embodiments, the difference in the efficacy of the plurality of drug doses administered comprises a difference in a post-prandial glucose level in the first time of day period compared a post-prandial glucose level associated with a prior drug dose administered in the first time of day period. In some embodiments, the difference in the efficacy of is a result of a change in an adjunctive therapy. In some embodiments, the difference in the efficacy is a result of a change in a drug analog administered.

In some embodiments, the time period is about three days.

In some embodiments, the method further includes the step of outputting, by processing circuitry, a new dose guidance, wherein the new dose guidance is less than a prior dose for the first time of day period.

In some embodiments, the drug is insulin.

In many embodiments, an apparatus for detecting changes in a dosing strategy is described, the apparatus including: an input configured to receive drug dosing data; a display configured to visually present a dose guidance; and one or more processors coupled with the input, the display, and a memory storing instructions, wherein the instructions, when executed by the one or more processors, cause the one or more processors to: detect a trend of differences related to a plurality of drug doses administered in a first time of day period over a time period; and notify a health care provider, the user, or both of the trend of differences.

In some embodiments, the trend of differences comprises a difference in an amount of drug administered in the plurality of drug doses in the first time of day period compared to a prior drug dose administered in the first time of day period.

In some embodiments, the trend of differences comprises a difference in an efficacy of the plurality of drug doses administered in the first time of day period compared to prior drug doses administered in the first time of day period.

In some embodiments, the difference in the efficacy of the plurality of drug doses administered comprises a difference in a post-prandial glucose level in the first time of day period compared a post-prandial glucose level associated with a prior drug dose administered in the first time of day period. In some embodiments, the difference in the efficacy of is a result of a change in an adjunctive therapy. In some embodiments, the difference in the efficacy is a result of a change in a drug analog administered.

In some embodiments, the time period is about three days.

In some embodiments, execution of the program further causes the one or more processors to output a new dose guidance, wherein the new dose guidance is less than a prior dose for the first time of day period.

In some embodiments, the drug is insulin.

In many embodiments, a method for detecting dosing strategy changes is described, the method including: detecting, by processing circuitry, a difference related to a drug dose administered to a subject in a first time period as compared to a dose guidance provided for the first time period; detecting, by processing circuitry, any hypoglycemic episodes associated with the drug dose administered in the first time period; and notifying, by processing circuitry, the subject, an HCP, or both of the any hypoglycemic episodes associated with the drug dose administered in the first time period that were detected.

In some embodiments, detecting any hypoglycemic episodes includes detecting a trend of hypoglycemic episodes related to differences in the drug dose administered in the first time period as compared to the dose guidance provided for the first time period. In some embodiments, the trend of hypoglycemic episodes comprises at least three hypoglycemic episodes.

In some embodiments, notifying the subject or HCP comprises providing a note in a glucose patterns report or in a drug logbook.

In some embodiments, wherein notifying the subject or HCP comprises alerting an HCP.

In some embodiments, the method further includes the step of notifying the subject of the difference detected. In some embodiments, the difference detected is administration of a different drug type. In some embodiments, the notification can further include a warning of a possible upcoming hypoglycemic episode. In some embodiments, the difference detected is a difference in an amount of the drug dose administered in the first time period as compared to dose guidance provided for the first time period.

In some embodiments, the drug is insulin.

In many embodiments, an apparatus for detecting dosing strategy changes is described, the apparatus including: an input configured to receive analyte time series data and drug dosing data; a display configured to visually present a dose guidance; and one or more processors coupled with the input, the display, and a memory storing instructions, wherein the instructions, when executed by the one or more processors, cause the one or more processors to: detect a difference related to a drug dose administered to a subject in a first time period as compared to a dose guidance provided for the first time period; detect any hypoglycemic episodes associated with the drug dose administered in the first time period; and notify the subject, an HCP, or both of the any hypoglycemic episodes associated with the drug dose administered in the first time period that were detected.

In some embodiments, execution of the program causes the one or more processors to detect any hypoglycemic episodes by causing the processor to detect a trend of hypoglycemic episodes related to differences in the drug dose administered in the first time period as compared to the dose guidance provided for the first time period. In some embodiments, the trend of hypoglycemic episodes comprises at least three hypoglycemic episodes.

In some embodiments, execution of the program causes the one or more processors to notify the subject, the HCP, or both by causing the processor to provide a note in a glucose patterns report or in a drug logbook.

In some embodiments, execution of the program causes the one or more processors to notify the subject, the HCP, or both by causing the processor to notify the HCP with an alert.

In some embodiments, execution of the program causes the one or more processors to notify the subject, the HCP, or both by causing the processor to notify the subject of the difference detected. In some embodiments, the difference detected is administration of a different drug type. In some embodiments, the notification can further comprise a warning of a possible upcoming hypoglycemic episode. In some embodiments, the difference detected is a difference in an amount of the drug dose administered in the first time period as compared to dose guidance provided for the first time period.

In some embodiments, the drug is insulin and the analyte is glucose.

In many embodiments, a method for managing the administration of multiple doses is described, the method including: receiving, by an electronic device, drug dose data of the subject from a medication delivery device; detecting, by processing circuitry, administration of a plurality of drug doses comprising at least a first and a last dose, wherein the last dose is administered within a time period of the first dose; recording, by processing circuitry, the last dose as a dose administered if a first criteria is satisfied; and recording, by processing circuitry, an amount of the first and the last dose combined as the dose administered if a second criteria is satisfied.

In some embodiments, the first criteria includes an amount of the first dose is smaller than an amount of the last dose.

In some embodiments, the first criteria includes an amount of the first dose is between about 1 U to about 3 U.

In some embodiments, the first criteria includes the time period between administration of the first dose and last dose is under about 3 minutes.

In some embodiments, the first criteria includes the time period between administration of the first dose and last dose is under about 1 minute.

In some embodiments, the second criteria includes the time period between administration of the first dose and last dose is between about 4 minutes to about 35 minutes.

In some embodiments, the second criteria includes the time period between administration of the first dose and last dose is between about 4 minutes to about 30 minutes.

In some embodiments, the second criteria includes an amount of the first dose is greater than about 2 U.

In some embodiments, the plurality of drug doses further comprises an intermediate dose administered between the first and the last dose. In some embodiments, the first criteria is satisfied if an amount of the first dose and the intermediate dose is approximately equal. In some embodiments, the first criteria is satisfied if an amount of the intermediate dose is between about 1 U to about 3 U. In some embodiments, the second criteria is satisfied if the time period between administration of the first dose and last dose is between about 5 minutes to about 35 minutes.

In some embodiments, the drug is insulin.

In many embodiments, an apparatus for managing the administration of multiple doses is described, the apparatus including: an input configured to receive drug dose data; a display configured to visually present a dose guidance; and one or more processors coupled with the input, the display, and a memory storing instructions, wherein the instructions, when executed by the one or more processors, cause the one or more processors to: detect administration of a plurality of drug doses including at least a first and a last dose, wherein the last dose is administered within a time period of the first dose; record the last dose as a dose administered if a first criteria is satisfied; and record an amount of the first and the last dose combined as the dose administered if a second criteria is satisfied.

In some embodiments, the first criteria includes an amount of the first dose is smaller than an amount of the last dose.

In some embodiments, the first criteria includes an amount of the first dose is between about 1 U to about 3 U.

In some embodiments, the first criteria includes the time period between administration of the first dose and last dose is under about 3 minutes.

In some embodiments, the first criteria includes the time period between administration of the first dose and last dose is under about 1 minute.

In some embodiments, the second criteria includes the time period between administration of the first dose and last dose is between about 4 minutes to about 35 minutes.

In some embodiments, the second criteria includes the time period between administration of the first dose and last dose is between about 4 minutes to about 30 minutes.

In some embodiments, the second criteria includes an amount of the first dose is greater than about 2 U.

In some embodiments, the plurality of drug doses further comprises an intermediate dose administered between the first and the last dose. In some embodiments, the first criteria is satisfied if an amount of the first dose and the intermediate dose is approximately equal. In some embodiments, the first criteria is satisfied if an amount of the intermediate dose is between about 1 U to about 3 U. In some embodiments, the second criteria is satisfied if the time period between administration of the first dose and last dose is between about 5 minutes to about 35 minutes.

In some embodiments, the drug is insulin.

In many methods, a method for determining drug dose guidance is described, the method including: receiving, by an electronic device, drug dose data of the subject from a medication delivery device; detecting, by processing circuitry, a missed administration of a drug dose, wherein the drug dose has a time period associated with a duration of action; disregarding, by processing circuitry, analyte data associated with the time period when determining adjustments to drug dose guidance.

In some embodiments, the missed administration of the recommended drug dose is detected by detecting a gap in drug dose data received by the electronic device.

In some embodiments, the method further includes the step of detecting, by processing circuitry, meal events from analyte data, wherein the missed administration of the drug dose is detected by detecting a gap in drug dose data near a time when a meal event was detected.

In some embodiments, the time period is about 4 hours.

In some embodiments, the time period is about 24 hours.

In some embodiments, the analyte is glucose and the drug is insulin.

In many embodiments, an apparatus for determining dose guidance is described, the apparatus including: an input configured to receive drug dose data; a display configured to visually present a dose guidance; and one or more processors coupled with the input, the display, and a memory storing instructions, wherein the instructions, when executed by the one or more processors, cause the one or more processors to: detect a missed administration of a drug dose, wherein the drug dose has a time period associated with a duration of action; and disregard analyte data associated with the time period when determining adjustments to drug dose guidance.

In some embodiments, the missed administration of the recommended drug dose is detected by detecting a gap in drug dose data received by the electronic device.

In some embodiments, the instructions, when executed by the one or more processors, cause the one or more processors to detect meal events from analyte data, wherein the missed administration of the drug dose is detected by detecting a gap in drug dose data near a time when a meal event was detected.

In some embodiments, the time period is about 4 hours.

In some embodiments, the time period is about 24 hours.

In some embodiments, the analyte is glucose and the drug is insulin.

In many embodiments, a method for managing a dosing strategy is described, the method including: receiving, by an electronic device, drug dose data of a subject from a medication delivery device; detecting, by processing circuitry, a missed administration of a drug dose; determining, by processing circuitry, an amount of time that analyte levels of the subject has remained in a goal range for first and second time periods, wherein the first and second time periods are the same amount of time, wherein the first time period does not contain the missed administration of the drug dose, and wherein the second time period contains the missed administration of the drug dose; and notifying, by processing circuitry, the user of the determined time in range for the first and second time periods.

In some embodiments, the notifying step further includes a positive message regarding a benefit of adhering to an administration schedule of recommended drug doses.

In some embodiments, the analyte is glucose and the drug is insulin.

In many embodiments, an apparatus for managing a dosing strategy is described, the apparatus including: an input configured to receive drug dose data; a display configured to visually present a dose guidance; and one or more processors coupled with the input, the display, and a memory storing instructions, wherein the instructions, when executed by the one or more processors, cause the one or more processors to: detect a missed administration of a drug dose; determine an amount of time that analyte levels of the subject has remained in a goal range for first and second time periods, wherein the first and second time periods are the same amount of time, wherein the first time period does not contain the missed administration of the drug dose, and wherein the second time period contains the missed administration of the drug dose; and notify the user of the determined time in range for the first and second time periods.

In some embodiments, the instructions, when executed by the one or more processors, cause the one or more processors to provide a positive message regarding a benefit of adhering to an administration schedule of recommended drug doses.

In some embodiments, the analyte is glucose and the drug is insulin.

In many embodiments, a method for recommending an adjustment in a drug dose is described, the method including: outputting a first dose guidance in response to detecting in analyte data of a subject, by processing circuitry, a low analyte pattern in at least a first time of day period, wherein the first dose guidance is less than a prior dose for the at least the first time of day period; outputting a second dose guidance in response to detecting in analyte data of the subject, by processing circuitry, a high analyte pattern in an overnight period, wherein the second dose guidance is less than a prior dose for the overnight period; and outputting a third dose guidance in response to detecting in analyte data of the subject, by processing circuitry, a high analyte pattern in at least one post-meal period, wherein the third dose guidance is less than a prior dose for the at least one post-meal period, wherein if it is determined that a high analyte pattern exists in more than one post-meal period, the third dose guidance is associated with a post-meal period having a high analyte pattern that occurs earliest in the day.

In some embodiments, the second dose guidance is a new basal drug dose that is higher than a prior basal drug dose.

In some embodiments, the second dose guidance is a new drug dose that is lower than a prior drug dose for one or more periods of the day associated with a low analyte pattern in response to detecting a high analyte pattern in an overnight period.

In some embodiments, the third dose guidance is in response to a high analyte pattern in a post-dinner period, and wherein the third dose guidance is a new drug dose that is higher than a prior drug dose associated with the post-dinner period.

In some embodiments, the third dose guidance is in response to a high analyte pattern in a post-dinner period, and wherein the third dose guidance is a new basal dose that is lower than a prior basal.

In some embodiments, the drug is insulin and the analyte is glucose.

In many embodiments, an apparatus for recommending an adjustment in a drug dose is described, the apparatus including: an input configured to receive drug dose data and analyte data; a display configured to visually present a dose guidance; and one or more processors coupled with the input, the display, and a memory storing instructions, wherein the instructions, when executed by the one or more processors, cause the one or more processors to: output a first dose guidance in response to detecting in analyte data of a subject, by processing circuitry, a low analyte pattern in at least a first time of day period, wherein the first dose guidance is less than a prior dose for the at least the first time of day period; output a second dose guidance in response to detecting in analyte data of the subject, by processing circuitry, a high analyte pattern in an overnight period, wherein the second dose guidance is less than a prior dose for the overnight period; and output a third dose guidance in response to detecting in analyte data of the subject, by processing circuitry, a high analyte pattern in at least one post-meal period, wherein the third dose guidance is less than a prior dose for the at least one post-meal period, wherein if it is determined that a high analyte pattern exists in more than one post-meal period, the third dose guidance is associated with a post-meal period having a high analyte pattern that occurs earliest in the day.

In some embodiments, the second dose guidance is a new basal drug dose that is higher than a prior basal drug dose.

In some embodiments, the second dose guidance is a new drug dose that is lower than a prior drug dose for one or more periods of the day associated with a low analyte pattern in response to detecting a high analyte pattern in an overnight period.

In some embodiments, the third dose guidance is in response to a high analyte pattern in a post-dinner period, and wherein the third dose guidance is a new drug dose that is higher than a prior drug dose associated with the post-dinner period.

In some embodiments, the third dose guidance is in response to a high analyte pattern in a post-dinner period, and wherein the third dose guidance is a new basal dose that is lower than a prior basal.

In some embodiments, the drug is insulin and the analyte is glucose.

In many embodiments, a method for recommending drug doses is described, the method including: receiving, by an electronic device, drug dose data of a subject from a medication delivery device; determining, by processing circuitry, if the electronic device has received data associated with a last dose administered to the subject; notifying the subject that a dose guidance cannot be made in response to a determination that data associated with the last dose administered to the subject was not received by the electronic device; and outputting a dose guidance in response to a determination that data associated with the last dose administered to the subject was received by the electronic device.

In some embodiments, the determining step comprises determining if drug dose data has been received by the electronic device within at least a time period. In some embodiments, the time period is about 6 hours.

In some embodiments, the determining step comprises determining if the medication delivery device is connected to the electronic device.

In some embodiments, the determining step comprises determining if the electronic device is enabled for communication with the medication delivery device.

In some embodiments, the determining step comprises determining if a power source associated with the medication delivery device needs to be replaced.

In some embodiments, the notifying step further comprises notifying the subject of a timestamp of an drug dose that was last received by the electronic device.

In some embodiments, the drug is insulin.

In many embodiments, an apparatus for recommending drug doses is described, the apparatus including: an input configured to receive drug dose data; a display configured to visually present a dose guidance; and one or more processors coupled with the input, the display, and a memory storing instructions, wherein the instructions, when executed by the one or more processors, cause the one or more processors to: determine if the electronic device has received data associated with a last dose administered to the subject; notify the subject that a dose guidance cannot be made in response to a determination that data associated with the last dose administered to the subject was not received by the electronic device; and output a dose guidance in response to a determination that data associated with the last dose administered to the subject was received by the electronic device.

In some embodiments, where the instructions, when executed by the one or more processors, cause the one or more processors to determine if drug dose data has been received by the electronic device within at least a time period. In some embodiments, the time period is about 6 hours.

In some embodiments, where the instructions, when executed by the one or more processors, cause the one or more processors to determine if the medication delivery device is connected to the electronic device.

In some embodiments, where the instructions, when executed by the one or more processors, cause the one or more processors to determine if the electronic device is enabled for communication with the medication delivery device.

In some embodiments, where the instructions, when executed by the one or more processors, cause the one or more processors to determine if a power source associated with the medication delivery device needs to be replaced.

In some embodiments, where the instructions, when executed by the one or more processors, cause the one or more processors to notify the subject of a timestamp of an drug dose that was last received by the electronic device.

In some embodiments, the drug is insulin.

In many embodiments, a method for determining abnormalities in a dose guidance system is described, the method including: determining, by processing circuitry, a first rolling insulin metric associated with a first time from insulin dose data received from a medication delivery device; determining, by processing circuitry, a first rolling glucose metric associated with the first time from glucose data received from a sensor control device; determining, by processing circuitry with reference to a data space including first, second, and third zones, which of the first, second, and third zones contains a complement pair including the first rolling insulin metric and the first rolling glucose metric, wherein the data space is defined by a plurality of complement pairs, each complement pair including a rolling insulin metric and a rolling glucose metric associated with the same time; outputting a notification regarding checking at least one of the sensor control device or the medication delivery device in response to a determination that the complement pair including the first rolling insulin metric and the first rolling glucose metric is contained in the second or third zone.

In some embodiments, the rolling insulin metric is a total dose of insulin within a time period. In some embodiments, the time period is selected from the group consisting of about 24, about 48, and about 72 hours. In some embodiments, the total dose of insulin is a total dose of long and rapid-acting insulin within the time period.

In some embodiments, the rolling insulin metric is an insulin-on-board at an elapsed time since a meal start.

In some embodiments, the rolling glucose metric is selected from the group consisting of a rolling mean glucose, a rolling median glucose, and a rolling mode glucose.

In some embodiments, the rolling glucose metric is a meal-start normalized glucose AUC or a change in meal glucose.

In some embodiments, data form the complement pairs are collected at a regular time interval.

In some embodiments, the second and third zones are associated with an abnormal insulin dose or glucose measurement.

In some embodiments, the plurality of complement pairs in the data space are correlated to form a curve of a nominal expected relationship. In some embodiments, a lower and an upper safety boundary are located below and above the curve of the nominal expected relationship. In some embodiments, the first, second, and third zones of the data space are defined by the lower and the upper safety boundary, wherein the second zone is above the upper safety boundary and the third zone is below the lower safety boundary.

In many embodiments, an apparatus for determining abnormalities in a dose guidance system is described, the apparatus including: an input configured to receive drug dose data and analyte data; a display configured to visually present a dose guidance; and one or more processors coupled with the input, the display, and a memory storing instructions, wherein the instructions, when executed by the one or more processors, cause the one or more processors to: determine a first rolling insulin metric associated with a first time from insulin dose data received from a medication delivery device; determine a first rolling glucose metric associated with the first time from glucose data received from a sensor control device; determine, with reference to a data space including first, second, and third zones, which of the first, second, and third zones contains a complement pair including the first rolling insulin metric and the first rolling glucose metric, wherein the data space is defined by a plurality of complement pairs, each complement pair including a rolling insulin metric and a rolling glucose metric associated with the same time; and output a notification regarding checking at least one of the sensor control device or the medication delivery device in response to a determination that the complement pair including the first rolling insulin metric and the first rolling glucose metric is contained in the second or third zone.

In some embodiments, the rolling insulin metric is a total dose of insulin within a time period. In some embodiments, the time period is selected from the group consisting of about 24, about 48, and about 72 hours. In some embodiments, the total dose of insulin is a total dose of long and rapid-acting insulin within the time period.

In some embodiments, the rolling insulin metric is an insulin-on-board at an elapsed time since a meal start.

In some embodiments, the rolling glucose metric is selected from the group consisting of a rolling mean glucose, a rolling median glucose, and a rolling mode glucose.

In some embodiments, the rolling glucose metric is a meal-start normalized glucose AUC or a change in meal glucose.

In some embodiments, data form the complement pairs are collected at a regular time interval.

In some embodiments, the second and third zones are associated with an abnormal insulin dose or glucose measurement.

In some embodiments, the plurality of complement pairs in the data space are correlated to form a curve of a nominal expected relationship. In some embodiments, a lower and an upper safety boundary are located below and above the curve of the nominal expected relationship. In some embodiments, the first, second, and third zones of the data space are defined by the lower and the upper safety boundary, wherein the second zone is above the upper safety boundary and the third zone is below the lower safety boundary.

In many embodiments, a method for monitoring injection site locations is described; the method including: determining a first distance between an electronic device and a sensor control device and a second distance between the electronic device and a medication delivery device; calculating a third distance between the SCD and the MDD, wherein the SCD is at a fixed location on the subject; determining if the calculated third distance between the SCD and the MDD is substantially similar to a prior calculated third distance; and outputting a recommendation to move the MDD to a new injection site on the subject.

In some embodiments, the first and second distances are determined through Bluetooth communication between the electronic device and the sensor control device and between the electronic device and the medication delivery device.

In some embodiments, the first distance is determined by a strength of a first signal between the electronic device and the sensor control device, and wherein the second distance is determined by a strength of a second signal between the electronic device and the medication delivery device. In some embodiments, the third distance is calculated by triangulating the first signal and the second signal.

In some embodiments, the first signal and second signals are BLE signals.

In some embodiments, the recommendation is outputted if the calculated third distance is determined to be substantially similar to two prior calculated third distances. In some embodiments, the first and second distances are determined in response to a request for dose guidance, and wherein the two prior calculated third distances were calculated for first and second injections that were administered immediately prior to a current request for dose guidance.

In some embodiments, the recommendation includes a proposed new injection site.

In many embodiments, an apparatus for monitoring injection site locations is described, the apparatus including: an input configured to receive drug dose data and analyte data; a display configured to visually present a dose guidance; and one or more processors coupled with the input, the display, and a memory storing instructions, wherein the instructions, when executed by the one or more processors, cause the one or more processors to: determine a first distance between an electronic device and a sensor control device and a second distance between the electronic device and a medication delivery device; calculate a third distance between the SCD and the MDD, wherein the SCD is at a fixed location on the subject; determine if the calculated third distance between the SCD and the MDD is substantially similar to a prior calculated third distance; and output a recommendation to move the MDD to a new injection site on the subject.

In some embodiments, the first and second distances are determined through Bluetooth communication between the electronic device and the sensor control device and between the electronic device and the medication delivery device.

In some embodiments, the first distance is determined by a strength of a first signal between the electronic device and the sensor control device, and wherein the second distance is determined by a strength of a second signal between the electronic device and the medication delivery device. In some embodiments, the third distance is calculated by triangulating the first signal and the second signal.

In some embodiments, the first signal and second signals are BLE signals.

In some embodiments, the recommendation is outputted if the calculated third distance is determined to be substantially similar to two prior calculated third distances. In some embodiments, the first and second distances are determined in response to a request for dose guidance, and wherein the two prior calculated third distances were calculated for first and second injections that were administered immediately prior to a current request for dose guidance.

In some embodiments, the recommendation includes a proposed new injection site.

For any of the methods described herein, the methods can be executed on at least one processor of a remote device, e.g., a server, phone/receiver, on the medication delivery device, or on the glucose monitoring device.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A system for parameterizing a patient's medication dosing practice for configuring dose guidance settings for the treatment of diabetes, the system comprising:
an on-body unit configured to be worn on a skin surface of the patient, the on-body unit comprising:
an analyte sensor configured to be in contact with interstitial fluid of the patient and monitor analyte levels of the user; and
sensor electronics coupled to the analyte sensor and configured to wirelessly transmit analyte data of the patient;
a medication delivery device configured to administer medication doses and wirelessly transmit medication dose data of the patient;
a display configured to visually present information; and
one or more processors in communication with the on-body unit, the medication delivery device, and the display, the one or more processors coupled to a memory storing instructions that when executed by the one or more processors, cause the system to:
receive analyte data of the patient from the on-body unit and medication dose data of the patient from the medication delivery device over an analysis period;
detect a meal time using a first model based on the analyte data and the medication dose data, wherein the first model is a machine learning model;
classify medication doses received by the patient over the analysis period based on a feature matrix correlating a set of classification features and the meal time to each of the medication doses, wherein the set of classification features comprises a probability of a meal starting within a defined interval prior to a medication time of the medication dose;
group each of the classified medication doses in one of a set of mealtime groups;
generate dose parameters for the patient at least in part by applying the analyte data and the medication dose data for each of the groups of the set of mealtime groups to a second model, wherein the second model is configured to output the generated dose parameters, and wherein the dose parameters include a fixed dose medication amount;
store the dose parameters for configuring dose guidance settings;
adjust a fixed dose medication amount of the medication delivery device for each corresponding mealtime group based on the stored dose parameters to minimize a time out of a target analyte range of the patient; and
output, on the display, the adjusted fixed dose medication amount for each corresponding mealtime group.

2. The system of claim 1, wherein the memory holds further instructions for correlating the classification features from the group comprising: a medication time for each dose, a time-filtered analyte value, a rate of change of the analyte value closest to the time of medication, a left Area-Under-Curve (AUC) indicating an integrated difference between analyte values and the analyte value closest to the time of medication over an interval prior to the medication time, a right AUC indicating an integrated difference between analyte values and the analyte value closest to the time of medication over an interval after the medication time, time elapsed between medication times, a most probable interval of time elapsed since the most recent meal, probability of a meal starting within a defined interval after the medication time, and a most probable interval of time until the next meal.

3. The system of claim 1, wherein the memory holds further instructions to classify the medication doses at least in part by estimating a time for each meal eaten by the patient during the analysis period.

4. The system of claim 3, wherein the memory holds further instructions for estimating the time for each meal further at least in part by generating the feature matrix based on the analyte data and the medication dose data, wherein the feature matrix correlates a set of analyte data features to each of distinct regions classed as rising, fall-preceding, and falling.

5. The system of claim 4, wherein the memory holds further instructions for estimating the time for each meal at least in part by generating estimated mealtimes based on the feature matrix, using an algorithm.

6. The system of claim 4, wherein the memory holds further instructions for selecting the set of analyte data features from the group comprising: a maximal analyte rate of change, a maximal analyte acceleration, an analyte value at the maximal analyte acceleration point, a duration of the region, a height of the region, a maximal deceleration, an average rate of the change in the region, and a time of the maximal analyte acceleration.

7. The system of claim 1, wherein the memory holds further instructions to group each of the classified medication doses into the set of mealtime groups comprising breakfast, lunch, and dinner.

8. The system of claim 7, wherein the memory holds further instructions for the grouping at least in part by a clustering analysis.

9. The system of claim 1, wherein the memory holds the analyte data comprising an indicator of glucose level and the medication dose data comprising the medication doses comprising insulin.

10. The system of claim 1, wherein the memory holds further instructions for applying the analyte data and the medication dose data for each of the mealtime groups to the second model at least in part by fitting data pairs to the second model, wherein the data pairs each comprise a pre-meal glucose level and a corresponding meal dose amount.

11. The system of claim 10, wherein the memory holds further instructions for selecting the second model for fitting data pairs from a linear model with zero slope, a linear model with non-zero slope, a piecewise model with joins at a single point, or a non-linear model that approximates the piecewise model.

12. The system of claim 10, wherein the memory holds further instructions for fitting data pairs at least in part by minimizing a residual sum of squares.

13. The system of claim 10, wherein the memory holds further instructions for fitting data pairs at least in part by evaluating each second model with Akaike Information Criterion (AIC) and choosing a second model having a minimum AIC value.

14. The system of claim 13, wherein the dose parameters further comprise an analyte level and a correction factor from a chosen second model for each group.

15. The system of claim 14, wherein the memory holds further instructions for combining data from multiple mealtime groups to form a combined group, and choosing a best-fitting one of the second models and a correction factor for the combined group.

16. The system of claim 13, wherein the memory holds further instructions for comparing the AIC value of a chosen second model to a threshold, and requesting user input if the AIC value exceeds the threshold.

17. The system of claim 1, wherein the machine learning model comprises a pre-trained machine learning model based on one or more classification algorithms.

18. The system of claim 1, wherein the machine learning model is based on tree building rules and a feature threshold for each feature in each tree.

19. The system of claim 1, wherein the classified medication doses comprise a meal dose, a pre-meal correction dose, a post-meal correction dose, a basal dose, a missed meal dose, or an ambiguous dose.

20. The system of claim 1, wherein the memory holds further instructions for the classifying at least in part by extracting one or more features of the analyte data and the medication dose data.

21. The system of claim 1, wherein rows of the feature matrix correspond to each of the medication doses over the analysis period and each row comprises a feature vector for a corresponding medication dose.

22. The system of claim 21, wherein each feature vector is based at least in part on a corresponding segment of analyte data in a time range relative to the corresponding medication dose.

* * * * *